United States Patent [19]
Lagree et al.

[11] Patent Number: 5,627,716
[45] Date of Patent: May 6, 1997

[54] OVERCURRENT PROTECTION DEVICE

[75] Inventors: James L. Lagree, Plum Borough; Harry W. Wargo, Bethel Park; Anthony Tomeo, Penn Hills; Joseph C. Engel, Monroeville Boro, all of Pa.

[73] Assignee: Eaton Corporation, Cleveland, Ohio

[21] Appl. No.: 610,679

[22] Filed: Mar. 5, 1996

Related U.S. Application Data

[63] Continuation of Ser. No. 907,131, Jun. 30, 1992, abandoned, which is a continuation-in-part of Ser. No. 636,634, Dec. 28, 1990, Pat. No. 5,270,898.

[51] Int. Cl.$^6$ ...................................................... H02H 3/08
[52] U.S. Cl. .................................. 361/93; 361/64; 361/96
[58] Field of Search .............................. 361/93, 64, 63, 361/68, 69, 75, 96, 97; 364/487

[56] References Cited

U.S. PATENT DOCUMENTS

| | | | |
|---|---|---|---|
| 4,331,997 | 5/1982 | Engel et al. | 361/93 |
| 4,351,013 | 9/1982 | Matsko et al. | 361/96 |
| 4,653,073 | 3/1987 | Vercellotti et al. | 375/94 |
| 4,685,024 | 8/1987 | Martellock et al. | 361/93 |
| 4,827,369 | 5/1989 | Saletta et al. | 361/96 |
| 4,866,557 | 9/1989 | Fitts et al. | 361/96 |
| 5,007,013 | 4/1991 | Elms | 364/900 |

OTHER PUBLICATIONS

"Interrupt–Driven Microprocessor Based Overcurrent Relay", by M.A. Manzoul, IEEE Transactions on Industrial Electronics, vol. 38, No. 1, pp. 8–9, Feb. 1991.

"Rule–Based Coordination Program Evaluates Distribution Transformer Overcurrent Protection Alternatives", by S. Mendis, M. Bishop, D. Gonzalez, IEEE Computer Applications in Power, pp. 31–36, Apr. 1991.

"Modeling Overcurrent Relay Characteristics", by S. Chan, R. Maurer, Computer Applications in Power, vol. 5, No. 1, pp. 41–45, Jan. 1992.

ETAP Brochure by Operation Technology, Inc., pp. 1–18, undated.

*Primary Examiner*—Todd DeBoer
*Attorney, Agent, or Firm*—Martin J. Moran

[57] ABSTRACT

A microprocessor based overcurrent trip unit includes an analog circuit for monitoring phase currents in the electrical interrupting device. The analog circuit is adapted to interface with the microprocessor over a range of selectable setpoints for instantaneous tripping and at the same time accurately monitor the phase currents even during a condition when the current sensing transformers are saturated. The overcurrent trip unit also allows the function of the long time delay characteristics of protection curve to be varied in order to provide better coordination with the characteristics of other overcurrent tripping devices in an electrical distribution system, such as a current limiting fuse, thereby enhancing the overall reliability of the system. For example, the function may be varied to provide either a fixed or FLAT, It, $I^2t$ and $I^4t$ functions. The overcurrent tripping device also allows for relatively wide adjustment ranges for the long time delay and short time delay protection portions of an overcurrent protection curve. In order to prevent any overlapping of the protection ranges, the long time delay portion is prevented from tripping the interrupting device prior to the short time delay portion.

34 Claims, 82 Drawing Sheets

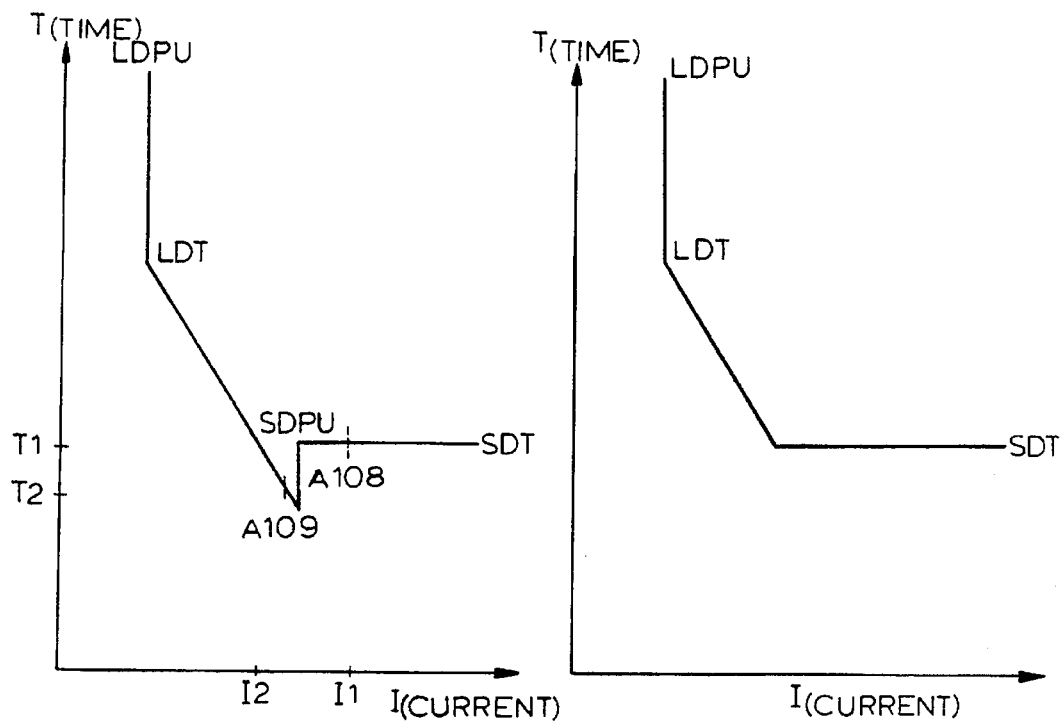
FIG.7  FIG.8
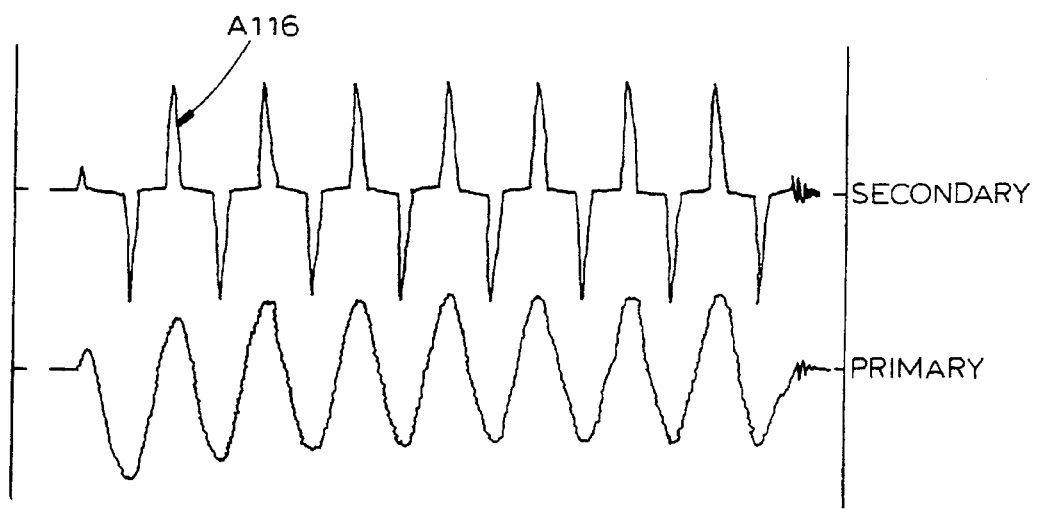
FIG.9

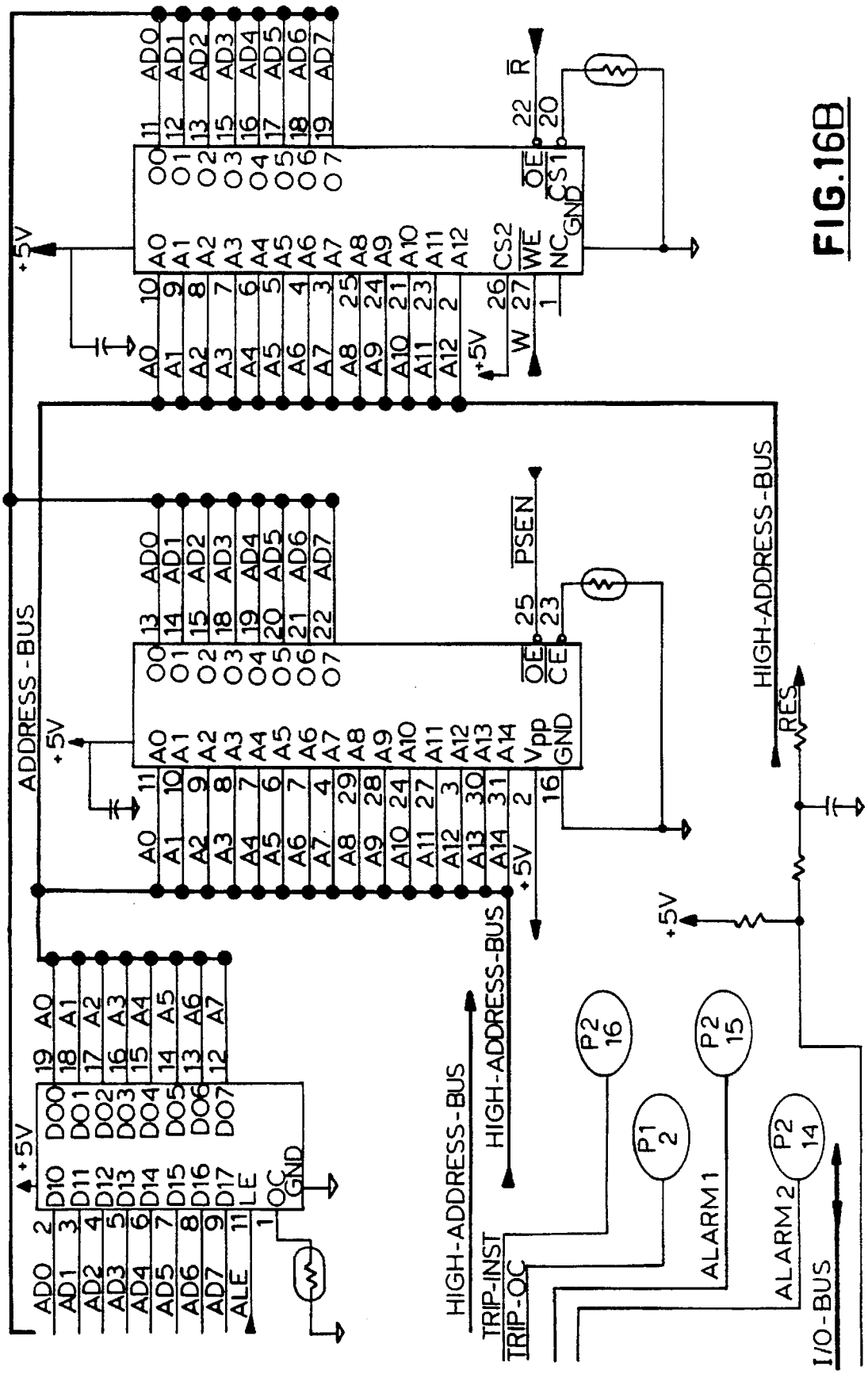

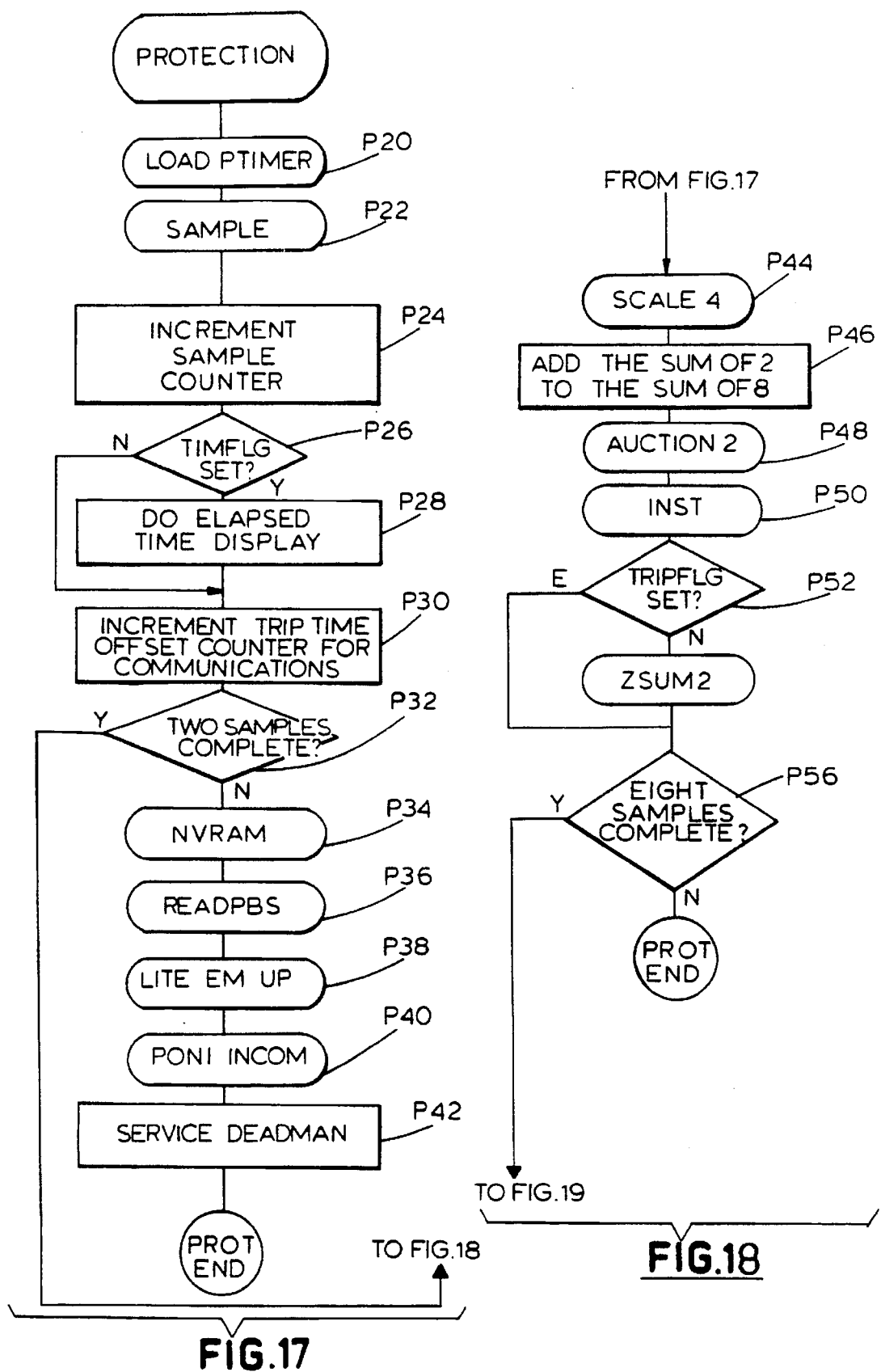

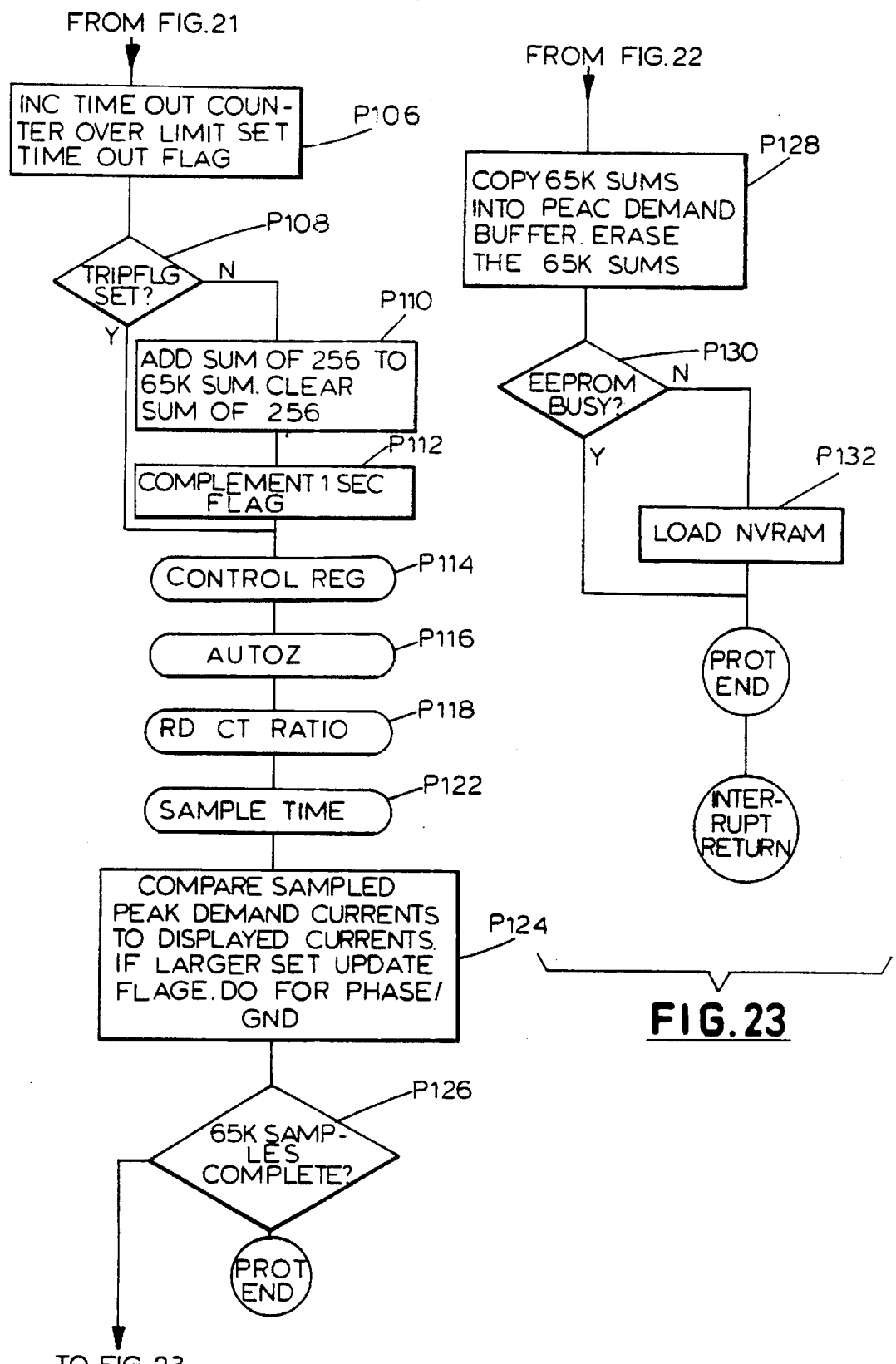

FIG. 35A

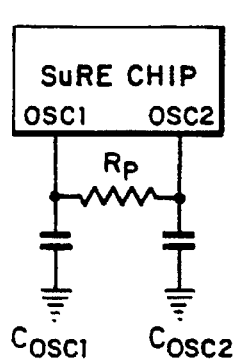

FIG. 35B

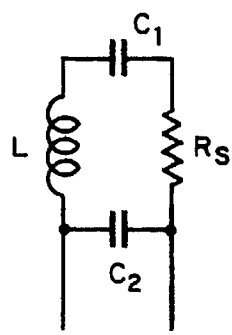

FIG. 35C

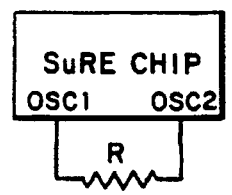

FIG. 35D

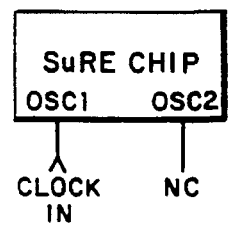

FIG. 36

| Address | Region | | Address | Register |
|---|---|---|---|---|
| $FFFF | USER VECTORS 16 BYTES | | $FFFF | RESET VECTOR |
| $FFF0 | | | $FFFE | |
| $FFEF | SELF CHECK ROM 240 BYTES | | $FFFC | SWI VECTOR |
| $FF00 | | | $FFFA | IRQ VECTOR |
| $EFFF | USER ROM 4096 BYTES | | $FFF8 | TIMER VECTOR |
| $EF00 | | | $FFF6 | COMPARATOR VECTOR |
| $EEFF | | | $FFF4 | A/D VECTOR |
| | UNUSED 28,416 BYTES | EXTERNAL ROM (EXPANDED MODE) 32,768 BYTES | $FFF2 | SPI VECTOR |
| | | | $FFF0 | INCOM VECTOR |
| | | | $2F | ICSR |
| | | | $2E | ICCR |
| | | | $2D | ICM3 |
| | | | $2C | ICM2 |
| | | | $2B | ICM1 |
| | | | $2A | ICM0 |
| | | | $29 | ICAL |
| | | | $28 | ICAH |
| | | | $27 | ACSF |
| | | | $26 | AVSF |
| | | | $25 | AMZ |
| | | | $24 | ADZ |
| | | | $23 | ACFR |
| | | | $22 | ADC |
| | | | $21 | AMUX |
| $8000 | | | $20 | ADCR |
| $7FFF | | | $1F | TEST REGISTER |
| | EXTERNAL RAM 16,384 BYTES | | $1E | CONFIGURATION CFR |
| | | | $1D | PWM |
| | | | $1C | EEPROM NVCR |
| | | | $1B | TARL |
| | | | $1A | TARH |
| | | | $19 | TCRL |
| | | | $18 | TCRH |
| | | | $17 | TOCL |
| | | | $16 | TOCH |
| | | | $15 | TICL |
| | | | $14 | TICH |
| | | | $13 | TSR |
| $4000 | | | $12 | TCR |
| $3FFF | | | $11 | TSCL |
| $0FF0 | DMC | | $10 | TSCH |
| $0200 | | | | |
| $01FF | EEPROM 256 BYTES | | $0F | UNUSED |
| | | | $0E | |
| $0100 | | | $0D | |
| $00FF | STACK 64 BYTES | | $0C | SPD |
| | | | $0B | SPSR |
| $01C0 | | | $0A | SPCR |
| $00BF | | | $09 | CMPI |
| | RAM 208 BYTES | | $08 | CMPST |
| | | | $07 | PDC |
| $0030 | | | $06 | PCC |
| $002F | I/O RESISTORS 48 BYTES | | $05 | PBC |
| | | | $04 | PAC |
| | | | $03 | PDD |
| | | | $02 | PCD |
| | | | $01 | PBD |
| $0000 | | | $00 | PAD |

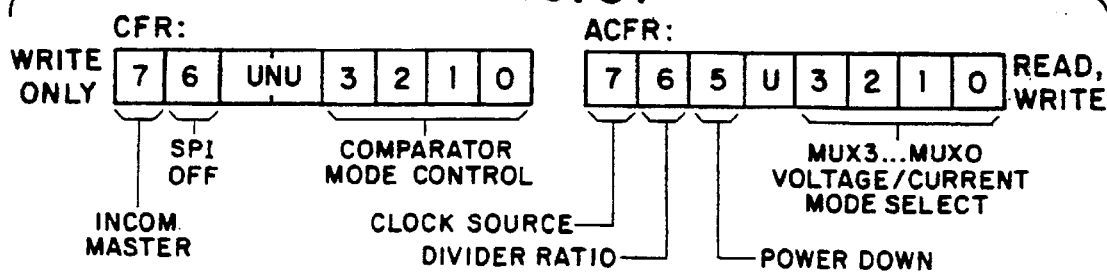
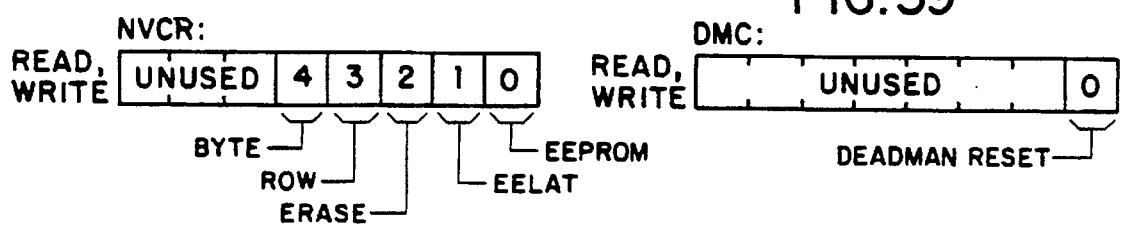
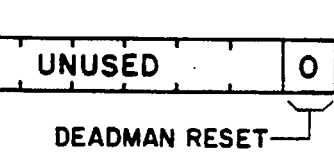
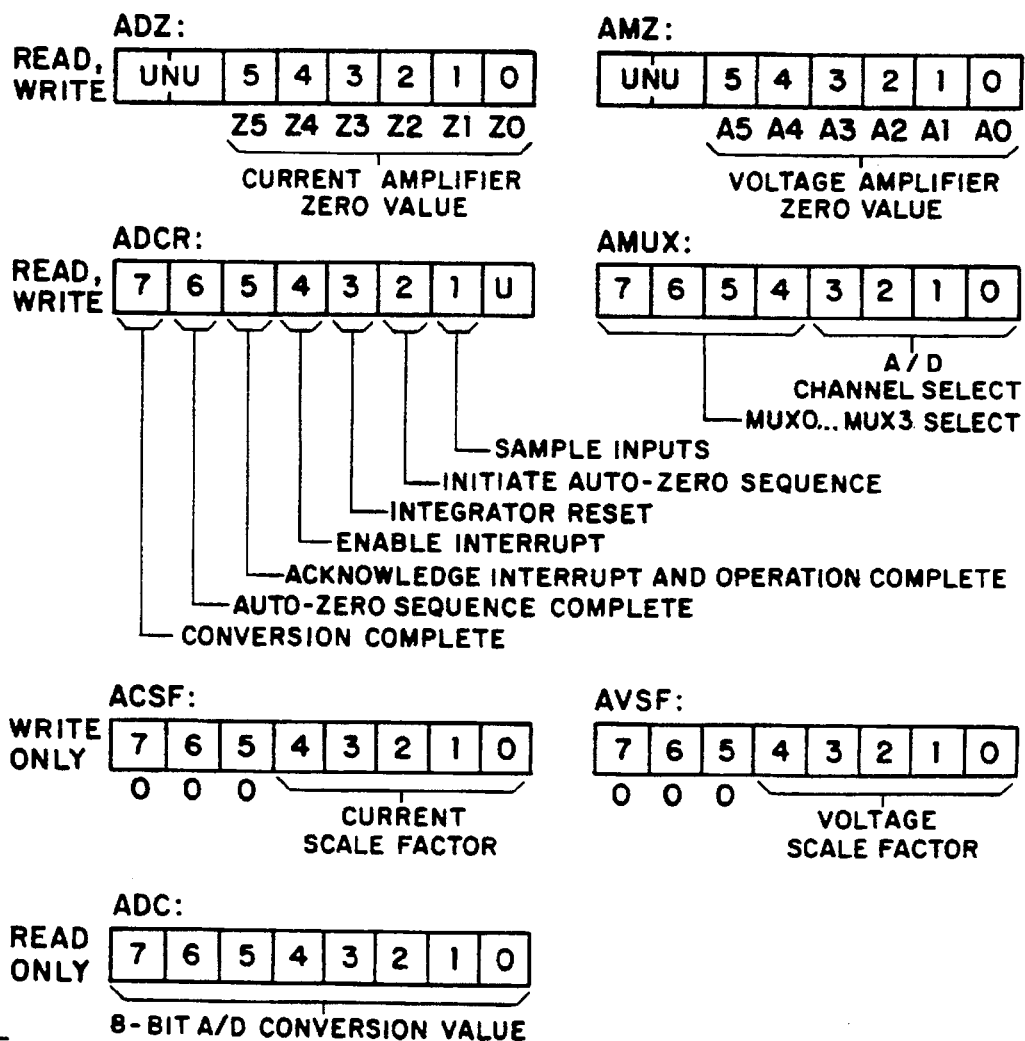

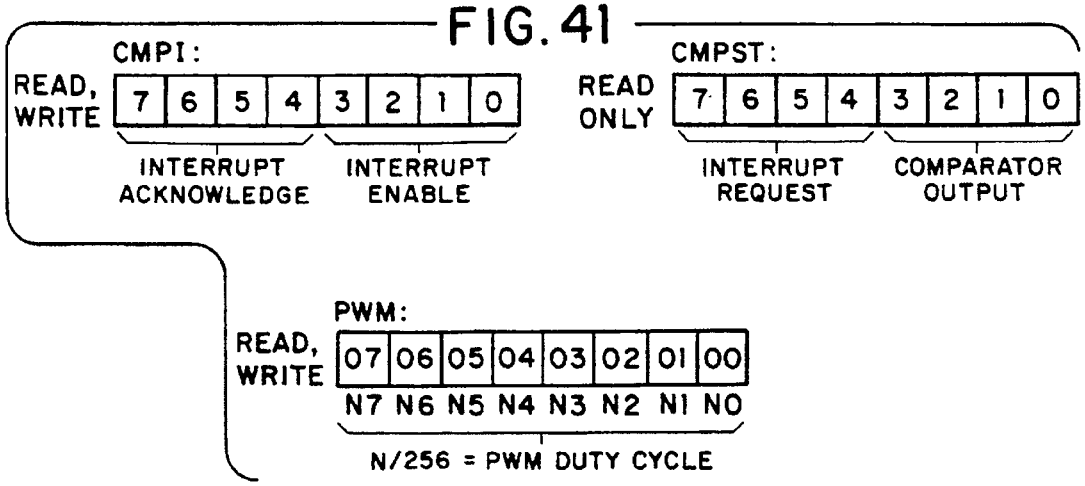
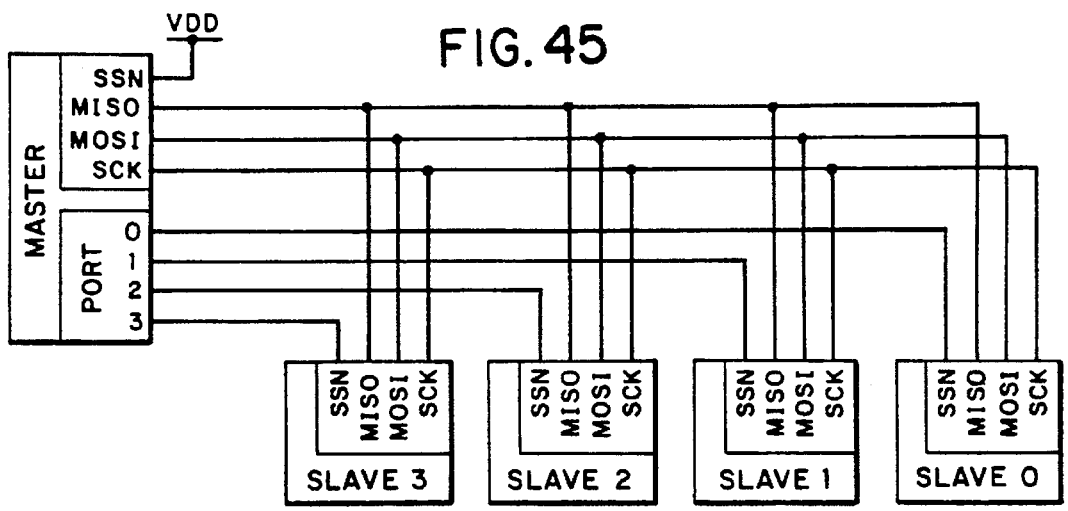
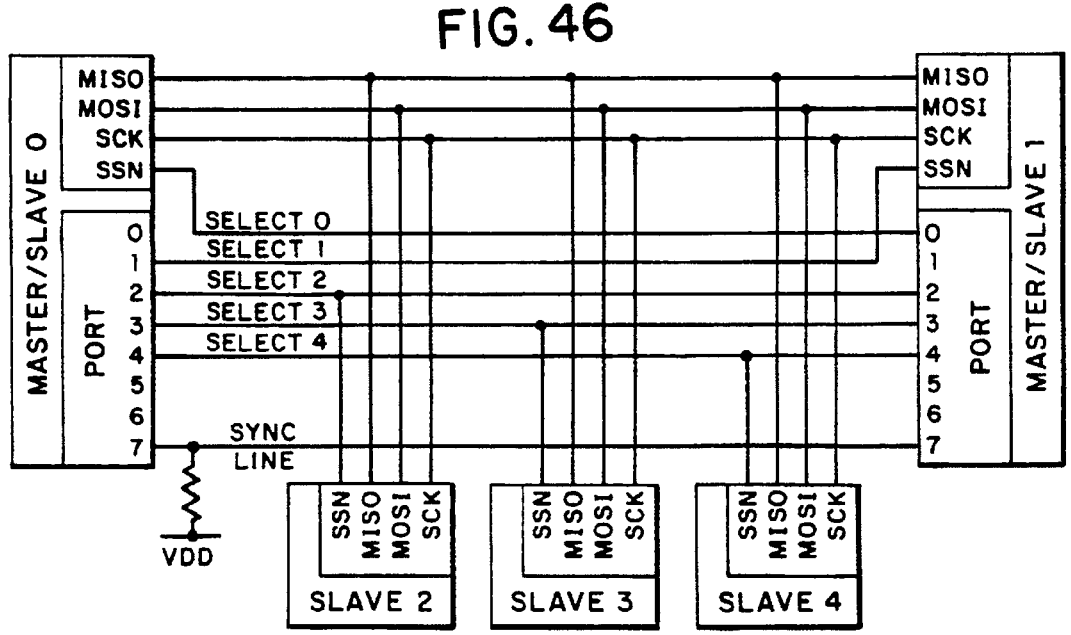

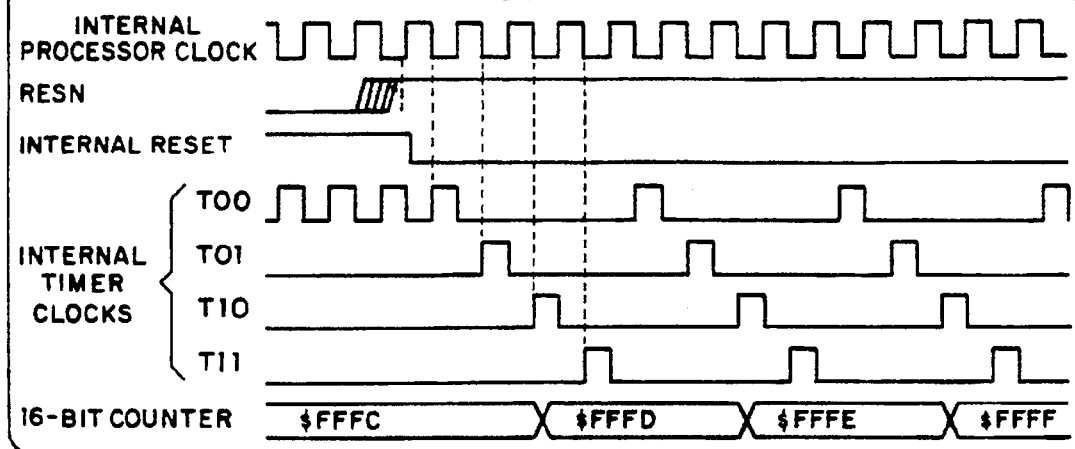
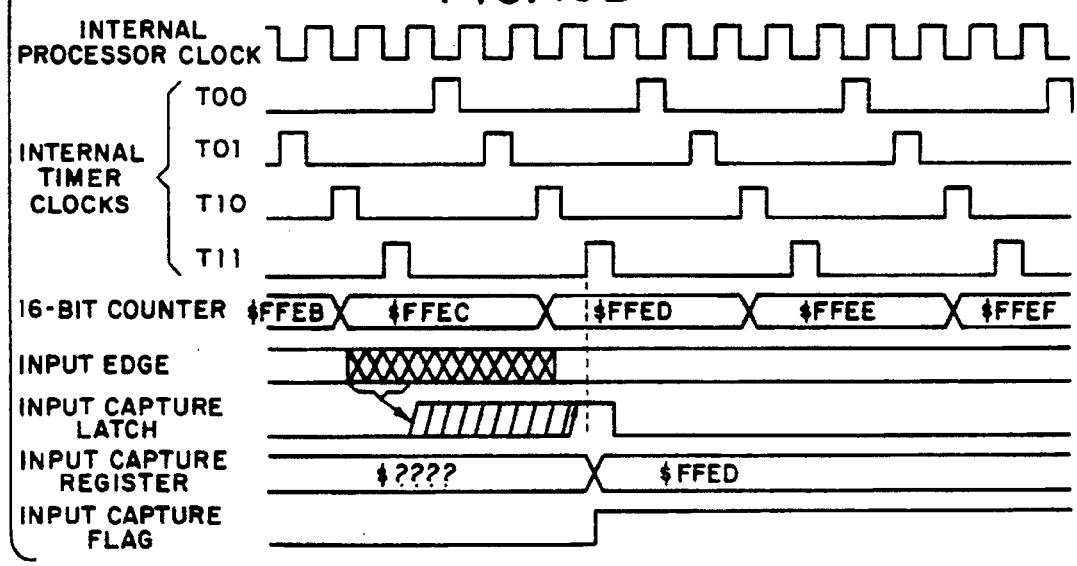
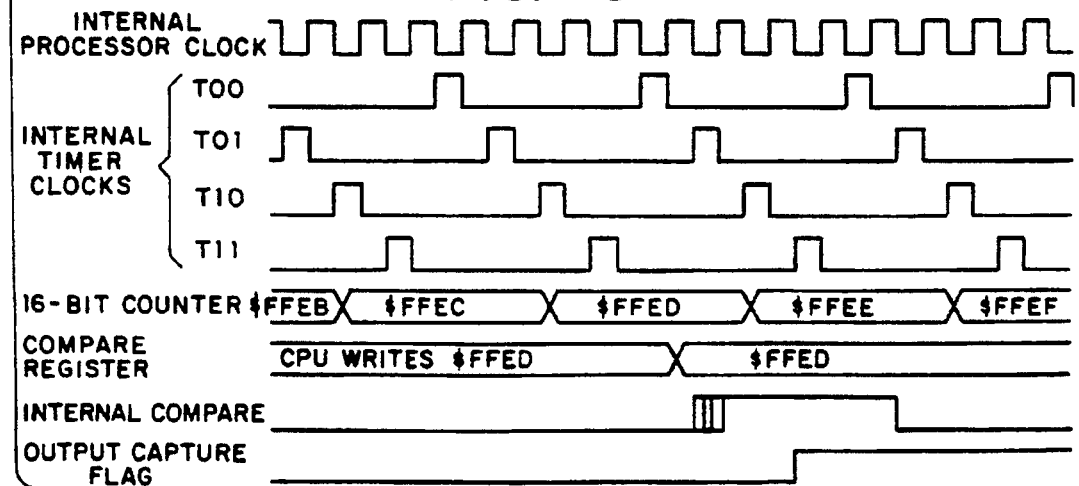

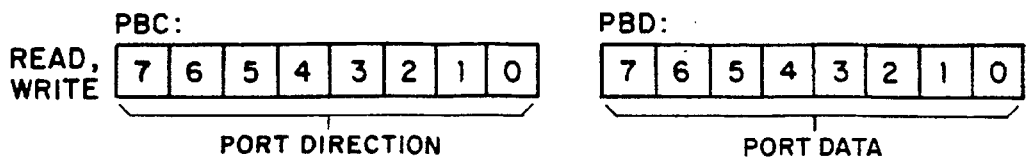
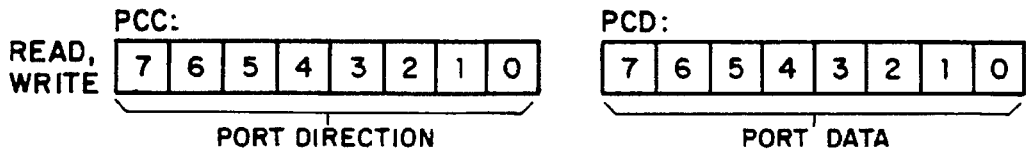
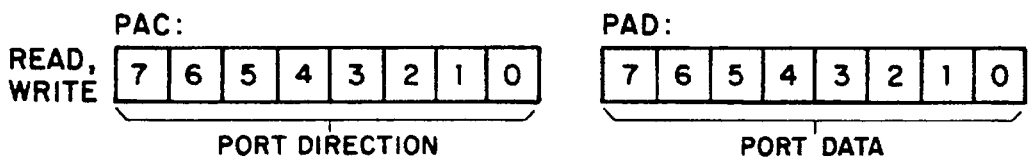
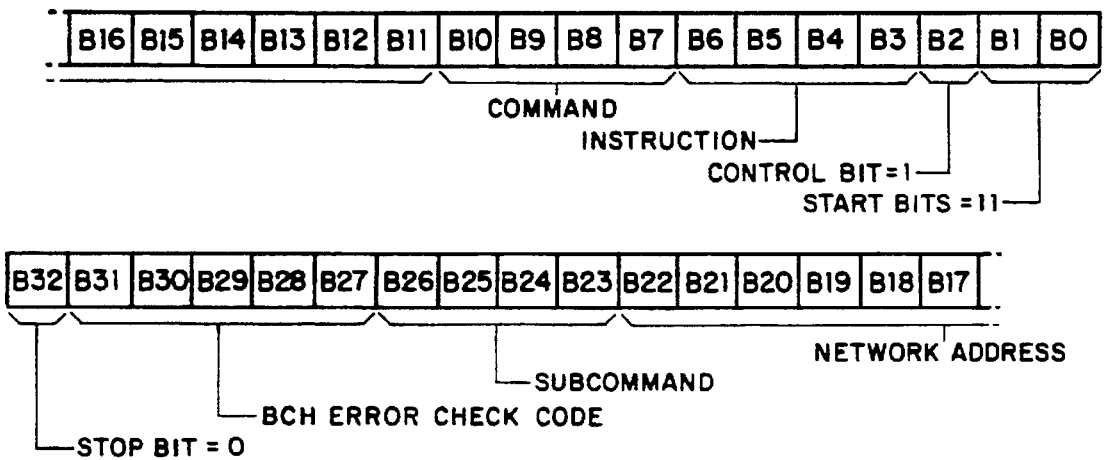
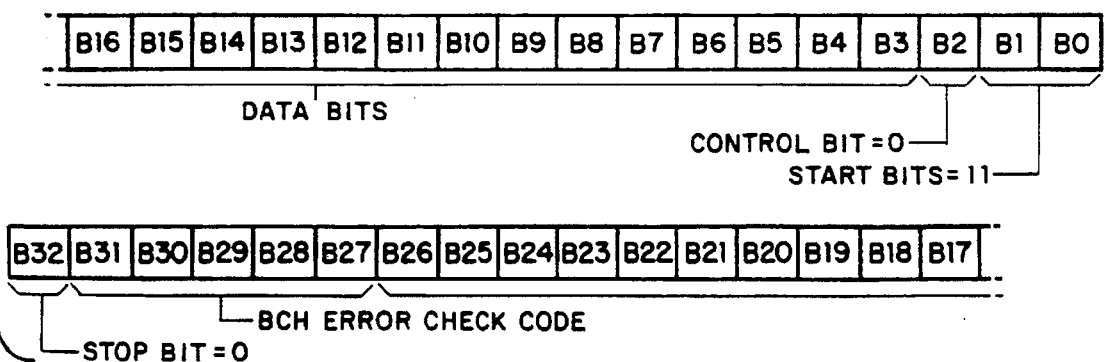

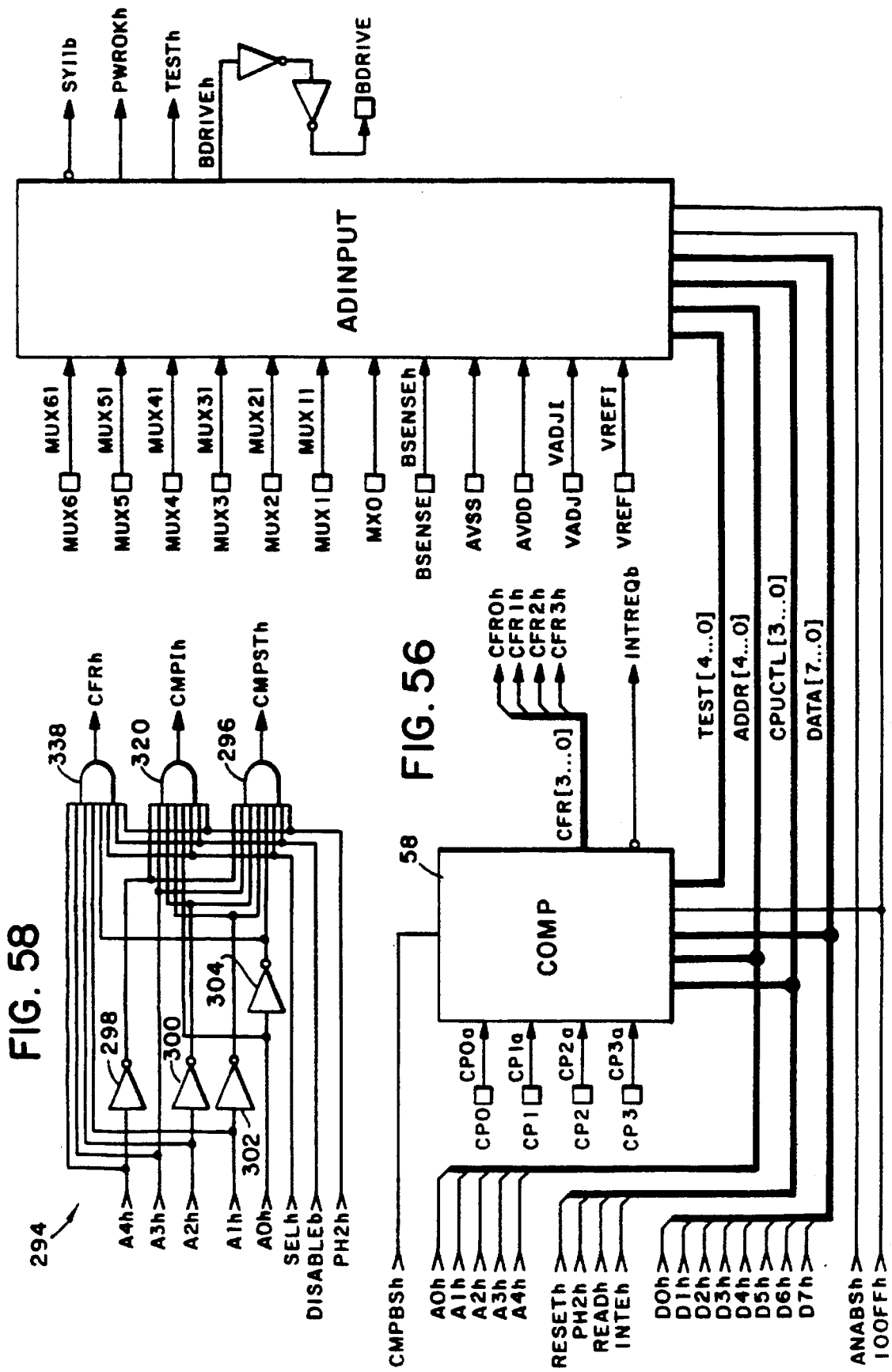

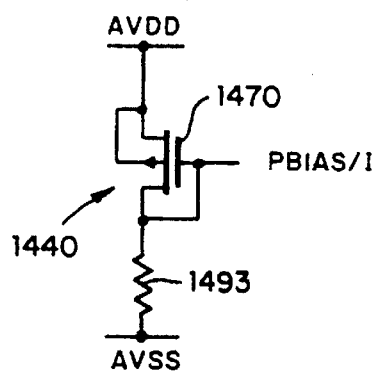
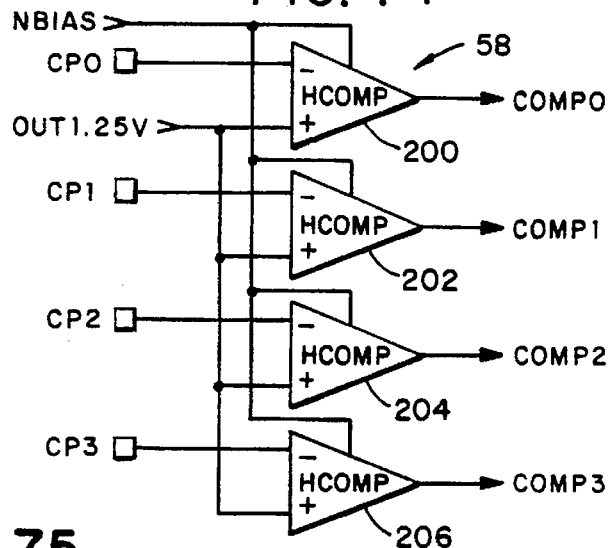
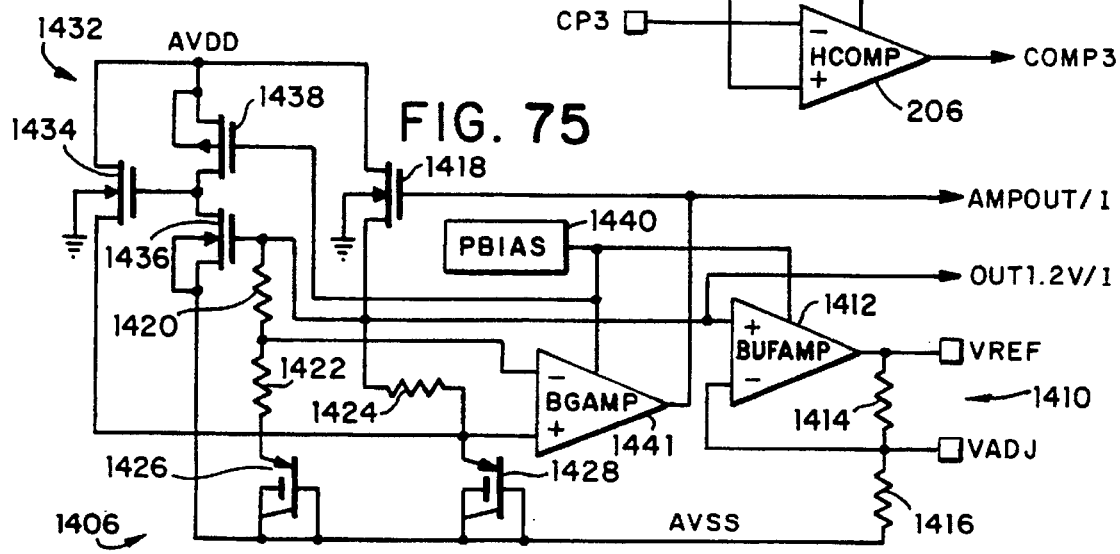
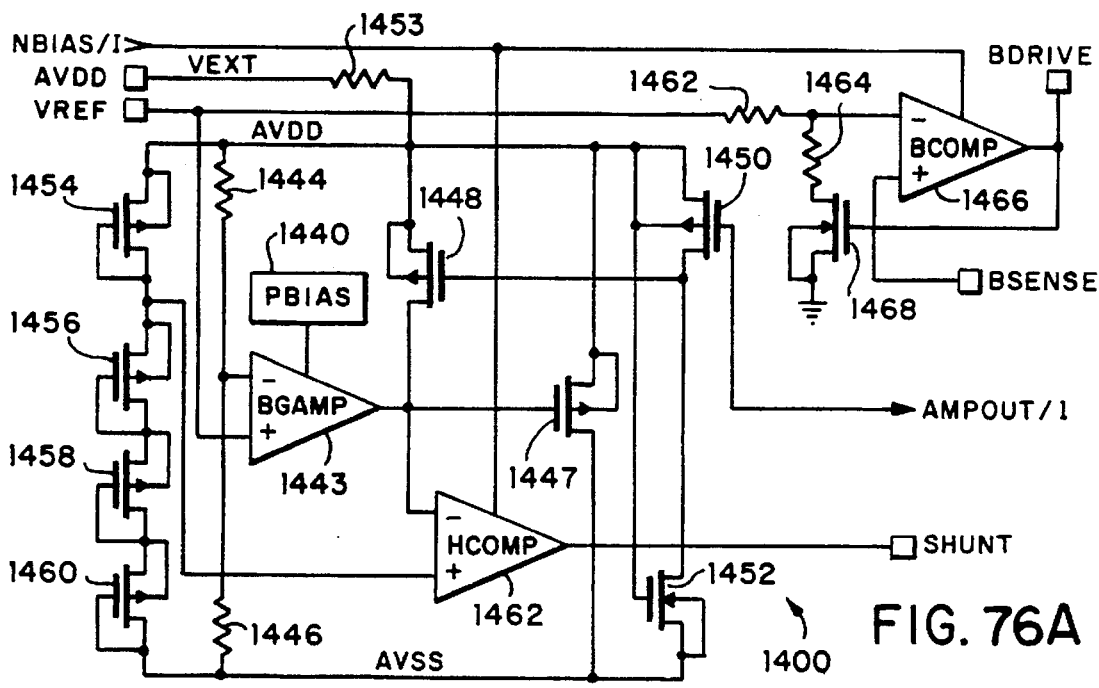

2118

2218

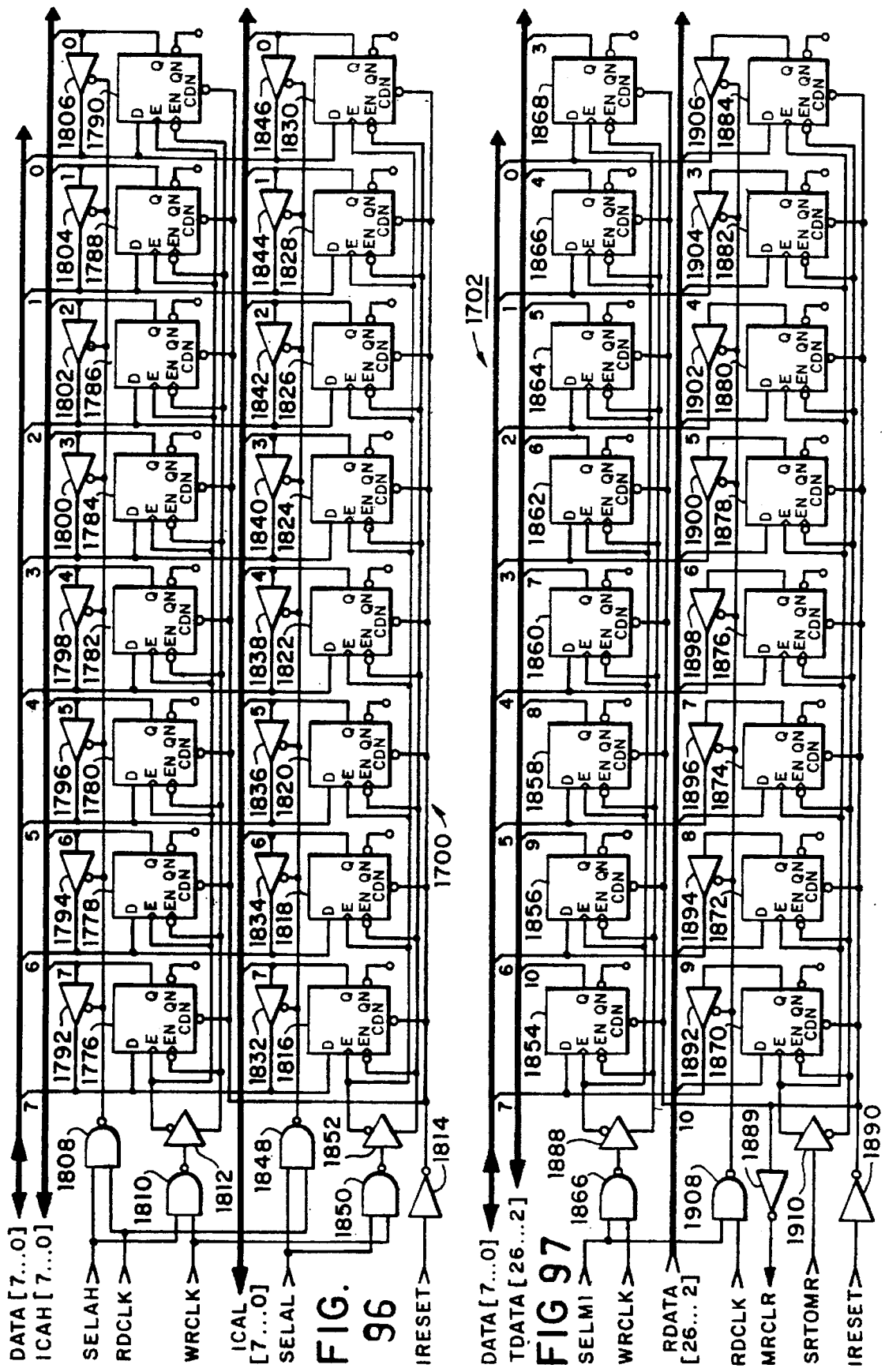

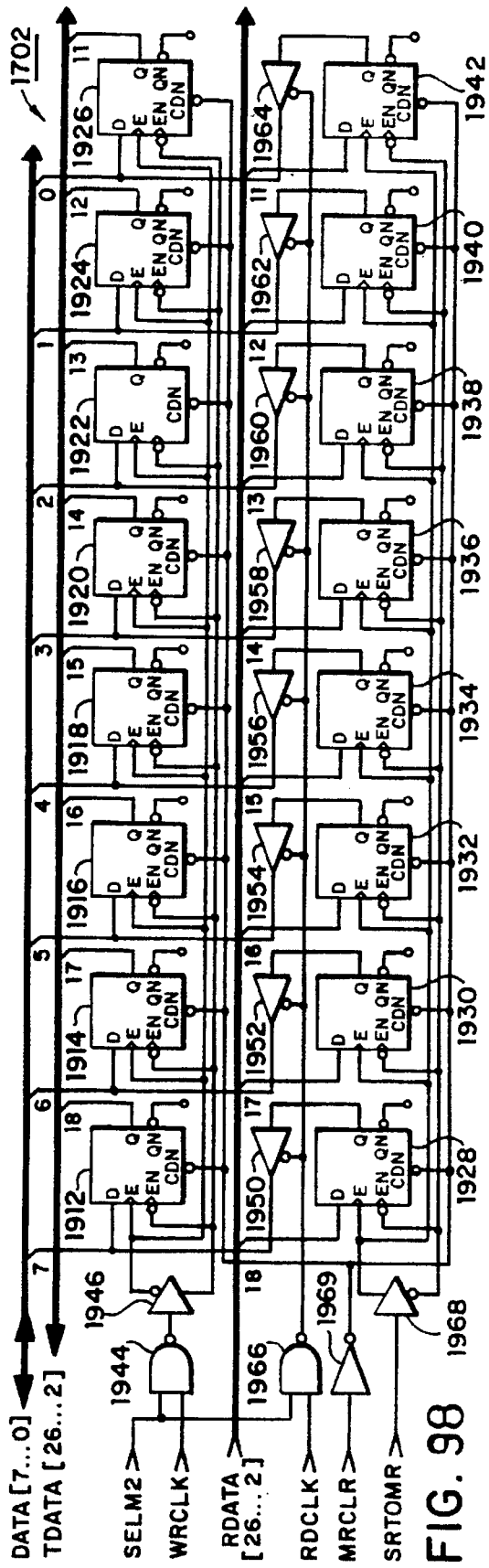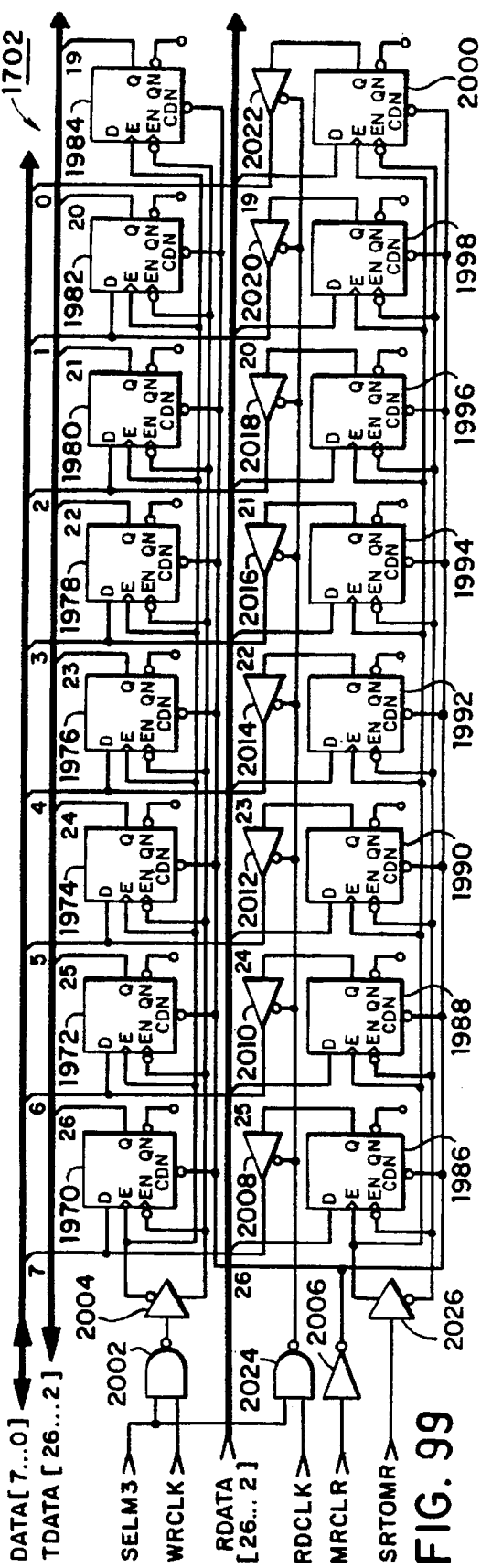
FIG. 98
FIG. 99

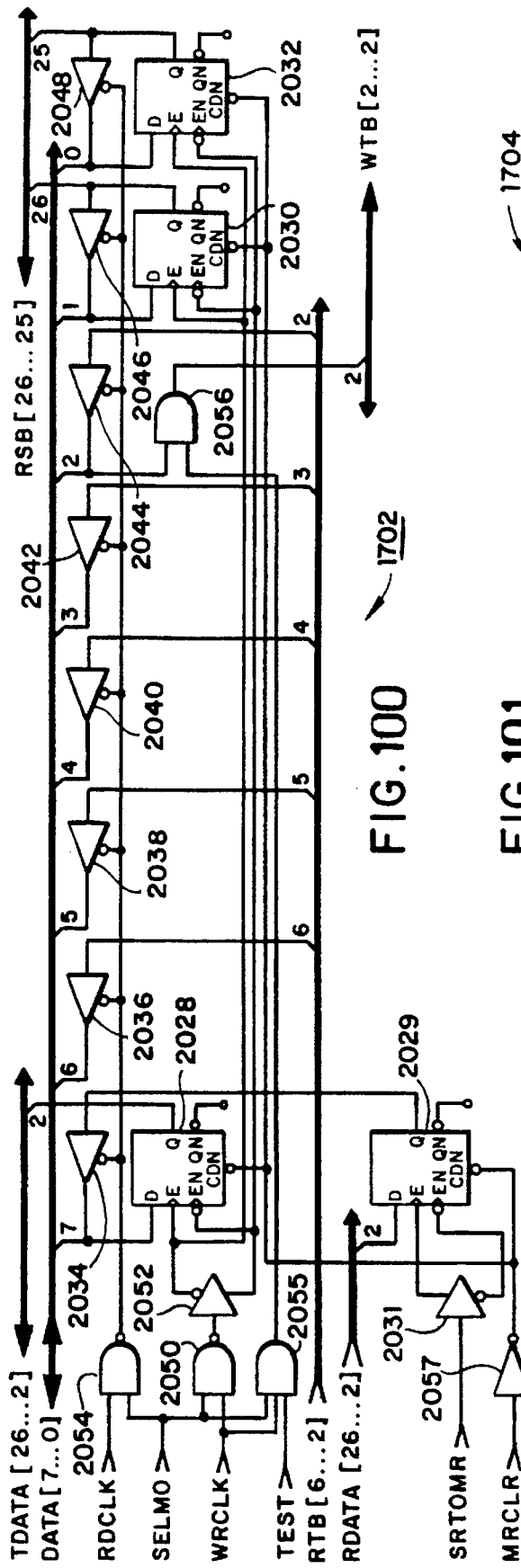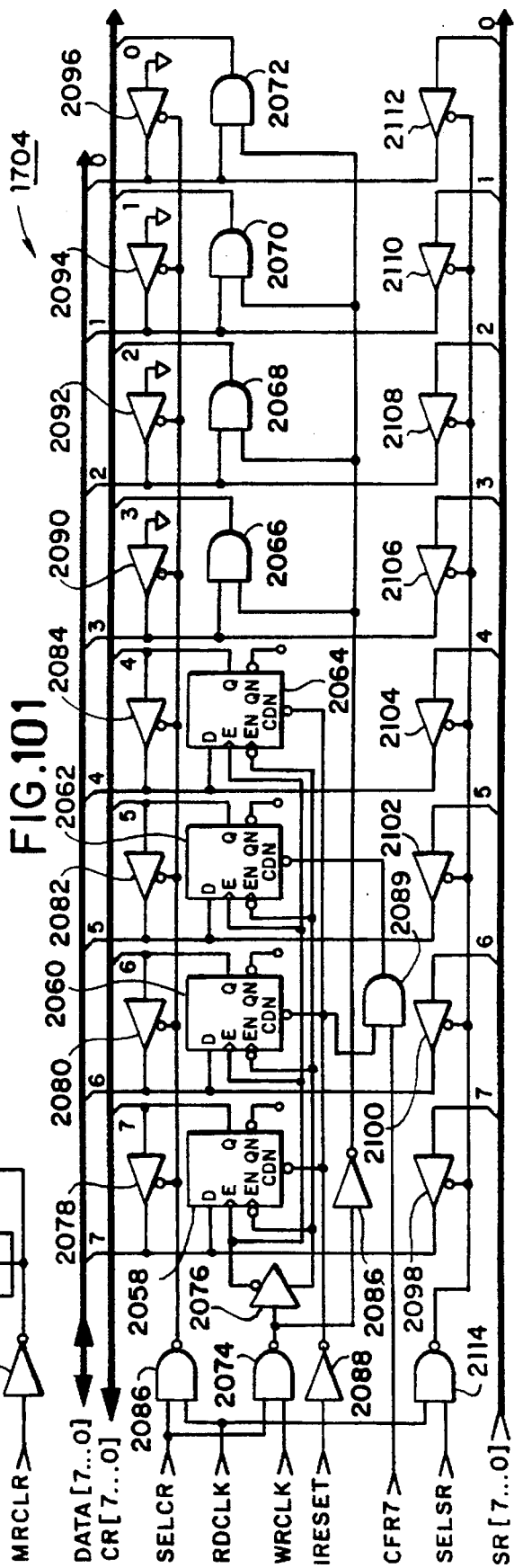
FIG. 100
FIG. 101

OVERCURRENT PROTECTION DEVICE

This application is a continuation, of application Ser. No. 07/907,131 filed Jun. 30, 1992 now abandoned which is a continuation-in-part of application Ser. No. 07/636,634, filed Dec. 28, 1990, entitled SURE CHIP PLUS, by Joseph C. Engel and John C. Schlotterer, now U.S. Pat. No. 5,270,898.

This case is also related to the following copending applications all filed Dec. 28, 1990: Ser. No. 07/636,643, entitled SURE CHIP, by Joseph C. Engel, John C. Schlotterer, Robert T. Elms and William J. Murphy, now U.S. Pat. No. 5,525,985; Ser. No. 07/635,720, entitled VOLTAGE CONTROLLED POWER SUPPLY, by Marlan L. Winter and Mark E. Innes, now abandoned, Ser. No. 07/636,000, entitled A PROCESS FOR AUTO CALIBRATION OF A MICROPROCESSOR BASED OVERCURRENT PROTECTIVE DEVICE AND APPARATUS, by Joseph C. Engel, Gary F. Saletta, Marlan L. Winter and Edward C. Prather, now abandoned; Ser. No. 07/749,221, filed Aug. 23, 1991, entitled THERMAL MODELING OF OVERCURRENT TRIP DURING POWER LOSS, by J. C. Engel, now abandoned and Ser. No. 07/781,480, filed Oct. 18, 1991, entitled ULTRASONIC CURRENT COIL REGULATOR, by Rick Hurly and Mark Innes, Westinghouse Case No. WE-56,158-I-1.

BACKGROUND OF THE INVENTION

1. Field of the Invention

The present invention relates to an overcurrent trip unit for an electrical circuit interrupting device, such as metal clad switchgear, molded case circuit breakers and the like, for protecting electrical conductors from damage due to excessive electrical currents and, more particularly, to a microprocessor based overcurrent trip unit with adjustable tripping characteristics that is adapted to continuously monitor the electrical current flowing through the electrical circuit interrupting device and initiate a trip as a function of a selectable tripping characteristic even during conditions when the current transformers driving the overcurrent trip unit are saturated wherein the overall reliability of the electrical distribution system is improved by allowing the time-current characteristic and in particular the long time delay and short time delay portions of the protection curve to be adjusted over a relatively wide range without overlap and further allows the time-current characteristic itself to be selected from a plurality of programmed functions (e.g., FLAT, It, $I^2t$, $I^4t$) to allow the overall coordination of the electrical distribution system to be improved in order to provide selective isolation of excessive electrical currents in an electrical distribution system, thus eliminating unnecessary circuit interruptions in the electrical system.

2. Description of the Prior Art

Various overcurrent devices are known in the art for protecting electrical conductors in an electrical distribution system from damage due to an excessive electrical current. Such overcurrent devices are typically characterized by their time-current characteristics or protection curve. Such protection curves are normally utilized to limit the temperature rise of an electrical conductor due to an excessive electrical current in order to prevent damage. For example, the temperature rise of the electrical conductors during certain excessive current conditions can be approximated by the product of the square of the electrical current and the time period that such electrical current is applied to the electrical conductors (e.g., $I^2t$). Thus, for an electrical motor rated for a predetermined temperature rise, for example, 55° C., such overcurrent devices are used to limit the temperature rise of the electrical conductors within the motor to the rated temperature rise.

In order to facilitate selection of an overcurrent device with a suitable characteristic for use with an electrical motor, motor operating curves (for example, as shown in FIG. 2) are normally provided by a motor manufacturer. Such motor operating curves graphically illustrate the normal time and current characteristics of a particular electrical motor at its rated temperature rise. Accordingly, in order to protect the motor from damage and at the same time prevent spurious tripping of the motor during start-up, it is necessary to "coordinate" the motor operating curve with the time-current characteristics of an electrical overcurrent device utilized on the electrical circuit breaker feeding the motor.

It is also known to coordinate the overcurrent device provided on the electrical circuit breaker feeding circuits and loads protected by various overcurrent devices utilized in the electrical distribution system in order to prevent unnecessary tripping of such circuit breakers. Thus, the time-current characteristics for all of the various overcurrent devices in the electrical distribution system are coordinated to provide for "selective" tripping. Selective tripping refers to tripping of only those portions of an electrical distribution system necessary to isolate an excessive electrical current. Selective tripping provides for several advantages in an electrical distribution system.

First, selective tripping greatly improves the reliability of the electrical distribution system. For example, various electrical interrupting devices, for example, motor control centers, unit substations and the like, include a plurality of circuit breakers and the like for providing electrical power to various electrical loads. By utilizing selective tripping, a fault at or adjacent one of the electrical loads would result in only that load being isolated from the electrical distribution system. The balance of the electrical loads fed from the motor control center or the like would be undisturbed. As such, the reliability of the electrical distribution system is greatly improved.

Second, selective tripping facilitates the maintenance cost for locating and repairing the source of an excessive electrical current. More specifically, by utilizing selective tripping, only the circuit breaker or other protective device immediately upstream of the source of the excessive electrical current is tripped. Accordingly, the source of the excessive overcurrent can generally be located relatively quickly thereby decreasing the maintenance time and also decreasing the down time for the electrical load that was tripped. Moreover, such selective tripping also prevents unnecessary tripping of interrupting devices, such as fuses, which would require replacement thereby decreasing the maintenance cost and down time of the system.

Selective tripping further optimizes the cycle life of the circuit breakers in the electrical distribution system. More specifically, the various molded case circuit breakers and metal clad switchgear breakers within an electrical distribution system are generally adapted to operate a predetermined number of times before they either need to be replaced or serviced. This predetermined number is known as the cycle life. By preventing unnecessary operations of the various electric circuit breakers within the distribution system, the cycle life of the various breakers is thus improved.

Ideally, all of the various overcurrent devices provided in an electrical distribution system are coordinated to provide good electrical protection and to provide for selective tripping. However, in actuality, perfect coordination is not always attainable for several reasons. One reason relates to the particular time-current characteristics of the overcurrent devices. For example, fuses are known to be used for overcurrent devices in electrical distribution systems. The time-current characteristics of such fuses are significantly different from the time-current characteristics of various other overcurrent protection devices. Accordingly, it can be difficult to achieve good coordination of a fuse with other overcurrent devices over an entire range of anticipated overcurrents. Thus, in such applications, the coordinated protection may be less than ideal.

Another problem with known overcurrent devices relates to the adjustment ranges provided in such devices. More specifically, some known overcurrent devices are known to have rather limited adjustment ranges, for example, in the long time delay and short time delay portions of the protection curve, in order to prevent overlap which could degrade the selectivity of the system. Due to such limited adjustment ranges of such known overcurrent devices, the coordination of such overcurrent devices is relatively limited.

Another problem with known overcurrent devices, relates to their response to a relatively large overcurrent, such as a short circuit. More specifically, current transformers (CT) are known to be used to sense the electrical current flowing in an electrical interrupting device. The secondary windings of such CT's are then applied to an overcurrent device. During relatively large overcurrent conditions, such as a short circuit, the CT's often become saturated, thus resulting in a distorted current waveform on the secondary winding. Accordingly, during such a condition when the current transformers are saturated the overcurrent device, driven by such saturated current transformers, may not properly respond to such a distorted waveform during a short circuit condition in time to prevent damage.

SUMMARY OF THE INVENTION

It is an object of the present invention to solve the problems associated with the prior art.

It is another object of the present invention to provide an overcurrent trip unit which facilitates coordination with other overcurrent devices including fuses.

It is yet a further object of the present invention to provide an overcurrent trip unit which improves the selectivity of an electrical distribution system.

It is another object of the present invention to provide an overcurrent trip unit which includes a relatively wide range of adjustment in order to provide better coordination with other overcurrent trip units in an electrical distribution system.

It is yet another object of the present invention to provide an overcurrent device which includes a relatively wide range of adjustment of the long time delay and short time delay portions of the protection curve which precludes overlap.

It is yet another object of the present invention to provide an electrical overcurrent device which overcomes the problems associated with sensing relatively large magnitude overcurrents, such as short circuit currents, associated with saturated current transformers.

It is another object of the present invention to provide an overcurrent trip unit which provides for adjustable trip characteristics.

Briefly, the present invention relates to an overcurrent trip unit for an electrical interrupting device, such as a molded case circuit breaker, metal clad switchgear breaker or the like and more particularly to a microprocessor based overcurrent trip unit which includes an analog circuit for monitoring phase currents in the electrical interrupting device. The analog circuit is adapted to interface with the microprocessor over a relatively wide range of selectable setpoints for instantaneous tripping and at the same time accurately monitor the phase currents even during a condition when the current sensing transformers are saturated. The overcurrent trip unit also allows the function of the long time delay characteristics of protection curve to be varied in order to provide better coordination with the characteristics of other overcurrent tripping devices in an electrical distribution system, such as a current limiting fuse, thereby enhancing the overall reliability of the system. For example, the function may be varied to provide either FLAT, It, $I^2t$ or $I^4t$ functions. The overcurrent tripping device also allows for relatively wide adjustment ranges for the long time delay and short time delay protection portions of an overcurrent protection curve. In order to prevent any overlapping of the protection ranges, the long time delay portion is prevented from tripping the interrupting device prior to the short time delay portion.

DESCRIPTION OF THE DRAWING

These and other objects of the present invention will be readily apparent upon consideration of the following description and attached drawings, wherein:

FIG. 7 is a graphical representation of the long time delay and short time delay characteristic of the overcurrent tripping device in accordance with the present invention having relatively wide long time delay and short time delay adjustment ranges uncorrected for overlap;

FIG. 8 is similar to FIG. 7 illustrating the long time delay and short time delay portions corrected for overlap in accordance with the present invention;

FIG. 9 is an exemplary graphical illustration of the output current waveform of a saturated current transformer;

FIGS. 17–31 represent a flow chart for the overcurrent tripping device in accordance with the present invention;

FIGS. 35(a)–35(d) are diagrams of alternate clock generator connections for the IC in accordance with the present invention;

FIG. 36 is a memory address map for the IC in accordance with the present invention;

FIG. 37 is a format diagram for configuration registers CFR and ACFR which form a portion of the IC in accordance with the present invention;

FIG. 38 is a format diagram for an EEPROM control register NVCR which forms a portion of the IC in accordance with the present invention;

FIG. 39 is a format diagram for a dead-man control register DMC which forms a portion of the IC in accordance with the present invention;

FIG. 40 is a format diagram for A/D conversion interface registers ADZ, AMZ, ADCR, AMUX, ACSF, AVSF and ADC which form a portion of the IC in accordance with the present invention;

FIG. 41 is a format diagram for comparator mode control registers CMPI and CMPST and the pulse width modulated output control register PWM which form a portion of the IC in accordance with the present invention;

FIGS. 43(a)–43(d) are timing diagrams for the timer of FIG. 42;

FIG. 44 is a format diagram for programmable timer registers TCRH, TCRL, TARH, TARL, TICH, TICL, TOCH, TOCL, TCR and TSR which form a portion of the IC in accordance with the present invention;

FIG. 45 is a connection diagram of a serial peripheral interface (SPI), single master, which forms a portion of the present invention;

FIG. 46 is a connection diagram of a typical SPI with multiple masters;

FIG. 51 is a format diagram for PORT B interface registers PBC and PBD which form a portion of the IC in accordance with the present invention;

FIG. 52 is a format diagram for PORT C interface registers PCC and PCD which form a portion of the IC in accordance with the present invention;

FIG. 53 is a format diagram for PORT D interface registers PDC and PDD which form a portion of the IC in accordance with the present invention;

FIG. 55 illustrates the control message and data message format diagrams for the communication controller which forms a portion of the IC in accordance with the present invention;

FIG. 56 is an overall block diagram of the comparator subsystem and A/D input subsystems of the IC in accordance with the present invention;

FIG. 58 is a schematic diagram of the address decode logic for the comparator control registers CMPST and CMPI and the configuration register CFR in accordance with the present invention;

FIG. 64 is a block diagram of the analog control logic in accordance with the present invention;

FIG. 74 is a block diagram of the quad comparator system in accordance with the present invention;

FIG. 75 is a schematic diagram of a band gap regulator in accordance with the present invention;

FIG. 76A is a schematic diagram of a shunt regulator, B+ comparator and a power monitor in accordance with the present invention;

FIG. 77 is a schematic diagram of a biasing circuit in accordance with the present invention;

FIG. 88 is a schematic diagram of a bit phase timing generator which forms a portion of the communication controller in accordance with the present invention;

FIG. 96 is a schematic diagram of the address registers which forms a portion of the communication controller in accordance with the present invention;

FIG. 97 is a schematic diagram of a message register ICM1 which forms a portion of the communication controller in accordance with the present invention;

FIG. 98 is a schematic diagram of a message register ICM2 which forms a portion of the communication controller in accordance with the present invention;

FIG. 99 is a schematic diagram of a message register ICM3 which forms a portion of the communication controller in accordance with the present invention;

FIG. 100 is a schematic diagram of a message register ICM0 which forms a portion of the communication controller in accordance with the present invention;

FIG. 101 is a schematic diagram of control and status registers which forms a portion of the communication controller in accordance with the present invention;

FIG. 110 is a continuation of FIG. 107;

DETAILED DESCRIPTION OF THE DRAWING

General

The present invention relates to an overcurrent trip unit for an electrical interrupting device, such as a molded case circuit breaker or a metal clad switchgear breaker of the type, for example, disclosed in U.S. Pat. Nos. 4,351,013 and 4,827,369, assigned to the same assignee as the assignee of the present invention, hereby incorporated by reference. Such overcurrent trip units are microprocessor based and include various input/output devices, such as membrane switches, light emitting diodes (LED's) and displays, which form a user interface which provide for various functions including allowing the various setpoints to be selected and initiating a trip of the attendant electrical circuit interrupting device. Although such known overcurrent trip units are adapted to provide reasonably good coordination in an electrical distribution system, the overcurrent trip unit in accordance with the present invention provides for better coordination of various overcurrent devices utilized in an electrical distribution system in order to provide relatively better selectivity and consequently improve the overall reliability of the system.

More specifically, in one embodiment of the invention, the function of the long time delay portion of the protection curve is selectable from a plurality of programmed functions, for example FLAT, It, $I^2t$ and $I^4t$. By providing for such a selectable function, the overcurrent device incorporating the principles of the invention is able to be more readily coordinated with other overcurrent devices utilized in an electrical distribution system. In an alternate embodiment of the invention, the overcurrent trip unit in accordance with the present invention includes relatively wide long time delay and short time delay adjustment ranges. In order to prevent overlapping of the long time delay and short time delay portions, the trip unit in accordance with the present invention prevents any overlapping zones which could result in a loss of selectivity. In another alternate embodiment of the invention, the trip unit in accordance with the present invention solves the problem associated with instantaneous tripping during a condition when the current transformers are saturated.

Description of Radial Distribution System

Figure 1:
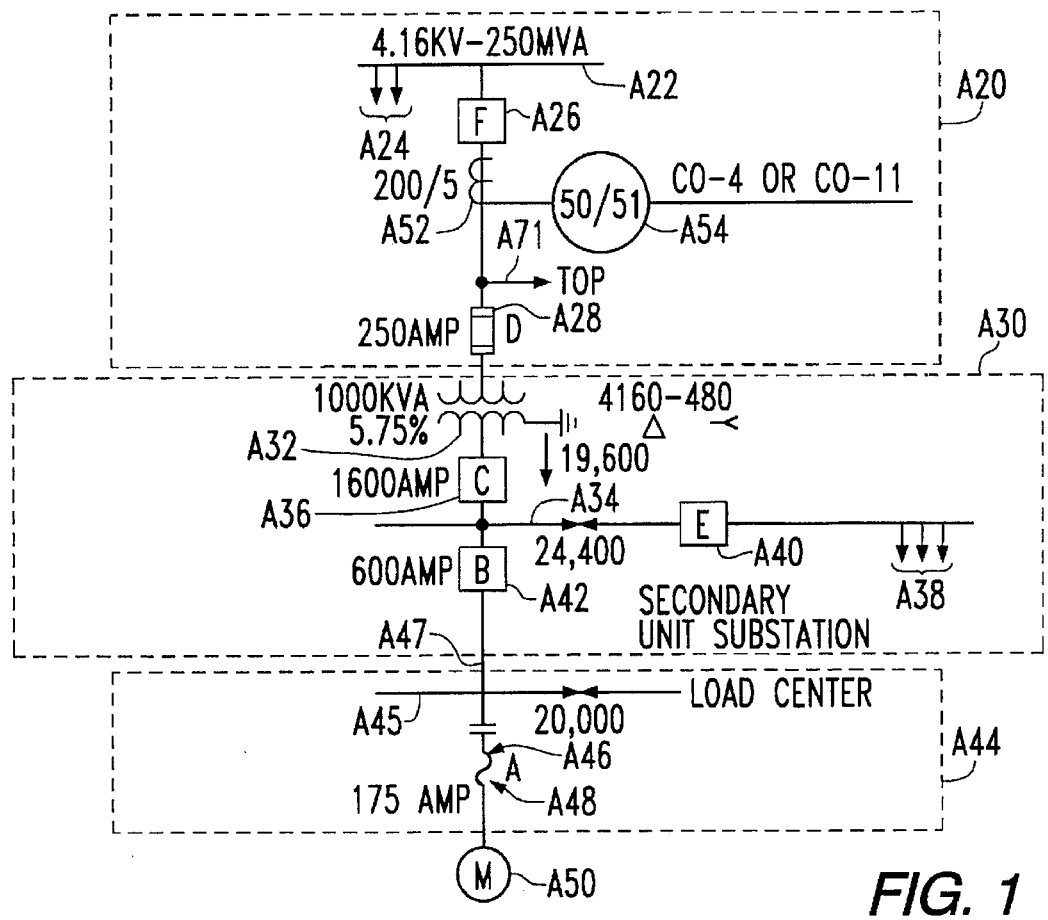
FIG. 1 is a single line diagram of an exemplary 4.16 kV radial distribution system.

The various embodiments of the invention are best understood with reference to the single line diagram illustrated in FIG. 1 which represents an exemplary 4.16 kV radial electrical distribution system. In the exemplary system, 4.16 kV medium voltage metal clad switchgear, shown within the dashed box identified with the reference numeral A20, forms the source. The 4.16 kV switchgear A20 includes a 4.16 kV bus, identified with the reference numeral A22, and a plurality of feeder breakers A24 for providing electrical power to various 4.16 kV electrical loads in the system. As shown, the 4.16 kV switchgear includes a feeder breaker A26 and a serially connected fuse A28 feeding a unit substation, shown within the dashed box identified with the reference numeral A30. The unit substation A30 includes an integral 4.16 kV to 480 V transformer A32 to form a 480 V bus A34. The transformer A32 secondary winding is connected to the 480 V bus A34 by way of a 480 V transformer breaker A36. The 480 V bus A34 includes a plurality of feeder breakers A38 for typically feeding various non-cyclic electrical loads, such as 480 V motor control centers (MCC). In order to improve the reliability of the system the 480 V unit substation A30 includes a tie breaker A40 to allow electrical power to be supplied to the 480 V bus A34 in the event that the primary source (e.g., 4.16 kV bus A22 or transformer A32) becomes unavailable. As shown, a 480 V feeder breaker A42 is used to feed a 480 V MCC, shown within the dashed box identified with the reference numeral A44. Such MCC's A44 normally include a 480 V bus A45, a plurality of circuit breakers, starters and contactors and the like for supplying electrical power to various cyclic electrical loads. For example, a 480 V contactor A46 with an integral overload relay A48 is shown feeding a motor A50. As is known in the art, such overload relays A48 include a bimetallic element, serially connected with the line conductors which interrupts the electrical power to the motor A50 during overload conditions, for example, due to fluctuations in the source voltage or mechanical problems, such as faulty motor bearings.

Moreover, each of the circuit interrupting devices (e.g., A26, A28, A36, A40 and A42) in the illustrated radial distribution system include overcurrent protection. For example, the 4.16 kV feeder breaker A26 includes one or more current transformers A52 for monitoring the electrical current on the load side. These current transformers A52 are used to drive an instantaneous/overcurrent device A54, such as a Westinghouse type CO relay. As previously mentioned, the primary winding of the unit substation transformer A32 is additionally protected with the fuse A28. The circuit breakers A36, A40 and A42 in the unit substation A30 are provided with solid state tripping units, for example, as generally described and illustrated in U.S. Pat. No. 4,827,369, assigned to the same assignee as the present invention and hereby incorporated by reference.

In such an application, it is necessary to coordinate all of the overcurrent devices in the distribution system to selectively isolate excessive electrical currents while at the same time leaving the unaffected electrical loads in the system undisturbed. For example, a faulty bearing on the motor A50 could result in a condition where the motor A50 is stuck in a locked rotor condition—a condition where the motor A50 draws between approximately four to six times its rated current. During such a condition, it is desirable that an overcurrent protection device isolate the motor A50 without disturbing any of the other electrical loads in the electrical distribution including other loads on the 480 volt MCC bus A45. By selectively isolating the source of excessive electrical current and tripping only the motor A50 the system reliability is improved since the other electrical loads on the 480 volt MCC bus A45 would be virtually unaffected. Otherwise, without selective coordination, a fault at the motor A50 could cause tripping of the MCC feeder breaker A42 which, in turn, would cause a loss of the entire MCC A44.

At the same time, it is also desirable to avoid tripping the motor A50 during starting. Accordingly, the overcurrent protective device used to protect the motor (e.g., overload relay A48) is coordinated with the normal time-current characteristics of the motor during a normal starting condition to prevent spurious tripping of the electrical motor during starting.

Coordination of Interrupting Devices

Such coordination is normally done graphically. More specifically, the time-current characteristics of the overcurrent protective devices, and operating characteristics of various devices, such as electrical motors, are normally plotted on a logarithmic scale. In particular, the setpoints and time-current characteristics are selected to provide coordination of all of the overcurrent devices in the distribution system to provide selectivity and avoid spurious tripping, thereby increasing the reliability of the system.

Figure 2:
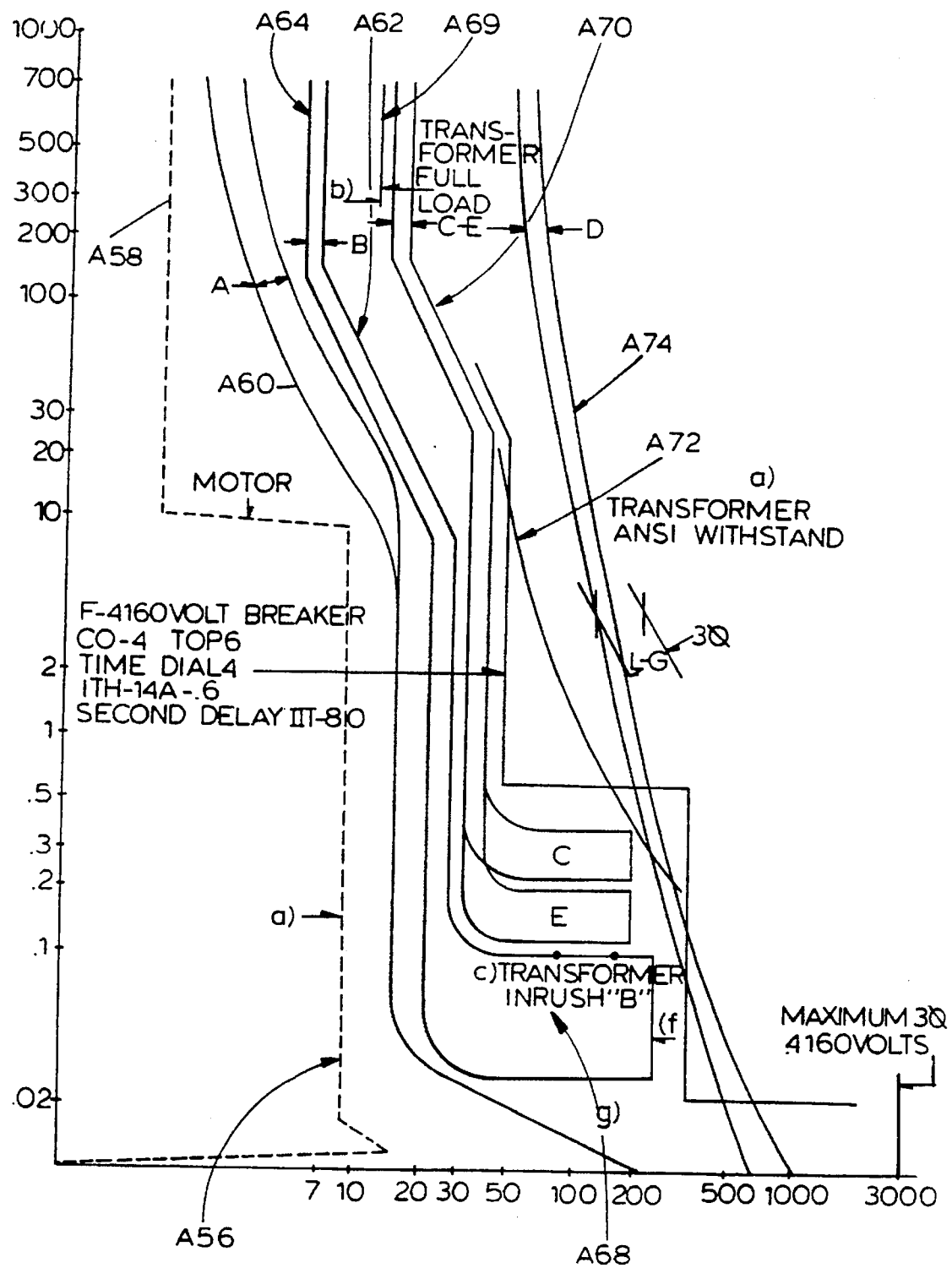
FIG. 2 is an exemplary graphical representation of the coordination of the various overcurrent devices of the system illustrated in FIG. 1.

An example of such is illustrated in FIG. 2. More specifically, FIG. 2 is a graphical representation of the time-current characteristics of the various overcurrent devices in the electrical distribution system illustrated in FIG. 1 on a logarithmic scale. The vertical axis relates to time in seconds while the horizontal axis relates to current in amperes on a scale basis.

Referring to FIG. 2, the curve, identified with the reference numeral A56, illustrates the time-current characteristics of the motor A50 during normal operating conditions. Initially, when electrical power is first applied to the motor A50, the motor A50 is in what is known as a lock rotor condition. During this condition, as illustrated, the motor A50 draws anywhere from four to six times its normal full load rated current until the rotor reaches its rated speed. As illustrated in FIG. 2, this locked rotor condition is shown to last for about ten seconds. After the motor reaches its rated speed, the electrical current drawn by the motor A50 drops down to its rated full load current as illustrated by the portion of the curve A56 identified with the reference numeral A58.

During normal starting conditions, it is undesirable to trip the electrical motor A50. Accordingly, the time-current characteristic selected for the overcurrent protective device (e.g., the overload relay A48) feeding the motor A50 is illustrated by the curve A60. As shown, the time-current characteristics A60 are selected to allow the motor A50 to start normally without tripping. However, should there be a mechanical problem or a fluctuation of the source voltage which causes the motor A50 to draw the locked rotor current for longer than normal (e.g., longer than ten seconds) the overload relay A48 would cause a trip the motor A50, thereby isolating the condition. The other electrical loads on the MCC bus A45 would thus be unaffected.

As previously mentioned, it is desirable to coordinate the time-current characteristics of the overload relay A48 used to protect the electric motor A50 with the other overcurrent protective devices described above in the electrical distribution system. Thus, the time-current characteristics of the overcurrent protection devices for the 480 V circuit breakers A36, A40 and A42 as well as the 4.16 kV feeder breaker A26 and fuse A28 (FIG. 1) are selected to coordinate with the time-current characteristic A60 for the overload relay A48, as shown. More specifically, as illustrated in FIG. 2, the curve identified with the reference numeral A62 illustrates the time-current characteristics of the overcurrent device utilized for the 480 V feeder breaker A42. As shown in FIG. 2, the characteristics and setpoints are selected to protect the 480 V MCC bus A45 and the electrical conductor A63 feeding it. The 480 V feeder breaker A42 is used to protect the 480 V MCC bus A45 as well as the electrical conductors A47 feeding the bus A45 and would not normally interrupt for a fault downstream of the bus A45 unless there was a failure of a downstream interrupting device. For example, a fault on the feeder to the electrical motor A50 would normally be cleared by the overload relay A48 and would be "transparent" to the overcurrent protection device associated with the MCC feeder breaker A42.

In addition to coordinating the various overcurrent devices in the electrical distribution, consideration must also be given to the normal full load current on the 480 V MCC bus A45. Accordingly, the continuous current portion of the time-current characteristic of the overcurrent device associated with the 480 V feeder breaker A40 is normally selected to avoid tripping the MCC feeder breaker A42 during normal loading conditions. Accordingly, the continuous current portion A64 of the curve A62, which represents the time-current characteristics of the overcurrent device associated with the MCC feeder breaker A42, is selected to be about 110% of the normal full load current of the 480 V MCC bus A45. Similarly, the normal full load current of the 480 V unit substation bus A34 must also be taken into consideration in selecting the setpoints for a time-current characteristic for the overcurrent devices associated with the transformer breaker A36 and the tie breaker A40.

Additionally, the unit substation transformer A32 full load current and inrush current must be taken into account in selecting the setpoints for the overcurrent device associated with the transformer breaker A36. The transformer inrush current is indicated in FIG. 2 by the points designated with the reference numeral A68, while the full load current is indicated by the line segment identified with the reference numeral A69. Thus, the setpoints are selected such that the overcurrent device associated with the transformer breaker A36 as well as the tie breaker A40, so as to prevent spurious tripping of the unit substation A30 during normal operating conditions and additionally avoid tripping for a fault downstream of the feeder breaker A42 unless there is a failure of the circuit breaker A42 or its associated overcurrent device. Thus, the time-current characteristics for the transformer breaker A36 as well as the tie breaker A42 are illustrated in FIG. 2 and identified with the reference numeral A70. As shown, the time-current characteristics for the overcurrent devices for these circuit breakers, generally allow for selectivity relative to the downstream circuit breaker protective devices.

The considerations for the overcurrent characteristics for the overcurrent device A54 for the 4.16 kV feeder breaker A26 must take into account the normal full load current of the unit substation A30 including as well as any loads connected to the tap A71 and additionally be coordinated with the time-current characteristics of the fuse A28. In such an application, as illustrated in FIG. 2, the fuse A28 acts as backup protection for the feeder breaker A26 as well as provide protection for the primary winding of the unit substation transformer A32. Additionally, it is desirable for the feeder breaker A26 to trip prior to the fuse A28. Thus, the curve illustrated with the reference numeral A72, illustrates the time-current characteristics of the overcurrent device A54 associated with the feeder breaker A26. The curve A74 illustrated the time-current characteristics of the fuse A28.

As shown in the lower portion of FIG. 2, there is slight overlapping of the time-current characteristics of the fuse curve A74 and the feeder breaker curve A72. Accordingly, some selectivity between the feeder breaker A26 and the fuse A28 is lost for relatively large magnitude faults. In the upper area of the curve, there is a significant disparity of the characteristics of the fuse curve A74 relative to a portion of the time-current curve A72 for the feeder breaker A26 known as the long time delay portion. As such it is relatively difficult to coordinate time-current characteristics of various known overcurrent trip units with devices, such as fuses.

Figure 3:
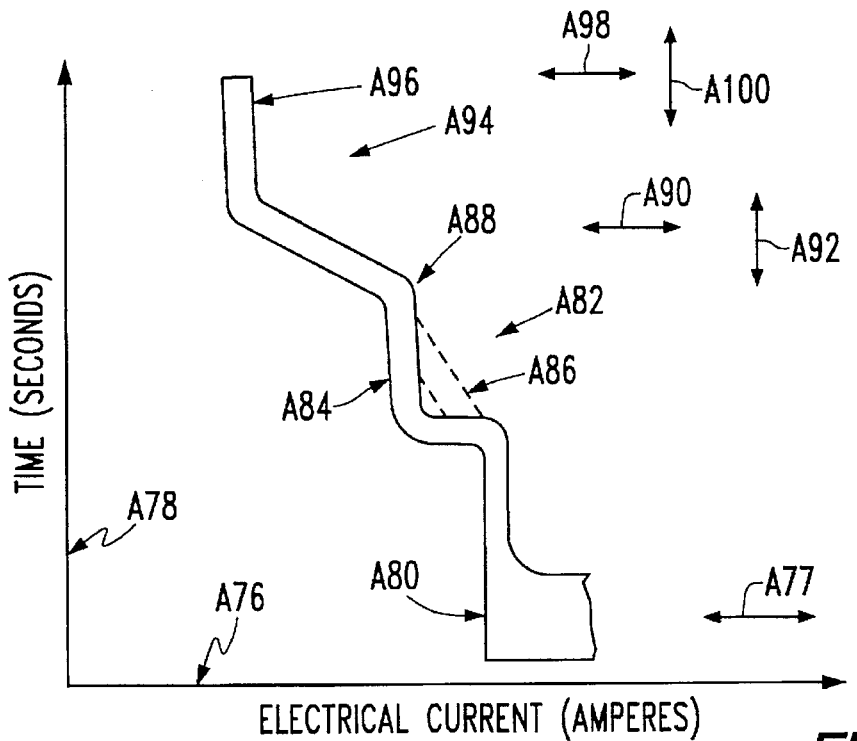
FIG. 3 is an exemplary overcurrent protection curve.

Characteristics of the Time Versus Current Characteristics for an Exemplary Solid State Tripping Device The time-current characteristics for an exemplary adjustable solid state tripping device, such as disclosed in U.S. Pat. No. 4,827,369, assigned to the same assignee as the present invention and hereby incorporated by reference, are illustrated in FIG. 3. Such time-current characteristics are normally illustrated on a logarithmic scale whereby the horizontal axis, identified with the reference numeral A76, relates to electrical current in amperes and the vertical axis, identified with the reference numeral A78, relates to time in seconds.

The bottom-most portion of the curve identified with the reference numeral A80 illustrates what is known as the instantaneous portion of the curve. The instantaneous portion of the curve is used during conditions where the electrical current magnitude is relatively large, for example, during a short circuit condition. During such a short circuit condition, the instantaneous portion A80 causes the interrupting device to be tripped, for example, in one cycle or less. The electrical current magnitude at which the instantaneous portion A80 becomes active is adjustable. Thus, the instantaneous portion can be adjusted relative to the horizontal axis A76 as indicated by the reference arrow A77.

The central portion of the curve illustrated by the bracket, identified with the reference numeral A82 relates to the short time delay portion of the curve. Both inverse time characteristics and fixed time characteristics are known for the short time delay portion A82. More specifically, with reference to FIG. 3, fixed time characteristic A84 is illustrated in solid line while an inverse time portion curve A86 is illustrated in phantom.

The short time delay portion A82 is adjustable. More specifically, the minimum electrical current magnitude at which the short time portion A82 becomes active is known as the short time delay pickup (SDPU) indicated by the reference numeral A88. The SDPU is adjustable relative to the horizontal axis A76 as indicated by the arrow A90. The time at which the short time delay portion is also adjustable relative to the vertical axis A78 as indicated by the arrow A92.

Although the SDPU and time settings are adjustable, the characteristics (e.g., function) of a short time delay portion A82 have heretofore been known to be fixed. Such characteristics are generally inverse. With such inverse characteristics, the tripping time is generally inversely related to the magnitude of the electrical current. Thus, relatively larger electrical currents are tripped in relatively short time periods and relatively smaller magnitude electrical currents in relatively longer time periods.

The portion of the curve identified with the reference numeral A94 relates to the long time delay portion. This portion A94 is also inverse and generally follows an $I^2t$ characteristic. Similar to the short time delay portion A82, the setpoints can be varied to adjust the time and electrical current magnitude at which this portion of the time-current characteristics become active. More specifically, the minimum electrical current at which the long time delay portion A94 becomes active is known as the long time delay pickup (LDPU) A96. This LDPU can thus be adjusted relative to the horizontal axis A76 as indicated by the arrow A98. The time at which the long time delay portion A94 becomes active can be varied to allow the long time delay characteristic to be moved upwardly and downwardly relative to the vertical axis A78 as indicated by the arrow A100.

Although the LDPU A96 and time setpoints can be varied as indicated by the arrows A98 and A100, the characteristic (e.g., $I^2t$ function) has not heretofore been known to be adjustable which, as described above, can cause difficulty in attaining good coordination with very inverse characteristics such as the fuse A28

Variable Long Time Delay Characteristics

An important aspect of the invention relates to the ability to vary the long time delay characteristics of the time-current curve for a solid state tripping device. More specifically, as heretofore stated, known overcurrent devices including solid state tripping devices, for example, as described and illustrated in detail in U.S. Pat. No. 4,827,369, are provided with long time delay characteristics which are fixed and generally follow an $I^2t$ function. Although the magnitude and time at which such a characteristic becomes active can be adjusted as discussed above, the characteristic itself (e.g., $I^2t$ function) is fixed and thus not adjustable.

The solid state tripping device in accordance with the present invention, provides for adjustability of the characteristic of the long time delay portion A94 of a solid state tripping device in order to provide better coordination and therefore better selectivity with other overcurrent devices in an electrical distribution system. More specifically, referring back to FIG. 2, the characteristics of the curve of the fuse curve A74 are very inverse. Thus, as heretofore stated, it is rather difficult to coordinate an overcurrent device with the fuse A28 because of the disparity in the characteristics of the fuse curve A74 relative to the characteristics of various overcurrent devices as discussed above. Accordingly, in accordance with the present invention, a solid state tripping device is provided which includes a long time delay portion A94 having adjustable characteristics. More specifically, the long time delay portion A94 of the time-current characteristics not only allows the time and current at which the long time delay portion of the characteristic becomes active, as in U.S. Pat. No. 4,827,369, but also allows the actual characteristics of this portion of the curve to be varied. For example, as described and illustrated hereinbelow, the long time delay characteristics A94 are adjustable to enable an operator to select between a plurality of characteristics, for example, a fixed time (FLAT) characteristic, It, $I^2t$ and $I^4t$. However, it should be understood by those of ordinary skill in the art that the principles of the invention are not related to any particular characteristics or any number of available characteristic selections.

Figure 4:
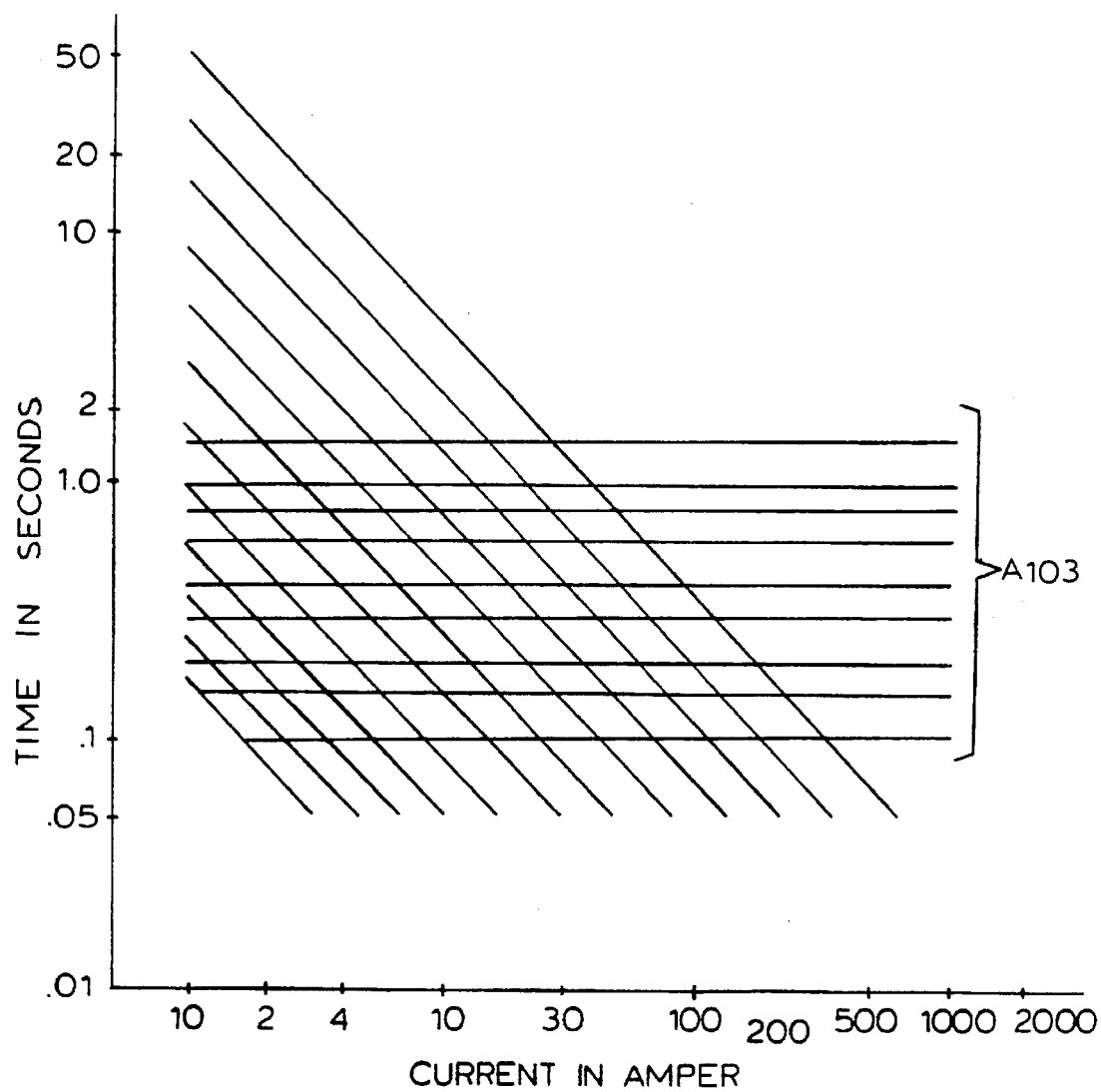
FIG. 4 is a graphical representation of the long time delay portion of a protection curve for an overcurrent tripping device in accordance with the present invention illustrating an It characteristic for the long time delay portion.
Figure 6:
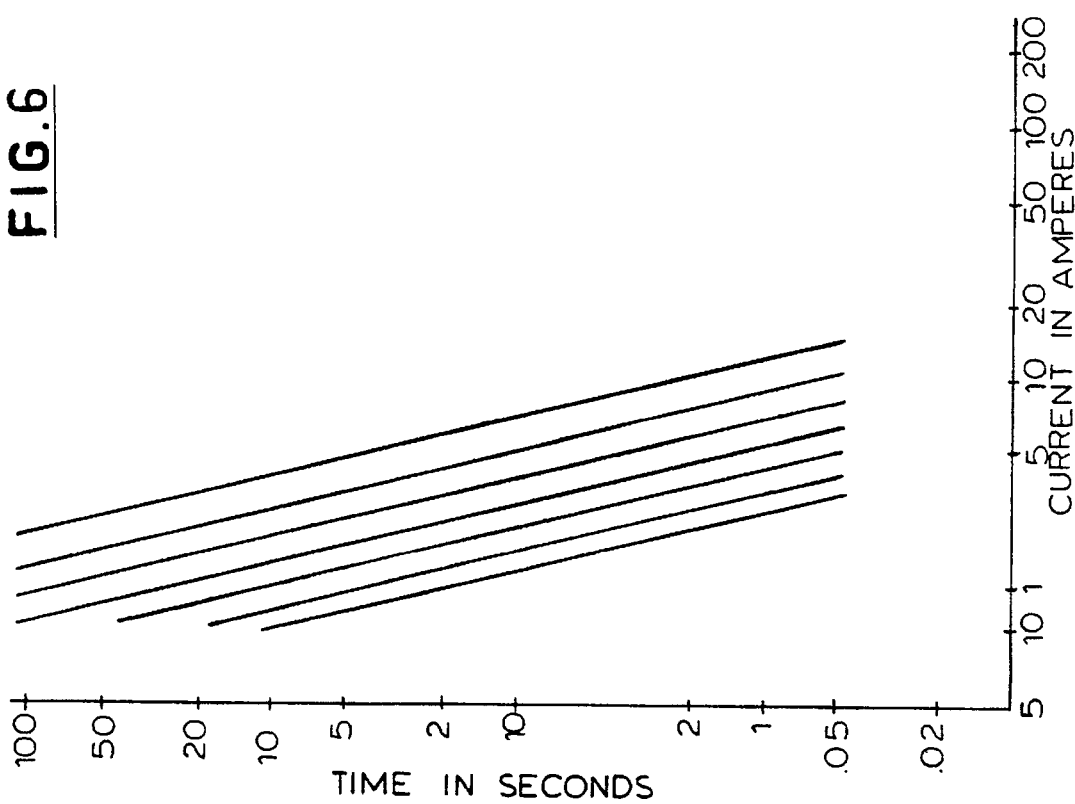
FIG. 6 is similar to FIG. 4 illustrating an $I^4t$ characteristic.
Figure 5:
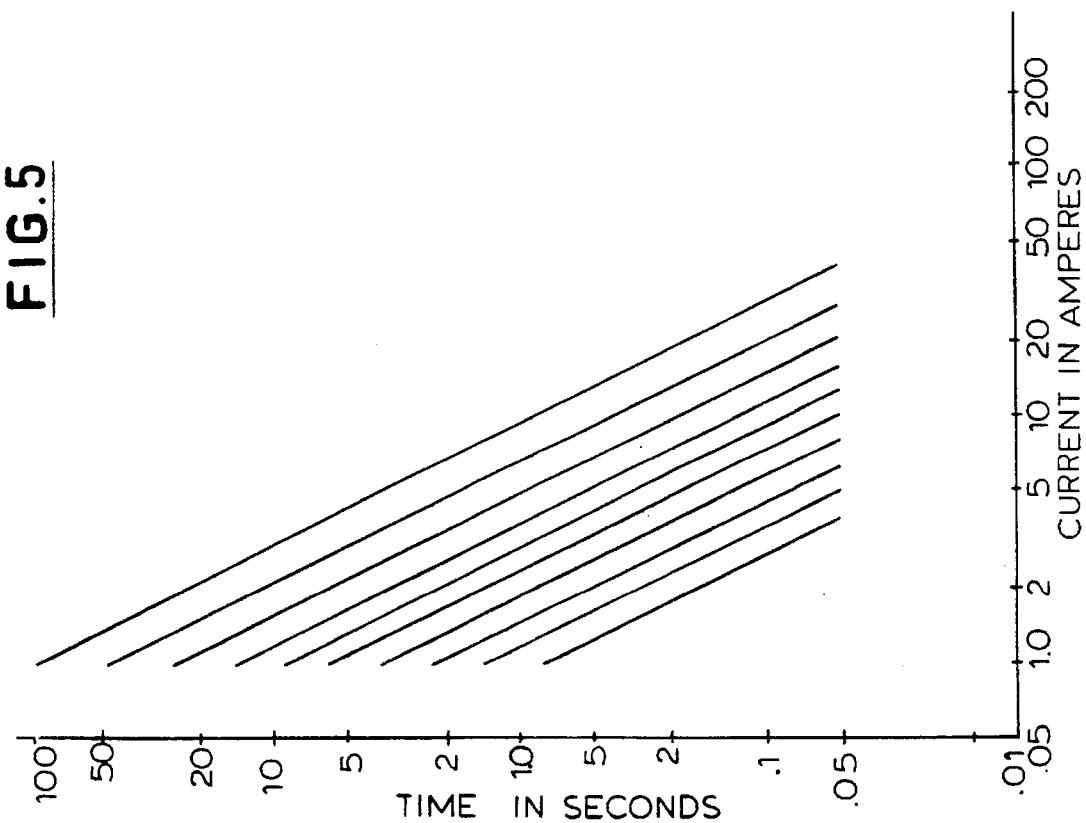
FIG. 5 is similar to FIG. 4 illustrating an $I^2t$ characteristic.
Figure 10A:
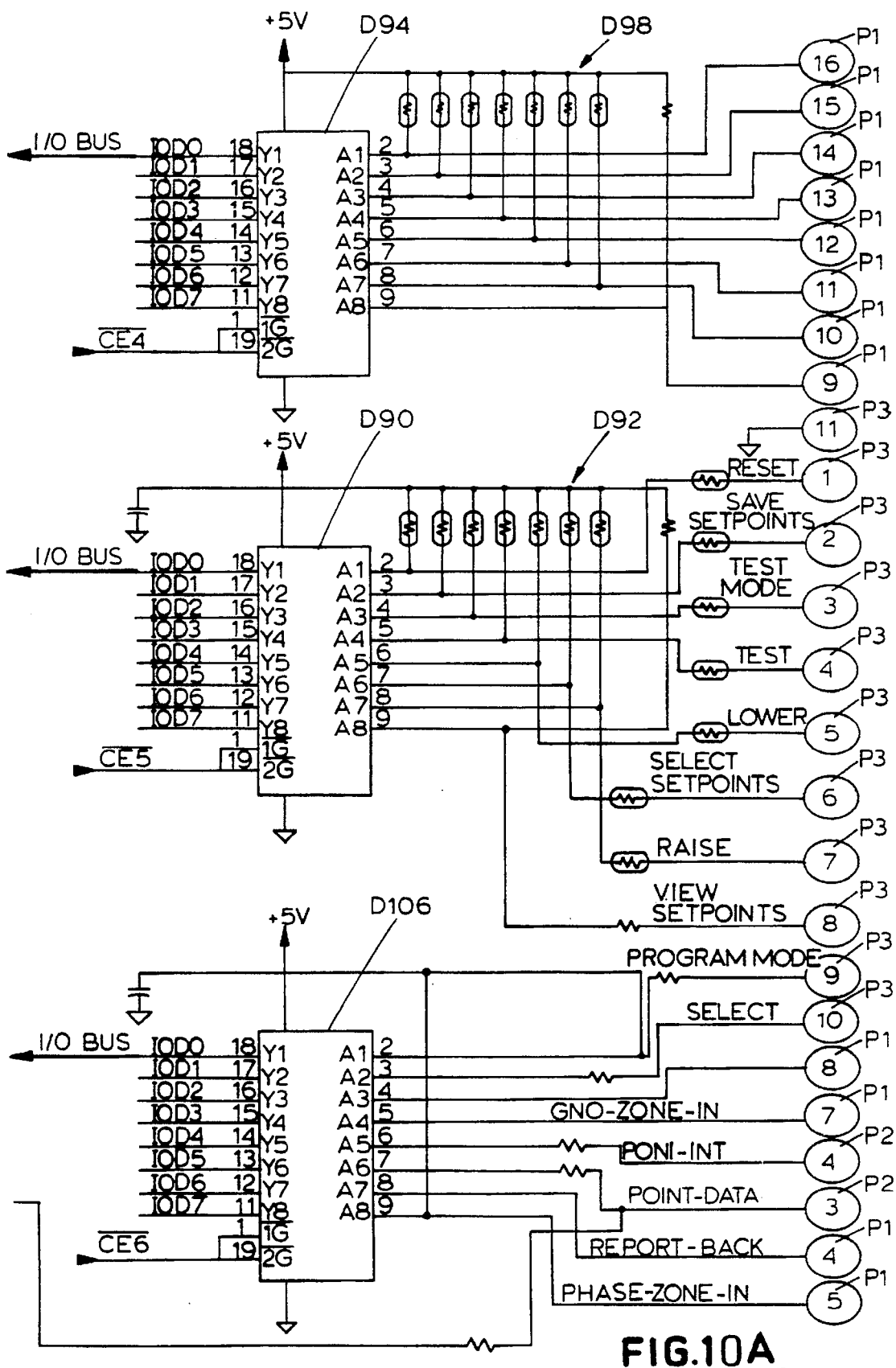
FIGS. 10–16 represent a schematic representation of the overcurrent tripping device in accordance with the present invention.
Figure 10B:
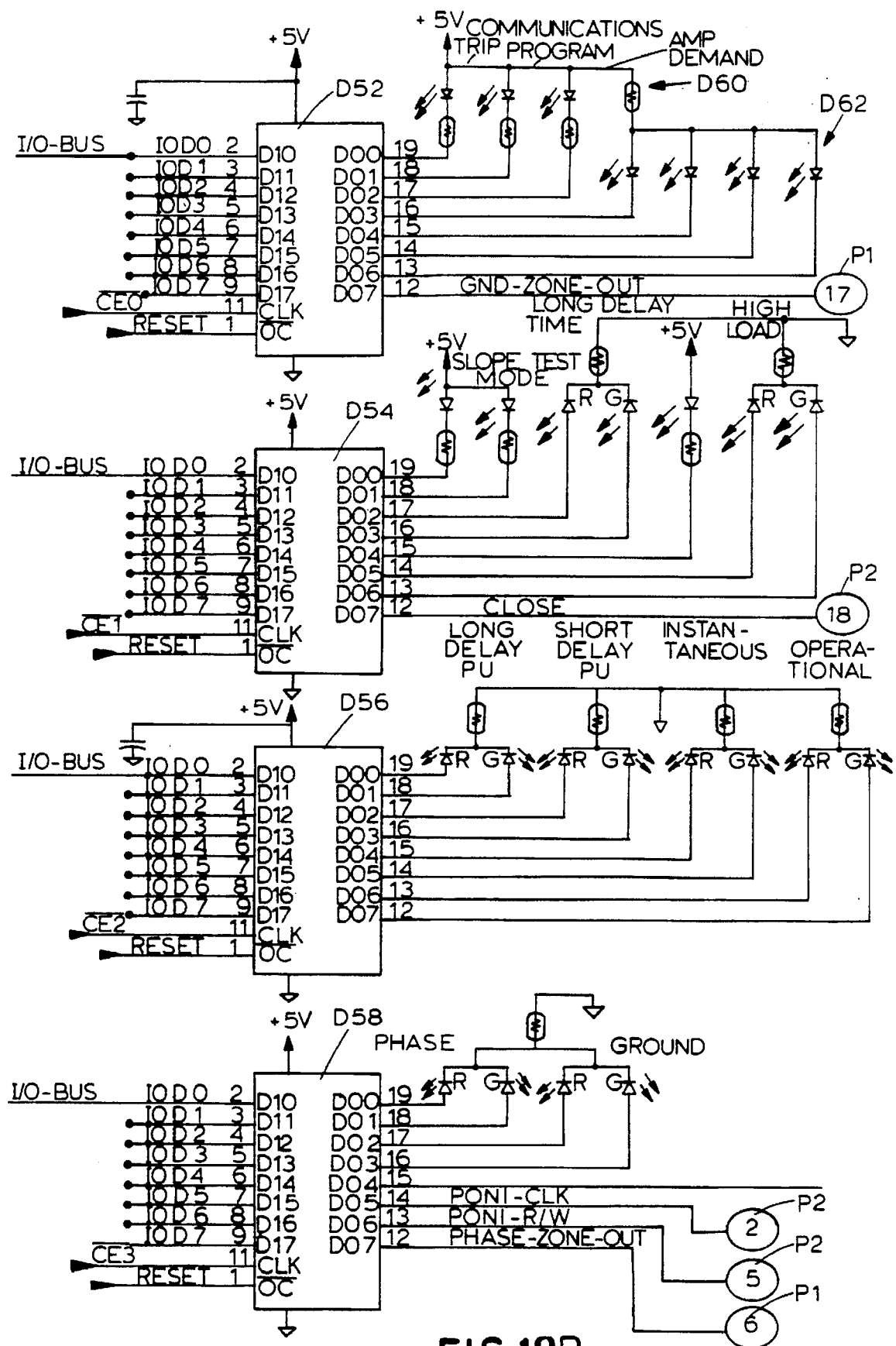

Graphical illustrations of the adjustable characteristics in accordance with the present invention are illustrated in FIGS. 4, 5 and 6 with exemplary FLAT characteristics shown in brackets in FIG. 4 and identified with the reference numeral A103. Each of the figures illustrate the time-current characteristics of the long time delay portion on a logarithmic scale whereby the horizontal axis relates to the current in amperes and the vertical axis relates to the time in seconds. More specifically, FIG. 4 illustrates a long time delay portion A102 which has a characteristic representative of the product of the current and the time; It. As mentioned above, the FLAT characteristic is also illustrated in FIG. 4 and identified with the reference numeral A103. FIG. 5 illustrates a long time delay characteristic A104 having a characteristic which represents the product of the square of the current and the time; $I^2t$. FIG. 6 represents a long time delay characteristic A106 which represents the product of the fourth power of the current and the time; $I^4t$.

The characteristics of the long time portions A92, A94 and A96 all relate to the product of the time with the current to a predetermined factor. For example, the factors described and illustrated above are 1, 2 and 4. On a logarithmic scale for the example above, varying the power of the current simply relates to varying the slope of the characteristics of a straight line function and illustrated graphically in FIGS. 4–6.

By providing adjustment of the slope of the long time characteristics of an overcurrent device, better coordination is possible for providing better selectivity and better electrical overcurrent protection relative to various devices including the fuse A28 illustrated in FIG. 1. More specifically, with reference to FIG. 2, the upper portion of the fuse characteristic A74 is very inverse and thus has a relatively steep slope. With known overcurrent devices having fixed characteristics which follow a general $I^2t$ characteristic, it is rather difficult to provide optimum coordination with a device having such an inverse characteristic such as the fuse A28. The solid state tripping device in accordance with the present invention, solves this problem by providing for adjustable tripping characteristics. Thus, in an application such as the application illustrated in FIG. 2, an $I^4t$ characteristic could be selected to provide better coordination between the 4.16 kV circuit breaker and the fuse A26.

Long Delay and Short Delay Coordination in Circuit Breaker Trip Units

As mentioned above, solid state tripping units for use in molded case circuit breakers, metal clad switchgear and the like, include tripping curves having fixed characteristics wherein the time and the magnitude of electrical current are adjustable. More specifically, as described above and further described in detail in U.S. Pat. No. 4,827,369, such overcurrent characteristics normally include an instantaneous portion A80, a short time delay portion A82 and a long time delay portion A94 (FIG. 2). In order to prevent any overlapping in the short time delay portion A82 and the long time delay portion A94 of the time-current curves, the adjustment ranges for these portions are selected such that the short time delay portion A82 and the long time delay portion A94 of the curves will not overlap throughout the entire adjustment range of the trip unit. As such, the coordination of such devices with other overcurrent devices in electrical distribution systems is rather limited.

In accordance with another aspect of the present invention, the adjustment ranges for the long time and short time delay portions of the trip unit are provided with relatively larger adjustment ranges than known solid state trip units in order to provide the capability to provide better coordination in an electrical distribution system. However, by providing such relatively wider adjustment ranges, coupled with the selectable long time characteristics described above, overlapping of the short time and long time delay characteristics can result. More specifically, FIG. 7 illustrates a situation where the long time delay portion A94 and the short time delay portion A82 of a time-current curve or overcurrent device having relatively wider adjustment ranges have been adjusted to cause overlapping. In particular, with reference to FIG. 7, an electrical current having a magnitude $I_1$ designated in FIG. 7 with the reference numeral A108 would pause a short time delay portion A82 of the trip unit to trip the interrupting device at a predetermined time period identified as $T_1$. However, a relatively lower magnitude current $I_2$, identified as A109, would cause the long time delay pickup to become active to trip the interrupting device in a relatively shorter time $T_2$, thus resulting in an overlap of the short time delay portion A82 and the long time delay portion A94 of the time-current curve perhaps causing a loss of selectivity in an electrical distribution system.

Typically, the long time delay portion A94 of a time-current curve is adapted to become active after the short time delay portion A82 to allow relatively lower magnitude electrical currents to flow in the electrical distribution system for relatively longer times without causing a trip of the interrupting device. This is done to prevent tripping of any interrupting device due to transient overcurrent conditions, for example, bus loading, voltage fluctuations in the system or the like. Accordingly, the long time delay portion A94 normally allows for relatively lower magnitude electrical currents for relatively larger amounts of time.

The short time delay portion A82 of the curve is normally intended to become active prior to the long time delay portion A94. The short time delay portion A82 normally becomes active at relatively larger magnitude electrical currents in relatively shorter times than the long time delay portion A94.

Accordingly, it is necessary that the long time and short time delay portions A94 and A82, respectively, be coordinated. As mentioned above, one aspect of the present invention relates to providing relatively wider adjustment ranges of the short time delay portion A82 and the long time delay portion A94 of the time-current curves. Accordingly, in order to provide such relatively wide adjustment ranges for the short time delay portion A82 and the long time delay portion A94 of the time-current curve, the solid state trip unit in accordance with the present invention includes provisions (described below) for monitoring the short time delay timers as well as the long time delay timers to prevent the long time delay portion A94 of the time-current curve from tripping the interrupting device prior to the short time delay portion A82.

By preventing the long time delay portion A94 from tripping the interrupting device prior to the short time delay portion A82, the overlap is thus eliminated. More specifically, with reference to FIG. 8, the short time delay portion is indicated with the reference numeral A112 while the long time delay portion is identified with the reference numeral A114. By preventing the long time delay portion from tripping the interrupting device prior to the short time delay portion, the characteristic illustrated in FIG. 7 is modified to that shown in FIG. 8, thus eliminating overlapping, while at the same time, providing relatively wider adjustment ranges for the short time delay portion A112 and the long time delay portion A114 of the time-current curve.

Instantaneous Fault Detection Method

As previously indicated, the instantaneous portion A80 of a time-current curve is normally utilized to protect an electrical distribution system subject to a relatively large overcurrent, such as a short circuit current. As such, it is necessary to trip the immediately upstream circuit breaker virtually instantaneously to prevent damage to the electrical distribution system. In particular, it is necessary to trip an interrupting device before its withstand capability is exceeded. The withstand capability relates to the mechanical forces that an interrupting device can withstand without failure due to the excessive short circuit current.

The line current flowing through an interrupting device is normally sensed by one or more current transformers, such as the current transformers A52 illustrated in FIG. 1. During relatively large overcurrent conditions, such as a short circuit condition, such current transformers A52 are known to become saturated. During saturation, the output waveform on the secondary of the current transformer is similar to that illustrated in FIG. 9, which, as shown, includes a plurality of relatively steep and narrow spike portions A116. As such, such relatively steep and narrow spike portions A116 can cause problems and even result in the solid state tripping device not tripping in time to prevent damage to the system.

More specifically, known solid state tripping devices which utilize a microprocessor, normally sample the line current a specific number of times during each cycle of the waveform. Problems arise when the sampling time interval is relatively longer than the time period of the relatively narrow and steep spike portions A116 of a saturated current transformer waveform. Consequently, in such an application, the instantaneous fault level may not be undetected in time to prevent damage to the electrical distribution system.

Some known devices utilize a modified sampling technique in order to cover different points of the waveform. However, in such an application where the current transformers are saturated, such a sampling technique is relatively complex and also may still not be able to allow detection of the instantaneous saturated current transformer peak current in time to prevent damage to the electrical distribution system.

Analog circuits for monitoring the secondary electrical current of the current transformers have not been known to be used because of the interface problems with microprocessor-based systems. More specifically, such microprocessor-based systems normally include a adjustable instantaneous trip level with a range between 1 to 28 times a nominal 5 ampere current. The instantaneous trip level is generally programmed by the end user, thus making it difficult, if not impossible, to interface with an analog detection circuit.

An important aspect of the present invention relates to the use of an analog circuit for determining the highest negative peak level of the instantaneous phase current and summing it with a positive current which is proportional to the setpoint of the instantaneous trip level. The positive current set by the microprocessor is a pulse width modulated output wherein the pulse width is proportional to the desired instantaneous setpoint. The summed current is then compared in a comparator to determine if the instantaneous phase current is greater than the instantaneous setpoint. If so, the comparator produces an interrupt to the microprocessor. In response to the interrupt, the microprocessor samples the current waveform to measure the final value and initiate a trip command to the interrupting device.

The analog circuitry consists of a plurality of OR diodes connected diodes to select the highest negative current available from the current transformers A52. For a three phase system, the analog circuitry would include three diodes connected in an OR configuration to select the highest peak negative electrical current value. This negative value is then summed with the positive electrical current generated by the microprocessor.

By utilizing an analog circuit for monitoring the secondary currents of the current transformers, the relatively steep spike portions A116 will be appropriately sensed and thus compared with the reference setpoint in order to initiate a trip command to the interrupting device if the setpoint is exceeded. In this way, the danger of utilizing a sampling scheme which could miss the relatively steep and narrow spike portion A116 of the current transformer secondary current waveform are virtually eliminated.

DETAILED DESCRIPTION OF THE EMBODIMENT

The electrical circuitry for incorporating the solid state tripping device as described above is illustrated in FIGS. 10–16. Such electrical circuitry includes a custom Westinghouse SURE CHIP PLUS microcontroller illustrated in FIGS. 32–113 and described below. The microcontroller includes a microprocessor, an on-board A/D converter, on-board comparators, as well as a plurality of input/output devices. The software control for the microprocessor is illustrated in FIGS. 17–31.

With reference to FIGS. 10–16, the alphanumeric characters within the circles are used to denote a continuation of the schematic on another figure. For example, a circle containing "$P_1 1$" is used to designate a connection on another figure having a circle containing "$P_1 10$". Also, multiple bits of a bus or port are designated, for example, as PC[7 . . . 0] which denotes bits 0 through 7 of port C. Similarly, individual bits are designated, for example, as PC[7,5,1] which denotes bits 7, 5 and 1 of port C.

Power supplies are well within the ordinary skill in the art. As such, the power supply inputs for the components illustrated in FIGS. 10–16 do not form a part of the present invention. Accordingly, power supply inputs to the various components are merely illustrated and not described. Similarly, ground inputs for the various components illustrated in FIGS. 10–16 are merely illustrated.

Figure 16A:
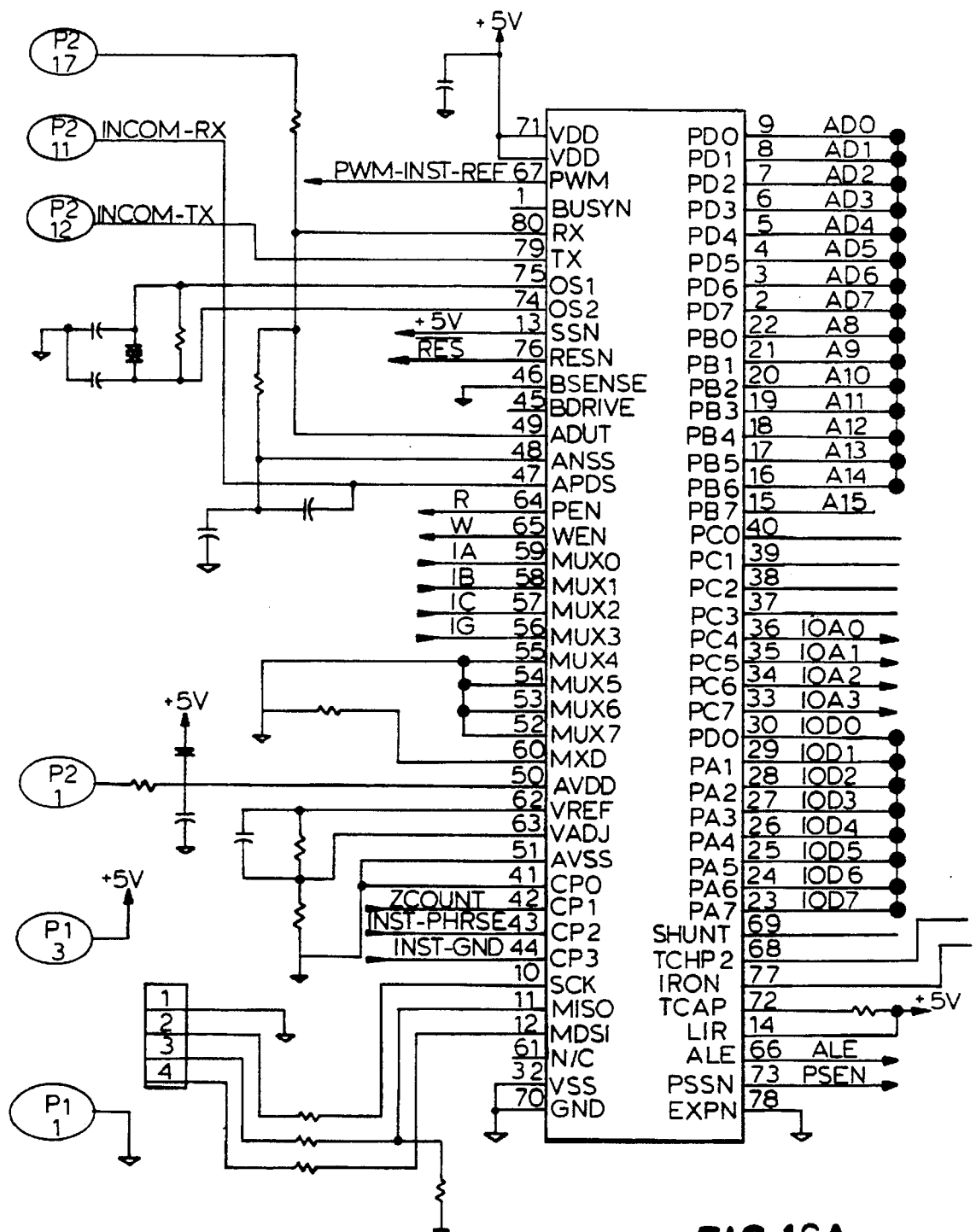
Figure 16C:
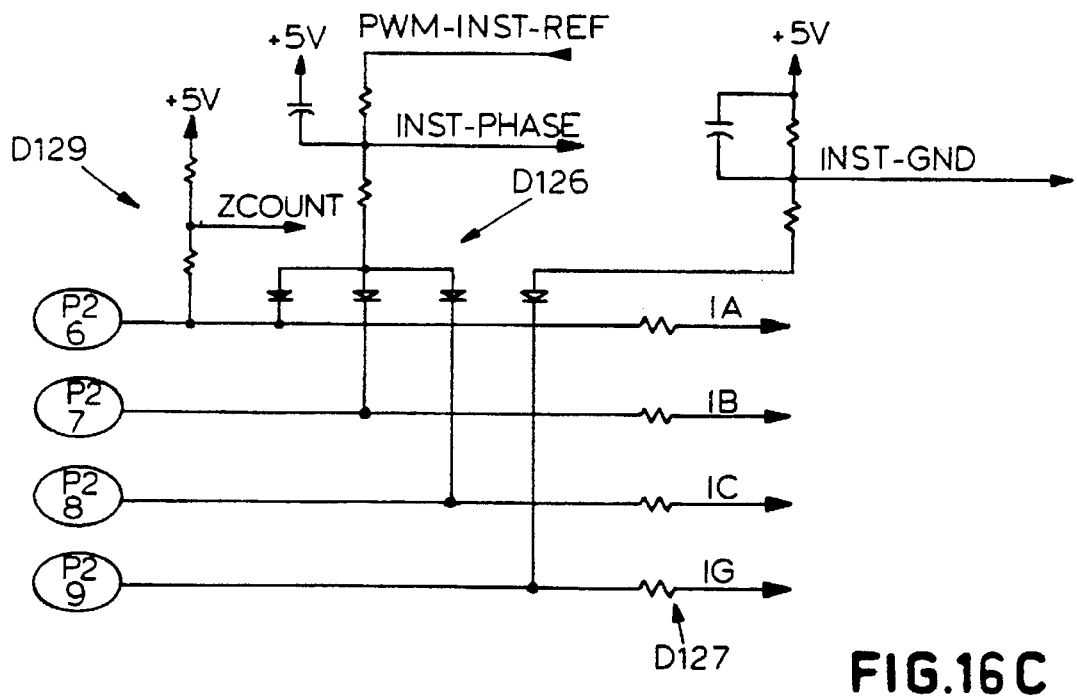
Figure 16D:
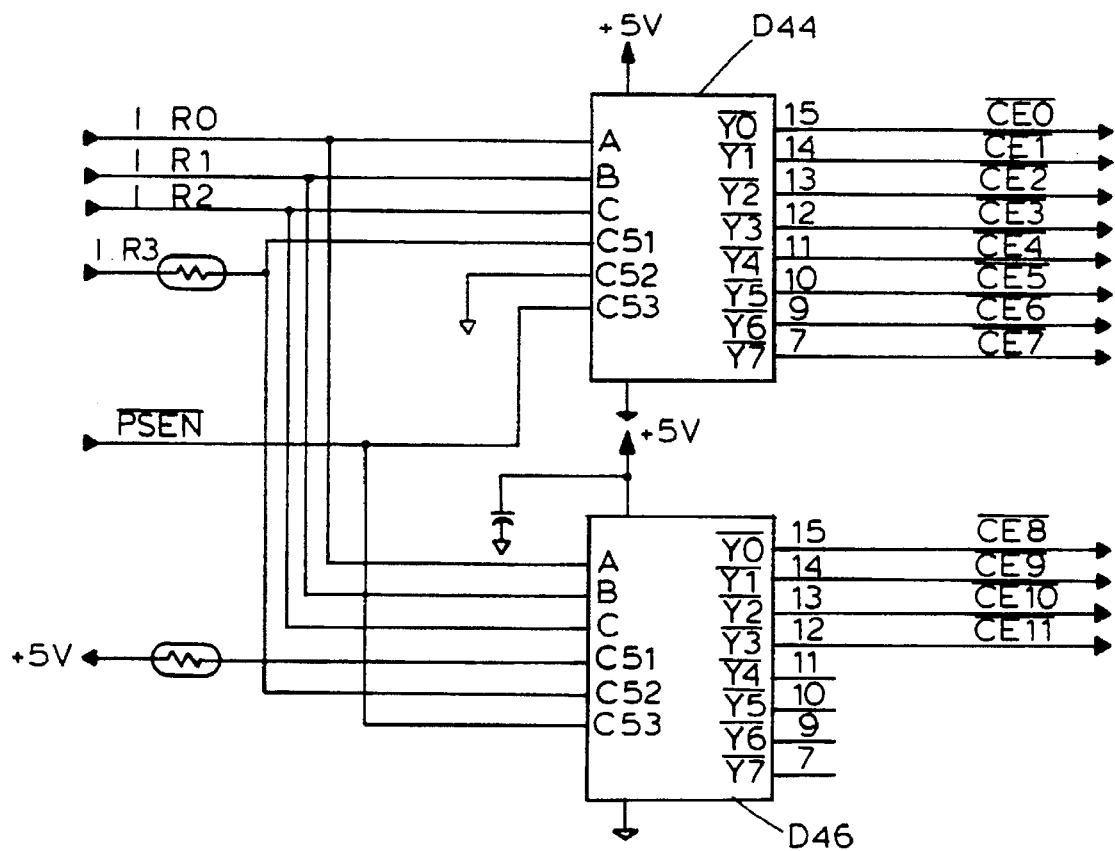
Figures 19, 20:
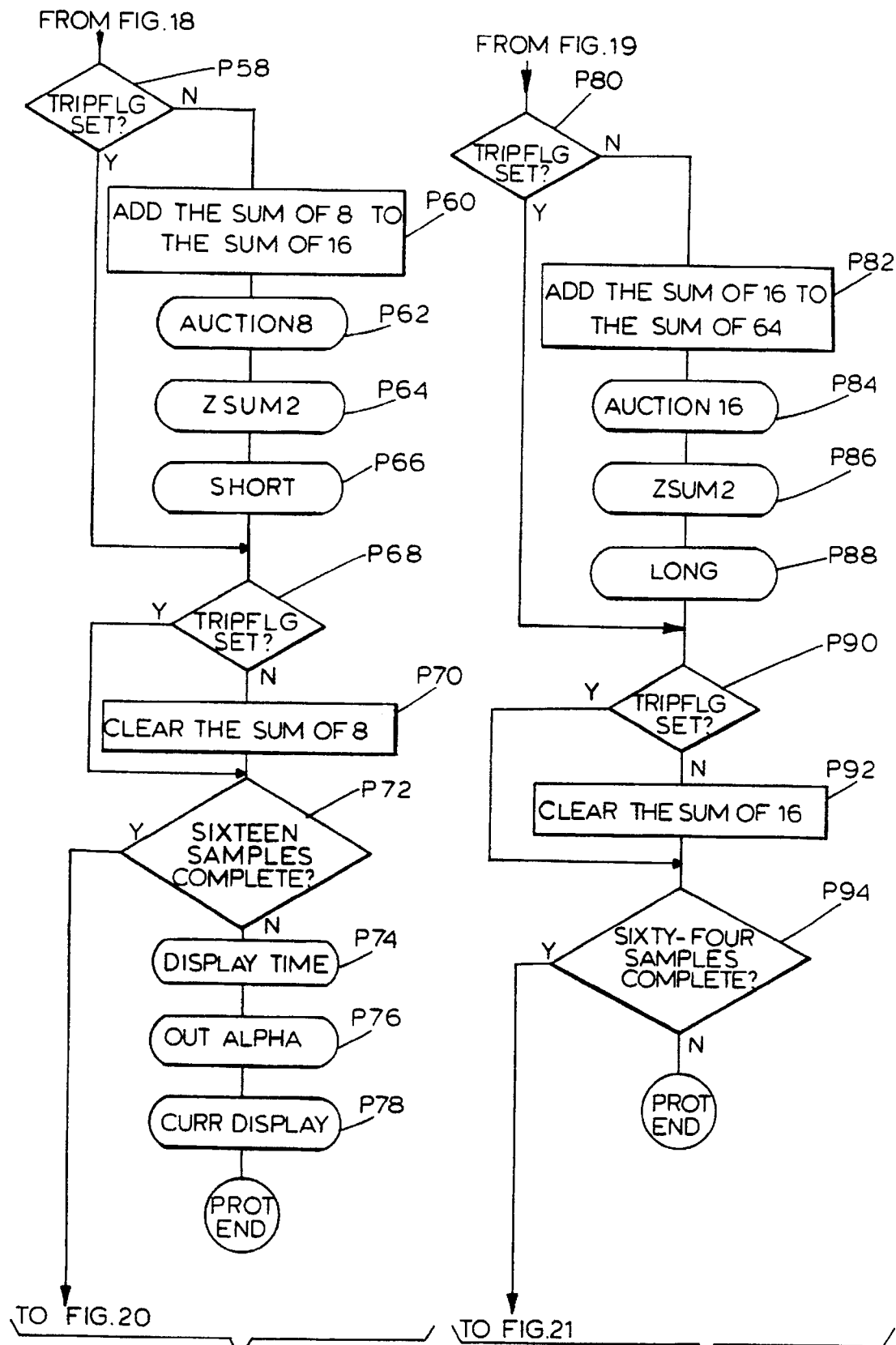
Figure 21:
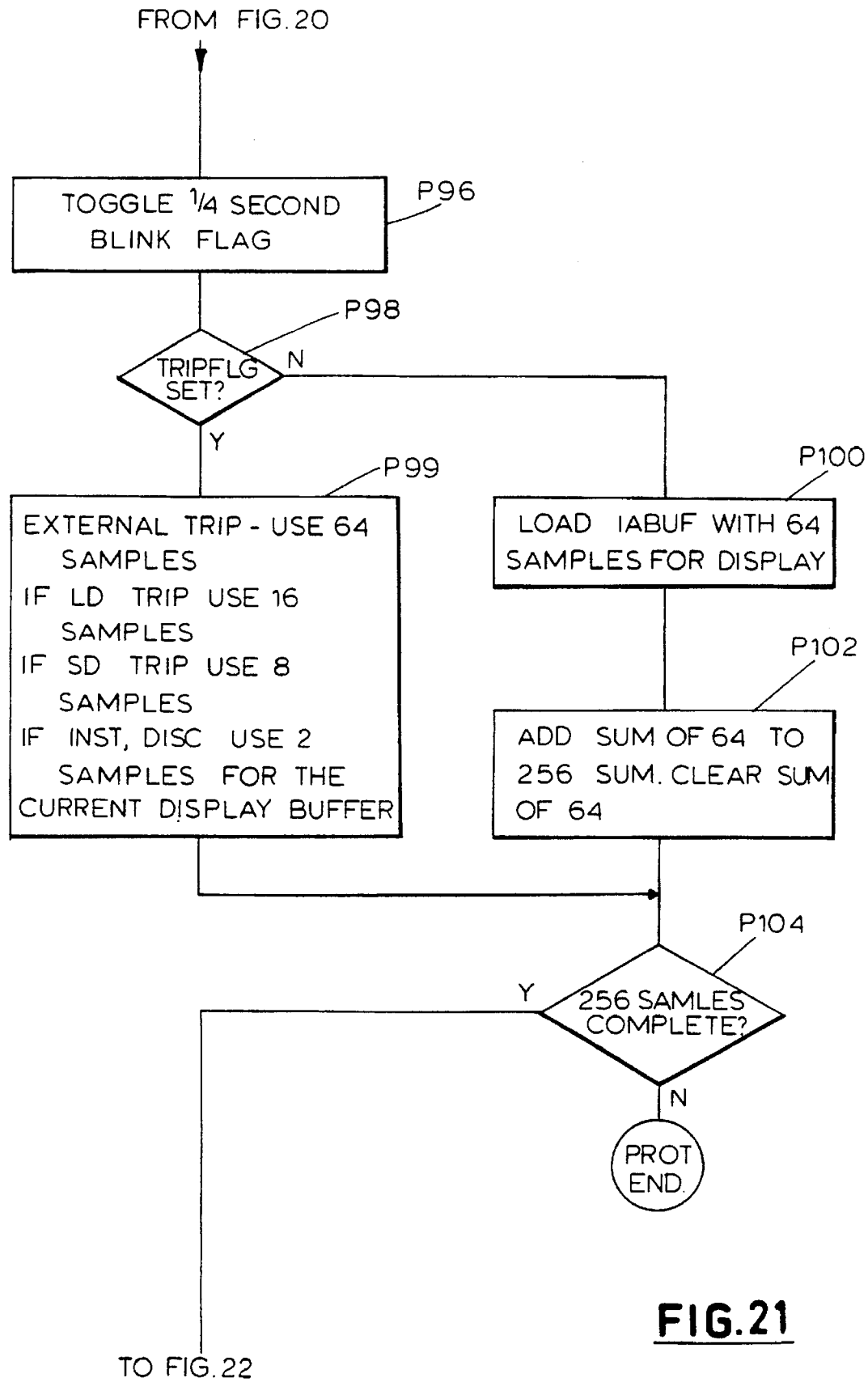
Figure 32:
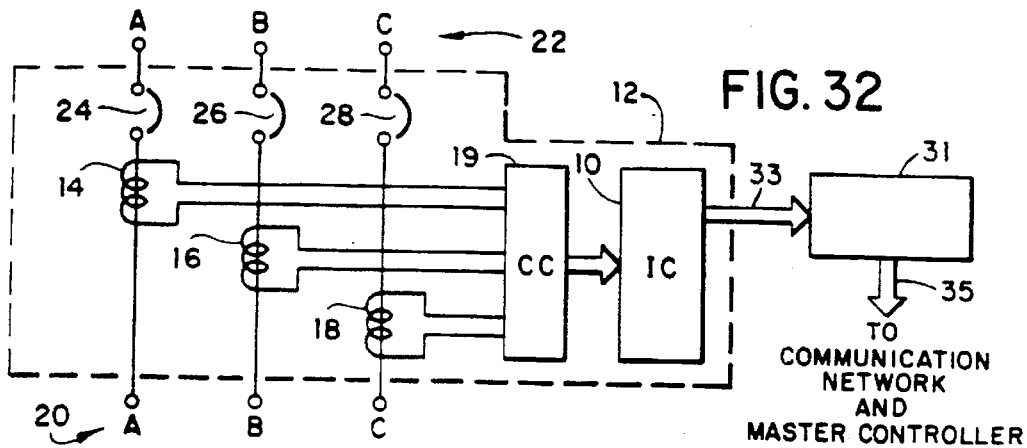
FIG. 32 is a functional representation of an application of the IC in accordance with the present invention.
Figure 113:
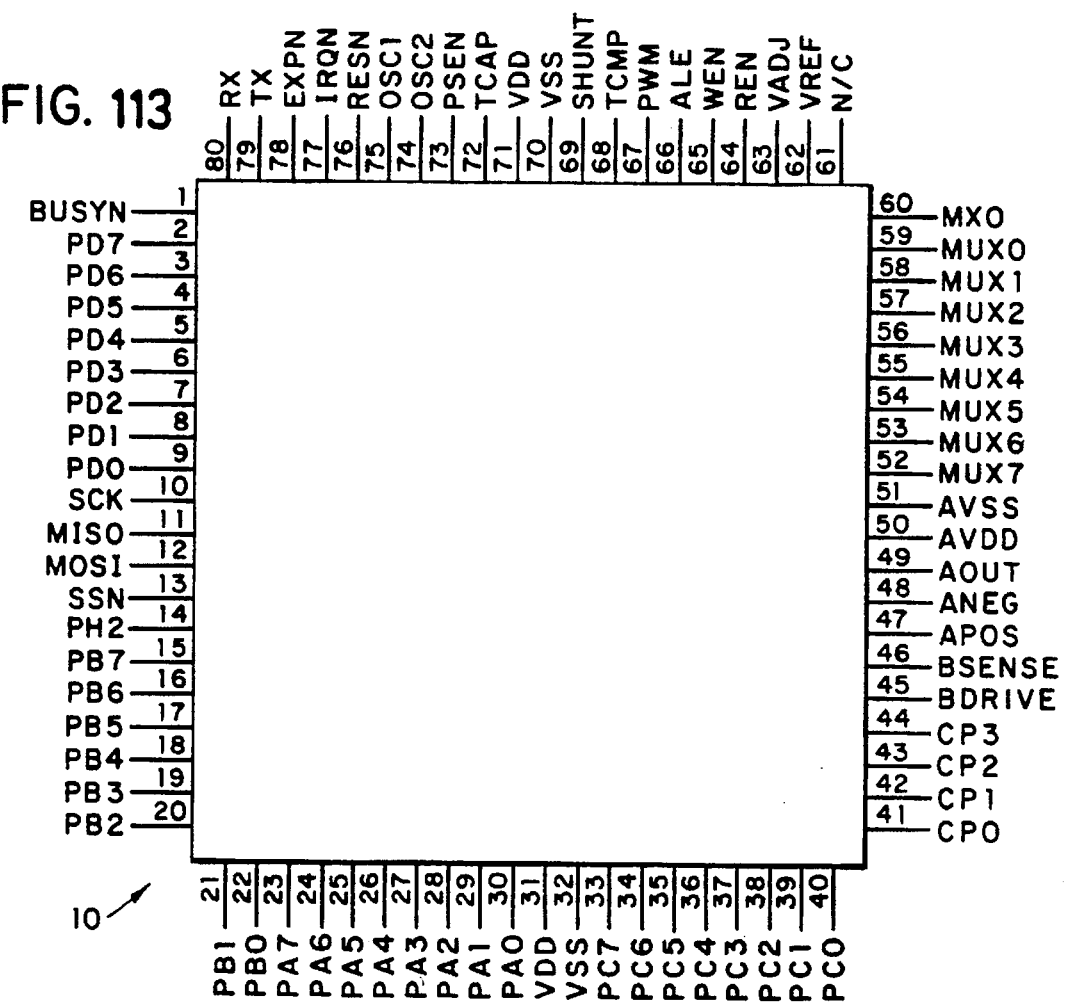
FIG. 113 is a pin out diagram of the IC in accordance with the present invention.

Referring first to FIG. 16, a Westinghouse custom SURE CHIP PLUS microcontroller is illustrated and identified with the reference numeral D20. As previously mentioned, the microcontroller D20 is illustrated in FIGS. 32–113 and described below.

The microcontroller D20 includes four parallel 8 bit input/output ports: PA, PB, PC and PD. The port PD[7 . . . 0] is used to form an eight bit multiplexed address/data bus, identified with the reference numeral D22. The port PB[6 . . . 0] is used to form a high address bus, identified with the reference numeral D24. Port PC is used for trip and alarm functions as well as for address decoding. More specifically, bits PC[1,0] are utilized for instantaneous trip and overcurrent trip commands, respectively. Bits PC[2,3] are used for instantaneous and overcurrent alarm functions, respectively. Bits PC[7 . . . 4] are used for input/output address decoding defining the address lines IOA0, IOA1, IOA2 and IOA3.

Port D forms an input/output bus, identified with the reference numeral D26. As will be described in more detail below, the input/output bus D26 is utilized for the user interface as well as for a supervisory interface as will be described below.

The solid state trip unit also includes a preselected amount of read only memory (ROM), identified with the reference numeral D30, for program instructions and a preselected amount of random access memory (RAM), identified with the reference numeral D32, for data. A nominal 32K ROM is selected for program instructions while a nominal 8K RAM is selected for data. However, it will be appreciated by those of ordinary skill in the art that the principles of the invention are not limited by the sizes selected for the ROM D30 and the RAM D32.

The 32K ROM D30 requires 14 address lines. Accordingly, a low address bus, identified with the reference numeral D34, and the high address bus D24, (forming a total of 14 address lines) are applied to the address inputs A0 through A14 of the ROM D30.

The high address bus D24 is provided by port D on the microcontroller D20 as discussed above. The low address bus D34 is derived from the multiplexed address/data bus D22. More specifically, the multiplexed address/data bus AD[7 . . . 0] D22 is applied to the data inputs DI[7 . . . 0] of an 8 bit address latch D36. The data output bits DO[7 . . . 0] of the address latch D36 form the low address bus D34.

The address latch D36 is under the control of an address latch enable signal ALE, available at the microcontroller D20. Thus, once an address is placed on the multiplexed address/data bus D22 by the microcontroller D20, this address is latched by the address latch D36 under the control of the address latch enable signal ALE, which in turn, is applied to the latch enable (LE) input on the address latch D36.

The address latch D36 is continuously selected by tying the chip select input ($\overline{OC}$) to ground by way of a resistor D38. Similarly, the ROM D30 is continuously selected by tying the select input; $\overline{CE}$ to ground by way of the resistor D40.

The output pins D0[7 . . . 0] of the address latch D36 form the low address bus A[7 . . . 0] D34. The low address bus A[7 . . . 0] D34 is applied to the address inputs A[7 . . . 0] of the ROM D30 along with the high address bus A[14 . . . 8] D24 which is applied to the ROM address inputs A[14 . . . 8] to address the 32 kilobyte ROM D30 which, as indicated previously, contains the program instructions which will be described below.

The output pins O[7 . . . 0] of the ROM D30 are applied to the multiplexed address/data bus D22 in order to allow the microcontroller D20 and, in particular, the microprocessor within the microcontroller D20 to access program instructions. The operation of the ROM D30 is under the control of a program select enable signal ($\overline{PSEN}$), available at the output of the microcontroller D20.

The 8 kilobyte RAM D32 only requires 12 address lines. Accordingly, the low address bus A[7 ... 0] D34 is applied to the input terminals A[0 ... 7] of the RAM D32. A portion of the high address bus D24 (e.g., A[12 ... 7]) is applied to the address inputs A[12 ... 7] of the RAM D32. The output of the 8 kilobyte RAM, O[7 ... 0], is tied to the multiplexed address/data bus D22 in order to allow the microcontroller D20 to access the RAM D30.

Analog values, such as electrical current values and in particular the phase and ground currents are digitized by the microcontroller D20 and stored in the RAM D32. Read and write functions of the RAM D32 are under the control of the microcontroller D20. More particularly, the RAM D32 may be read when the microcontroller pulls its read output ($\overline{R}$) low which is tied to the operate enable input ($\overline{OE}$) of the RAM D32. The microcontroller D20 can write to the RAM D32 by pulling it write output ($\overline{W}$) low which is tied to the write enable input of the RAM D32.

Input/output address bits IOA[3 ... 0], available at the microcontroller D20, facilitate addressing of a plurality of user and supervisory control interfaces. More specifically, the input/output address bits IOA[3 ... 0], are applied to two 3×8 address decoders D44 and D46. In particular, the input/output address bits IOA[2 ... 0] are applied to the A, B, C inputs of each of the 3×8 address decoders D44 and D46. The address bit IOA[3] is applied to chip select inputs CS1 and $\overline{CS2}$, respectively of the address decoders D44 and D46 by way of a resistor D48. The $\overline{PSEN}$ signal, available from a microcontroller, is applied to the chip select inputs $\overline{CS3}$ of the address decoders D44 and D46. The chip select input $\overline{CS2}$ of the address decoder D44 is grounded while the chip select input CS1 of the address decoder D46 is tied to a 5 volt source by way of a resistor D50.

The address decoders D44 and D46 are thus used to decode the input/output address bits IOA[3 ... 0] to provide twelve different address decode signals. (Four of these select signals are unused.) These address decode signals are identified as $\overline{CE0}$ through $\overline{CE11}$ used for various user and supervisory control interfaces as discussed below. More specifically, referring to FIG. 10, the address decode signals $\overline{CE0}$, $\overline{CE1}$, $\overline{CE2}$ and $\overline{CE3}$ are applied to a clock input (CLK) of four 8 bit registers D52, D54, D56 and D58, respectively, while the input/output bus D26 is applied to the data input pins DI[7 ... 0]. Data on the input/output bus D26 is clocked into the registers D52, D54, D56 and D58 under the control of the chip enable address decode signals $\overline{CE0}$, $\overline{CE1}$, $\overline{CE2}$ and $\overline{CE3}$. The registers D52, D54 and D56 and D58 are reset by the microcontroller reset signal. The output pins DO[7 ... 0] of the registers D52, D54 and D56 and D58 are used to drive various light emitting diodes (LED's), generally identified with the reference numeral D60 by way of various current limiting resistors generally identified with the reference numeral D62.

In addition to controlling the LED's D60, the registers D52 and D58 are also used for interlocking functions. More particularly, the signals, GND-ZONE-OUT and PHASE-ZONE-OUT, available at pin DO7 on the registers D52 and D58, respectively, are used for interlocking with an upstream circuit breaker in the electrical distribution system to allow for selective tripping. In particular, the GND-ZONE-OUT and PHASE-ZONE-OUT signals are used to indicate whether the ground and phase overcurrent options have been selected. In particular, these signals are used to prevent tripping of an upstream breaker during the long time delay portion of the time-current current curve if these options were selected on the downstream trip unit in order to prevent the upstream circuit breaker for tripping on a long time delay. If the options are not selected, then the upstream circuit breaker will provide the long time delay protection not selected for the downstream trip unit.

Figure 11A:
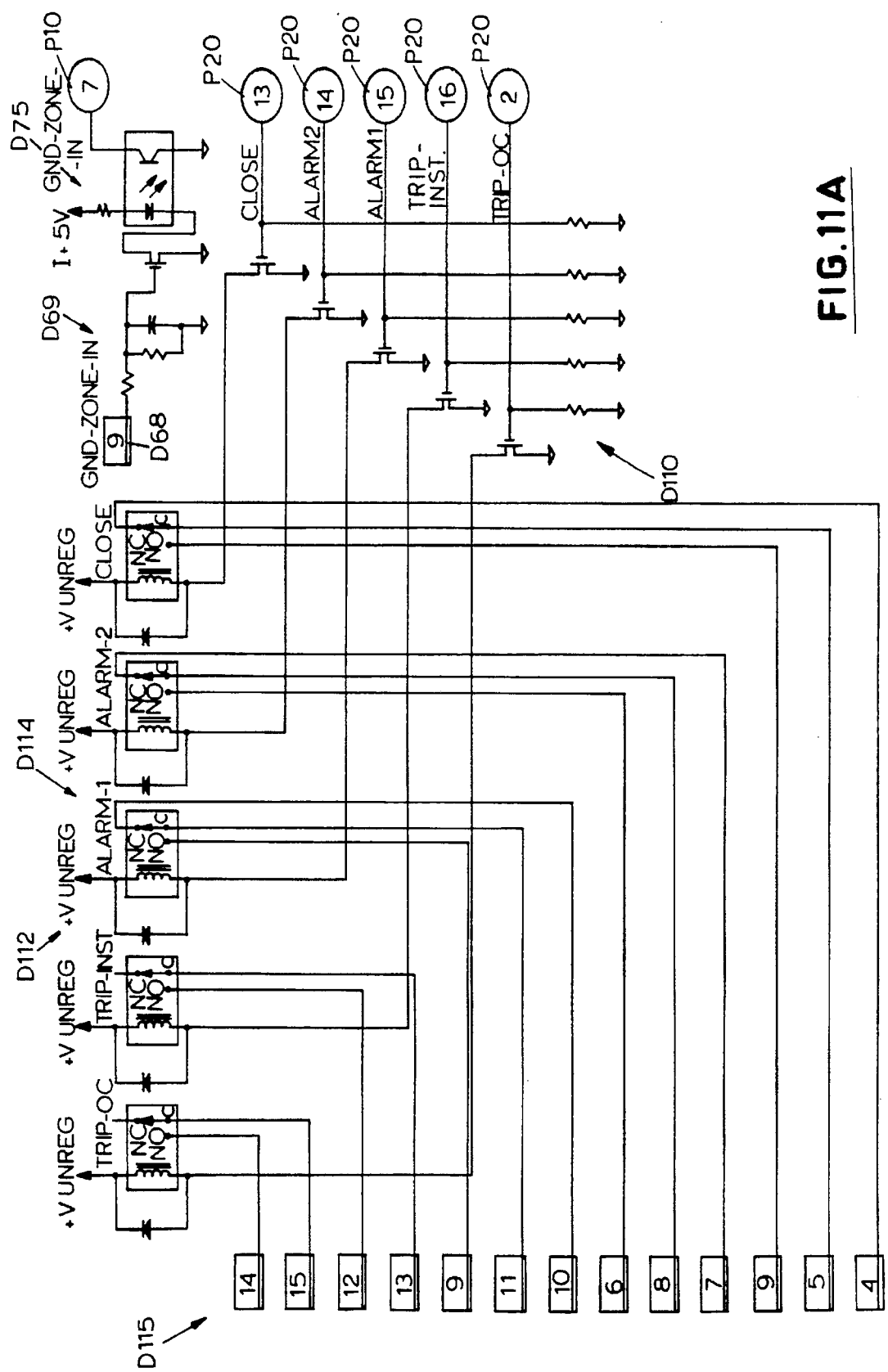
Figure 11B:
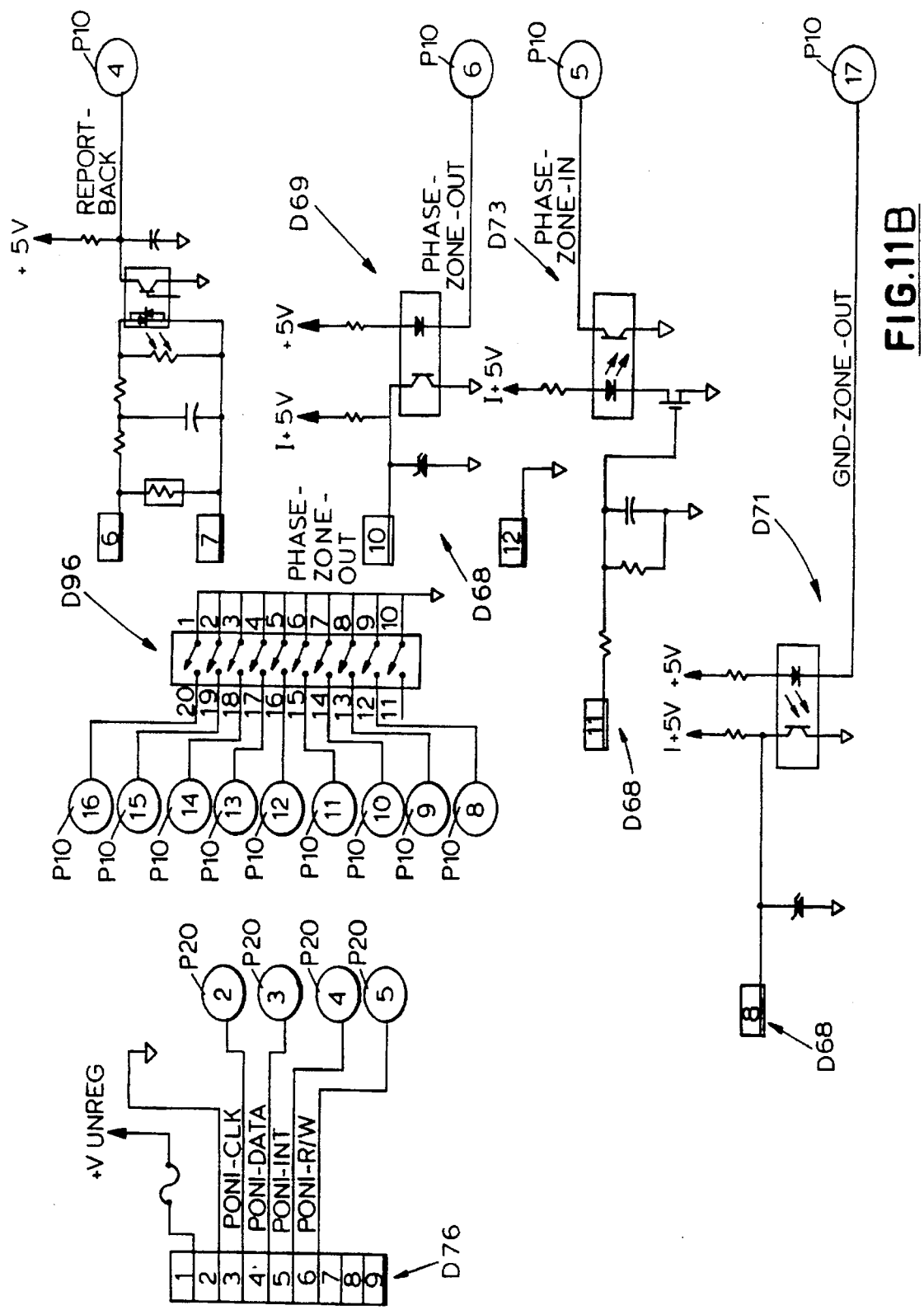

These signals are applied to the registers D52 and D58 by way of the input/output bus D26 and are available at the DO7 outputs of the registers D52 and D58, respectively. These signals, in turn, are applied to two optocoupler networks generally identified with the reference numerals D69 and D71 (FIG. 11). The output of the optocoupler networks D69 and D71, in turn, are applied to terminals 8 and 10 of the user interface terminal block D68 for interlocking with an upstream circuit breaker.

Similarly, signals from downstream circuit breakers, identified as PHASE-ZONE-IN and GND-ZONE-IN from a downstream circuit breaker are applied to terminals 9 and 11 of the user interface terminal block D68. These signals are applied to the signal conditioning and switching network generally identified with the reference numeral D69 and, in turn, to optocoupler networks D73 and D75, respectively. The output of the optocouplers D73 and D75 are then applied to the input data bus D26 to inform the system that the downstream circuit breaker has been configured for both phase and ground current over protection in order to coordinate long time delay tripping functions therewith. The outputs of the optocouplers D73 and D75 are applied to an 8 bit register D106 (FIG. 10), selectable by the address decode signal $\overline{CE6}$, and applied to the input/output bus D26.

The register D58 is also used as an interface for a PONI network. The PONI network relates to a serial port interface for use with Westinghouse's INCOM communications network. The PONI interface is described in U.S. Pat. No. 5,007,013, assigned to the same assignee as the present invention and hereby incorporated by reference. An example of the INCOM network is described in U.S. Pat. No. 4,653,073, also assigned to the same assignee as the present invention and incorporated by reference.

In particular, the inputs to the PONI interface, identified as PONI-CLK and PONI-R/W, available at the DO5 and DO6 pins of the register D58 are applied to a PONI interface terminal block D76 (FIG. 11). The output signals from the PONI interface, PONI-INT and PONI-DATA, adapted to be connected to the PONI interface terminal block D76 are applied to the input/output bus D26 by way of the register D106.

The INCOM network, referred to above, is a communications network that allows the electrical interrupting device to communicate with a remote communications device as described in the aforementioned '073 patent. The SURE CHIP PLUS microcontroller D20 as discussed in detail enables the electrical interrupting device to communicate with the INCOM network. By enabling the electrical communications device to communicate with the INCOM network, the function (e.g., slope) and setpoints can be varied remotely.

Figure 14A:
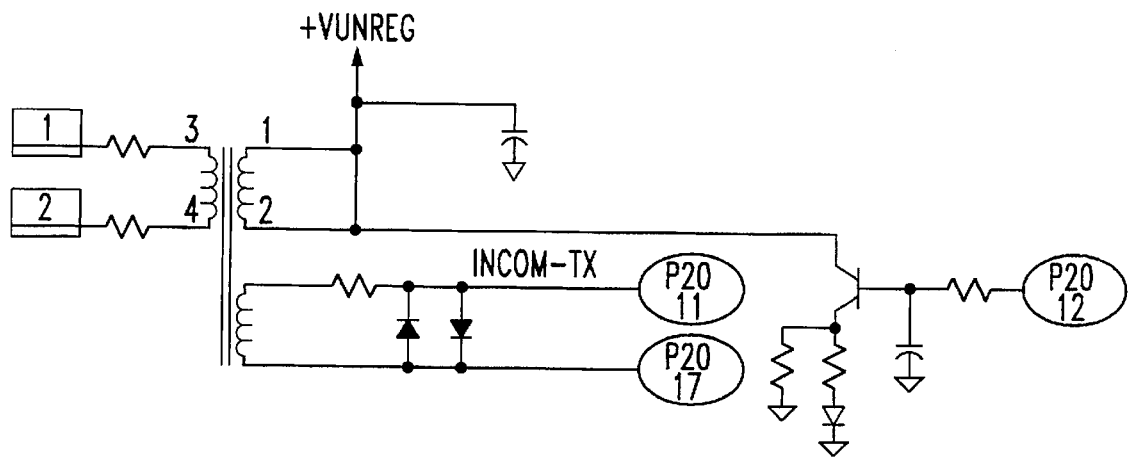

The interface with the INCOM network is by way of a terminal block D77 (FIG. 14a). In particular, the INCOM send and receive signals TX and RX are connected to terminals 1 and 2 of the terminal block D77 to connect the electrical interrupting device to an INCOM communications network as described in detail in the '073 patent.

Both the RX and TX signals are conditioned by signal conditioning circuitry shown within the dashed box identified with the reference numeral D79. The RX and TX signals as well as a common line are connected to the SURE CHIP PLUS microcontroller D20 as shown in FIG. 16.

A 5 bit seven segment display (FIG. 12) is also locally mounted relative to the solid state trip device. The seven segment display is adapted to display values of various parameters including the instantaneous phase and ground currents. The display generally includes five seven segment digits generally identified with the reference numeral D80. Each of the seven segment display elements are driven by a seven segment display driver, generally identified with the reference numeral D82, by way of a plurality of resistors generally identified with the reference numerals D84. The input/output bus D26 is applied to the input terminals A, B, C, D of the display drivers D82. The chip and decoded address chip enable signals $\overline{CE7}$, $\overline{CE8}$ and $\overline{CE9}$ are applied to the enable input $\overline{LE}$ of the display drivers D82.

In addition to the display, the trip unit also includes an alphanumeric display, generally identified with the reference numeral D86, utilized during a calibration mode. The alphanumeric display D86 is selected by the decoded address inputs $\overline{CE10}$ and $\overline{CE11}$. More specifically, the decoded address input $\overline{CE10}$ and $\overline{CE11}$ are used to select the display D86. The input/output bus D26 is applied to a register D107.

Figure 15:
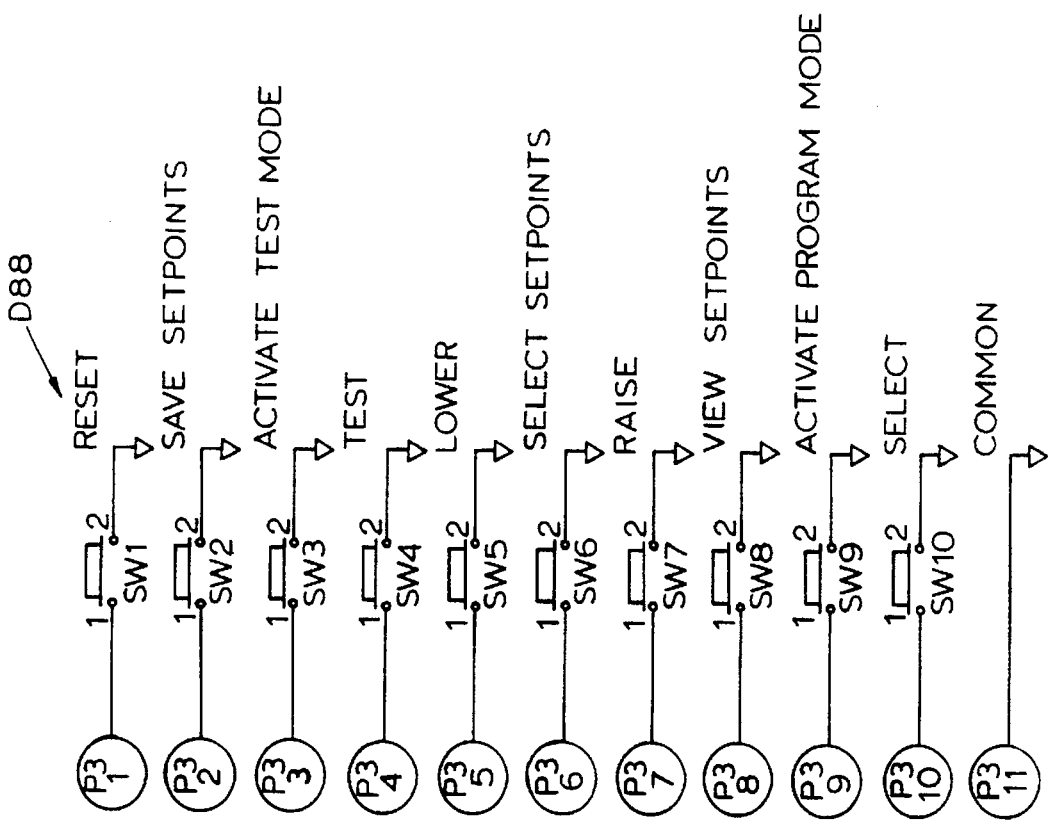
Figure 13:
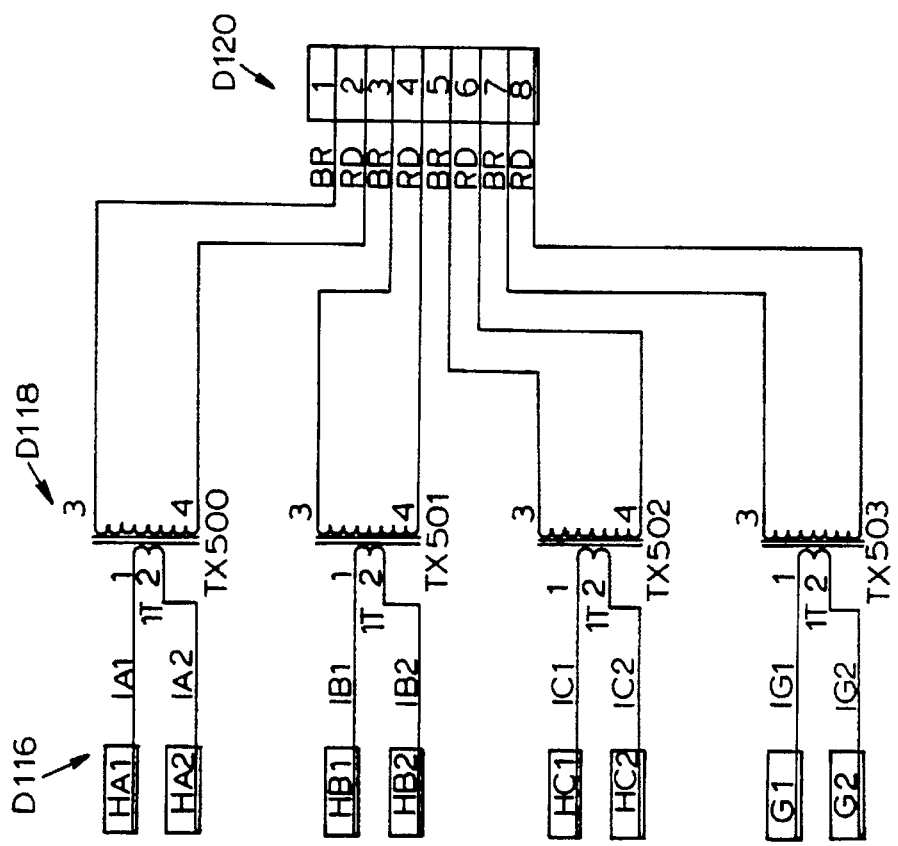

The user interface also includes a plurality of membrane switches for selecting setpoints, viewing the setpoints on the display and testing the trip unit as illustrated in FIG. 15. These membrane switches are generally identified with the reference numeral D88 and are applied to a register D90 (FIG. 10) by way of a plurality of resistors D92 for interfacing with the microcontroller D20. More specifically, the membrane switches D88 together with the resistors D92 which form a voltage divider with the 5 volt source, function to change the voltage level and consequently the logic level applied to the register D90. The output of the register D90 is applied to the IO bus D26. The register D90 is selected by the address decode select signal $\overline{CE5}$.

A user interface register D94 (FIG. 10) is also provided for programming the current transformer ratio as well as select options, such as a discriminator option or an auto reset option. Such data is programmed by the user by way of a gang switch D96 (FIG. 11). The gang switch D96 includes a plurality, for example 10, single pole single throw switches which are used to interface with the system. The switches D96 are applied to the register D94 by way of a plurality of pull up resistors D98. The output of the register D94 is applied to the IO bus D26. The register D94 is selected by the address decode chip enable signal $\overline{CE4}$.

In addition, the trip unit is adapted to provide a plurality of relay contact outputs for interfacing with a circuit breaker trip coil and customer remote annunciator. More specifically, a CLOSE signal, available at register D54 and an instantaneous trip and overcurrent trip signals as well as alarm signals, available at the microcontroller D2 are applied to power transistors, generally identified with the reference numeral D110, which, in turn, are applied to a plurality of relays identified with the reference numeral D112. Each relay D112 includes a single pole double throw contact D114. The relay contact outputs D114 are then applied to the customer interface terminal block D115 for use by the customer.

Figure 14B:
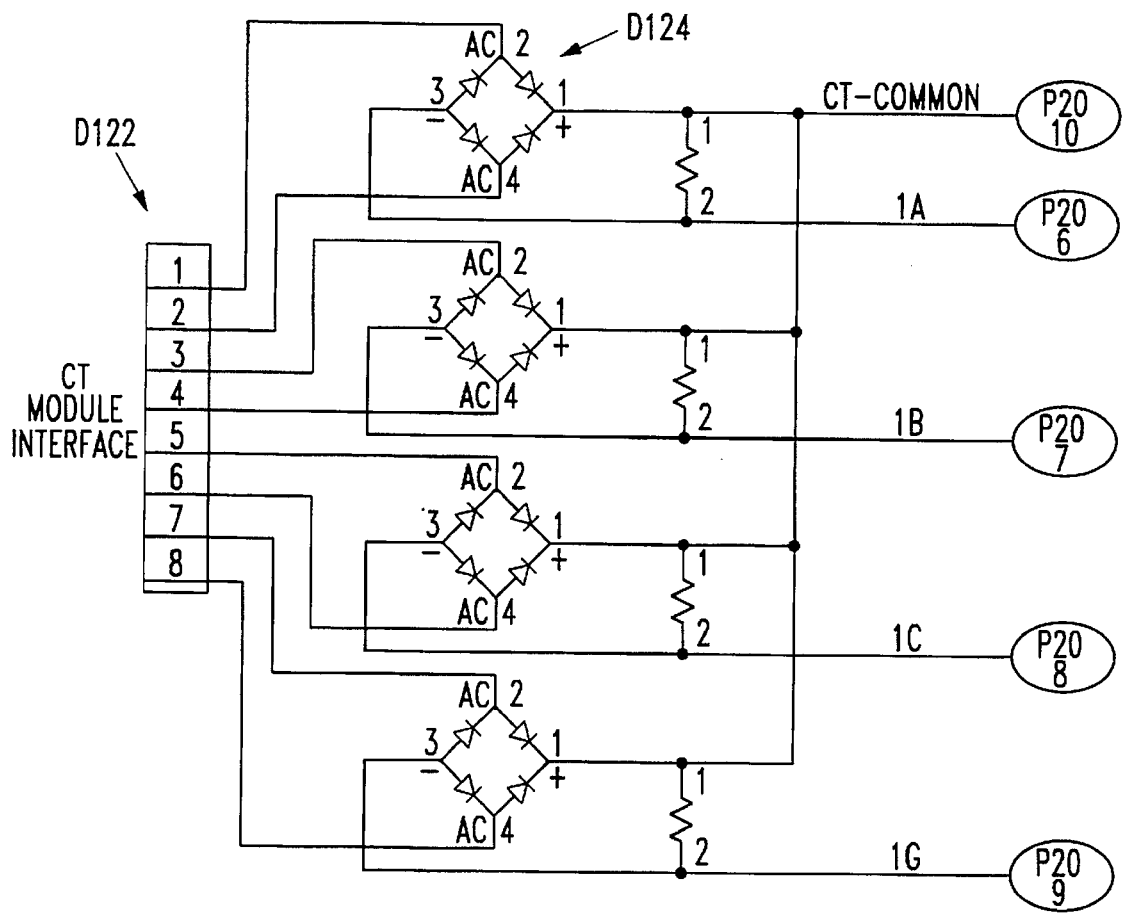

The system includes a plurality of auxiliary current transformers for reducing the CT output currents to an acceptable level. More specifically, the primary current transformers provided on the particular interrupting device upon which the trip unit is used, are wired to a terminal block D116 (FIG. 13) which, in turn, is wired to the auxiliary transformers D118. The secondary of the auxiliary transformers is wired to a terminal block D120. The terminal block D120 are wired to a CT module interface terminal block D122 (FIG. 14).

The outputs of the CT's are rectified by a plurality of rectifiers generally identified with the reference numeral D124. The rectified output is then applied to a monitoring circuit, generally identified with the reference numeral D126 (FIG. 16). More specifically, the rectified phase current outputs IA, IB and IC are applied to a diode OR circuit, generally identified with the reference numeral D126. The diode OR circuit D126 contains three diodes whose anodes are connected in common and whose cathodes are connected to the rectified phase currents IA, IB and IC.

Such a configuration can easily and continuously select the largest negative phase current even when the current transformers are saturated. This negative phase current is summed with a positive current developed by the microcontroller D20 which is related to the customer selected setpoint for the instantaneous/overcurrent setting as discussed below. This combined value is then applied to a comparator within the microcontroller D20 which will interrupt the microprocessor within the microcontroller D20 whenever the phase currents exceed the preselected setpoint.

The ground current is likewise monitored by the system. The ground current IG causes a voltage drop across a resistor D127. As long as this voltage is lower than the voltage formed by a voltage divider network, a diode will conduct and indicate the instantaneous ground current which, in turn, is applied to the microcontroller D20.

System Configuration

The trip unit in accordance with the present invention is configured by way of the membrane switches D88 (FIG. 15) and the gang switch D96 (FIG. 11). In particular, the gang switch D96 is a user interface to indicate to the system the particular current transformer ratio selected on the circuit breaker associated with the overcurrent trip device. The five switch contacts are utilized for the CT ratio selection. This allows up to 32 various CT ratios to be programmed into the system.

Similarly, two switch contacts are used to program the ground current transformer ratio. These two switch contacts allow up to four different ratios to be selected.

In addition, the gang switch contacts D96 are also used for various options. For example, one gang switch contact D96 may be used to program an auto reset option. The other gang switch D96 can be used to allow or block downloading of setpoints via INCOM.

The membrane switches generally, identified with the reference numeral D88, provide for a user interface with the trip unit. In particular, setpoints are programmed into the trip unit by depressing the membrane switch identified as ACTIVATE PROGRAM MODE. The setpoints for the various phase and ground overcurrent and instantaneous tripping functions including the slopes for the long time delay portion may be selected by depressing the membrane switch identified as SELECT. By depressing the SELECT setpoints switch various LED's D60 (FIG. 10) relative to various setpoints including long time delay pick-up, short time delay pick-up, instantaneous delay times and slope will sequentially be illuminated. Once the LED D60 on the trip unit adjacent the particular the desired setpoint is illuminated, the operator by way of the LOWER RAISE membrane switches can page through a number of pre-programmed setpoints until the desired setpoint is visible on the alphanumeric display D86. After the desired setpoint is reached the membrane switch identified as SAVE SETPOINTS is depressed which, in turn, stores the selected setpoint. In the event of an error, the operator can simply depress the membrane switch identified as RESET to exit the programming mode. The system also has capability for viewing all of the setpoints once they have been saved. In order to view the setpoints, the membrane switch identified VIEW SETPOINTS is depressed.

The system also has capability for testing. In order to test the unit, a membrane switch labeled ACTIVATE TEST MODE is depressed. The word "TEST" then appears on the alphanumeric display D86. The operator can then press the SELECT SETPOINTS switch to select the desired test. Once the test is selected, the operator can press the RAISE LOWER switch to increase or clear the level of current to run the test. Subsequently, the membrane switch labeled TEST is depressed. This will cause the unit to initiate a trip which is indicated by the LED's D60.

There is also a metering function, where phase currents IA, IB, IC are displayed along with IG ground current IG. To step between these displays the operator presses the SELECT switch. The currents are displayed on the display D80.

Program Control

The program control for the trip unit in accordance with the present invention is illustrated by way of a flow chart in FIGS. 17–31. As previously mentioned, the program instructions are contained in the 32K ROM D30. In addition to the program instructions, the ROM D30 may also contain look-up tables for the various time-current characteristics for phase and ground overcurrents.

As previously mentioned, these phase currents IA, IB, IC, as well as the ground current IG are applied to analog inputs MUX0, MUX1, MUX2 and MUX3 of the custom microcontroller D20. As discussed below, these analog inputs are arranged and applied to an on-board A/D converter. The digitized values are then stored in the RAM D32.

Figure 24:
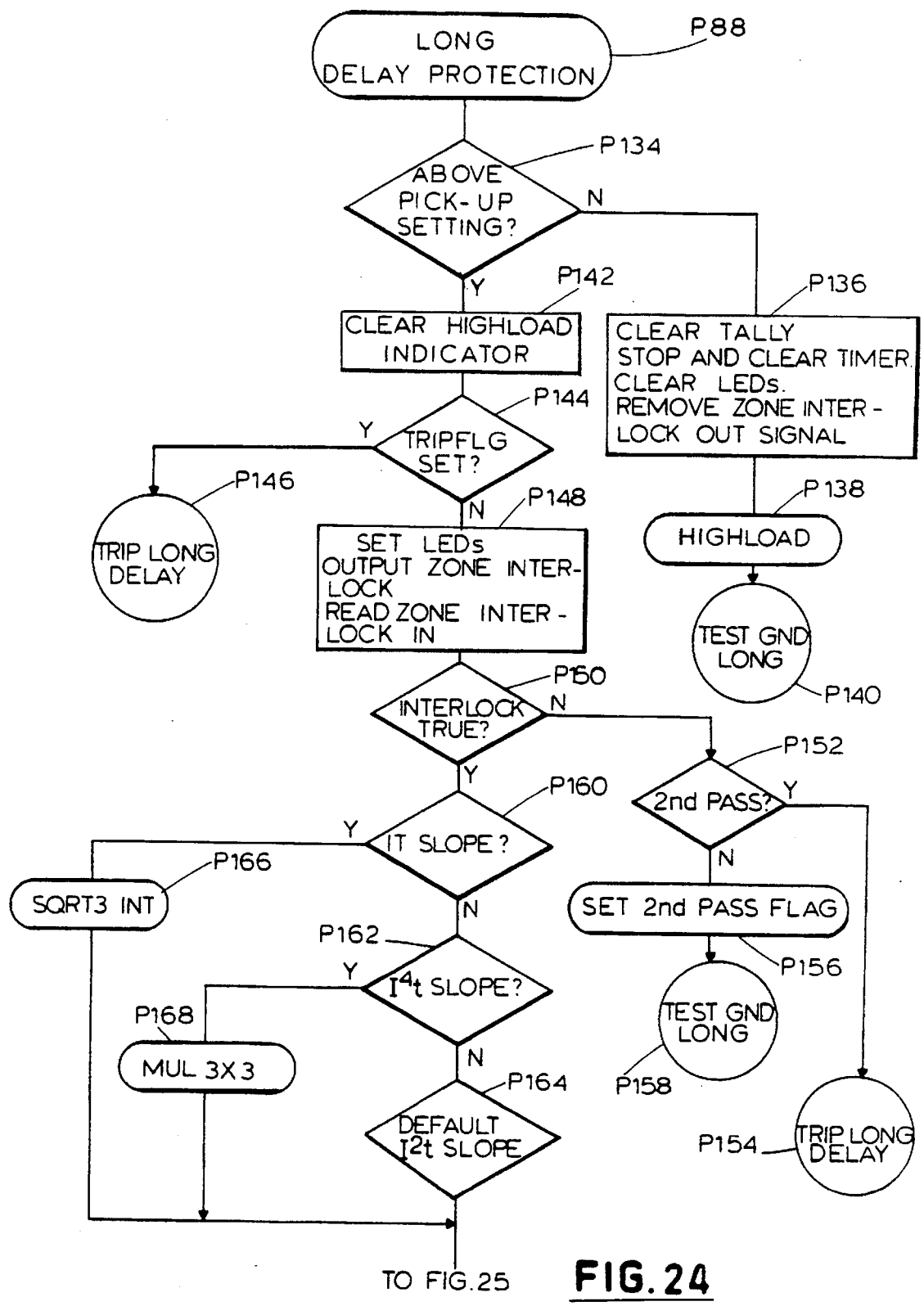
Figure 25:
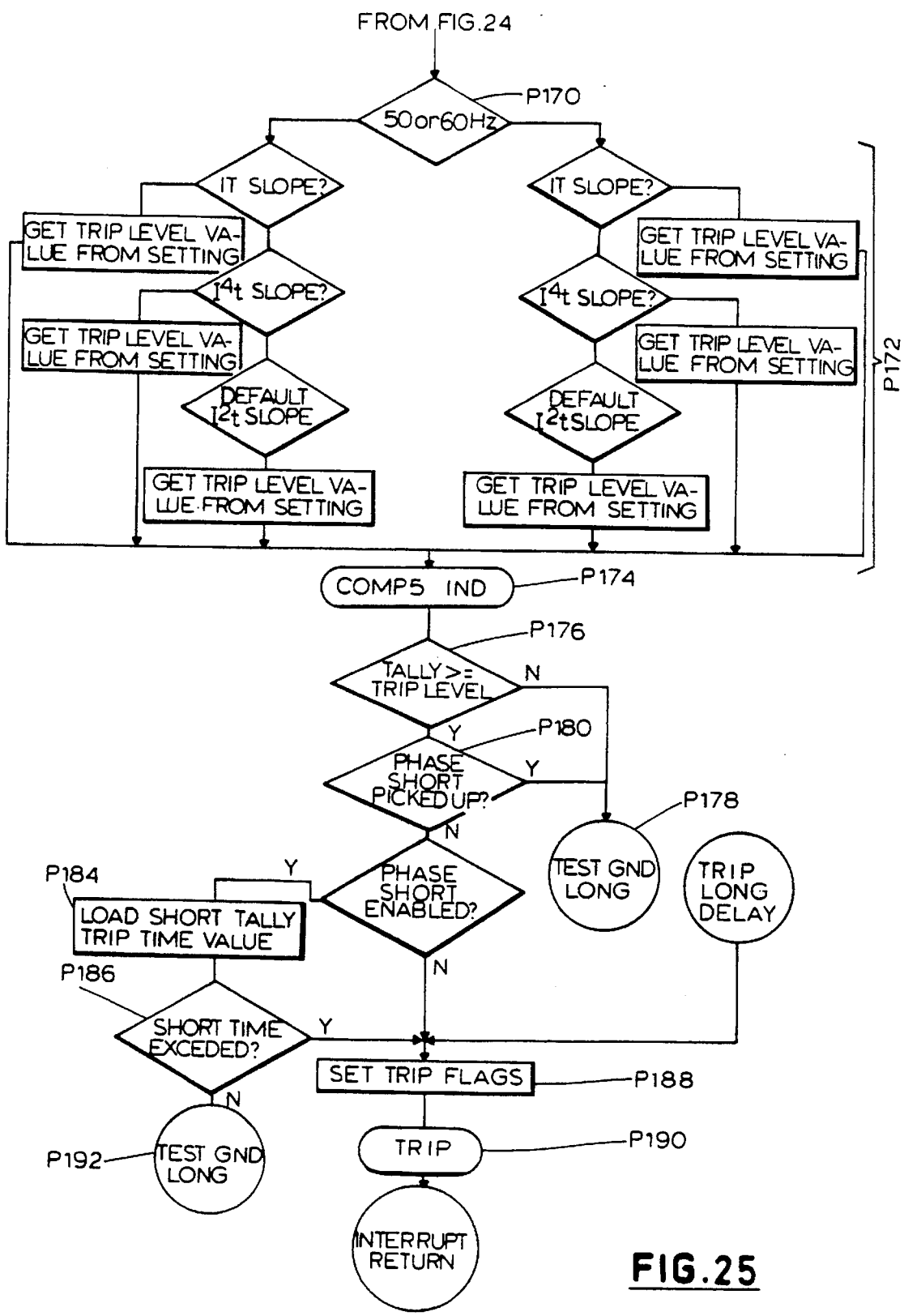
Figure 26:
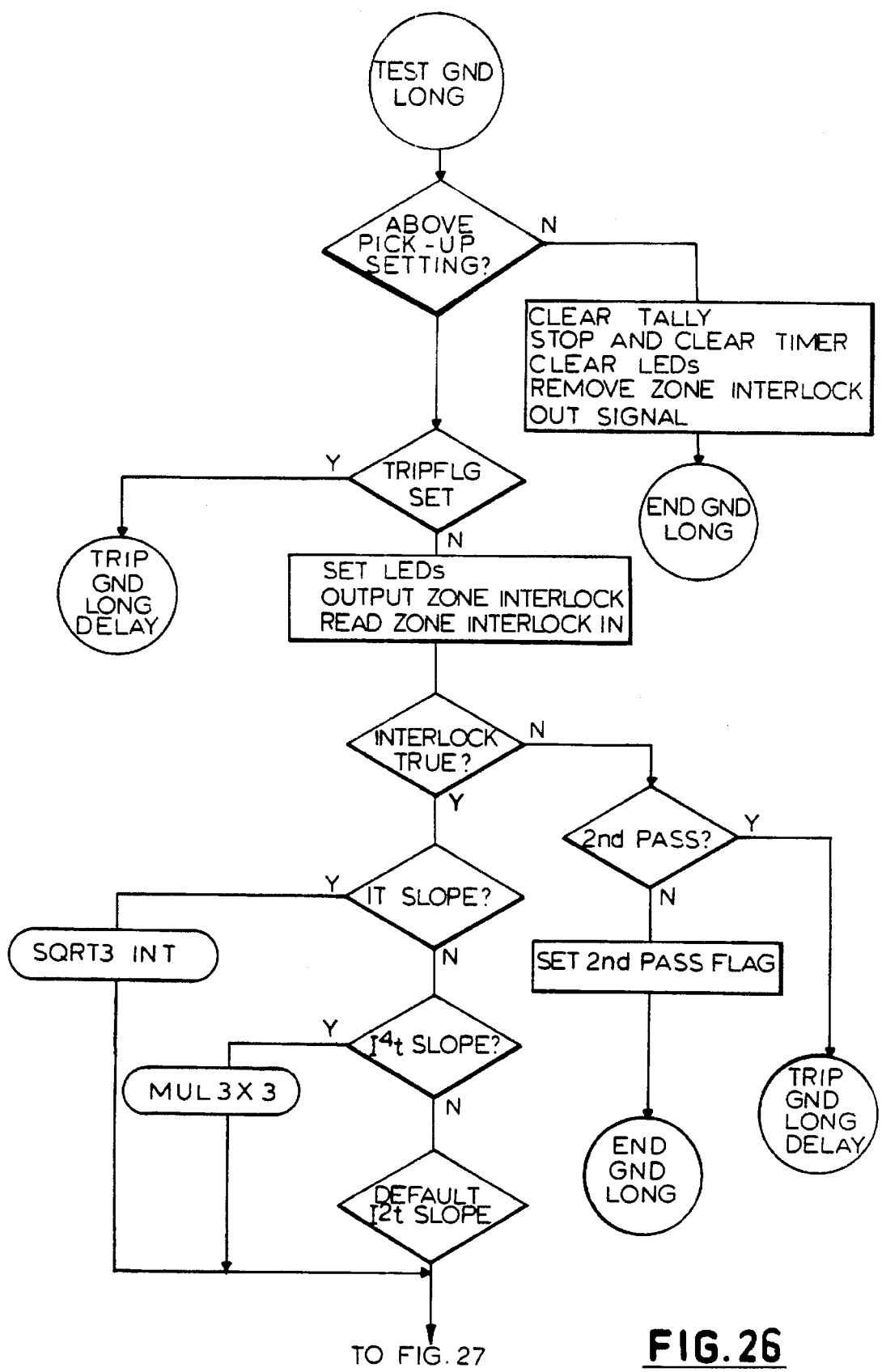
Figure 27:
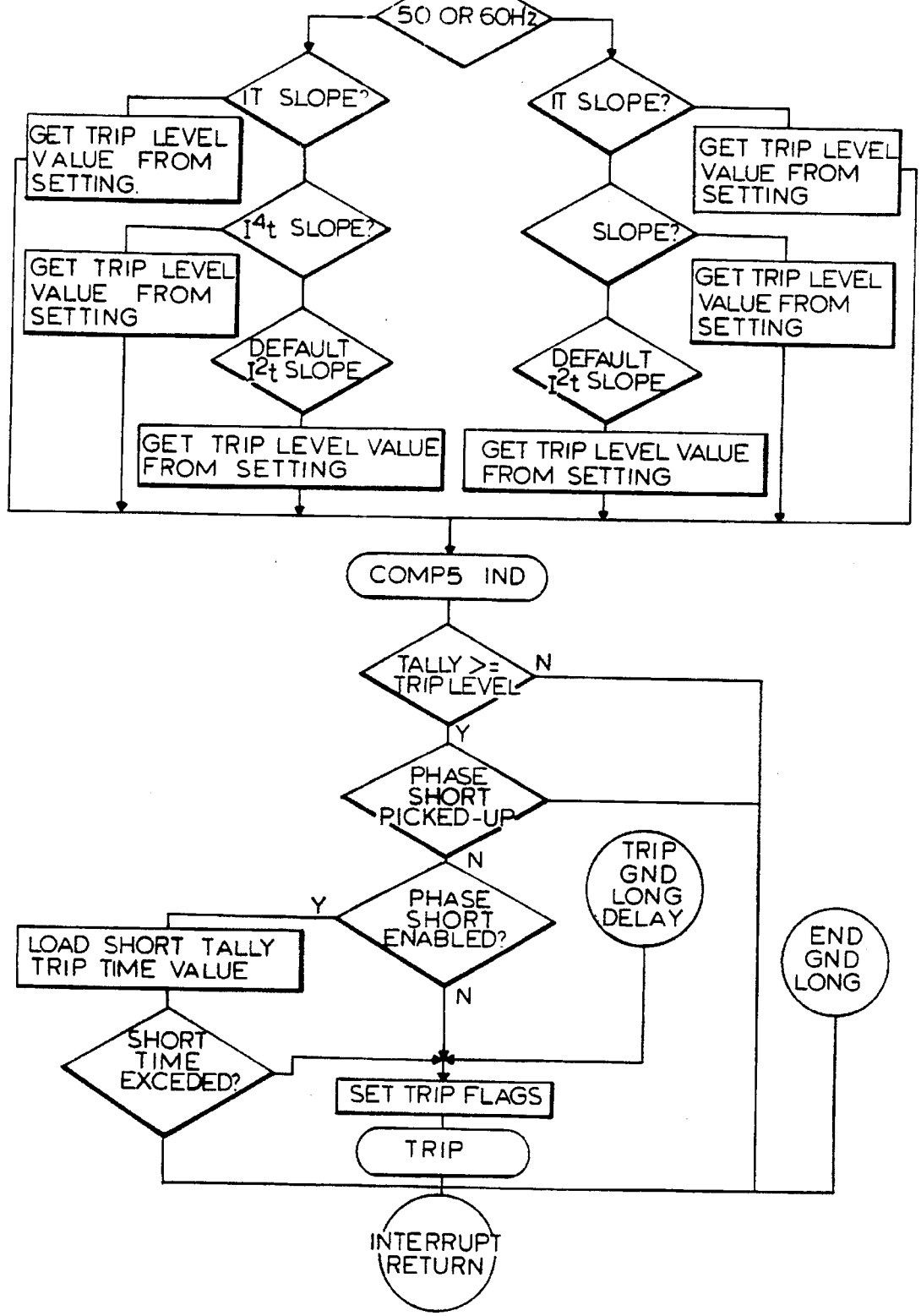
Figure 28:
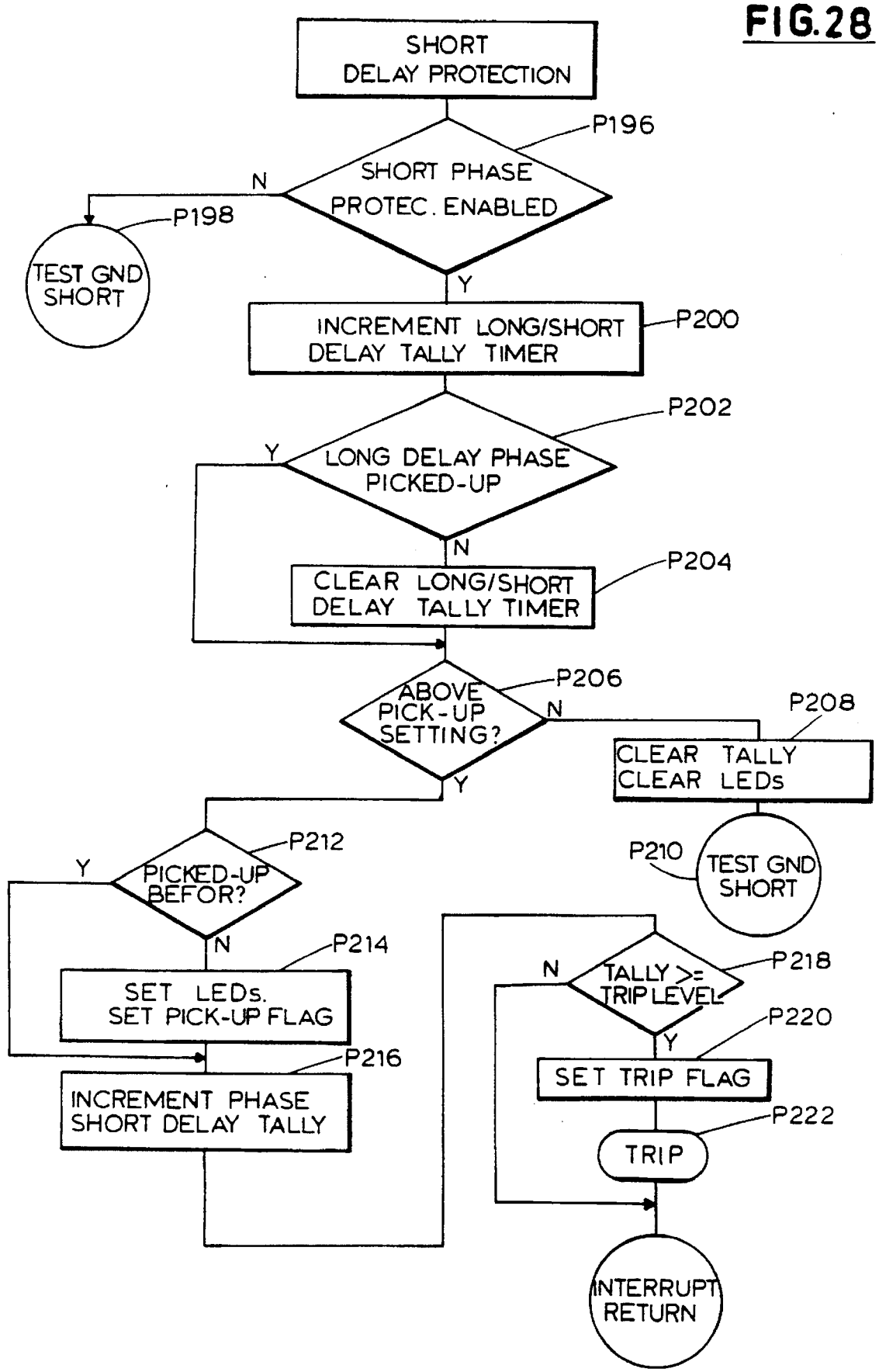
Figure 29:
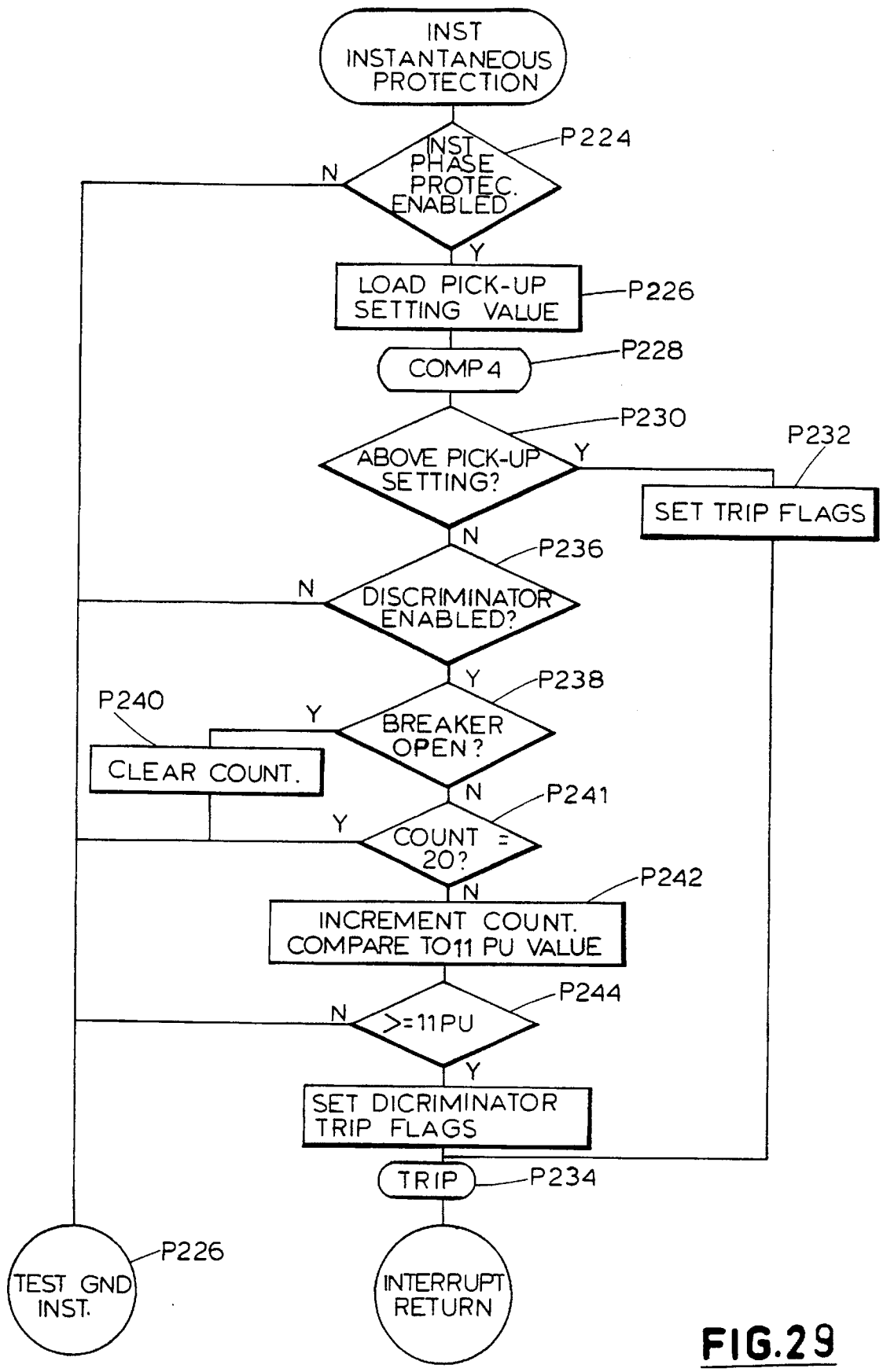
Figure 30:
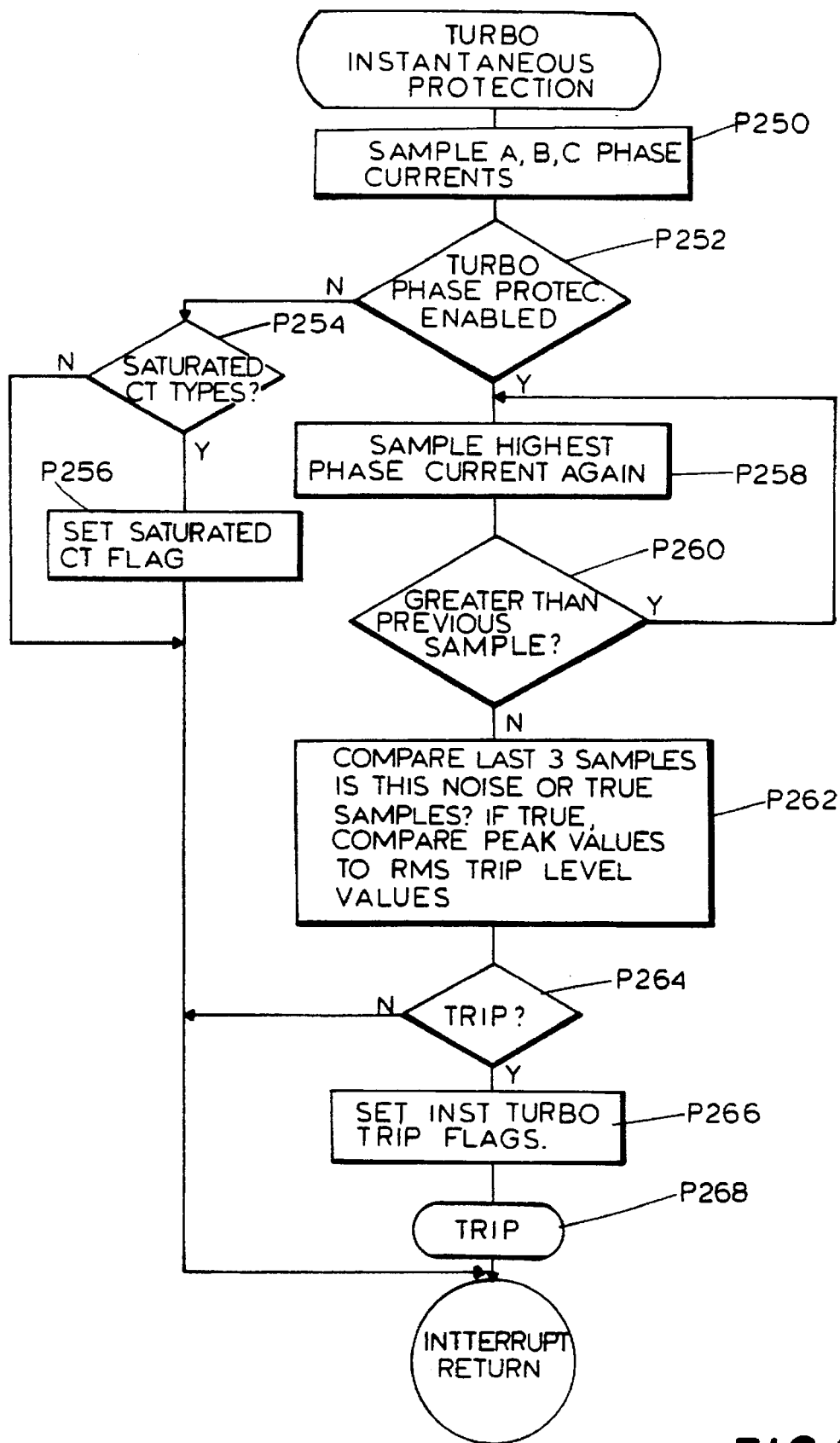
Figure 31:
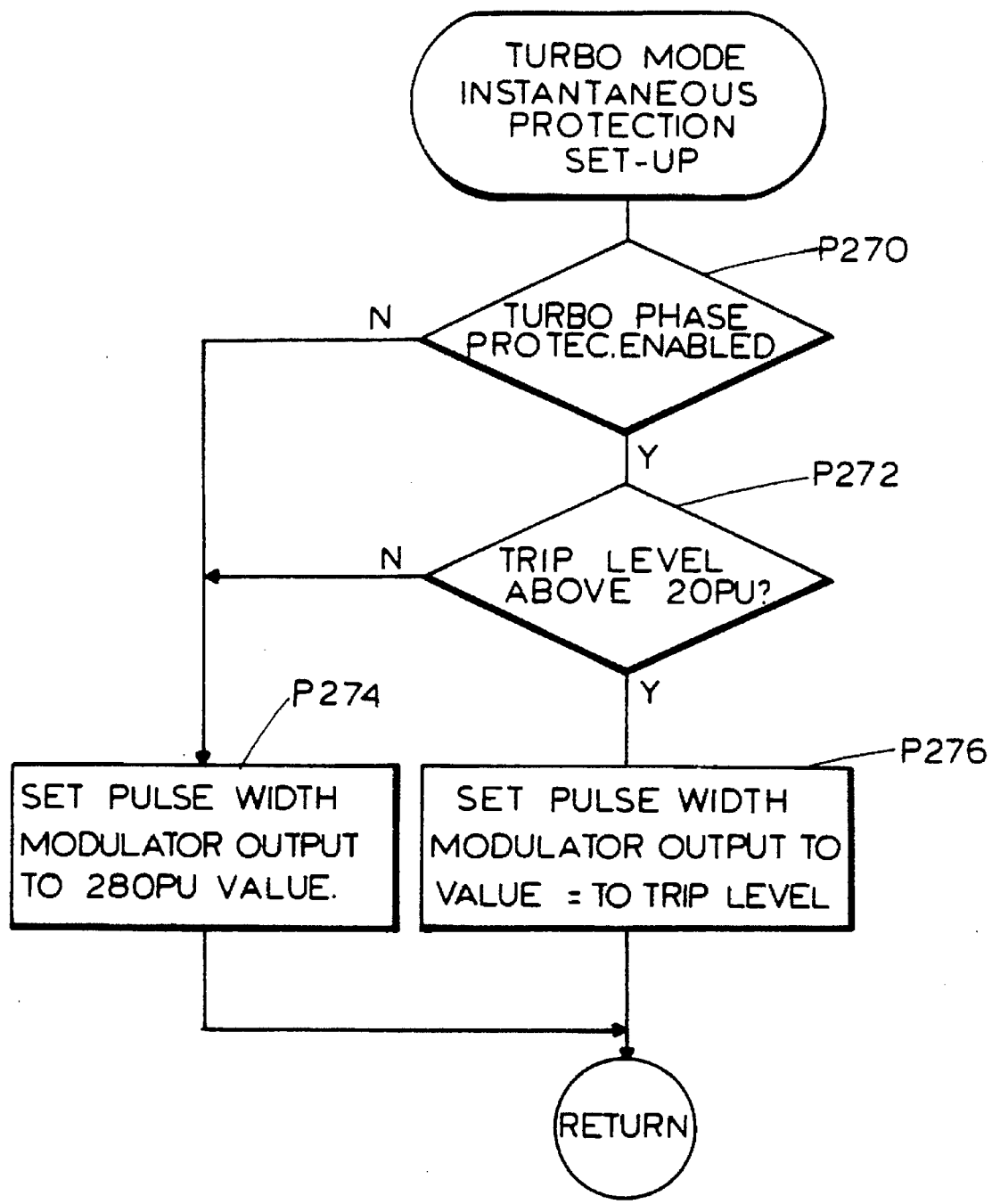

The program control consists of a main program illustrated in FIGS. 17–23; a phase current long time delay subroutine illustrated in FIGS. 24 and 25, a ground current long time delay subroutine illustrated in FIGS. 26 and 27; a short time delay subroutine illustrated in FIG. 28, an instantaneous subroutine illustrated in FIG. 29 and a turbo instantaneous subroutine illustrated in FIGS. 30 and 31.

In general, the system operates on a continuous cycle of 65K samples. More specifically, the phase currents ($I_A$, $I_B$ and $I_C$) and ground current ($I_G$) are sampled every one-third cycle or 4.7 milliseconds. Two samples are used for instantaneous protection, while eight samples are used for short-time delay protection; sixteen samples are used for long time delay protection. In addition to overcurrent protection, the 256 samples are used for metering and 65K samples to peak demand current in five minute intervals.

Initially, a sample timer, identified as PTIMER, is loaded in step P20 to cause the phase and ground currents, IA, IB, IC and IG to be sampled approximately every one-third cycle or 4.7 milliseconds. After the sample timer PTIMER is loaded, the first sample is taken in step P22 and the sample counter PTIMER is incremented in step P24. After the sample counter PTIMER has been incremented, the system checks in step P26 to determine if a time flag has been set. If so, the alphanumeric display D86 displays the elapsed time from which the fault occurred. If not, the system bypasses step P28. Subsequently, a trip time offset counter is incremented in step P30. The trip time offset counter is incremented every time a FAST STATUS command is received from a master controller in the network. FAST STATUS commands are described below in relationship with the microcontroller. By incrementing the trip time offset counter, a time stamp of the trip event is obtainable. After the trip time offset counter is incremented, the system determines in step P32 whether two samples have been taken. If not, during the first sample loop the system proceeds with various housekeeping chores in steps P34–P42, such as servicing the deadman and the non-volatile RAM, reading the membrane switches and strobing the LED's D60. The system then returns to step P20 to take additional samples. Subsequently, the steps P22–P32 are repeated. After two samples have been completed, the samples are scaled by a predetermined number, for example, four, in step P44. The two samples are added in a SUM2 register for use for instantaneous tripping and also saved for later use in a cumulative register for the short and long time delay functions in step P46. Subsequently, the sampled currents are auctioned in step P48. The auctioning relates to selecting of the highest of the input phase currents. These input phase currents are then checked by way of the instantaneous subroutine in step P50 in FIGS. 30 and 31 to be discussed below.

The system next checks in step P52 whether or not the trip flag has been set as a result of the instantaneous subroutine in step P50. If the trip flag has been set at this stage, this would be indicative of an instantaneous trip. Accordingly, the system proceeds to step P56. If not, the SUM2 register is cleared in step P54 since this sum was previously stored above in a cumulative register discussed above. If the trip flag was set as a result of step P50 then the SUM2 register is saved for the display to indicate the electrical current at tripping and the system proceeds to step P56.

The system checks in step P56 whether eight samples have been taken. If not, the system returns to step P20 and additional samples are taken and stored. If eight samples have been taken, the system again checks in step P58 if the trip flag has been set. If not, the eight samples are stored in a register and saved for later use with the long time delay protection subroutine in step P60. The highest phase current of the eight sample currents are then auctioned in step P62. The SUM2 register is then cleared and step P64 and the eight auctioned samples are then checked by the short time delay subroutine in step P66 discussed below. Next, the system determines in step P68 whether the trip flag was set.

If there was a short time delay trip, as a result of step P66, then the register containing the sum of the eight samples is used to indicate the value of the current at tripping and the system control proceeds to step P72. If not, this sum is cleared in step P70. The system next checks whether 16 samples have been taken in step P72. If not, the system then proceeds and does several housekeeping chores identified by steps P74, P76 and P78 while such 16 samples are in progress. If 16 samples have been taken, the system then checks to see whether the trip flag has been set in step P80. If not, the 16 samples are summed and also saved for later use in step P82. The 16 samples are then auctioned in step P84 and the SUM2 register is cleared in step P86. Subsequently, the auctioned samples are checked by the long time delay protection subroutine identified with the step P88 and the system checks to see if the trip flag was set in step P94. If the trip flag has been set, the value at which the trip occurred is displayed and the system proceeds directly to step P94. If the trip flag was not set, the register containing the 16 samples is cleared in step P92, since these samples were previously saved in the 64 sample register. The system then continues taking samples and checks to determine when 64 samples have been taken. Once 64 samples have been taken, the LED's D60 are then strobed for a quarter second in step P96. The system again checks to determine if the trip flag has been set in step P98. If so, the block P99 indicates the number of samples used for the various functions. If not, the 64 samples are loaded into a temporary buffer for metering in step P100. The 64 samples are then summed in a 256 sample register and the 64 sample register is cleared in step P102. The system then checks to determine if 256 samples have been taken in step P104. If not, the samples are continued to be taken every 4.7 milliseconds. Once 256 samples are taken, a time out counter is incremented in step P106.

The time out counter is a timer which is initiated once the program mode is initiated. The time out counter is used to prevent users from initiating a program mode and delaying and programming in setpoints.

The system subsequently checks to see if the trip flag has been set in step P108. If not, the 256 samples are summed in a register and also stored in a register used for adding 65K samples in step 110. The 256 sample register is then cleared. Subsequently the one second flag is complemented in step P112. This one second flag is used to flash an LED D60 to indicate that the system is functional. If the trip flag was set in step P108, various housekeeping chores are performed in steps P114–P118. For example, the control registers are tested to see if they are in working order in step P114. Also amplifiers in the SURE CHIP PLUS microcontroller are zeroed in step P116 as discussed below. This time is also used to read the CT ratio programmed in by the gang switch D90 in step P118. Additionally, the Z count is sampled to indicate whether the system is operated at 50 or 60 Hz in step P122.

The Z count relates to circuitry illustrated in FIG. 16 for determining the frequency of the system. More specifically, the circuitry includes a voltage divider network, generally identified with the reference numeral D129 connected to the phase current $I_A$, for example. Such circuitry is used to monitor the time period between zero crossings of the phase current $I_A$. More specifically, the output of the voltage divider D129, identified as ZCOUNT, is applied to the microcontroller D20. The signal ZCOUNT produces pulses which represent the zero crossings. These pulses are timed by the microcontroller D20 to determine the frequency of the system.

The system is also able to store peak demand currents, for example, for five minutes (e.g., 65K samples). Thus, the samples are summed and loaded into a peak demand buffer and compared with displayed currents in step P124. Next, the system checks to see if 65K samples were taken in step P126. If so, after the peak demand buffer is loaded, the 65K sum is then erased in step P128. Subsequently, the system does housekeeping chores, for example, service the EPROM as indicated by steps P130 and P132. After the 65K samples have been completed, the system recycles.

Long Time Delay

The long time delay protection subroutine P88 for use with phase overcurrent protection is illustrated in FIGS. 24 and 25. The long time delay protection subroutine for use for ground overcurrent protection is illustrated in FIGS. 26 and 27. Since the phase and ground long time subroutines are virtually identical, only the phase overcurrent subroutine is described and illustrated.

Initially, the system determines in step P134 if the electrical current flowing through the electrical interrupting device is above the long delay pickup (LDPU) setting. If not, the long time delay timer and trip tally is cleared in step P136. Additionally, the LED's D60 are cleared as well as the phase zone out signals described above. Subsequently, a HIGH LOAD is indicated by way of the LED's D60 in step P138. The HIGH LOAD function is described in detail in U.S. Pat. No. 4,827,369, hereby incorporated by reference. Next, in step P140 the ground long time protection subroutine, illustrated in FIGS. 26 and 27 is tested.

If the electrical current through the electrical interrupting device is above the LDPU, the HIGH LOAD indicator is cleared in step 142. Subsequently, the system determines if the trip flag has been set in step P144. More specifically, once the electrical current is above the LDPU a long time delay timer is initiated. Once the timer times out a trip flag is set. If the trip flag has been set, a trip command is initiated in step P146. If not, the LED's D60 as well as the PHASE-ZONE-IN interlock is set in step P148 as discussed above. Additionally, the PHASE-ZONE-OUT interlock is read.

The system next determines in step P150 whether the PHASE-ZONE-IN interlock has been set. If not, this indicates that the long time delay protection will be provided by another overcurrent device in the electrical distribution system as discussed below. In this case, the system proceeds to step P152 to determine if the system is in the second loop. If so, a long time delay trip of the circuit breaker is initiated to clear the fault. If not, the system proceeds to step P156 and sets a second pass flag and subsequently tests the ground current long time delay protection in step P158.

If the interlock in step P150 is set indicating that long time delay protection is not being provided by another overcurrent device in the electrical distribution system, the system must then provide the long delay time protection feature. The system then checks the slope of the selected long time delay portion in steps P160 through P168 with the default setting set at the $I^2t$ slope.

After the selected slope has been determined, the system proceeds to step P170 to determine whether the system is being utilized on a 50 Hz or 60 Hz system. As previously discussed, zero crossings of the phase current are sensed and read by the microcontroller D20 and identified as ZCOUNT. Once a determination has been made in step P170, the system then obtains the selected trip level setting for the selected slope as generally indicated by the bracket identified with the reference numeral P172. Subsequently, in step P174, the selected trip setting is compared with the maximum phase currents obtained in step P84. Next, in step P176, the system determines whether the long time delay trip tally timer has timed out. If not, the system tests the long time delay protection subroutine for the ground currents in step P178.

In order to prevent any overlap in the short time delay and long time delay protection curves, the system checks in step P180 whether the short time delay pickup value has been exceeded. If so, the system proceeds to step P184 and loads the short time delay trip time value in step P184 and determines if this time has been exceeded in step P186. If the short time delay pickup time value has been exceeded in step P186, the system then sets the trip flags in step P188 and initiates a trip in step P190. If the short time delay time value has not been exceeded, then the long time delay protection for the ground current is tested in step P192.

Short Time Delay Protection

The subroutine for the short time delay protection is illustrated in FIG. 28. Initially the system determines in step P196 whether the short time delay phase protection has been enabled. If not, the system proceeds to step P198 and tests the short time delay function for the ground currents. If the short time delay protection function has been enabled, a long/short delay tally timer is incremented in step P200. This timer is used to prevent overlap between the long time and short time delay functions. Once the long/short delay tally timer is incremented in step P200, the system checks in step P202 to determine whether the electrical current flowing through the interrupting device is greater than the LDPU in step P202. If not, the long/short delay tally timer is cleared in step P204. If so, the system proceeds to step P206 to determine if the electrical current is greater than the SDPU. If not, the long/short tally is cleared as well as the LED's D60 in step P208 and the system then proceeds to step P210 to test the ground current short time protection function. If the electrical current is greater than the SDPU, the system then determines whether the SDPU was picked up before in step P212. If not, the LED's D60 are set and a pickup flag is set as well in step P214. If so, the phase short delay tally is incremented in step P216. After the phase short delay tally is incremented, the system next determines in step P218 whether the short time delay timer has timed out. If not, the systems returns back to the main program. If so, the system sets the trip flags in step P220 and initiates a trip function in step P222.

Instantaneous Protection

Instantaneous protection is illustrated in FIGS. 29 and 30. FIG. 29 relates to a discriminator protection routine which is used in systems where there is a report back of the status of the circuit breaker (e.g., open or closed) back to the trip unit.

Initially, the system determines whether the instantaneous phase protection is enabled in step P224. If not, the system then proceeds to step P226 and tests the ground current instantaneous protection. If so, the system proceeds to step P226 and loads the pickup setting. Next, in step P228 the pickup setting is then compared with the maximum phase currents in step P228. Next, the system determines in step P230 whether the electrical currents flowing through the electrical interrupting device are greater than the pickup setting in step P230. If so, the trip flags are set in step P232 and a trip is initiated in step P234. If not, the system then proceeds and determines whether or not the discriminator option is enabled in step P236. If the discriminator option was not selected, the system proceeds to step P226 and tests the instantaneous ground current protection. If the discriminator option has been selected, the system proceeds to step P238 to determine the status of the interrupting device. If there is current flowing through the electrical circuit interrupting device, the system then determines in step P241 how long the circuit breaker has been closed. This is done by determining how many times the discriminator routine was entered after the circuit breaker was closed. Each time the discriminator routine is entered, a discriminator counter DCOUNT is incremented. If, for example, DCOUNT is greater than 20 which indicates that the breaker has been closed for about ten cycles, the system proceeds to step P226 and tests the ground current instantaneous protection. If the discriminator counter DCOUNT is less than 20, the counter is incremented in step P242 and the current flowing through the circuit breaker is compared with an instantaneous setpoint. If the current through the electrical interrupting device is greater than the setpoint as determined in step P244, the discriminator flags are set in step P246 and a trip is initiated in step P234. If not, the system proceeds to step P226.

The turbo instantaneous protection is shown in FIGS. 30 and 31. As previously discussed, this routine cooperates with the analog circuit D129 (FIG. 16) described above in order to provide for instantaneous tripping during conditions when the current transformers piloting the overcurrent trip unit are saturated. More specifically, the system initially samples the phase currents in step P250. After sampling the phase currents in step P250, the system determines in step P252 whether the turbo phase protection has been enabled. If not, the system determines whether the current transformers are saturated in step P254. If so, a saturated CT flag is set in step P256 and the system returns to the main program. If the turbo phase protection has been enabled as indicated by step P252, the system then proceeds to step P258 to sample the highest phase current again. Subsequently, the system determines in step P260 whether the last sample was greater than the previous sample. If so, the system returns to step P258 and takes another sample. If not, the system compares the last three samples to determine if they were true samples or noise. If it is determined that the samples are true, these samples are then compared with the trip level values in step P262 to determine if they are greater than the selected trip settings in step P264. If not, the system returns to the main program. If so, the instantaneous turbo trip flags are set in step P266 and a trip is initiated in step P268.

FIG. 31 illustrates the set up for the turbo mode instantaneous program. This set up is generally enabled at power up after the setpoint programming. Initially the system determines in step P270 whether the turbo phase protection has been enabled. If not, the pulse width modulator output is set to a preselected value, for example, 28 times the minimum pickup level of nominal pickup level of 5 amperes in step P272. If the turbo phase protection has been enabled, the system then ascertains the program trip level to determine if the trip level was set greater than 20 per unit. If not, the system proceeds to step P274 and sets the pulse width modulator output to 28 times the pickup value. If so, the pulse width modulator output is set to the trip level in step P276.

INTEGRATED CIRCUIT DEFINITIONS

The following definitions are to be used throughout:

Bit designations: Bits within a register will be designated by placing the bit number within square brackets. For example, bit 5 of register ABC is designated as: ABC[5]. Bits 5 through 0 of register ABC are designated: ABC[5 . . . 0]. Bits 4 and 5 of register ABC are designated as ABC[5,4], etc.

Hexadecimal. Base 16 numbers written with a dollar sign prefix. For example, $0100=256 decimal.

High-true: These signals are designated with the suffix "h" and are defined to be asserted (true or logical 1) when their electrical level is at or near the +VDD supply and are defined to be negated false or a logical zero) when their electrical level is at or near zero volts direct current (Vdc).

Low-true: These signals are designated by the suffix "b" and are defined to be asserted (true, or a logical 1) when their electrical level is at or near zero Vdc and are defined to be negated (false or a logical zero) when their electrical level is at or near +VDD supply.

Input: An input signal is received by the IC 10.

Output: An output signal is driven by the IC 10.

Referring to the drawings, the IC in accordance with the present invention is generally identified with the reference numeral 10. The circuitry of the IC 10 has been standardized to enable it to be utilized with various types of electrical equipment including circuit breakers, motor controllers, and the like. For illustration and discussion purposes only, the IC 10 is shown utilized in a circuit breaker 12 in FIG. 32. The circuit breaker 12 is shown as a three phase circuit breaker having phases identified as "A", "B" and "C". It is to be understood by those of ordinary skill in the art that the IC 10 is capable of being utilized with various other types of electrical equipment, such as motor controllers, contactors and the like.

The circuit breaker 12 does not form a portion of the present invention. As shown, the circuit breaker 12 is provided with three current transformers 14, 16 and 18. These current transformers 14, 16 and 18 are disposed on a load side 20 of the circuit breaker 12 to allow the circuit breaker 12 to be monitored and controlled. The line side 22 of the circuit breaker 12 is generally connected to a three phase source of electrical energy (not shown). The load side 20 is generally connected to a three phase load (not shown), such as an electrical motor.

Figure 76B:
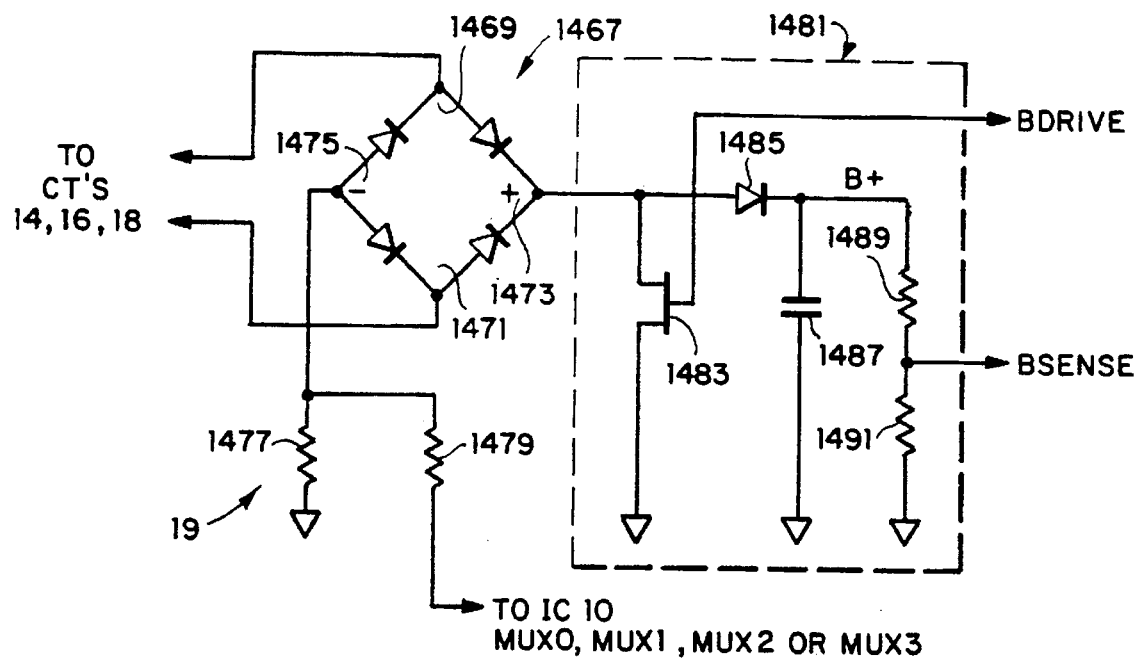
FIG. 76B is a schematic diagram of exemplary external conditioning circuitry and power supply circuitry for use with the IC in accordance with the present invention.

An important aspect of the invention relates to the fact that the IC 10 is current driven as will be discussed below. More specifically, electrical current from the current transformers 14, 16 and 18 is applied to the IC 10 by way of conditioning circuitry 19 (FIGS. 32 and 76B). The conditioning circuitry 19 is used to provide an electrical current of about 20 microamperes (μA) to the IC 10.

Another important aspect of the invention relates to an on-board communication controller 29. This controller allows the IC 10 to communicate with devices, such as a panel meter 31 as illustrated in FIG. 32 by way of a communications network link, such as a twisted pair 33. Another IC 10 or an INCOM chip, as disclosed in U.S. Pat. No. 4,644,566, can be disposed in the remote meter 31 to allow the remote panel meter 31 to be connected in another network, by way of another communications network link 35 which includes its own master controller (not shown). A general description of a similar communication controller connected in a network with a master controller is described in detail in U.S. Pat. No. 4,644,566, assigned to the same assignee as the present invention and hereby incorporated by reference.

Figure 33:
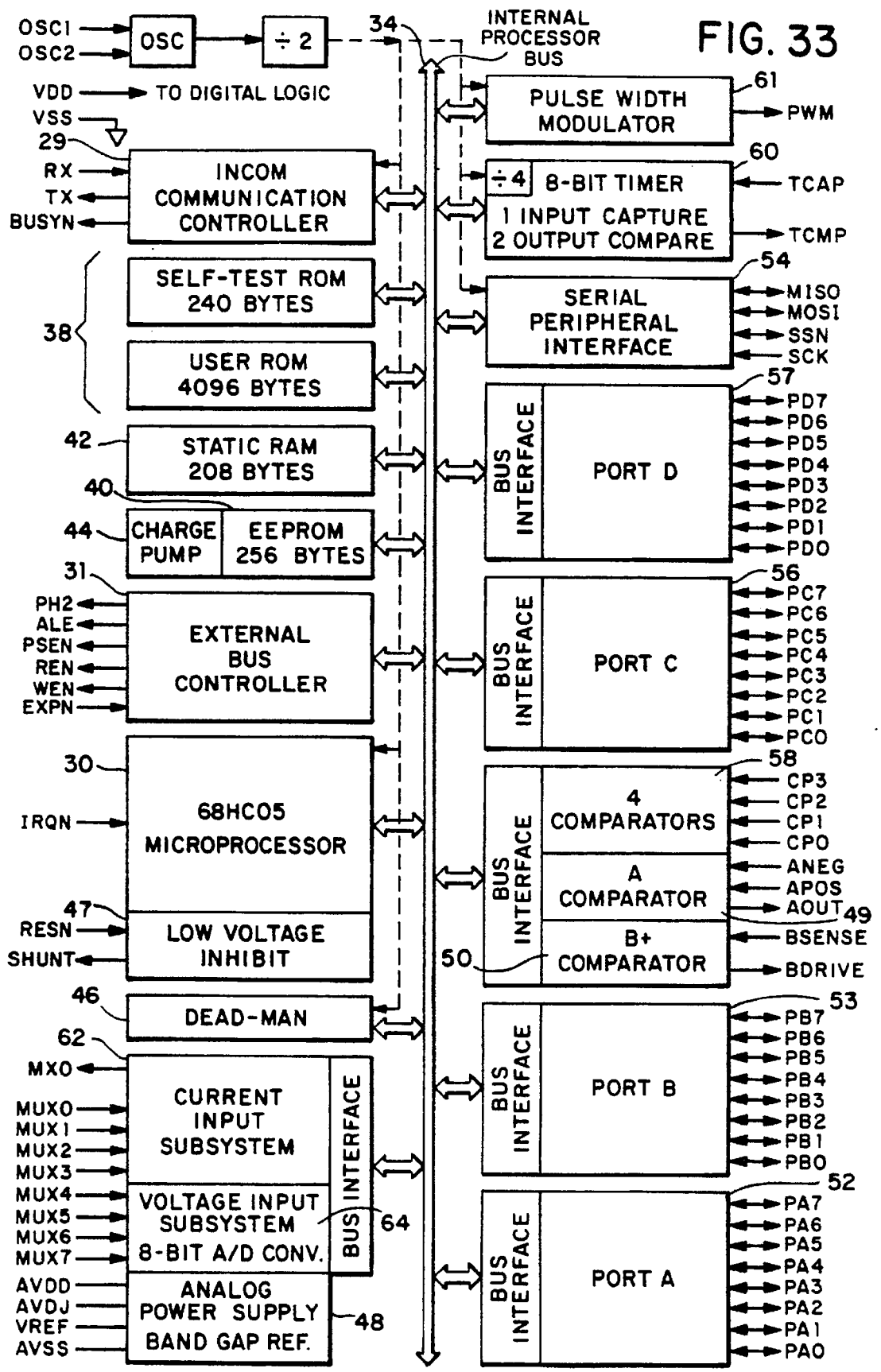
FIG. 33 is a functional block diagram of the IC in accordance with the present invention.

A block diagram of the digital portion of an exemplary embodiment of the IC 10 is shown in FIG. 33. Various configuration options are selectable by software programming and mask options for specific applications as will be discussed below. In order to provide an IC 10 with universal application for controlling and monitoring various types of electrical equipment, such as circuit breakers, motor controllers, contactors and the like, various peripherals may be provided. These peripheral devices may include a microprocessor 30 with a multiply instruction, for example, a Motorola type MC68HO5. The microprocessor 30 communicates with the various other peripherals and external pins on the chip 10 by way of an internal address, data and control bus 34 and an external bus controller 31. A clock generator 36 provides timing for the microprocessor 30. An on-board memory subsystem is provided which may include read only memory (ROM) 38, electrically erasable read only memory (EEPROM) 40 and random access memory (RAM) 42. The EEPROM may be provided with an internal charge pump 44 for obviating the need to provide an external high voltage source for erasure in programming of the EEPROM 40.

Exemplary memory sizes are provided for illustration and discussion purposes only. For example, 256 bytes of EEPROM 40 and 208 bytes of RAM 42 may be provided. The ROM 38 may include 4,096 bytes of mask programmable user instruction memory and 240 bytes of self-test memory.

Figure 76C:
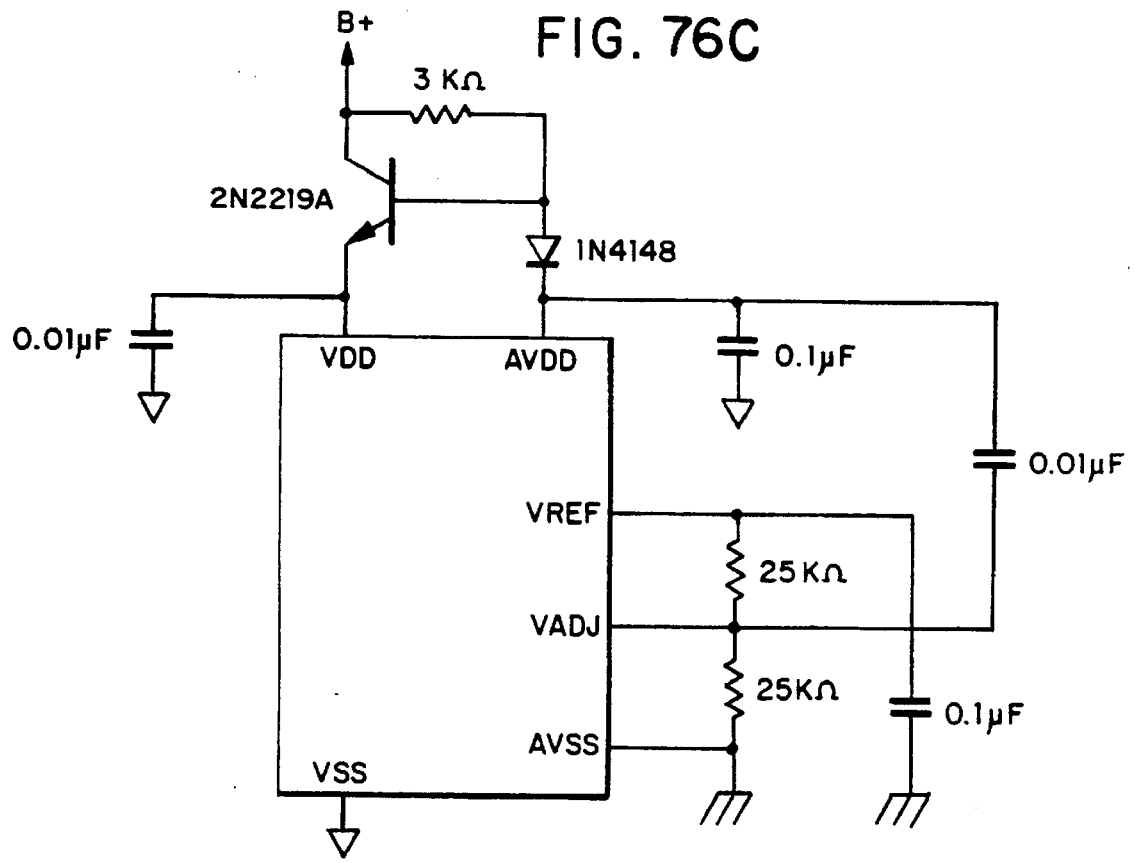
FIG. 76C is a schematic diagram of an exemplary external regulator circuit for use with the IC in accordance with the present invention.

The IC 10 has separate digital and analog power supply systems. These power supply systems are segregated to prevent digital noise from affecting the analog circuitry. The digital power supply is directed to a VDD pin on the IC 10 formed from an external voltage regulator (FIG. 76C). The analog power supply is directed to a AVDD pin. In many applications, an external transistor, diode and resistor are adequate.

Power monitor circuitry 47 is provided, which includes an internal voltage level detector for monitoring the gate drive to the shunt regulator associated with the AVDD pin. The power monitor circuitry 47 deactivates a SHUNT output pin which, when connected to the RESN input pin, provides a reset when the analog supply voltage AVDD begins to fall below a preset threshold. Dead-man circuitry 46 is provided which monitors operation of the microprocessor 30 and activates a reset upon detection of spurious operation.

An analog power supply subsystem 48 is provided for the analog circuitry. This subsystem 48 includes a +1.25 Vdc band gap regulator and a buffer amplifier to generate a +2.5 Vdc reference. An external current source is used to power the analog power supply subsystem 48. The current source is directed to an external pin AVDD. An adjustment pin VADJ is provided to allow the voltage reference to be trimmed to exactly +2.5 Vdc. Trimming may be provided by a voltage divider circuit, for example, two series connected resistors connected between the VREF pin and an analog ground pin AVSS, as illustrated in FIG. 75. The interface between the series connected resistors is connected to the VADJ pin. A shunt regulator provides a nominal +5.0 Vdc source at the AVDD pin based on the reference voltage at the VREF pin. The buffer amplifier is provided with an open drain output such that it can only source current. This will permit multiple devices to be paralleled. The regulator can also be slaved to another IC. This is accomplished by connecting the VADJ pin to the VREF pin on the slave IC and connecting the VREF pin on the slave IC to the VREF pin on the master IC.

A comparator subsystem is provided which includes an A comparator 49, a B$^+$ comparator 50 and quadcomparators 58. The A comparator 49 is for use with the communication controller 29. A B$^+$ comparator 50 is provided for external power supply generation as illustrated in FIG. 76B and discussed below. The inverting input of the comparator 50 is referenced to the VREF pin (nominally, +2.5 Vdc). The input signal is applied to a non-inverting input pin BSENSE of the comparator 50. The B+ comparator 50 output is connected to an external pin BDRIVE. The quadcomparators 58 include four comparators referenced to a fixed voltage, for example +1.25 Vdc.

Various special functions may also be provided, such as a timer 60 and a pulse width modulated output 61. The timer 60 may be used for time base or waveform generation periodic measurement or other periodic functions. The PWM output is a periodic signal whose period may be controlled by the microprocessor's phase 2 clock divided by 4.

Various other peripheral devices may also be provided on the IC 10 to allow it to be adapted for various applications, such as circuit breakers, motor controllers and the like. For example, these peripheral devices may include four general purpose 8-bit bidirectional ports; Port A (52), Port B (53), Port C (56) and Port D (57). A serial peripheral interface 54 (SPI) may also be provided to allow for efficient connection of peripheral devices that communicate over a serial bus. The SPI 54 may also be used for interprocessor communication in a multiprocessor system. The SPI 54 supports several operating modes that permit connection of devices that communicate using various protocols.

Figure 34:
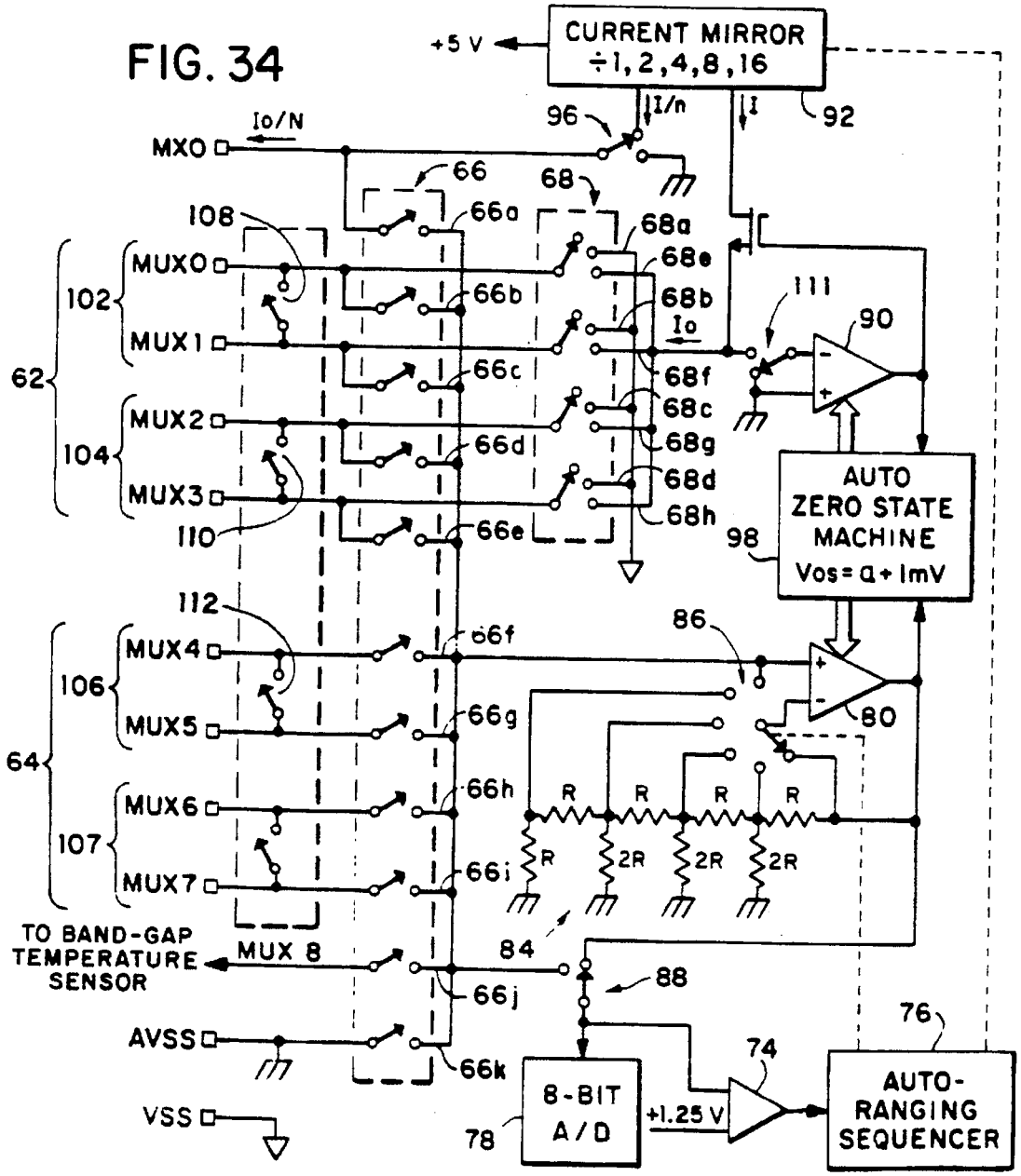
FIG. 34 is a functional block diagram of a portion of the analog portion of the IC in accordance with the present invention.

An important aspect of the invention relates to an analog subsystem, identified by the function blocks 62 and 64 in FIG. 33. A block diagram for this subsystem is illustrated in FIG. 34. The analog subsystem includes, for example, eight analog input channels for receiving analog voltage and current signals and converting these signals to an 8-bit digital signal with 12-bit resolution. Four of the input channels 62 can be selected by the software to operate as either voltage inputs or current inputs. The other input channels 64 can only be operated as voltage inputs. Current and voltage input operation of the input channels 62 and 64 is controlled by multiplexers (MUXes) 66 and 68, which are selected by the software.

The voltage input channels can accept positive voltages in the range of 0–2.5 Vdc and are applied to an auto-zeroable voltage adjustable gain amplifier 80. These signals can be processed in either an auto-ranging mode or a fixed gain mode, selectable by the software. If the auto-ranging mode is selected, the selected voltage input channel 62 or 64 is ranged by values stored in an internal auto-ranging register to allow the gain to be automatically adjusted until the signal is at least one-half of full scale but not in overflow. The ranged signal is then converted directly to an 8-bit digital value by an A/D 78 and stored in an internal register. If fixed ranging is selected, the voltage mode inputs 62 or 64 can be operated at preselected gain settings, for example, 1, 2, 4, 8 or 16. The preselected gain settings are provided by gain circuitry which includes a resistor network 84, connected to an inverting terminal of the voltage amplifier 80 by way of a MUX 86. The MUX 86 is controlled by the software. The output of the voltage amplifier 80 is connected to the A/D circuitry 78 by way of another MUX 88. The MUX 88 is in the position shown in FIG. 34 when voltage gains other than one have been selected. However, when a gain of one is selected, the voltage amplifier 80 is disconnected from the ranging circuitry and the input voltage channel 62 or 64 is applied directly to the A/D 78.

Current mode inputs 62 accept negative currents (e.g., currents flowing out of a MXO pin) with a −1.6 mA, for example, representing full scale. Unselected current input channels are tied to a digital ground pin (VSS) by the MUXes 68 which provide for make-before-break switching. The selected input current channel is connected to an inverting input of an auto-zeroable current amplifier 90, referenced to analog ground (AVSS). The source follower output is configured to maintain the inverting input at a virtual ground by providing current to the selected channels through an adjustable current mirror 92. The current mirror 92 can be set by auto-ranging circuitry, which can be overwritten by the software, to one of the following exemplary ratios: 1/1, 1/2, 1/4, 1/8 or 1/16. The ratioed mirror output current is directed to the MXO pin. Thus, the current flowing out of the MXO pin will be a programmable fraction of the sum of the currents flowing out of the selected current input channel pin. Two modes of operation are possible:

Non-integrating mode. An external resistor (not shown) may be connected between the analog ground pin (AVSS) and the MXO pin to convert the ratioed current to a voltage. This voltage may then be converted to a digital value in a similar manner as discussed above. In this mode of operation, the default amplifier gain is set at times one unless overwritten by the software.

Integrating mode. An external capacitor (not shown) may be connected between the analog ground pin (AVSS) and the MXO pin to integrate the ratioed current. A shorting switch 96 is provided to discharge this capacitor under program control. Integrated voltages are then converted by the A/D 78 as discussed above.

The voltage and current amplifiers 80 and 90 have offset voltage compensation circuitry 98 to compensate for offsets inherent in CMOS amplifiers. These offsets can be on the order of, for example, ±20 millivolt (mV) which can affect the accuracy of the least significant bits of the converted digital value. This circuitry 98 assures that the offset is always a negative voltage between 0.0 and 0.5 mV and forces the amplifier 80, 90 to have a positive output when the differential input voltage is zero. This offset correction can be done either automatically by the hardware or controlled by the software.

Sample and hold capability is provided for the input channels 62 and 64. More specifically, the eight analog input channels 62 and 64 are grouped into four pairs of channels 102, 104, 106 and 107. Each pair of channels 102, 104, 106 and 107 can be used as a single channel with sample and hold capability. A capacitor (not shown) may be connected between one channel input and the analog ground pin AVSS while the other channel of the pair is connected to a voltage input. A sample command permits the software to connect the two channels of each pair together by way of sample and hold MUXes 108, 110, 112 and 114, thus storing the input voltage on the capacitor of the adjacent channel. Only channel pairs in which both channels are configured for voltage mode operate in this fashion. All four channel pairs 102, 104, 106 and 108 may be sampled simultaneously.

There are other important aspects of the invention. For example, the IC 10 is adapted to respond to either analog signals or digital signals and provide a digital output signal. Another important aspect relates to the fact that the IC 10 is provided with circuitry which enables it to sense the ambient temperature in which it is disposed and generate a corresponding electrical signal.

OPERATING MODES

The IC 10 has five modes of operation. Two normal operating modes are single-chip and expanded. These are selected by strapping an EXPN pin to either the VSS or VDD pins. The three special operating modes are: emulation, test and self-check. These modes can only be selected by connecting certain pins to a voltage level twice VDD when the reset line is negated. They cannot be enabled by normal product operation. The operating mode of the IC 10 is determined by the electrical input levels of EXPN, IRQN, and TCAP pins when the device comes out of reset. These pins are sampled when the RESN pin transitions from an electrical low to high. Table 1 defines the pin input levels for various operating modes.

TABLE

| OPERATING MODE SELECTION | | | |
| --- | --- | --- | --- |
| Mode | EXPN | IRQN | TCAP |
| Single-Chip | $V_{DD}$ | $V_{SS}$ to $V_{DD}$ | $V_{SS}$ to $V_{DD}$ |
| Expanded | $V_{SS}$ | $V_{SS}$ to $V_{DD}$ | $V_{SS}$ to $V_{DD}$ |
| Emulation | $V_{DD}*2$ | $V_{SS}$ to $V_{DD}$ | $V_{SS}$ to $V_{DD}$ |
| Test | $V_{SS}$ | $V_{DD}*2$ | $V_{DD}$ |
| Self-Check | $V_{SS}$ | $V_{DD}*2$ | $V_{SS}$ |

The operating mode determines the function of certain device pins: ALE, PSEN, REN, WEN and PH2. The following sections discuss the behavior of the IC 10 in these different operating modes.

1. Single-chip Mode

The single-chip mode is selected when the RESN pin changes from an electrical low to high and the EXPN pin is at VDD. In this mode, Ports A and B operate as normal bidirectional I/O ports and the microprocessor executes code from internal mask-programmed ROM. See Table 2 for operation of variable function device pins.

2. Expanded Mode

The expanded mode is selected when the RESN pin changes from an electrical low to high and the EXPN pin is at VSS. In this mode, Port A becomes a multiplexed data/address bus and Port B becomes the high-order address bus. This mode requires program code to reside in an external memory device. The internal code ROM is not available and all memory locations above $4000 must be implemented with external devices. See Table 2 for operation of variable function device pins.

3. Emulation Mode

The emulation mode is a special operating mode that is selected by setting the EXPN pin to a voltage level twice VDD when the RESN pin changes from an electrical low to high. This mode operates similar to the expanded mode, except that certain pin definitions change. See Table 2 for operation of variable function device pins.

4. Test Mode

The test mode is used for production testing of the IC 10. It is selected by setting IRQN at twice VDD and TCAP at VDD when the RESN pin input rises. See Table 2 for operation of variable function device pins.

5. Self-check Mode

The self-check mode is used for production burn-in. It is selected by setting IRQN at twice VDD and TCAP at VSS when the RESN pin input rises. See Table 2 for operation of variable function device.

TABLE 2

| Pad | Single-chip | Ex-panded | Emula-tion | Test | Self-check |
|---|---|---|---|---|---|
| ALE | low | ALE | ALE | ALE | low |
| PSEN | high | PSEN | LIR | LIR | high |
| REN | high | REN | R/W | R/W | high |
| WEN | high | WEN | E | E | high |
| PH2 | low | PH2 | PH2 | PH2 | low |

PIN DEFINITION FOR OPERATING MODES

CONFIGURATION METHODS

Since the IC 10 is intended for universal application of various types of electrical equipment, certain configuration information is required to tailor the IC 10 for a specific application. The configuration information is defined by either mask options, software, constants or run time configuration.

Regarding mask options, the contents of the ROM 38 may be specified at the time the IC 10 is manufactured. Certain other mask configuration options may be determined by modification of a single mask. These other configuration options include the dead-man subsystem 46, IRQN triggering, an oscillator option, comparator hysteresis option and an SPI option. A predetermined hysteresis, for example, 20 millivolts (mV) or no hysteresis at all can be selected on an individual comparator basis.

A mask programmable option also permits selection of the type of interrupt generated associated with an IRQN pin. One of two triggering methods may be selected as follows:

1) negative edge sensitive triggering only, or 2) both negative edge-sensitive and low level-sensitive triggering. If option 2) is selected, either type of input to the IRQN pin will produce an interrupt. The IC 10 can be configured to accept either a crystal/ceramic resonator input or an RC network to control the internal oscillator. More specifically, the IC 10 can be configured by mask option to accept either a crystal/ceramic resonator input or an RC network to control the internal oscillator. The internal clocks are derived by a divide-by-two of an internal oscillator, which operates with an AT-cut parallel resonant quartz crystal resonator in the frequency range of 1 MHz to 8 MHz. Use of an external oscillator is recommended when crystals outside the specified range are to be used. The crystal and components are be mounted as close as possible to the input pins to minimize start-up and stability problems. Table 1 shows recommended parameters for crystal resonators.

TABLE 3

CRYSTAL/CERAMIC RESONATOR PARAMETERS

| PARAMETER | CRYSTAL | | CERAMIC | |
|---|---|---|---|---|
| | 2 MHz | 4 MHz | 2–4 MHz | UNITS |
| Rs | 400 | 75 | 10 | ohms |
| $C_0$ | 5 | 7 | 40 | pF |
| $C_1$ | 8000 | 12000 | 4.3 | pF |
| $C_{OSC1}$ | 15–40 | 15–30 | 30 | pF |
| $C_{OSC2}$ | 15–30 | 15–25 | 30 | pF |
| $R_p$ | 10 | 10 | 1–10 | megohms |
| Q | 30 | 40 | 1.25 | $10^3$ |

A ceramic resonator may be used in place of the crystal in cost-sensitive applications. The circuit shown in FIG. 35A is recommended when using a ceramic resonator. Its equivalent circuit is shown in FIG. 35B. Table 3 shows the recommended parameters for various resonators.

A mask programmable oscillator option may be selected to permit the use of a single external resistor R between external oscillator pins OSC1 and OSC2 as illustrated in FIG. 35C. With this option, frequencies between 5 MHz and 70 KHz are practical. An external clock input should be used with either mask oscillator option. This external clock is connected to the OSC1 pin with the OSC2 pin unconnected as shown in FIG. 35D.

Two mask options are available for the SPI. This mask option selects one of two serial peripheral interface data pin (MOSI, MISO) configurations.

Bidirectional Data Pins: This configuration causes the EPI data pins to change direction when master or slave operation is selected. The MOSI pin is an output when in the master mode and an input when in the slave mode. The MISO pin is an input when in the master mode and an output when in the slave mode.

Unidirectional Data Pins: This configuration forces the SPI data pins to operate independently of the mode of the SPI. When this configuration is selected, MOSI is always an output and MISO is always an input.

In addition to the mask options, software constants are also used for configuration of the IC 10. More specifically, internal configuration registers are loaded by the microprocessor software from application dependent software constants stored in the program ROM 38 or the EEPROM 40. A pair of internal configuration registers (CFR, ACFR) are used to control these options in the IC 10. The CFR and ACFR registers are loaded on program initialization and are not intended to be altered during normal program operation and will be discussed in detail below.

Lastly, the IC 10 can be configured by run time configuration. With this option, configuration data is read from external devices through the microprocessor's I/O subsystem. This can be done by utilizing the input/output ports A, B, C or D in either a parallel or serial fashion.

CONFIGURATION REGISTERS

The configuration registers CFR and ACFR are used to specify various software configuration options available in the IC 10 architecture. These registers CFR, ACFR are programmed during software initialization to configure input/output pins to their appropriate function as well as setting other major configuration parameters. In order to avoid improper operation of the IC 10, the CFR and ACFR registers should not be altered during normal operation.

The CFR register is a write only register. The ACFR register is a read-write register. The bit format for the CFR and ACFR registers is illustrated in FIG. 37. Both the CFR and ACFR configuration registers are initialized to zeros on power-up or reset. This defines the state of the IC 10 after power has been applied and before the microprocessor 30 alters it for the application.

CFR Register

The CFR register is a write-only register used to configure the comparator output options. Bits 4 and 5 are unimplemented. The remainder of the bits in the CFR register are defined below.

CFR[7]: Communication Subsystem Master Enable. This is a permissive bit that allows the communication controller subsystem 29 to be switched into a master mode. A zero in this configuration bit prevents the communication controller subsystem 29 from entering into a master mode of operation. A one permits master operation. This bit is set to zero on reset.

CFR[6]: SPIOFF. This is a disable bit for the SPI subsystem. When set, the SPI subsystem is disabled. This bit is set to zero on reset.

CFR[3 . . . 0]: Comparator Mode Control. These four configuration bits enable the comparator outputs to be "ORed" with the least significant four bits of port C. A zero in these configuration bits enables the OR operation for the associated port pin. In this mode, each output pin will be low during device reset if the respective comparator input is above the threshold voltage (+1.25 V). Reset will clear the microprocessor's PORT C output register, making the output pin only a function of the comparator input. When the microprocessor writes a "1" into the port output register, the output pin will be forced high independent of the state of the comparator input.

A one in these configuration bits disables the 'OR' operation. In this mode, the port pins are in a high impedance state after reset. The configuration bits are assigned in sequential order with CFR[0] controlling PC0/CMP0 and CFR[3] controlling PC3/CMP3.

ACFR Register

The ACFR register is a 7-bit read-write register and is used to configure the analog subsystem. This register is set to zero on device reset or power-up. Bit 4 is unimplemented. Bit definitions of the ACFR register are as follows:

ACFR[7]: Clock Source. This bit selects the clock source for the A/D 78 and the communication controller subsystem 29 as well as the EEPROM charge pump 44. They can be configured to use either an internally generated clock or a clock derived from an external crystal oscillator of the IC 10. If the crystal oscillator is selected (ACFR[7]=1), the oscillator frequency must be in the range of 2–8 MHz. Other crystal values must use the internal clock source option (ACFR[7]=0)0. If the communication controller subsystem is used, the external crystal option must be selected (ACFR7]=1). This bit is set to 0 (internal clock source) by reset. A delay of 10 milliseconds (ms) is required after selecting the internal clock to permit the oscillator to stabilize. During the stabilization time, A/D 78 and EEPROM 40 operations should be performed.

ACFR[6]: Divider ratio. This bit selects the clock divider ratio for the A/D 78 and the communication controller subsystem 29. There are two considerations when selecting external crystals and the ACFR[6] setting. These considerations are; first, the clock input to the A/D 78 must be in the range of 1–2 MHz; and second, the clock input to the communication controller subsystem 29 must be 1.8432 MHz if the communication controller carrier and bit rate standards are to be met.

This bit selects a divider ratio of 1/2 or 1/4, permitting crystals in the range of 2–8 MHz to be used. If the communication controller subsystem 29 is active, either a 7.3728 MHz or 3.6864 MHz crystal must be used. The selection of the external crystal and the state of ACFR[7] will determine the A/D conversion, autoranging and autozero times. Table 4 defines the configuration bit and demonstrates the effect on conversion times.

TABLE 4

| A/D CONVERTER CLOCK SOURCE ||||| 
| --- | --- | --- | --- | --- |
| ACFR [7,6] | Divider | Crystal (MHz) | A/D Conv.* ($\mu$s) | Auto-zero** ($\mu$s) |
| 0 X | Internal | NA    | 48–96 | 13–1,537 |
| 1 0 | 1/2      | 2     | 48–96 | 25–1,537 |
| 1 0 | 1/2      | 3.6864| 26–52 | 15–884   |
| 1 0 | 1/2      | 4     | 24–48 | 13–769   |
| 1 1 | 1/4      | 4     | 48–96 | 25–1,537 |
| 1 1 | 1/4      | 7.3728| 26–52 | 25–884   |
| 1 1 | 1/4      | 8     | 24–48 | 13–769   |

*The auto-range time depends on the number of gain steps required to range.
**The auto-zero time depends on the amount of offset correction required.

ACFR[5]: A/D power-down. This bit controls power down operation of the A/D subsystem 78. When set, it will power up the A/D subsystem 78. When the bit is reset, the A/D subsystem 78 will power down. This bit is set to zero by reset on power-on. At least 100 $\mu$s should be allowed for the converter to stabilize after power-up.

ACFR[3 . . . 0]: MUX3 . . . MUX0 mode select. These configuration bits control the input mode of the analog input channels 62 and 64. The input channels 62 (MUX0 . . . MUX3) can be placed in either a voltage input mode or a current input mode. A zero in these configuration bits selects the voltage mode, while a one selects the current mode. These bits are assigned sequentially with ACFR[0] controlling MUX0 and ACFR[3] controlling MUX3 as shown in Table 5.

TABLE 5

| ANALOG INPUT MODE DEFINITIONS |
| --- |
| ACFR(0) = 0 = voltage mode, 1 = current mode |
| ACFR(1) = 0 = voltage mode, 1 = current mode |
| ACFR(2) = 0 = voltage mode, 1 = current mode |
| ACFR(3) = 0 = voltage mode, 1 = current mode |

MICROPROCESSOR 30

The microprocessor 30 is based on a Motorola type MC68HC05 architecture, a Von Neumann type machine, which places all data, program and I/O interfaces into a single address map. This reduces the number of special purpose instructions that must be supported and therefore results in a relatively small and easy to remember instruction set.

The microprocessor 30 is described in detail in *M6805 HMOS/M146805 CMOS FAMILY USERS MANUAL* by Motorola, Inc., copyrighted 1983, hereby incorporated by reference. The microprocessor 30 architecture is based on five registers: an accumulator (A), an index register (X), a program counter (PC), a stack pointer (SP) and a condition code register (CC).

The accumulator is a general purpose 8-bit register used by the program for arithmetic calculation and data manipulations. A full set of read/modify/write instructions operate on this register. The accumulator is used in the register/memory instructions for data manipulation and arithmetic calculation. The index register is used in the index mode of addressing or as an auxiliary accumulator. It is an 8-bit register that can be loaded either directly or from memory, having its contents stored in memory, or its contents compared to memory. In index instructions, the index register provides an 8-bit value that is added to an instruction provided value to create an effective address. The index register is also used for limited calculations and data manipulation.

The program counter is a 16-bit register and contains the memory address of the next instruction that is to be fetched and executed. Normally, the program counter points to the next sequential instruction, however, it may be altered by interrupts or certain instructions. During an interrupt, the program counter is loaded with the appropriate interrupt vector. Jump and branch instructions may modify the program counter so that the next instruction to be executed is not necessarily the next instruction in memory.

The stack array or stack is an area in memory used for the temporary storage of important information. It is essentially a sequence of RAM locations used in a last-in-first-out (LIFO) fashion. The stack pointer always points to the next free location on the stack. Interrupts and subroutines make use of the stack to temporarily save important information. The stack pointer is used to automatically store the return address (2 byte program counter) on subroutine calls and to automatically store all registers (5 bytes: A, X, PC and CC) during interrupts. The stack starts at location $00FF and extends downward 64 locations.

The condition code register is a 5-bit register that indicates the results of the instruction just executed, as well as the state of the processor. These bits can be individually tested by a program instruction and specified action taken as a result of their state. The following condition code bits are defined: half-carry (H), interrupt mask (I), negative (N), zero (Z) and carry/borrow (C).

MEMORY MAPPING

The microprocessor 30 is capable of addressing 65,536 bytes of memory. Thus, the memory space ranges from $0000 to $FFFF. FIG. 36 is a diagram of memory allocation for the IC 10.

1. ROM 38

The IC 10 memory map has three sections of mask programmable ROM 38 and accommodate up to 32,768 bytes of external ROM in the expanded mode at locations $8000 to $FFFF. This memory 38 is programmed at device manufacture. The three sections of the ROM 38 are located as defined in Table 6.

TABLE 6

ROM ASSIGNMENTS

| ADDRESS RANGE | SIZE | FUNCTION |
|---|---|---|
| $EF00–$FEFF | 4096 bytes | User instruction memory |
| $FF00–$FFEF | 240 bytes | Self-check program |
| $FFF0–$FFFF | 16 bytes | Vectors |

2. RAM 42

The IC 10 is configured with 208 bytes of RAM starting at location $0030 extending to $00FF and can accommodate 16,384 bytes of external RAM at locations $4000 to $7FFF. The top of this internal RAM $0030 to $00FF area is reserved for the stack. The stack starts at location $00FF and extends downward a maximum of 64 locations to $00C0. Unused stack locations may be used by the program for general storage. However, care must be exercised to avoid data being stored in these locations being overwritten by stack operations.

3. EPROM 40

The IC 10 has 256 bytes of EEPROM 40 located at addresses $0100 through $01FF.

4. Interrupt and Reset Vectors

The upper 16-bytes of the memory map are reserved for interrupt vectors. The address assignments for each are described below:

$FFFE–FFFF: Reset Vector

This vector is used on processor reset. It has the highest priority of the eight interrupts.

$FFFC–FFFD: Software Interrupt

This vector is used during execution of the SWI instruction. It has the second-highest priority of the eight interrupts.

$FFFA–FFFB: External Asynchronous Interrupt

This interrupt is assigned the third-highest priority of the eight interrupts. The external interrupt (IRQN pin) uses this vector.

$FFF8–FFF9: Timer Interrupt

This interrupt is assigned the fourth-highest priority of the eight interrupts. It is used by the timer 60.

$FFF6–FFF7: Comparator Subsystem Interrupt

This interrupt is assigned the fifth-highest priority of the eight interrupts. It is used by the comparator subsystem 58.

$FFF4–FFF5: A/D Subsystem Interrupt

This interrupt is assigned the sixth-highest priority of the eight interrupts. It is used by the A/D 78.

$FFF2–FFF3: Serial Peripheral Interrupt

This interrupt is assigned the seventh-highest priority of the eight interrupts. It is used by the SPI subsystem 54.

$FFF0–FFF1: Incom Communication Controller Interrupt

This interrupt is assigned the lowest priority of the eight interrupts. It is used by the communication controller 29.

5. Data Transfer and Control

Data transfer and control functions are implemented using byte-wide register interfaces accessed by the microprocessor 30 in its memory address space as defined in Table 7.

TABLE 7

REGISTER ADDRESS MAP

| ADDR | REGISTER |
|---|---|
| $0000 | PAD |
| $0001 | PBD |
| $0002 | PCD |
| $0003 | PDD |
| $0004 | PAC |
| $0005 | PBC |
| $0006 | PCC |
| $0007 | PDC |
| $0008 | CMPST |
| $0009 | CMPI |
| $000A | SPCR |
| $000B | SPSR |
| $000C | SPD |
| $000D | |
| $000E | |
| $000F | |
| $0FF0 | DMC |
| $0010 | TSCH |
| $0011 | TSCL |
| $0012 | TCR |
| $0013 | TSR |
| $0014 | TICH |
| $0015 | TICL |
| $0016 | TOCH |
| $0017 | TOCL |
| $0018 | TCRH |
| $0019 | TCRL |
| $001A | TARH |
| $001B | TARL |
| $001C | NVCR |
| $001D | PWM |
| $001E | CFR |
| $001F | TEST |
| $0020 | ADCR |
| $0021 | AMUX |
| $0022 | ADC |
| $0023 | ACFR |
| $0024 | ADZ |
| $0025 | AMZ |
| $0026 | AVSF |
| $0027 | ACSF |
| $0028 | ICAH |
| $0029 | ICAL |
| $002A | ICM0 |
| $002B | ICM1 |
| $002C | ICM2 |
| $002D | ICM3 |
| $002E | ICCR |
| $002F | ICSR |

EEPROM CONTROL

The microprocessor 30 controls the operation of the EPROM 40 by a single read-write register NVCR, located in memory address space. FIG. 38 shows the format of this register. Reset clears this register to zero. This will configure the EEPROM 40 for normal read operation. A description of the bit assignments for the NVCR register is provided below:

NVCR[7 . . . 5]: Unused. These bits are reserved for device testing.

NVCR[4]: Byte Erase Select (BYTE). This bit selects byte erase operations. When set, it overrides the row bit. If BYTE is set to a 1, erase operations effect the selected byte. If BYTE is set to zero, erase operations are either row or bulk.

NVCR[3]: Row Erase Select (ROW). This bit selects row or bulk erase operations. If BYTE is set, this bit is ignored. If ROW is set to a 1, erase operations effect the selected row. If ROW is set to a 0, bulk erase is selected.

NVCR[2]: EEPROM Erase (ERASE). This bit controls erase operations in the following manner: If ERASE is set to a 1, erase mode is selected. If ERASE is set to a 0, normal read or program mode is selected.

NVCR[1]: EEPROM Latch Control (EELAT). This bit controls EEPROM address and data latch operations as follows: If EELAT is set to a 1, address and data can be latched into the EEPROM 40 for programming or an erase operation. If EELAT is set to a 0, data can be read from the EEPROM 40. If an attempt is made to set both the EELAT and EEPGM bits in the same write cycle, neither will be set.

NVCR[0]: EEPROM Program Voltage Enable (EEPGN). This bit determines the operating mode of the EEPROM 40 as follows: If the EEPGM is set to a 1, the charge pump 44 is on and the resulting high voltage is applied to the EEPROM array. If EEPGM is set to 0, the charge pump generator is off. If an attempt is made to set both the EELAT and the EEPGM in the same write cycle, neither will be set. If a write to a EEPROM address is performed while the EEPGM bit is set, the write is ignored and the programming operation currently in progress is not disturbed. These two safeguards prevent accidental EEPROM 40 changes.

EEPROM OPERATION

Specifications for the EEPROM 40 are provided in Appendix A. An internal charge pump 44 avoids the necessity of supplying a high voltage for erase and programming. To reduce programming time, bulk, row and byte erase operations are supported.

The erase state of an EPROM byte is $FF. Programming changes ones to zeros. If any bit in a location needs to be changed from a zero to a one, the byte must be erased in a separate operation before it is reprogrammed. If a new byte has no ones in bit positions which were already programmed to zero, it is acceptable to program the new data without erasing the EEPROM byte first.

Programming and erasure of the EEPROM 40 relies on an internal high voltage charge pump 44. The clock source for the charge pump 44 is the same as the A/D subsystem and is selected by ACFR[7,6] as discussed above. Clock frequencies below 2 MHz reduce the efficiency of the charge pump 44 which increases the time required to program or erase a location. The recommended program and erase time is 10 ms when the selected clock is 2 MHz and should be increased to as much as 20 ms when the clock is between 1 MHz and 2 MHz. At least 10 ms should be allowed after changing the clock source for the charge pump 44 to stabilize.

The EEPROM 40 operation is controlled by the NVCR register. Various operations are performed by the EEPROM 40 as described below. Other processor operations can continue to be performed during EEPROM programming and erasure provided these operations do not require a read of the data from the EEPROM 40. The EEPROM 40 is disconnected from the internal read/data bus 34 during program and erase operations.

To read data from the EEPROM 40, the EELAT bit must be zero. When this bit is cleared, the remaining bits in the NVCR register have no meaning or effect and the EEPROM 40 may be read as if it were a normal ROM.

During EEPROM 40 programming, the ROW and BYTE bits are not used. The zero bits in a byte must be erased by a separate erase operation prior to programming. The following sequence of operations is required to initiate a programming cycle as follows:

1. Set the EELAT bit with EEPGM=0
2. Store data to the EEPROM memory location
3. Set the EEPGM bit to turn on the high voltage
4. Wait 10 ms
5. Reset both EEPGM and EELAT bits to return to normal operation (clear NVCR)

The following sequence of operations is required to initiate a bulk erase of the EEPROM memory as follows:

1. Set the ERASE and EELAT bits with EEPGM=0
2. Write any data to any EEPROM address
3. Set the EEPGM bit to turn on the high voltage
4. Wait 10 ms
5. Reset ERASE, EELAT and EEPGM bit to return to normal operation (clear NVCR).

A row in the EEPROM 40 is a group of 16 bytes whose starting address is $xxN0 and whose ending address is $xxNF. The x's indicate don't care address bits. The N is the row number. This type of erase operation saves time compared to byte erase operations when large sections of EEPROM are to be erased. The sequence of operations required to initiate a row erase in the EEPROM 40 is as follows:

1. Set the ROW, ERASE and EELAT bits with EEPGM=0
2. Write any data to any EEPROM address in the selected row
3. Set the EEPGM bit to turn on the high voltage
4. Wait 10 ms
5. Reset ROW, ERASE, EELAT and EEPGM bit to return to normal operation (clear NVCR)

DEAD-MAN SUBSYSTEM 46

The dead-man circuitry 46 monitors the microprocessor 30 for proper operation. This function is a mask-enabled option that interacts with the microprocessor 30 through a single register (DMC) located at address $0FF0. The dead-man circuitry may implemented as a 17-bit ripple counter that provides a timeout period of 32.8 milliseconds at a bus rate of 4 MHz (262,144 oscillator cycles). If the counter overflows, a processor reset will occur and the device will be reinitialized.

The dead-man timer is reset by writing a zero to DMC[0]. This will reset the counter and begin the timeout period again. The location of the DMC register was chosen such that a normal bit manipulation instruction cannot reset the timer. Only extended or indexed, 16-bit offset addressing modes can access this location.

DEAD-MAN INTERFACE REGISTER

The dead-man subsystem is controlled by a 1-bit register (DMC) located in memory address space. FIG. 39 defines the register's format.

DMC[0]: Dead-man Reset. This write-only bit is used to reset the dead-man timer. Writing a zero to it will reset the dead-man counter and restart the dead-man timeout time.

ANALOG SUBSYSTEM INTERFACE REGISTERS

The microprocessor 30 interface consists of seven registers (ADZ, AMZ, AMUX, ACSF, AVSF, ADC, and ADCR) located in the memory address space. The format of these registers is shown in FIG. 40.

ADZ: A/D Auto-zero Value. This 6-bit read-write register contains the offset correction value for the voltage input amplifier 80. The ADZ register is loaded with the correction value at the completion of an auto-zero sequence. A value of zero represents the intrinsic positive offset built into the amplifier 80. As the ADZ value increases, the offset decreases. A least-significant-bit represents approximately 0.5 mV offset. The correction value may be changed by writing to this register. Write operations to the ADZ register are intended for diagnostic and verification purposes and are not intended in normal operation. The auto-zero sequence should provide the proper offset value for nominal device operation. At the completion of the auto-zero, the offset of the amplifier 80 should be in the range of 0 to −0.5 mV.

AMZ: Amplifier Auto-zero Value. This 6-bit read-write register contains the offset correction value for the current amplifier 90. The AMZ register will be loaded with the correction value at the completion of an auto-zero sequence. As the AMZ value increases, the offset decreases. A least-significant-bit represents approximately 0.5 mV offset. The correction value may be changed by writing into this register. Write operations to this register are intended for diagnostic and verification purposes and are not intended in normal operation. The auto-zero sequence should provide the proper offset value for nominal device operation. At the completion of the auto-zero, the offset of the amplifier should be in the range of 0 to −0.5 mV.

ACSF: Current Scale Factor. This read-write register is used to control operation of the current input auto-ranging. The value written into this register determines the current subsystem auto-ranging operating mode. If a zero is written, the current subsystem is placed in auto-ranging mode. A nonzero value inhibits auto-ranging and sets the current mirror 92 into a fixed scale value. Table 8 defines possible values for ACSF write operations. Values other than these will cause unpredictable operation.

This register is not a true read-write register. The value read from it is not necessarily the value that was written into it. Writing a zero into ACSF enables auto-ranging, however, a zero will never be read from the ACSF register. There are only five possible values that will be read: $10, $08, $04, $02, and $01.

The value read from this register is one of the scale factors required to properly scale the 8-bit A/D output. Five values are possible: ×1, ×2, ×4, ×8 and ×16. Scale factors are shown in Table 8.

TABLE 8

| CURRENT SCALE FACTOR CONTROL VALUES | | |
|---|---|---|
| ACSF[7 ... 0] | HARDWARE MODE | SOFTWARE SCALE FACTOR |
| $00 | Auto-ranging enable | |
| $10 | Divide by 16 | × 16 |
| $08 | Divide by 8 | × 8 |
| $04 | Divide by 4 | × 4 |
| $02 | Divide by 2 | × 2 |
| $01 | Divide by 1 | × 1 |

AVSF: Voltage Scale Factor. This read-write register is used to control operation of the voltage input auto-ranging. The value written into this register determines the voltage amplifier 80 auto-ranging operating mode. If a zero is written, the voltage amplifier 80 is placed in auto-ranging mode. A nonzero value inhibits auto-ranging and sets the voltage amplifier 80 in a fixed-gain mode of operation. Table 9 defines legal values for AVSF write operations. Values other than these will cause unpredictable operation.

This register is not a true read-write register. The value read from it is not necessarily the value that was written into it. Writing a zero into AVSF enables auto-ranging, however, a zero will never be read from AVSF. There are only five possible values that will be read: $10, $08, $04, $02 and $01.

TABLE 9

| A/D VOLTAGE AMPLIFIER CONTROL VALUES | | |
|---|---|---|
| ACSF[7 ... 0] | HARDWARE MODE | SOFTWARE SCALE FACTOR |
| $00 | Auto-ranging enable | |
| $01 | × 16 gain | × 1 |
| $02 | × 8 gain | × 2 |
| $04 | × 4 gain | × 4 |
| $08 | × 2 gain | × 8 |
| $10 | × 1 gain | × 16 |

The value read from this register is one of the scale factors required to properly scale the A/D output. Five values are possible: ×1, ×2, ×4, ×8 and ×16. Scale factors are shown in Table 9. This register should not be read or written to while a conversion is in progress.

AMUX: Input Multiplexer Controls. This 8-bit read-write register is used to select the MUXes 66 and 68 connected to the voltage and current input channels 62 and 64. The register is divided into two 4-bit fields; one for controlling the voltage input channels and the other for controlling the current input channels. It is also used to initiate the A/D conversion process. Writing to this register will initiate an A/D conversion.

AMUX[3 ... 0]: A/D Channel Select. These four bits control operation of the voltage input channels 62 and 64. These bits are decoded as shown in Table 10. Values indicated as "reserved" are dedicated to test and verification and should not be selected during normal operation. When the current channels 62 are selected (AMUX[3 ... 0]=1000), auto-ranging of the voltage amplifier 80 will be inhibited and the gain set to ×1. If a nonzero value has previously been written into the AVSF register, the selected gain will be used instead of an ×1 gain factor.

TABLE 10

| A/D CHANNEL SELECT DECODE | |
|---|---|
| AMUX [3 ... 0] | SOURCE |
| 0000 | MUX0 |
| 0001 | MUX1 |
| 0010 | MUX2 |
| 0011 | MUX3 |
| 0100 | MUX4 |
| 0101 | MUX5 |
| 0110 | MUX6 |
| 0111 | MUX7 |
| 1000 | MXO (Current Channel) |
| 1001 | Reserved |
| 1010 | Reserved |
| 1011 | Reserved |
| 1100 | Reserved |
| 1101 | Reserved |
| 1110 | Temp. Sensor |
| 1111 | AVSS (0 volts) |

AMUX[7 ... 4]: Current MUX Select. These four bits control operation of the current input channels 62. Each bit controls a channel independent of the other three bits. Bits are assigned sequentially with AMUX[4] assigned to input pin MUX0 and AMUX[7] assigned to input pin MUX3. These bits have no effect if the associated channel is configured for voltage mode by the CFR register. A zero in AMUX[7 ... 4] connects the appropriate input pin(s) to digital ground (VSS), while a one connects the pin(s) to the current mirror 92 output. The currents can be summed by selecting multiple current inputs. If all four bits of this field are zero, no input channels are connected to the current mirror 92 output. Since the inverting input of the current amplifier 90 remains connected to the current mirror 92 output, the current amplifier 90 output will be low, and the current mirror 92 will have no current flowing out of it.

ADC: A/D CONVERTER OUTPUT This read-only register is used to return the 8-bit output value. The least-significant bit is in ADC[0]. This value must be multiplied by the voltage and current scale factors found in ACSF and AVSF. Depending on the mode of operation, both scale factors may not be needed:

Voltage Inputs: The ADC register should be multiplied by AVSF for all voltage inputs. The contents of ACSF register should not be used to scale a voltage reading.

Current Inputs: The ADC register should be multiplied by the value in the ACSF register and then the AVSF register for scaling of the current subsystem output (MSO). If the voltage amplifier 80 is set to auto-ranging, the AVSF software scale factor will always be ×16, since the voltage hardware gain will be forced to ×1 by the selection of MXO.

If an input voltage is converted that is not in the range of AVSS to VREF, the A/D converter will return either $00 (voltages less than AGND) or $FF (voltages greater than VREF). No additional indication is provided.

ADCR: A/D Subsystem Control This byte-wide register is used to control operation of the A/D 78. It is implemented as a read-write register to permit read-modify-write instructions to properly manipulate bits. All command bits will read as zero. Control bits will read the current value of the control bit.

ADCR[0]: Unused. This bit is not used. The ADCR[0] bit will always read zero.

ADCR[1]: Sample Inputs. This control bit is used to close the four MUXes 108, 110, 112 and 114 that connect the pairs of channels 102, 104, 106 and 108 together to form the sample and hold function. The channels are closed when ADCR[1]=1 and open when ADCR[1]=0. ADCR[1] is set to zero by device reset. Each of the sample and hold switches 108, 110, 112 and 114 will close only if both channels it is associated with are configured in the voltage mode.

ADCR[2]: Initiate Auto-Zero Sequence. When this command bit is written with a one, the voltage and current amplifiers 80 and 90 will initiate an autozero sequence. When the sequence is completed, the ADCR[6] bit will be set to a one. An interrupt will be generated, if enabled, at the completion of the autozero sequence. The ADCR[2] bit will always read 'zero'.

ADCR[3]: Integrator Reset. When this control bit is written with a one, the MUX 96 disconnects the MXO pin from the current mirror 92 and shorts MXO to analog ground. The MUX 96 will remain shorted as long as this bit remains set. To open the MUX 96 a zero must be written to ADCR[3]. This bit will read the present state of the MUX 96.

ADCR[4]: Enable Interrupt. This control bit enables interrupts from the A/D subsystem 78. When the ADCR[4] bit is set to one, interrupts are enabled. The ADCR[4] bit will read the present state of the interrupt enable.

ADCR[5]: Acknowledge Interrupt And Operation Complete. This command bit resets the operation complete flags when written with a one. It will reset ADCR[6 . . . 7], removing the interrupt request from the processor. ADCR[5] should be written with a one prior to initiation of another conversion. This bit will always read as a zero.

ADCR[6]: Auto-Zero Sequence Complete. This read-only status bit indicates the completion of an auto-zero sequence. It will be set to a one after completion of the auto-zero cycle. Registers ADZ and AMZ will be updated with the new value of offset correction calculated by the auto-zero sequence. This bit is reset by writing to the ADCR[5] bit with a one. The ADCR[6] bit cannot be written.

ADCR[7]: Conversion Complete. This read-only status bit indicates the completion of an A/D conversion cycle. It will be set to a one after completion of the A/D conversion and indicates that data is available in the ADC, ACSF, and AVSF registers. It is reset by writing the ADCR[5] bit with a one. This bit cannot be written.

A/D SUBSYSTEM OPERATION

The A/D subsystem should be initialized during the power-up routine. The following initialization operations are required.

The ACFR register should be written with the appropriate value to select the proper operating mode of the MUX4 . . . MUX1 inputs. Care should be used when placing an input channel in the current mode, since this will produce a low-impedance on the input pin.

The clock source and divider ratio should be selected with the ACFR[7,6] bits based on the application's crystal value. If the RC oscillator mask option is selected, the clock source should be set to internal (ACFR[7]=0). The ACFR[5] bit should be written with a one to enable A/D operation.

The control register (ADCR) should be written with an appropriate value. Bits 1, 3 and 4 should be set to establish initial operation conditions. An auto-zero sequence should be initiated by setting the bit ADCR[2]=1. This will cause the offset voltages in the voltage and current amplifiers 80 and 90 to be canceled and the ADZ and AMZ registers to be set to the correct values.

The two scale factor registers (ACSF and AVSF) should be initialized. If auto-ranging is desired, a zero should be written into both registers, otherwise the required scale factors should be selected.

OPERATION WITH VOLTAGE INPUTS

To initiate a conversion of a voltage input, the AMUX register should be written with a value that contains the desired input channel in the low-order four bits and the present current switch selection in the high-order four bits. This will start the conversion of the selected voltage input. When the conversion is complete, an interrupt will be generated (if enabled) and the ADCR[7] bit will be set. The ADCR[5] bit should be written with a one to clear the interrupt and acknowledge the operation complete flag. This will reset the ADCR[7] bit. The conversion value is read from ADC register and then multiplied by the value in the AVSF register to produce a 12-bit value. It should be noted that a voltage gain factor of ×1 produces a scale factor of ×16. Moreover, it is not intended to write to the AVSF register prior to each conversion. The ADCR[7] bit must be cleared after every conversion operation by writing to the ADCR[5] bit with a one.

OPERATION WITH CURRENT INPUTS

To initiate a conversion of a current input, the AMUX register should be written with a value that contains $8 in the low-order four bits and the present current switch selection in the high-order four bits. This will start the conversion of the MX0 input. When the conversion is complete, an interrupt will be generated (if enabled) and ADCR[7] will be set. ADCR[5] should be written with a one to clear the interrupt and acknowledge the operation complete flag. This will reset ADCR[7]. The conversion value is read from the ADC register and then multiplied by AVSF and ACSF to produce a 16-bit value. If voltage auto-ranging has been enabled by writing AVSF with a zero, it is not necessary to multiply the result by AVSF as long as a 12-bit result is desired. It should be noted that a voltage gain factor of ×1 produces a scale factor of ×16. As long as AVSF is not written with an overriding gain factor, the ×16 scale factor can be ignored for current conversions.

There is no need to write AVSF or ACSF prior to each conversion. ADCR[7] must be cleared after every conversion operating by writing ADCR[5] with a one.

The A/D subsystem generates a synchronous interrupt at vector address $1FF4–1FF5. The interrupt must be acknowledged prior to resetting the 1 bit in order to not reprocess the interrupt.

QUADCOMPARATOR SUBSYSTEM OPERATION

1. Quadcomparators Subsystem

Four individual inverting comparators are available. The non-inverting input of each is referenced to +1.25 volts. The comparators are discussed in detail below. Specifications for the subsystem are provided in Appendix B. The comparator output states can be read from a register (CMPST) and can also be directly connected to the least significant four output pins of port C. One comparator, 200 interrupts on both rising and falling output signals while the other three comparators interrupt only on rising outputs.

The quadcomparator subsystem 58 is controlled by 4 bits of the Configuration Register as defined in FIG. 37.

CFR[3 . . . 0]: Comparator Mode Control. These four configuration bits enable the comparator outputs to be ORed with the least-significant four bits of port C. A zero in a configuration bit enables the OR operation for the associated port pin. In this mode, each output pin will be low during device reset if the respective comparator input is above the threshold voltage (+1.25 V). A reset will clear the port C output register making the output pin only a function of the comparator input. When the microprocessor 30 writes a 1 into this port output register bit, the corresponding output pin will be forced high independent of the state of the comparator input.

A one in these configuration bits disables the OR operation. In this mode, the port pins behave as normal port pins. The configuration bits are assigned sequentially, with CFR [0] controlling PC0/CMP0 and CFR[3] controlling PC3/CMP3. See Table 11 for assignments.

TABLE 11

| COMPARATOR MODE CONTROL |
|---|
| CFR[3]: PC3/CMP3 |
| CFR[2]: PC2/CMP2 |
| CFR[1]: PC1/CMP1 |
| CFR[0] PC0/CMP0 |

The comparator subsystem 58 communicates with the microprocessor 30 through a set of two control and status registers (CMPI and CMPST) located in memory address space. The state of each comparator output can be read through the CMPST register. An external interrupt facility is provided to generate interrupts on selected edges of the comparator outputs. These comparators have approximately 20 mV of hysteresis. FIG. 41 shows the format of these registers.

CMPI REGISTER

CMPI[7 . . . 4]: Interrupt Acknowledge. These four command bits are used to reset the interrupt request generated by the quadcomparator subsystem 58. They always read as zero. When a one is written into a command bit, the corresponding interrupt request is cleared. These four bits are not read-write registers. The interrupt request must be reset prior to clearing the 1-bit to prevent reprocessing the interrupt. Bit assignments are defined in Table 12.

TABLE 12

| CMP[7 . . . 4] BIT ASSIGNMENTS |
| --- |
| CMPI[4]: CP0 |
| CMPI[5]: CP1 |
| CMPI[6]: CP2 |
| CMPI[7]: CP3 |

CMPI[3 . . . 0]: Interrupt Enable. These four control bits are used to enable the comparator interrupts. A one enables a comparator interrupt, while a zero disables it. They are true enables in that transitions prior to the enable will be ignored. Clearing the enable with an interrupt pending will remove the interrupt request. These four bits are implemented as true read-write registers. Bit assignments are defined in Table 13.

TABLE 13

| CMP[3 . . . 0] BIT ASSIGNMENTS |
| --- |
| CMP[0]: CP0 |
| CMP[1]: CP1 |
| CMP[2]: CP2 |
| CMP[3 : CP3 |

CMPST REGISTER

CMPST[7 . . . 4]: Interrupt Request. These four read-only status bits indicate which comparator interrupt(s) are active. They are read to determine the cause of the microprocessor interrupt. A one indicates an interrupt request for its respective comparator output. Bit assignments are defined in Table 14.

TABLE 14

| CMPST[4]: CP0 |
| --- |
| CMPST[5]: CP1 |
| CMPST[6]: CP2 |
| CMPST[7]: CP3 |

CMPST[3 . . . 0]: Comparator Output. These four read-only status bits indicate the state of the four comparator outputs. A one indicates the comparator output is high and that the comparator input is below the threshold. Bit assignments are defined in Table 15.

TABLE 15

| CMPST[0]: CP0 |
| --- |
| CMPST[1]: CP1 |
| CMPST[2]: CP2 |
| CMPST[3]: CP3 |

The comparator subsystem 30 generates a synchronous interrupt at vector address $FFF6–$FFF7.

2. B+ Comparator 50

The B+ comparator 50 is discussed in detail below. This comparator is provided for power supply generation (see FIG. 76B). The negative input of this comparator is connected to the VREF pin (+2.5 V nominal). The positive pin is BSENSE. The comparator output is located at BDRIVE. Comparator specifications are provided in Appendix B.

3. A Comparator 49

The A comparator 49 is utilized with the communication controller 29 receiver circuits. Both inverting (ANEG) and non-inverting (APOS) inputs are available as input pins. The output is AOUT. This comparator primarily operates at input voltages near VREF. Specifications for this comparator are provided in Appendix C.

4. PWM Subsystem 61

A pulse width modulated output 61 may be provided by circuitry on output pin PWM. This output is a periodic signal whose high-to-low ratio is controlled by the 8-bit value stored in the PWM register. The input to the 8-bit pulse width modulator is the processor's phase 2 clock divided by 4, which results in a PWM period of 0.2778 ms when the 3.6864 MHz crystal is used. The PWM base frequency is the crystal frequency divided by 1024. The PWM subsystem is not controlled by the Configuration Control Register.

INTERFACE REGISTERS

The PWM subsystem 61 is controlled by a single 8-bit register (PWM) located in memory address space. FIG. 41 defines the register's format.

PWM: PULSE WIDTH MODULATOR RATIO

The ratio of high-to-low signal levels on the PWM pin is determined by the value in the PWM register. The eight bits of the PWM are taken as the numerator (N) of a fraction whose denominator is 256. This fraction determines what proportion of the time the PWM pin will be high. If N=0, the PWM pin will remain low. If N=$80, the duty cycle will be 50%. After a reset, both the PWM register and the internal counter register will be set to zero and the PWM output will be low. When the PWM register is written with a non-zero value, the PWM output will go high two PH2 cycles after the write is completed. The output will remain high for the specified width and then go low for the remainder of the PWM cycle. The output pulse will repeat itself continuously within the PWM cycle until a new value is written to the PWM register. The new pulse width will become valid after the completion of the current PWM cycle. The PWM register is double-buffered such that a new value written into the PWM register will take effect only at the start of a PWM count sequence. This will prevent producing spurious output pulse widths.

If the value written to the PWM register is zero, the output will stay low after the current PWM cycle is completed. A zero value in the PWM register will disable the PWM until a non-zero value is written. Start-up of the PWM after a non-zero value is written will always be two PH2 clock cycles after completion of the write to the PWM register. This will ensure the start of the PWM cycle at a defined point in time.

5. Programmable Timer 60

Figure 42:
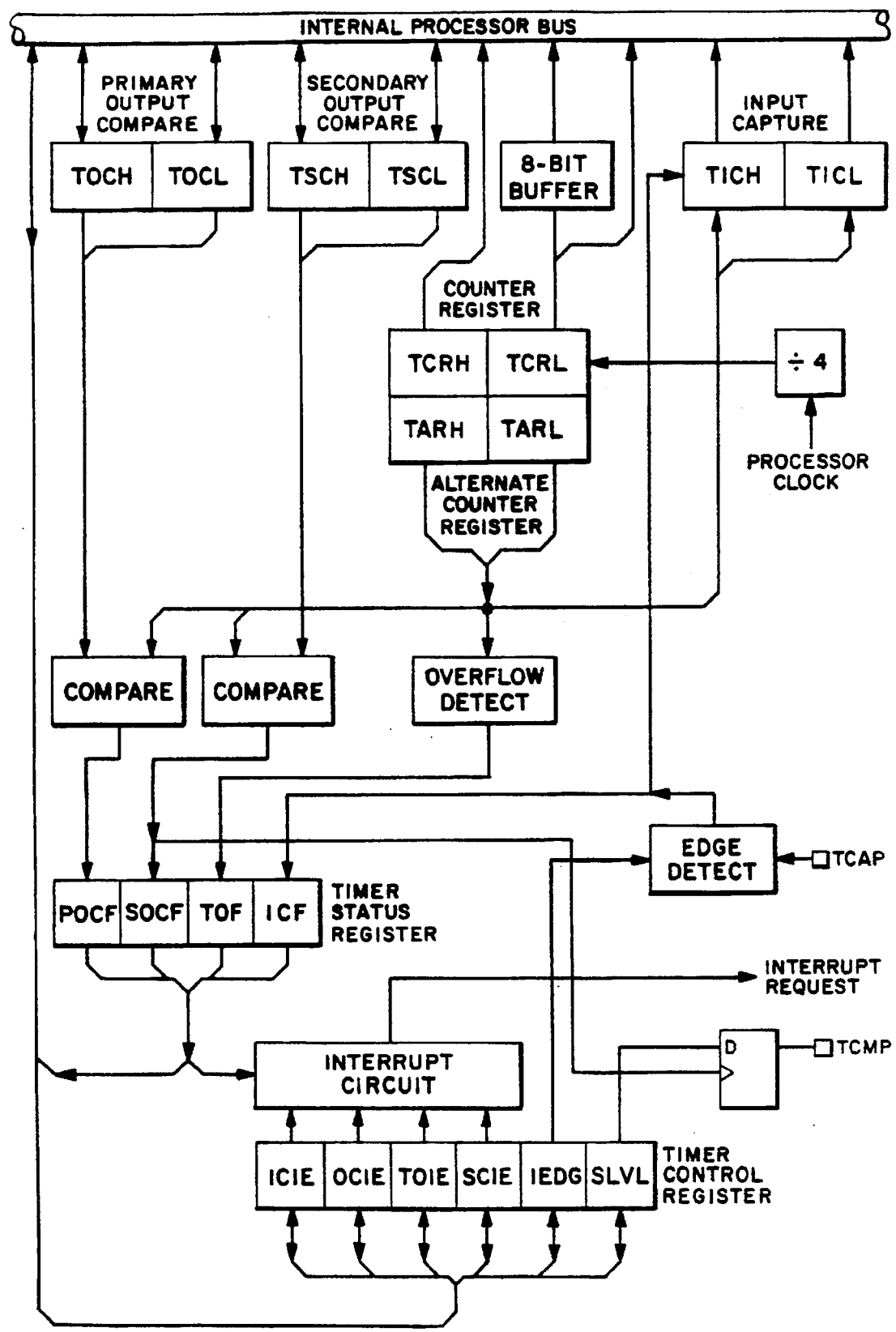
FIG. 42 is a block diagram of a programmable timer which forms a portion of the IC in accordance with the present invention.

The IC 10 contains a single 16-bit programmable timer 60 with dual output compare registers. The timer is driven by the output of a fixed divide-by-four prescaler operating from the microprocessor 30 phase 2 clock. It can be used for many purposes, including input waveform measurements, while simultaneously generating an output waveform. Pulse widths can vary from several microseconds to many seconds. The timer 60 is also capable of generating periodic interrupts or indicating passage of an arbitrary number of internal clock cycles. A block diagram of the timer is shown in FIG. 42. Timing diagrams are shown in FIGS. 43A–43D.

Because the timer has a 16-bit architecture, each specific functional capability is represented by two registers. These registers contain the high and low byte of that function. Generally, accessing the low byte of a specific timer function allows full control of that function; however, an access of the high byte inhibits that specific timer function until the low byte is also accessed. The 1-bit in the condition code register should be set while manipulating both the high and low byte register of a specific timer function to ensure that an interrupt does not occur. This prevents interrupts from occurring between the time that the high and low bytes are accessed.

The key element in the programmable timer is a 16-bit free running counter preceded by a prescaler which divides the microcontroller internal phase 2 clock by four. The prescaler gives the timer a resolution of 2.00 µs assuming a crystal frequency of 4 MHz. The counter is clocked to increasing values during the low portion of the internal phase 2 clock. Software can read the counter at any time without affecting its value.

The double byte free running counter can be read from either of two locations: the counter register (TCRH, TCRL), or the alternate counter register (TARH, TARL). A read sequence containing only a read of the least significant byte of the counter register will receive the counter value at the time of the read. If a read of the counter at either location first addresses the most significant byte, it causes the least significant byte to be transferred to a buffer. This buffer value remains fixed after the first most significant byte read, even if the user reads the most significant byte several times. The buffer is accessed when reading the counter register (TCRL) or alternate counter register (TARL) least significant byte, and thus completes a read sequence of the total counter value. In reading either the counter register or alternate counter register, if the most significant byte is read, the least significant byte must also be read in order to complete the sequence.

The free running counter cannot be loaded or stopped by the program. During a power-on-reset or device reset, the counter is set to $FFFC and begins running after the oscillator start-up delay. Because the counter is 16 bits and is preceded by a fixed divide-by-four prescaler, the value in the counter repeats every 262,144 MPU phase 2 clock cycles. When the counter rolls over from $FFFF to $0000, the timer overflow flag bit (TOF) is set. An interrupt can also be enabled when counter rollover occurs by setting its interrupt enable bit (TOIE).

Figures 43D, 44:
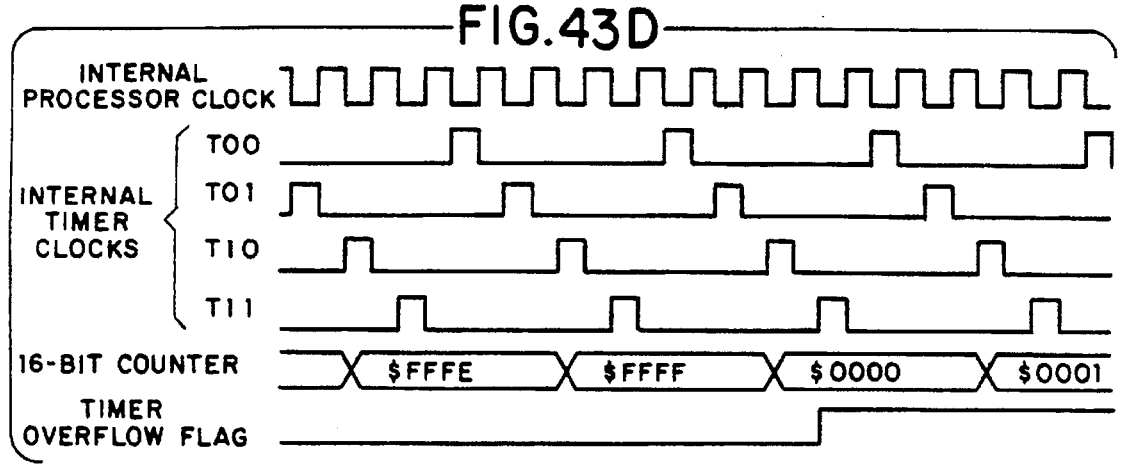

The programmable timer capabilities are provided by using the following twelve addressable 8-bit registers. Note that the names high and low represent the significance of the byte. The format of these registers is shown in FIG. 44.

The timer has two 16-bit output compare registers. Each consists of two 8-bit registers. The primary output compare register consists of TOCH and TOCL, with TOCH the most significant byte. The secondary output compare register is TSCH and TSCL. These output compare registers can be used for several purposes such as controlling output waveforms or indicating when a period of time has elapsed. These registers are unique in that all bits are readable and writeable and are not altered by the timer hardware. Reset does not affect the contents of these registers, and if the compare function(s) are not utilized, the four bytes of these registers can be used as storage locations.

The contents of each output compare register is compared with the contents of the free running counter every fourth rising edge of the phase 2 clock. If a match is found, the corresponding output compare flag (POCF or SOCF) bit is set and the corresponding output level (PLVL or SLVL) bit is clocked to the appropriate output level latch. The values in the output compare register and the output level bit should be changed after each successful comparison in order to control an output waveform or establish a new elapsed timeout. An interrupt can also accompany a successful output compare, provided the corresponding interrupt enable bit, OCIE, is set.

After a processor write cycle to the output compare register containing the most significant byte (TOCH or TSCH), the corresponding output compare function is inhibited until the least significant byte is also written. The user must write both bytes if the most significant byte is written. A write made only to the least significant byte will not inhibit the compare function. The free running counter is updated every four internal phase 2 clock cycles due to the internal prescaler. The minimum time required to update the output compare register is a function of the software program rather than the internal hardware.

A processor write may be made to either byte of the output compare register without affecting the other byte. A valid output compare must occur before the output level bit becomes available at the output compare pin: TCMP.

Because neither the output compare flag (POCF SOCF) or output compare registers are affected by reset, care must be exercised when initializing the output compare function with software. The following procedure is recommended:

1. Write to the high byte of the output compare register to inhibit further compares until the low byte is written.
2. Read the timer status register to clear the output compare flag if it is already set.
3. Write to the low byte of the output compare register to enable the output compare function with the output compare flag clear.

The objective of this procedure is to prevent the output compare flag from being set between the time it is read and the write to the output compare register. A software example is shown below.

| B7 | 16 | STA | OCMPHI | INHIBIT OUTPUT COMPARE |
| B6 | 13 | LDA | TSTAT | ARM OCF BIT IF SET |
| BF | 17 | STX | OCMPLD | READY FOR NEXT COMPARE |

The two 8-bit registers (TICH, TICL) which make up the 16-bit input capture register, are read-only and are used to latch the value of the free running counter after a defined transition is sensed by the input capture edge detector. The level transition which triggers the counter transfer is defined by the input edge bit (IEDG). Reset does not affect the contents of the input capture registers.

Figure 12A:
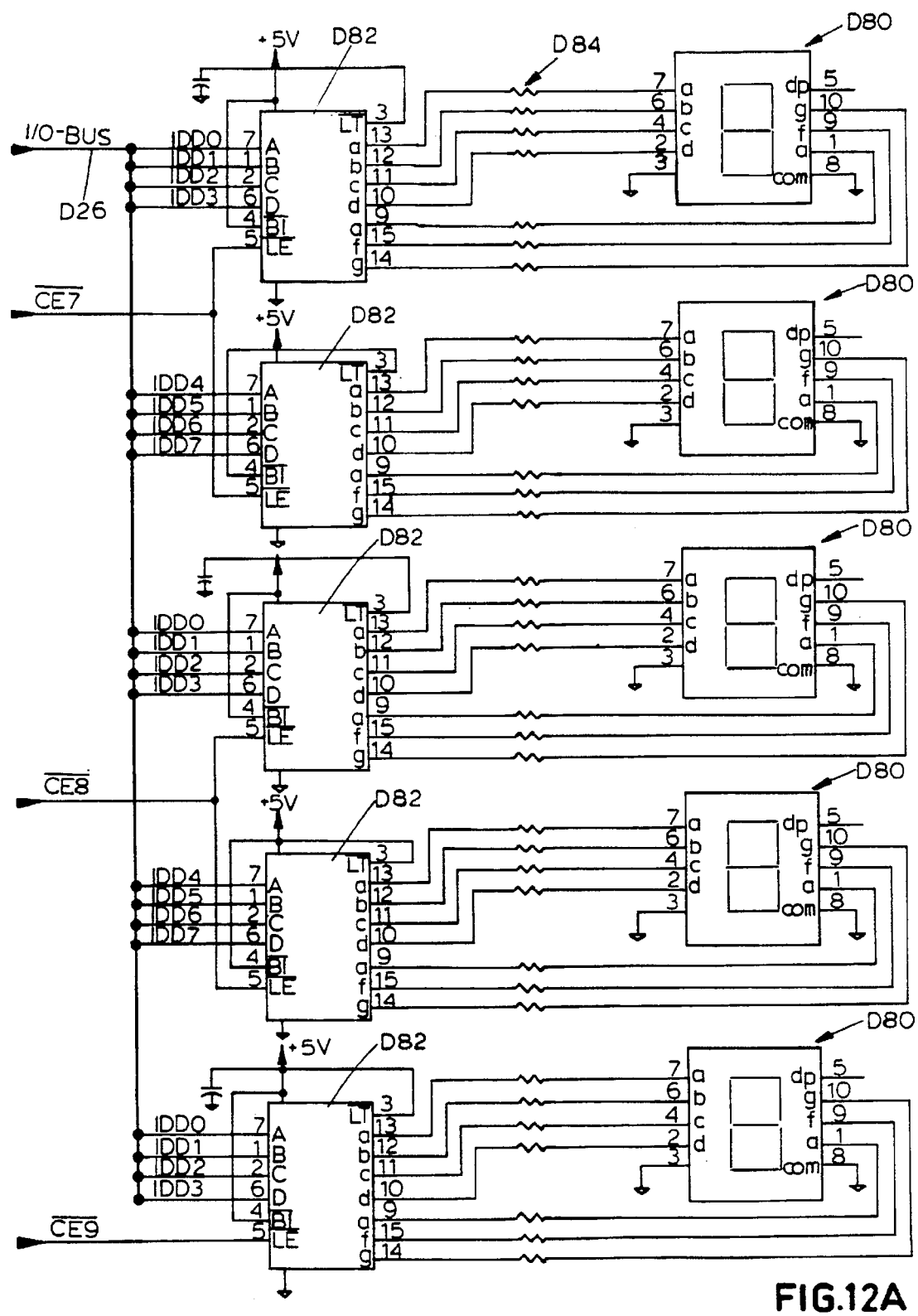
Figure 12B:
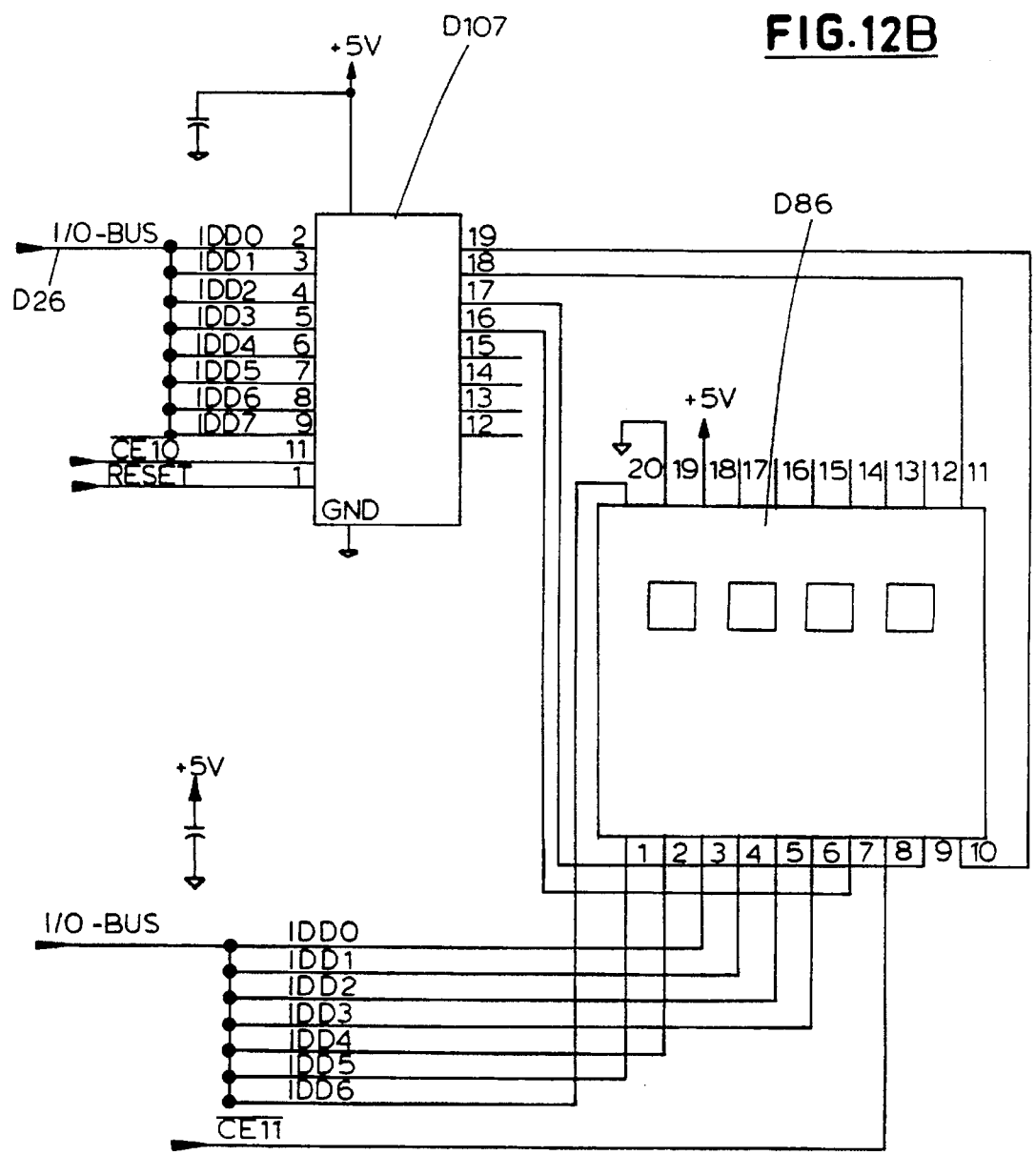

The result obtained by an input capture will be one more than the value of the free running counter on the rising edge of the phase 2 processor clock preceding the external transition (refer to the timing diagram shown in FIG. 12). This delay is required for internal synchronization. Resolution is affected by the prescaler allowing the timer to only increment every four phase 2 clock cycles.

The free running counter contents are transferred to the input capture register on the proper signal transition regardless of whether the input capture flag (ICF) is set or clear. The input capture register always contains the free running counter value which corresponds to the most recent input capture.

After a read of the most significant byte (TICH) of the input capture register, counter transfer is inhibited until the least significant byte of the register is also read. This characteristic forces the minimum pulse period attainable to be determined by the time used in the capture software routine and its interaction with the main program. For example, a polling routine using instructions such as BRSET, BRA, LDA, STA, INCX, CMPX, and BEQ might take 34 internal phase 2 cycles to complete. The free running counter increments every four processor clock cycles due to the prescaler.

A read of the least significant byte (TICL) of the input capture register does not inhibit the free running counter transfer. Minimum pulse periods are ones which allow software to read the least significant byte and perform needed operations. There is no conflict between the read of the input capture register and the free running counter transfer since they occur on opposite edges of the internal processor clock.

TIMER CONTROL REGISTER

The timer control register (TCR) is a read-write register which contains five control bits. Three of these bits control interrupts associated with each of the three flag bits found in the timer status register. The other two bits control: 1) which edge is significant to the capture edge detector; and 2) the next value to be clocked to the output level latch in response to a successful output compare. The timer control register and the free running counter are the only sections of the time affected by reset. The output compare pin (SCMP) is forced low during external reset and stay low until a valid compare changes it. The timer control register bit assignment is defined in FIG. 44.

TCR[0]: Primary Output Level (PLVL). The value of the primary output level bit (PLVL) is clocked into its output level latch by a successful output compare and will appear on the output compare pin PCMP. PLVL and the primary output level latch are cleared by reset. A zero in PLVL produces a low output level on PCMP.

TCR[1]: Input Edge Polarity (IEDG). The value of the input edge (IEDG) bit determines which level transition on the PD7/TCAP pin will trigger a free running counter transfer to the input capture register. Reset does not affect the IEDG bit. A zero selects the falling edge.

TCR[2]: Secondary Output Level (SLVL). The value of the secondary output level bit (SLVL) is clocked into its output level latch by a successful output compare and will appear on the secondary output compare pin SCMP. SLVL and the primary output level latch are cleared by reset. A zero in SLVL produces a low output level on SCMP.

TCR[4]: Secondary Output Compare Interrupt Enable (SCIE). If the secondary output compare interrupt enable (SCIE) bit is set, a timer interrupt is enabled whenever the SOCF status flag is set. If the SCIE bit is clear, the interrupt is inhibited. This bit is cleared by reset.

TCR[5]: Timer Overflow Interrupt Enable (TOIE). If the timer overflow interrupt enable (TOIE) bit is set, a timer interrupt is enabled whenever the TOF status flag (in the timer status register) is set. If the TOIE bit is clear, the interrupt is inhibited. The TOIE bit is cleared by reset.

TCR[6]: Primary Output Compare Interrupt Enable (OCIE). If the primary output compare interrupt enable (OCIE) bit is set, a timer interrupt is enabled whenever the POCF status flag is set. If the OCIE bit is clear, the interrupt is inhibited. This bit is cleared by reset.

TCR[7]: Input Capture Interrupt Enable (ICIE). If the input capture interrupt enable (ICIE) bit is set, a timer interrupt is enabled when the ICF status flag (in the timer status register) is set. If the ICIE bit is clear, the interrupt is inhibited. The ICIE bit is cleared by reset.

TIMER STATUS REGISTER

The timer status register (TSR) is a 4-bit register containing read-only status information. These four bits indicate the following:

A proper transition has taken place at the TCAP pin with an accompanying transfer of the free running counter contents to the input capture register.

A match has been found between the free running counter and one of the output compare registers.

The free running counter contains $FFFF (timer overflow).

The timer status register is illustrated in FIG. 44. The timing diagrams shown in FIG. 43 illustrate the timing relationships to the timer status register bits.

TSR[4]: Secondary Output Compare Flag (SOCF). The secondary output compare flag (SOCF) is set when the primary output compare register matches the contents of the free running counter. The SOCF is cleared by accessing the timer status register (with SOCF set) and then writing the low byte of the secondary output compare register. Reset does not affect the secondary output compare flag.

TSR[5]: Timer Overflow Flag (TOF). The timer overflow flag (ROF) bit is set by a transition of the free running counter from $FFFF to $0000. It is cleared by accessing the timer status register (with TOF set) followed by an access of the free running counter least significant byte. Reset does not affect the TOF bit.

TSR[6]: Primary Output Compare Flag (POCF). The primary output compare flag (POCF) is set when the primary output compare register matches the contents of the free running counter. The POCF is cleared by accessing the timer status register (with POCF set) and then writing the low byte of the primary output compare register. Reset does not affect the primary output compare flag.

TSR[7]: Input Capture Flag (ICF). The input capture flag (ICF) is set when the selected edge has been sensed by the input capture edge detector. It is cleared by a processor access of the timer status register (with ICF set) followed by accessing the low byte of the input capture register. Reset does not affect the input compare flag.

Accessing the timer status register satisfies the first condition required to clear any status bits which happen to be set during the access. The only remaining step is to provide an access of the register which is associated with the status bit. Typically, this presents no problem for the input capture and output compare function.

A problem can occur when using the timer overflow function and reading the free running counter at random times to measure an elapsed time. Without incorporating the proper precautions into software, the timer overflow flag could unintentionally be cleared if: 1) the timer status register is read or written when TOF is set; and 2) the least significant byte of the free running counter is read but not for the purpose of servicing the flag. The counter alternate register contains the same value as the free running counter; therefore, this alternate register can be read at any time without affecting the timer overflow flag in the timer status register.

During the WAIT instruction, the programmable timer continues to operate normally and may generate an interrupt to trigger the CPU out of the wait state. The STOP instruction has been disabled in the IC 10.

5. Serial Peripheral Interface 54

The serial peripheral interface (SPI) subsystem 54 is designed to provide efficient connection of peripheral devices that communicate over a serial bus. It may also be used for interprocessor communication in a multiprocessor system. The SPI supports several versatile operating modes that permit connection of devices that communicate using various protocols. The SPI is essentially an 8-bit shift register with separate pins for incoming and outgoing data, a pin for clock, and a fourth pin for device select functions. The following features are supported by the SPI: full duplex, three-wire synchronous transfers; master or slave operation; four programmable master bit rates; programmable clock polarity and phase; end of transmission interrupt flag; write collision flag protection; and master-master mode fault protection capability.

The SPI is controlled by three registers SPD, SPSR and SPCR located at memory addresses: $0C, $0B and $0A, respectively.

The SPI can be used in two basic types of systems: single master and multi-master. FIG. 45 illustrates the basic connections for both of these system types. As shown, the MOSI, MISO and SCK pins are all wired to equivalent pins on each of the four devices. The master device generates the SCK clock, and the slaves all receive it. Slave device selection is accomplished by three port pins wired to the three individual slave select pins on the slave devices. A slave device is selected when the master pulls its SSN pin low. As the master transmits data on MOSI (output), selected slaves receive it on MOSI (input). Care must be taken if multiple slaves are selected to avoid bus contention on MISO. Only one slave device can drive the MISO pin. As data is shifted out of the master on MOSI, it is shifted in on MISO. If the slave device is receive only, it needs no connection to MISO.

A more complex multi-master system is shown in FIG. 46. Here the slave select lines are generated by more than one potential master device. Only one master may control the select lines at any one time. An exchange of master control must be implemented using a handshake method through the I/O ports or by an exchange of coded messages through the serial peripheral interface system. The major device control that is used in this system is the MSTR bit in the SPCR and the MODF bit in the SPSR.

Four pins are connected to the serial peripheral interface subsystem 54. Operation of two of these pins (MOSI and MISO) is dependent on the SPI data pin mask option selected.

Figure 47:
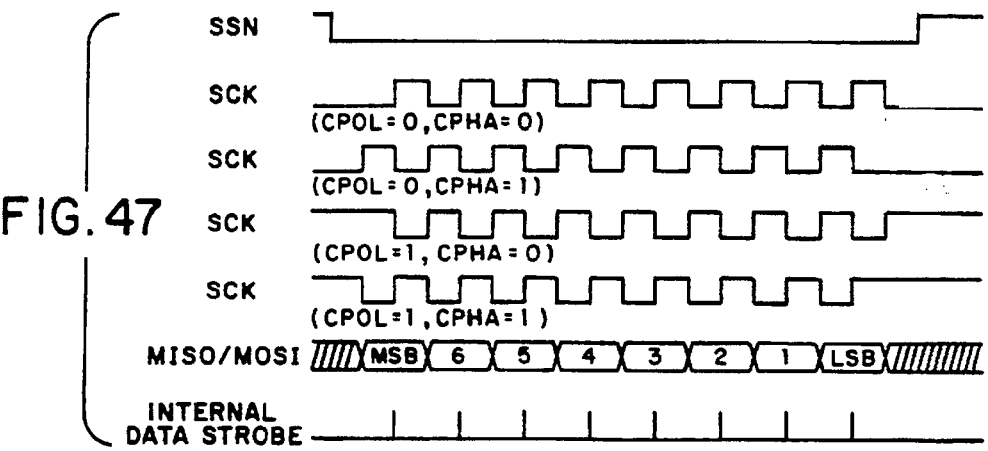
FIG. 47 are clock and data timing diagrams for the SPI illustrated in FIG. 46.

MOSI; Master Out Slave In. Operation of this pin is determined by the SPI data pin mask option selected. If the bidirectional option is selected, the MOSI pin is bidirectional and is configured as a data output in a master mode device and as a data input in a slave mode device. If the unidirectional option is selected, the MOSI pin is always an output. Data is transferred serially from a master to a slave device on this line; most significant bit first. The timing diagrams of FIG. 47 show the relationship between data and clock (SCK). As shown, four possible timing relationships may be chosen by using control bits CPOL and CPHA. The master device always allows data to be applied on the MOSI pin a half-cycle before the clock edge in order for the slave device(s) to latch the data. It should be noted that both the master and slave devices must be programmed for similar timing modes for proper data transfer.

When the master device transmits data to a slave device via the MOSI line, the slave responds by sending data to the master device using its MISO pin if the bidirectional option is selected; or its MOSI pin, if the unidirectional option is selected. This full duplex transmission is synchronized with the same clock edge for both transmission and reception of data. The internal data strobe always uses the opposite phase of the clock from the edge used to shift data in and out. The byte transmitted is replaced by the byte received and eliminates the need for separate transmit-empty and receiver-full status bits. A single status bit (SPIF) is used to signify that the I/O operation is complete.

Configuration of the MOSI pin is a function of the MSTR bit in the SPCR and the selected SPI data pin mask option. If the mask option selected is unidirectional, the MOSI pin is always an output. If the mask option selected is bidirectional, the MOSI pin is an output when the MSTR bit is a one and an input when the MSTR bit is a zero.

MISO: Master In Slave Out. Operation of this pin is determined by the SPI data pin mask option. If the bidirectional mask option is selected, the MIXO pin is bidirectional and is configured as a data input in a master mode device and as a data output in a slave mode device. If the unidirectional mask option is selected, the MISO pin is always an input. In this manner, data is transferred serially from a slave to a master, most significant bit first. When configured as a slave, the MISO and MOSI pins are placed in the high-impedance state if not selected by a low on the SSN pin. As shown in FIG. 47, four timing relationships are possible by using the control bits CPOL and CPHA. The master device always applies data on the MOSI line a half-cycle before the selected clock edge on SCK in order for the slave to have adequate data setup time.

When the master mode device transmits data to a slave mode device via the master's MOSI pin, the slave device responds by sending data to the master via the master's MISO pin. This full duplex transmission synchronizes both data out and data in with the same clock edge of the SCK supplied by the master device. A single status bit (SPIF) in the SPSR is used to signify that the I/O operation is complete.

In the master mode device, the MSTR control bit in the SPCR is set to a one by the program to configure the device to receive data on its MISO pin. In the slave device, its MISO pin (or MOSI pin of unidirectional mask option is selected) is enabled by the low level on the SSN pin. If SSN is high in a slave mode device, the MISO and MOSI pins are placed in the high-impedance state.

SCK: Serial Clock. The serial clock is used to synchronize the movement of data both in and out of the device through its MOSI and MISO pins. The master and slave devices are capable of exchanging a data byte of information during a sequence of eight clock pulses. Since the SCK is generated by the master mode device, the SCK pin becomes an input on all slave devices and synchronizes slave data transfer. The type of clock and its relationship to data are controlled by the CPOL and CPHA bits in the SPCR discussed below. Refer to FIG. 47 for timing.

The master mode device generates the SCK through a circuit driven by the internal processor clock. Two bits (SPR0 and SPR1) in the SPCR of the master device select the clock rate. The master device uses the SCK to latch incoming slave device data on the MISO line and shifts out data to the slave mode device on the MOSI pin. Both master and slave mode devices must be operated in the same timing mode as controlled by the CPOL and CPHA bits in the SPCR. In the slave mode device, SPR0 and SPR1 have no effect on the operation of the SPI.

SSN: Slave Select. This low-true input pin is used to enable slave mode device data transfer. To ensure that data will be accepted by a slave mode device, the SSN pin must be low prior to occurrence of SCK and must remain low until after the last (eighth) SCK cycle. FIG. 47 illustrates the relationship between SCK and the data for different combinations of CPHA and CPOL. When SSN is first pulled low in a slave mode device, the following events occur:

1. The appropriate output pin is driven with the first data bit. If the SPI data pin option is bidirectional, this is the MISO pin. If the unidirectional option is selected, this is the MOSI pin.
2. The slave mode device is prevented from writing to its data register when CPHA=0.

The description of the WCOL status flag in the SPSR contains more information of the effects that the SSN input and CPHA have on the I/O data register. A high on SSN in the slave mode device forces the appropriate output pin to the high-impedance state. Also, SCK and the appropriate input pin are ignored by a slave mode device when its SSN pin is high.

When a device is in the master mode, it constantly monitors its SSN input for a low level. The master device will become a slave mode device any time its SSN input is driven low. This ensures that there is only one master controlling the SSN line for a particular system. When the SSN pin is detected to be low, it clears the MSTR bit in the SPCR. Also, control bit SPE in the SPCR is cleared, which causes the SPI to be disabled. The MODF flag bit in the SPSR is also set to indicate to the program that another device is attempting to become a master. Two devices attempting to be masters is normally the result of a software error; however, a system could be constructed which would employ this error detection to provide a 'backup master' to restart a faulted system.

INTERFACE REGISTERS

Figure 48:
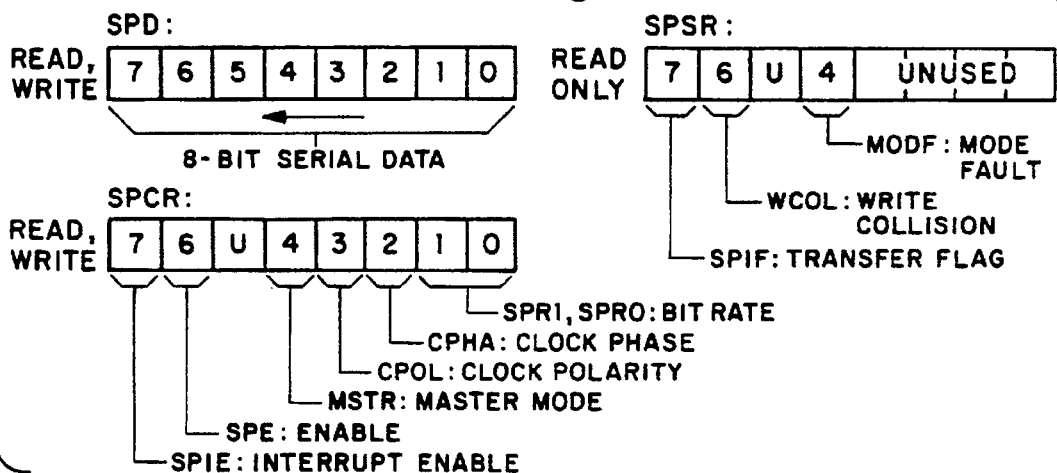
FIG. 48 is a format diagram for the SPI interface registers SPD, SPSR and SPCR which form a portion of the IC in accordance with the present invention.

The SPI is controlled by three registers: SPD, SPSR, and SPCR. These registers provide control, status and data storage functions for the SPI. FIG. 48 defines the registers formats.

SPD: Serial Data Register. This 8-bit read-write register is used to transmit and receive data on the synchronous serial bus. Only a write to this register will initiate transmission and reception of another byte and this will only occur in the master mode device. A slave mode device writing to its SPD register will not initiate a transmission. At the completion of transmitting a byte of data, the SPIF status bit is set in both the master and slave's SPSR. A write or read of the SPD, after accessing the SPSR with SPIF set will clear the SPIF.

During the clock cycle that the SPIF bit is being set, a copy of the received data byte in the shift register is moved to a buffer. When the program reads the SPR, the buffer is actually read. During an overrun condition, when the master device has sent several bytes of data and the slave device has not internally responded to clear the first SPIF, only the first byte is contained in the receive buffer of the slave device; all others are lost. The program may read the buffer at any time. The first SPIF must be cleared by the time a second transfer of data from the shift register to the read buffer is initiated, or an overrun condition will exist.

A write to the SPD is not buffered and places data directly into the shift register for transmission. The ability to access the SPD is limited when a transmission is in progress. It is important to read the discussion defining the WCOL and SPIF status bits to understand the limits on using the SPD.

SPSR: SPI Status Register. This 3-bit, read-only register is used to indicate the operational status of the SPI. Two of these status flags (SPIF and MODF) will generate an interrupt when set if interrupts are enabled by the SPIE control bit in the SPCR.

SPSR[7]—SPIF: Transfer Flag. This status flag indicated that a data transfer between the device and an external device has been completed. With the completion of the transfer, SPIF is set, and if SPIE=1, an SPI interrupt is generated. During the clock cycle that SPIF is being set, a copy of the received data byte in the shift register is moved to the receive buffer register. When the SPD is read, it is the receive buffer register that is actually read. During an overrun condition, when the master device has sent several bytes of data and the slave device has not responded to the first SPIF, only the first byte sent is contained in the receive buffer register and all others are lost.

The transfer of data is initiated by the master mode device writing to its SPD. Clearing the SPIF is accomplished by a software sequence of accessing the SPSR while SPIF is set, followed by a write or read of the SPD. While SPIF is set, all writes to the SPD are inhibited until the SPSR is read. This occurs in the master device. In the slave device, SPIF can be cleared using a similar sequence during a second transmission; however, it must be cleared before the second SPIF in order to prevent an overrun condition. The SPIF bit is cleared by reset.

SPSR[6]—WCOL: Write Collision. This operation flag is set when an attempt is made to write to the SPI data register (SPD) while data transfer is taking place. The transfer continues uninterrupted, and the write operation will be unsuccessful. A read collision will never occur, since the received data byte is placed in the receiver buffer register in which access is always synchronous with the processor operation. If a write collision occurs, WCOL is set, but no SPI interrupt is generated until the transfer has been completed. The WCOL bit is a status flag only.

Clearing the SCOL is accomplished by a software sequence of accessing the SPSR while WCOL is set, followed by 1) a read of the SPD prior to the SPIF bit being set, or 2) a read or write of the SPD after the SPIF bit is set. A write to the SPD prior to the SPIF bit being set will result in generation of another WCOL status flag. Both SPIF and WCOL bits will be cleared in the same sequence. If a second transfer has started while trying to clear the previously set SPIF and WCOL bits with a clearing sequence containing a write to the SPD only the SPIF bit will be cleared.

A collision of a write to the SPD, while an external data transfer is taking place can occur in both the master mode and the slave mode of operation, although, with proper programming the master device should have sufficient information to preclude this collision. Collision in the master mode device is defined as a write of the SPD while the internal clock (SCK) is in the process of transfer. The signal on the SSN pin must always be high on the master mode device.

A collision in a slave device is defined in two separate modes.

One problem arises in a slave device when the CPHA control bit is zero. When CPHA is zero, data is latched with the occurrence of the first clock transition. The slave device does not have any way of knowing when that transition will occur; therefore, the slave device collision occurs when it attempts to write the SPD after its SSN pin has been pulled low. The SSN pin of the slave freezes the data in its SPD and does not allow it to be altered if the CPHA bit is zero. The master device must raise the SSN pin of slave devices between each byte it transfers.

The second collision mode is defined for the state of the CPHA equal to one. With CPHA set, the slave device will be receiving a clock (SCK) edge prior to the latch of the first data transfer. This first clock edge will freeze the data in the slave's SPD and drive the most significant bit of the register onto the MISO pin of the slave mode device. The SSN pin low state enables the slave device, but the MISO pin enable does not take place until the first SCK clock edge. The WCOL bit will only be set if the SPD is accessed while a transfer is taking place. By definition of the second collision mode, a master device might hold a slave's SSN pin low during a transfer of several bytes of data without a problem.

A special case of WCOL occurs in the slave device. This happens when the master device starts a transfer sequence (an edge or SCK for CPHA=1; or an active SSN transition for CPHA=0) at the same time the slave device processor is writing to its SPD. In this case, the data byte written by the slave processor is lost and the previous contents of the SPD will be transferred to the master mode device's SPD. Because the master mode device receives back the last byte transmitted to the slave, the master device can detect that a fatal collision occurred if the software protocol is appropriately designed.

Since the slave mode device is operating asynchronously with the master device, the WCOL bit may be used as an indicator of a collision occurrence. The software communication protocol should be designed to accommodate the collisions that may be generated by this asynchronous operation.

The WCOL bit is cleared by reset.

SPSR[4]—MODF: Mode Fault. The function of this flag is defined for the master mode of operation. If the device is a slave, the MODF bit will be prevented from toggling from a zero to a one; however, this does not prevent the device from being in the slave mode with MODF set. The MODF bit is normally zero and is set only when the master device has its SSN pin pulled low. Setting the MODF bit affects the internal SPI subsystem in the following ways:

1. MODF is set and an SPI interrupt is generated if SPIE=1.
2. The SPE bit is forced to zero. This blocks all output drive on the SCK, MOSI and MISO pins. The SPI subsystem is disabled.
3. The MSTR bit is forced to zero, thus placing the device in the slave mode.

Clearing the MODF is accomplished by a software sequence of accessing the SPSR while MODF is set followed by a write to the SPCR. Control bits SPE and MSTR may be restored to their original set state during this clearing sequence, or after the MODF bit has been cleared. The hardware does not allow the program to set the SPI and MSTR bit while MODF is a one, unless it is during the proper clearing sequence. The MODF flag bit indicates that there might have been a multi-master conflict for system control and allows a proper exit from system operation to a reset or default system state. The MODF bit is cleared by reset.

SPCR: SPI Control Register. This 7-bit is used to control operation of the SPI subsystem. It is implemented as a read/write register to permit read-modify-write instructions to properly manipulate bits.

SPCR[7]—SPIE: Interrupt Enable. When this bit is a one, it allows the occurrence of a processor interrupt. An interrupt will be generated when either SPIF or MODF is set. If SPIE is zero, it will not inhibit the setting of these status bits, but an interrupt will not be generated. The SPIE bit is cleared to zero by reset.

SPCR[6]—SPE: SPI Enable. When this bit is set to one, the SPI subsystem is enabled. SPI pins that are defined as outputs are enabled. When SPE is zero, all SPI pin drive is inhibited. This bit is cleared to zero by reset.

SPCR[4]—MSTR: Master Enable. The master enable bit (MSTR) determines whether the SPI is in master or slave mode. If the MSTR bit is zero, the device is in slave mode. If the master mode is selected (MSTR=1), the function of the SCK pin changes from an input to an output, and the function of the MISO and MOSI pins are reversed. This allows multi-master systems to be constructed without external logic to reconfigure I/O pins. The MSTR bit is cleared by reset, placing the SPI in the slave mode 4 on power-up.

SPCR[3]—CPOL: Clock Polarity. The clock polarity bit controls the normal, or steady state, level of the clock when data is not being transferred. The CPOL bit affects both the master and slave modes of operation. It must be used in conjunction with the clock phase control bit (CPHA) to produce the wanted clock-to-data relationship between a master and slave device. When CPOL is zero, it produces a steady state low on the SCK pin of the master mode device. If CPOL is one, a high is output on SCK when not transferring data. The CPOL bit is not affected by reset.

SPCR[2]—CPHA: Clock Phase. This bit controls the relationship between the data on the MISO and MOSI pins and the clock produced or received at the SCK pin. This control bit has effect in both the master and slave modes of operation. It must be used in conjunction with the clock polarity control bit (CPOL) to produce the desired clock-to-data relationship. The CPHA bit selects the clock edge used to capture data in the shift register. If CPHA is a zero, data is captured on the falling edge of SCK. If CPHA is a one, data is captured on the falling edge. See FIG. 47 for waveform details. CPHA is not affected by reset.

SPCR[L-0]—SPRL, SPR0: Bit Rate. These two control bits select one of four communication bit rates to be used as SCK if the device is in master mode. They have no effect in slave mode, since the clock is generated externally by the master device. The slave mode is capable of shifting data in and out at a maximum rate which is equal to the processor's P2 (bus) clock. Table 16 defines the encoding of these two control bits SPR1 and SPR0 are not affected by reset.

TABLE 16

| | | SPI BIT RATE | |
| --- | --- | --- | --- |
| SPR1 | SPR0 | Processor Clock Divide By: | Crystal Clock Divide By: |
| 0 | 0 | 2 | 4 |
| 0 | 1 | 4 | 8 |
| 1 | 0 | 16 | 32 |
| 1 | 1 | 32 | 64 |

6. Port D

In the non-expanded mode, Port D 57 is an 8-bit bidirectional input–output port. The eight Port D pins can be individually programmed as input or output. In the expanded memory mode, Port D 57 contains the external 8-bit data bus multiplexed with the low-order eight address lines.

NON-EXPANDED MODE

When the expansion control pin (EXPN) is high, Port D 57 operates as a fully programmable I/O port.

INTERFACE REGISTERS

Figure 49:
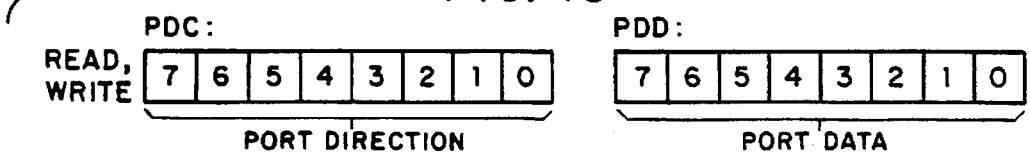
FIG. 49 is a format diagram for the PORT D interface registers PDC and PDD which form a portion of the IC in accordance with the present invention.

The Port D subsystem 57 communicates with the microcontroller through a set of two registers (PDD, PDC) located in memory address space. The direction of each port bit is determined by PDC, while the state of the port pins is controlled by PDD. See FIG. 49.

PDC[7 . . . 0]: Port Direction

These eight, read-write register bits are used to control the direction of the corresponding port pin. The port pin is an input if the port direction bit is zero. At reset, the port direction bits are cleared to zero, defining the port pins as inputs.

PDD[7 . . . 0]: Port Data

Figure 50:
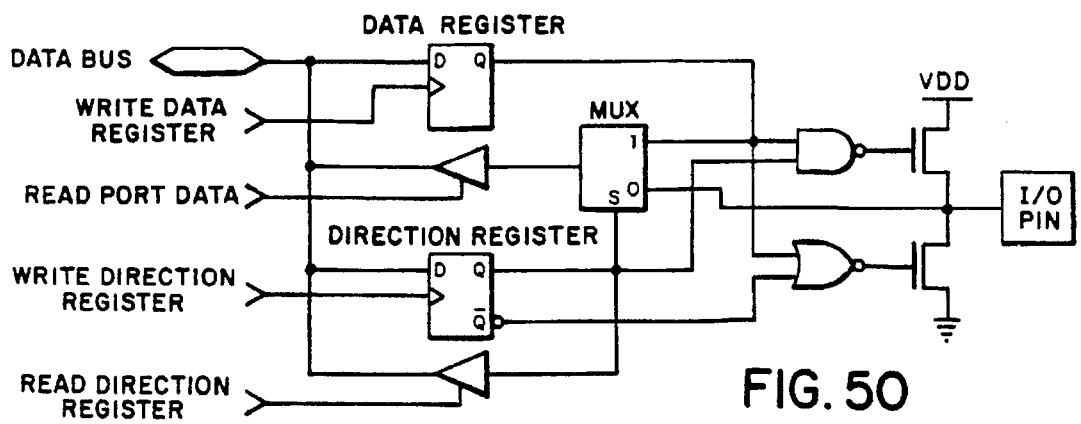
FIG. 50 is a block diagram of a parallel port which forms a portion of the IC in accordance with the present invention.

These eight, read-write register bits are used to read the state of the port pin if an input, and to control the state of a port pin if it is an output. A zero corresponds to an electrical low on the port pin. Bits are assigned sequentially, with PDD[0] controlling pin PD0. Device reset does not affect the data register. FIG. 50 illustrates the parallel port I/O circuitry. These bits are not true read-write register bits under all conditions. If the direction is out (PDC[n]=1), the PDD[n] bit operates as a true read-write register. If the direction is in (PDD[n]=0), the read source is the port pin, not the port data register bit.

PORT OPERATION

Each of the eight bits of the port operates independently of the others. The following paragraphs describe the operation of a single port bit.

Each port pin can be programmed to be either an input or output as determined by the appropriate port direction register bit. A pin is configured as an input if its associated port direction register bit is set to zero. At power-on or reset, all port direction register bits are cleared, which configure the eight port pins as inputs. When a port direction register bit is set, the port pin becomes an output, driving the state of the port data register bit onto the port pin. A one in the port data register causes a high on the port pin. When the port data register is written, the eight data bits are latched in the port data register.

When the port data register is read, the source of the data is determined by the port direction register as follows:

If the port pin is configured as an output, the read operation data source is the port data register, not the port pin.

If the port pin is configured as an input, the read operation data source is the port pin itself. This prevents read-modify-write operations from altering the state of output pins that may be loaded by external circuitry.

Whenever a port pin's direction is changed to output, its data register should be loaded with the desired output state prior to direction change. Read-modify-write operations can alter the state of data register bits configured as inputs.

EXPANDED MODE

When the expansion control pin (EXPN) is low, Port D 57 is used to multiplex both the data bus and the low-order eight address bits. The Port D pins change definition on the falling edge of the OS1 signal. They are outputs and contain address information when PH2 is asserted. When PH2 is negated, they are bidirectional and contain data.

Addresses should be latched on the falling edge of the address latch enable signal; ALE. The address latch should be implemented with a transparent latch that is transparent while in clock signal is high.

The port pins are driven with output data while PH2 is low. Output data may be latched on the rising edge of the low-true write strobe signal; WEN. If the memory cycle is a read operation, the port pins are tri-stated while PH2 is low. External memory devices should use one of the low-true read strobe signals: REN or PSEN, to drive read data onto the Port D pins. Read data will be latched on the rising edge of REN or PSEN. The REN read strobe is used for memory resources (typically RAM) in the memory address range of $4000 to $7FFF. The PSEN read strobe is used for memory resources (typically PROM) in the memory address range of $8000 to $FFFF. If the read operation is from an internal memory resource, Port D will be driven with the contents of the internal data bus.

7. Port B

In the non-expanded mode, Port B 53 is an 8-bit bidirectional input–output port. The eight Port B pins can be individually programmed as input or output. In the expanded memory mode, Port B contains the high-order eight address lines.

NON-EXPANDED MODE

If the IC 10 is in the non-expanded (single chip) mode, operation of this port is identical to the operation of Port D 57. In this mode, Port B is an 8-bit bidirectional input–output port. The eight Port B pins can be individually programmed as input or output.

INTERFACE REGISTERS

The Port B subsystem 53 communicates with the microcontroller through a set of two registers (PBD, PBC) located in memory address space. The direction of each port bit is determined by PBC, while the state of the port pins is controlled by PBD. See FIG. 51.

PBC[7 . . . 0]: Port Direction. These eight read-write register bits are used to control the direction of the corresponding port pin. The port pin is an input if the port direction bit is zero. At reset, the port direction bits are cleared to zero, defining the port pins as inputs.

PBD[7 . . . 0]: Port Data. These eight read-write register bits are used to read the state of the port pin if an input, and to control the state of a port pin if it is configured as an output. A zero corresponds to an electrical low on the port pin. Bits are assigned sequentially, with PBD[0] controlling pin PB0. Device reset does not affect the data register.

EXPANDED MODE

If the IC 10 is in the expanded mode (EXPN low), Port B 53 is an output port containing the high-order address lines. Addresses will change at the rising edge of PH2.

8. Port C

Port C 56 is an 8-bit bidirectional input–output port. The eight Port C pins can be individually programmed as input or output. Four can be assigned specialized output functions by the configuration register, CFR.

CONFIGURATION REGISTER

Four CFR bits control the function of the low-order four Port C pins as shown in FIG. 37.

CFR[3 . . . 0]: Comparator Mode Control. These four write-only configuration bits enable the comparator outputs to be ORed with the least-significant four bits of the Port C data register: PCD[3 . . . 0]. A zero in these configuration bits enables the OR operation and sets the respective port control register (PCC[3 . . . 0]) bit to a one. Device reset places the four port pins in output mode, clears the port data register, and OR's the four data register outputs with the respective comparator outputs. Thus, the four least significant port pins will be driven low if the comparator inputs are above the threshold of +1.25 V. Since the comparator's inverting input is connected to the comparator input pin, there will be an inversion between respective comparator input pins and Port C pins. If a one is written into a Port C data register bit; PCD[3 . . . 0], the port pin will be driven high independent of the comparator input level. A low-order Port C pin cannot be placed in the input mode (PCD[3 . . . 0]=0) if its corresponding comparator mode control (CFR[3 . . . 0]) bit is reset.

A one in these configuration bits disables the OR operation. In this mode, the low order four port pins operate as normal bi-directional I/O pins and are only a function of the port data register (PCD) and port control register (PCC). The configuration bits are assigned in sequential order with CFR[0] controlling PC0/CMP0 and CFR[3] controlling PC3/CMP3.

INTERFACE REGISTERS

The Port C subsystem communicates with the microcontroller through a set of two registers (PCC, PCD) located in memory address space. The direction of each port bit is determined by PCC, while the state of the port pins is controlled by PCD. See FIG. 52.

PCC[7 . . . 0]: Port C Direction. These eight read-write register bits are used to control the direction of the corresponding port pin. The port pin is an input if the port direction bit is zero. At reset, PCC[7 . . . 4] are set to zero and PCC[3 . . . 0] are set to one. This defines the low order four port pins as outputs and the high order four pins as inputs. Bit assignments are in ascending order with PCC[0] assigned to pin PC0 and PCC[7] assigned to pin PC7.

PCC[7 . . . 4]. The high-order nibble of the port control register operates as a normal set of bidirectional port control bits. The following conditions apply:

Reset clears PCC[7 . . . 4].

Writing a zero to a PCC[7 . . . 4] bit will cause the corresponding port pin to become an input, with its state readable by the respective bit in the PCD register.

Writing a one to a PCC[7 . . . 4] bit will cause the corresponding port pin to become an output, with its state driven by the last state written to the respective bit in the PCD register.

Reading PCC[7 . . . 4] will reflect the current state of those bits allowing for bit manipulation using read-modify-write instruction.

PCC[3 . . . 0]. The low-order nibble of the port control register operates differently from the high-order depending on the state of the configuration control register bits CFR[3 . . . 0]. The following conditions apply:

A zero in one of the lower four bits of the CFR (CFR[3 . . . 0]) will set the corresponding bit in the PCC.

Since device reset clears CFR[3 . . . 0], the low-order nibble of the port control register (PCC[3 . . . 0]) will be set after reset.

Writing a zero to one of the lower four bits of the PCC (with the corresponding CFR bit set), will cause the respective port pin to become an input, with the pin's state readable in the data register PCD.

Writing a one to one of the lower four bits of the PCC (with the corresponding CFR bit set), will cause the respective port pin to become an output, with its state driven by the last state written to the appropriate PCD bit.

Writing a one to one of the lower four bits of the PCC will be ignored if the respective bit in the CFR is clear.

Reading the lower four bits of the PCC will reflect the current state of those bits as stored in the PCC allowing for bit manipulation using read-modify-write instructions.

PCD[7 . . . 0]: Port C Data. These eight read/write register bits are used to read the state of the port pins if configured as an input, and to control the state of port pins if it is configured as an output. A zero corresponds to an electrical low on the port pin. Bits are assigned sequentially, with PCD[0] controlling pin PC0. Device reset clears the low order four bits of the data register: PCD[3 . . . 0]. The high order four bits are not changed by reset.

PCD[7 . . . 4]. The high-order nibble of PCD operates as a normal bidirectional port data register. The following conditions apply:

Reset does not affect the upper four bits of the PCD register.

A read of the upper four bits of the PCD will reflect the state of the respective port pin if the corresponding PCC bit is clear (input mode).

A read of the upper four bits of the PCD will reflect the last state of the respective bit in the PCD if the corresponding PCC bit is set (output mode).

9. Port A

Port A 52 is an 8-bit bidirectional input–output port. The eight Port A pins can be individually programmed as input or output. Operation of this port is identical to the operation of Port D in the non-expanded mode.

INTERFACE REGISTERS

The Port A subsystem 52 communicates with the microprocessor 30 through a set of two registers (PAC, PAD) located in memory address space. The direction of each port bit is determined by PAC, while the state of the port pins is controlled by PAD. See FIG. 53.

PAC[7 . . . 0]: Port Direction. These eight read-write register bits are used to control the direction of the corresponding port pin. The port pin is an input if the port direction bit is zero. At reset, the port direction bits are cleared to zero, defining the port pins as inputs.

PAD[7 . . . 0]: Port Data. These eight read-write register bits are used to read the state of the port pin if an input, and to control the state of a port pin if it is an output. A zero corresponds to an electrical low on the port pin. Bits are assigned sequentially, with PAD[0] controlling pin PA0. Device reset does not affect the data register.

10. Communication Controller 29

The communication controller 29 (hereinafter identified as ICC) provides the microprocessor 30 access to an INCOM network as defined in detail in U.S. Pat. No. 4,644,566, hereby incorporated by reference. It provides modem (modulator/demodulator) functions, serialization/deserialization of messages, and implements the required network protocol. The microprocessor 30 communicates with the communication controller 29 through eight interface registers located in memory address space. Four registers are used to transfer INCOM messages between the controller and the microprocessor, while the other four are used to set the communication address, speed, modulation method and to control transmit/receive operations of the INCOM communication controller (ICC) 29.

The ICC is capable of operating both as a master and slave controller. Master operation is inhibited unless a permissive flag is set in the configuration register.

The ICC supports the fast status request message that will reduce network response time. The transmit and receive registers for the ICC are independent of each other. This allows a message such as the fast status to be periodically updated in the transmit registers. Then, when a fast status request is received, the ICC can transmit the response without processor intervention.

Details of the INCOM network protocol are defined below.

CONFIGURATION REGISTER

The ICC 29 is configured by the CFR and ACFR as shown in FIG. 37.

CFR[7]: ICC Master Enable. This permissive bit allows the ICC 29 to be switched into the master mode. A zero in this configuration bit prevents the ICC from entering the master mode of operation. A one permits master operation. This bit is set to zero on reset inhibiting the ICC from being placed in master mode.

ACFR[6]: Divider Ratio. This bit selects the clock divider ratio for the A/D and ICC subsystems. If the ICC subsystem is active, either a 7.3728 MHz or 3.6864 MHz crystal must be used. If a 7.3728 MHz crystal is employed, ACFR[6] must be set to a one.

INTERFACE REGISTERS

Figure 54:
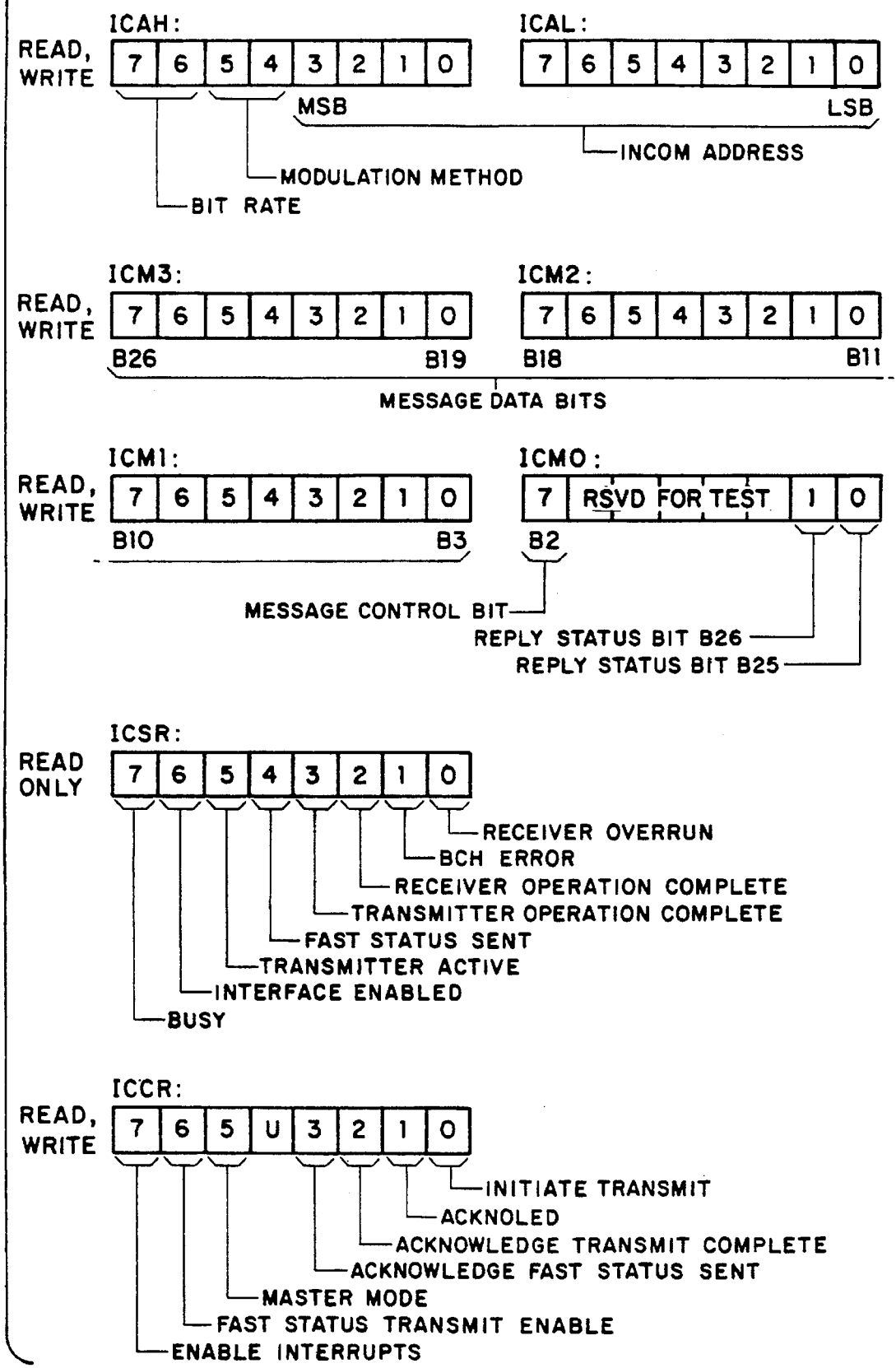
FIG. 54 is a format diagram for the communications controller interface registers ICAH, ICAL, ICM3, ICM2, ICM1, ICM0, ICSR and ICCR which form a portion of the IC in accordance with the present invention.

The microprocessor 30 interface to the ICC 29 consists of eight registers (ICAH, ICAL, ICM3, ICM2, ICM1, ICM0, ICSR and ICCR) located in memory address space. The format of these registers is shown in FIG. 54.

ICAH, ICAL: Address Registers. These two byte-wide, read/write registers are used set the communication bit rate, modulation method and the 12-bit INCOM address for the ICC. FIG. 54 defines the bit assignments for these registers. Both of these registers are set to zero by reset and power-up. These registers should not be altered during normal ICC operation.

ICAH[7,6]: Bit Rate. These two bits determine the communication bit rate of the ICC. Table 17 defines the decoding of this field. These bits are set to zero on power-up or reset.

TABLE 17

| BAUD RATE DECODE | | |
|---|---|---|
| ICAH[7,6] | ASK OPERATION | BASEBAND OPERATION |
| 0 0 | 300 bps | 19.2 kbps |
| 0 1 | 1200 bps | 38.4 kbps |
| 1 0 | 4800 bps | 76.8 kbps |
| 1 1 | 9600 bps | 153.6 kbps |

ICAH[5 . . . 4]: Modulation Method. These two bits determine the modulation method used by the INCOM controller. Table 18 defines the meaning of this field. These bits are set to zero on power-up or reset.

TABLE 18

| MODULATION METHOD DECODE | |
|---|---|
| ICAH[5,4] | MODULATION |
| 0 0 | ASK |
| 0 1 | FSK |
| 1 0 | Baseband |
| 1 1 | Baseband |

ICAH[3 . . . 0]: INCOM Address Bits 11 . . . 8. These four bits determine the high-order four bits of the INCOM address. They are set to zero by reset or power-up.

ICAL[7 . . . 0]: INCOM Address Bits 7 . . . 0. This byte-wide register determines the low-order eight bits of the INCOM address. It is set to zero by reset or power-up.

ICM3 . . . ICM0: Message Registers. These four byte-wide read/write registers are used to transfer INCOM messages between the ICC 29 and the microprocessor 30. They are not true read-write registers, since read operations access the receive buffer register, while write operations write to the transmitter buffer register. The same value will not necessarily be read from a message register location that had previously been written to that register location. For this reason, the read-modify-write instructions should not be used to manipulate these registers. The mapping of INCOM message bits is shown in FIG. 55. The transmitter buffer register is loaded when these registers are written. Reset clears the transmitter buffer register to all zeros.

ICM3[7 . . . 0]. This 8-bit register contains message bits 26 through 19.

ICM2[7 . . . 0]. This 8-bit register contains message bits 18 through 11.

ICM1[7 . . . 0]. This 8-bit register contains message bits 10 through 3.

ICM0[7]. This is the control bit 2 of the INCOM message. The register bit is not a true read-write register, since read operations access the receive buffer register, while write operations write to the transmitter buffer register. The same value will not necessarily be read from this bit that had previously been written.

ICM0[6 . . . 2]. These five bits are reserved for test. During normal operation they will contain arbitrary bits patterns that should be ignored by the program. Writing to them will have no effect on the operation of the INCOM subsystem unless the IC 10 is in the test mode.

ICM0[1 . . . 0]. These two bits contain the two status bits that are transmitted in B26 (ICM0[1]) and B25 (ICM0[0]) of the reply message. These bits are implemented as a true read-write register. The same contents will be read from them as was previously written. These bits are cleared by reset.

ICSR: Status Register. This byte-wide, read-only register contains ICC status flags that the microcomputer needs to communicate with the INCOM communication controller. FIG. 54 defines bit assignments in the status register.

ICSR[7]: Busy. This bit will read as a one whenever the ICC is busy transmitting or receiving a message on the INCOM network.

ICSR[6]: Interface Enabled. This bit will read as a one when the ICC interface is enabled. An ICC in master mode will always have this bit set, since its interface is always capable of transmission.

ICSR[5]: Transmitter Active. This bit will read as a one when the ICC is in the process of transmitting a message. The transmission may have been initiated by software, or by the receipt of a message requiring reply or fast status request. A transmission request (ICCR[0]=1) should not be issued when ICSR[5]=1. Under these conditions, the transmission request will be ignored.

ICSR[4]: Fast Status Sent. This bit will read as a one after the completion of the fast status message transmission. It is cleared by reset and by writing ICCR[3]=1.

ICSR[3]: Transmit Operation Complete. This bit will read as a one after the completion of a message transmission. It is cleared by reset and by writing ICCR[2]=1.

ICSR[2]: Receive Operation Complete. This bit will read as a one after a received message has been loaded into the receive message buffer. It is cleared by reset and writing ICCR[1]=1. The ICC will not begin receiving a new message until ICSR[2]=0.

ICSR[1]: BCH Error. This bit will read as a one after the receipt of a message containing a BCH error. It is cleared by reset and by writing ICCR[1]=1.

ICSR[0]: Overrun. This bit will be set if the message register has not been released (ICSR[2]=1) when a new message is ready to be loaded into the message register. This status bit is cleared by reset and by writing ICCR[1]=1.

ICCR: Control Register. This byte-wide, read-write register is used to control operation of the ICC 29. It has been designed as a read-write register to permit read-modify-write instructions to operate on it correctly. FIG. 54 defines bits assignments in the control register. This register is implemented with two types of register bits: command and control. Command bits will initiate a function when written with a one. They will always read as zero. Control bits can be set and cleared by the software. They will read the current value of the control bit. All control bits are set to zero by reset.

ICCR[7]: Enable Interrupts. This control bit enables interrupt operation of the ICC. When set, transmit and receive operations will generate an interrupt.

ICCR[6]: Fast Status Transmit Enable. This control bit enables automatic response to the fast status request message type. When set, the message stored in the transmit buffer registers will be transmitted following the receipt of the fast status request. The fast status request message has the control bit set (B2=1), an instruction field of 3, a command field of 0, and a subcommand field of either 0 or 1. The address must match the ICC address and the message BCH must be correct. Only devices configured as slaves will respond to the fast status request. Whenever the fast status message stored in the transmit buffer is being updated, ICCR[6] should be reset prior to any change in the buffer registers.

ICCR[5]: Master Mode. This bit, when set, places the INCOM communication controller in the master mode of operation. In the master mode, the ICC is permitted to transmit at any time and will receive all messages, independent of their address. Reply and fast status operations are disabled. ICCR[5] may only be set if CFR[7]=1. Attempts to write a one into ICCR[5] with CFR[7]=0 will fail. This bit is set to zero (slave mode) by reset or power-up ICCR[4]. This control bit is not used.

ICCR[3]: Acknowledge Fast Status Sent. This command bit is used to reset ISCR[4]. ICSR[4] will be reset whenever ICCR[3] is written with a one. ICCR[3] will always read as zero.

ICCR[2]: Acknowledge Transmit Complete. This command bit is used to reset ICSR[3]. ICSR[3] will be reset whenever ICCR[2] is written with a one. ICCR[2] will always read as zero.

ICCR[1]: Acknowledge Received Message. This command bit is used to reset ICSR[2]. ICSR[2] will be reset whenever iCCR[1] is written with a one. ICCR[1] will always read as zero.

ICCR[0]: Initiate Transmit. This command bit, when written with a one, will initiate transmission of the message stored in the transmit buffer registers: ICM3 ... ICM0. The transmitter must not be busy (ICSR[5]=0) and the interface must be enabled (ICSR[6]=1) in order to transmit a message.

INCOM NETWORK

All communication on the INCOM network is in 33-bit messages. The messages are asynchronous transmissions that begin with two start bits and terminate with a single stop bit. Both carrier-based and baseband modulation modes are supported.

CARRIER MODULATION

If the carrier-based modulation method is selected, two compatible modulation schemes are possible: frequency-shift keying (FSK), and amplitude-shift keying (ASK).

ASK: The amplitude-shift keying modulation scheme uses a 115.2 kHz carrier. A message bit is a one if carrier is present and a zero if carrier is not present.

FSK: The frequency-shift keying modulation scheme uses two carrier frequencies. A message bit is a one if the carrier frequency is 115.2 kHz and a zero if the carrier frequency is 92.16 kHz.

These modulation methods are compatible since the INCOM controller only uses FSK for transmission; the receiver's digital demodulator only correlates with the 115.2 kHz carrier. The presence of the 92.16 kHz carrier is not required for correct demodulation. The use of the second carrier frequency is to provide limiter capture in poorly terminated environments when operated at the higher bits rates. An INCOM controller in FSK mode will properly receive messages transmitted in ASK mode as long as echoes are properly terminated. The interval between messages must be a zero (no carrier). During the following discussions, the terms one and zero will be used to denote the state of the communication line to eliminate confusion between ASK/FSK and baseband modulation.

BASEBAND MODULATION

If baseband modulation is selected, the messages are transmitted without carrier in a non-return-to-zero format. If the receiver input (RX) is an electrical low, the message bit is a zero, and a one if an electrical high. The transmit output (TX) is an electrical high for a one and electrical low for a zero. The interval between messages must be a zero (RX low). During the following discussions, the terms one and zero will be used to denote the state of the communication line to eliminate confusion between ASK and baseband modulation.

COMMUNICATION BIT RATES

INCOM networks may be configured to operate at a variety of bit rates depending on the transmission mode selected. Table 19 defines the possible communication bit rates of INCOM networks. Only one transmission mode and one bit rate may be selected for a given INCOM network.

TABLE 19

| INCOM TRANSMISSION MODES AND BIT RATES | |
|---|---|
| ASK/FSK | BASEBAND |
| 300 B/S | 19.2 KB/S |
| 1200 B/S | 38.4 KB/S |
| 4800 b/s | 76.8 kb/s |
| 9600 b/s | 153.6 kb/s |

As mentioned above, the ASK and FSK modulation methods are compatible. ASK systems may require network restrictions not applicable to FSK at the higher bit rates.

MESSAGE FORMAT

All INCOM messages are 33 bits in length and have the following characteristics:

The first two bits are start bits and must be ones.

The third bit is the control bit that determines the basic message type.

A five-bit BCH error check code is transmitted starting with the 29th bit.

The last bit of the message is a stop bit that must be a zero.

The bit rate and modulation method can vary depending on system options selected, however, the 33-bit, asynchronous message format is common. In the following discussions, the first transmitted bit is numbered B0, and the last bit of the message (stop bit) is B32. The INCOM message format is shown in FIG. 55.

Start Bits: B0, B1

Each network message begins with two start bits. These bits are used to frame the message and must be ones. The intermessage gap is filled with zeros. A new message may start immediately following the stop bit.

Control Bit: B2

The control bit defines the meaning of message bits B3 through B26. If B2 is a one, the message is a control message and will be interpreted by the ICC. If B2 is a zero, the message is a data message and will not be interpreted by the ICC. Transmission rights (bus mastership token) can be exchanged only by control messages (B2=1).

Message Bits B3–B26

The meaning of this message field is determined by the control bit B2.

A control bit set to one indicates that bits B3 through B26 contain instruction, command, subcommand, and address fields that are to be interpreted by the ICC.

A zero control bit designates that bits B3 through B26 contain arbitrary data, and are part of a higher-level message protocol. These messages will not be interpreted by the ICC.

BCH Error Check Code: B27–B31

Message bits B27 through B31 contain a five bit error check calculated using the BCH 31, 26 code. The ICC computes a BCH remainder based upon bits B2 through B26 of the 33 bit message. The resulting message (B2 ... B30) will always have as a root the BCH generator polynomial: $X^5+X^2+1$. This error check code has a Hamming distance of 3 and will detect all random double bit errors and all burst errors up to 5 bits in length. Several examples of messages with correct BCH follow:

| s | -bch- | -sc- | -addr- | -cf- | ins | c | st |
|---|-------|------|--------|------|------|---|----|
| 0 | 01001 | 0000 | 000000000000 | 0000 | 0000 | 0 | 11 |
| 0 | 01000 | 0000 | 000000000000 | 0000 | 1000 | 1 | 11 |
| 0 | 00100 | 0111 | 111111111110 | 0000 | 0011 | 1 | 11 |
| 0 | 01001 | 0111 | 111111111110 | 0000 | 0010 | 1 | 11 |

Stop Bit: B32

Each message ends with a stop bit that is always a zero.

CONTROL MESSAGES

Messages with the control bit (B2) set (one) are defined as control messages.

INSTRUCTION FIELD: B6–B3

The instruction field consists of message bits B6 through B3. This field provides for certain primitive slave control functions and also implements the hardware-level transmission rights protocol. This field is interpreted as shown in Table 20.

TABLE 20

INSTRUCTION FIELD DEFINITIONS

| B6 | B5 | B4 | B3 | $ | INSTRUCTION |
|----|----|----|----|----|-------------|
| 0 | 0 | 0 | 0 | 0 | Shed Load |
| 1 | 0 | 0 | 0 | 8 | Shed Load With Reply |
| 0 | 0 | 0 | 1 | 1 | Restore Load |
| 1 | 0 | 0 | 1 | 9 | Restore Load With Reply |
| 0 | 0 | 1 | 0 | 2 | Disable Interface |
| 1 | 0 | 1 | 0 | A | Disable Interface with Reply |
| 0 | 0 | 1 | 1 | 3 | Enable Interface |
| 1 | 0 | 1 | 1 | B | Block Addressing |
| 1 | 1 | 0 | 0 | C | Reserved, Block Addressing |
| 0 | 1 | 0 | 0 | 4 | Reserved, Block Shed |
| 0 | 1 | 0 | 1 | 5 | Block Restore |
| 1 | 1 | 0 | 1 | D | Reserved, Universal Addressing |
| 0 | 1 | 1 | 0 | 6 | Reserved |
| 1 | 1 | 1 | 0 | E | Reserved, Universal Addressing |
| 0 | 1 | 1 | 1 | 7 | No Operation |
| 1 | 1 | 1 | 1 | F | No Operation With Reply |

NETWORK ADDRESS: B22–B11

Message bits B11 through B22 contain the network address in control messages. B11 is the least significant byte of the address. Address comparisons in control messages depend on the contents of the instruction field. Most control message instructions use all twelve bits of address information to determine the recipient of the message. Certain instructions use fewer than twelve.

BLOCK ADDRESS INSTRUCTIONS

The following instructions use only B22 through B15 of the address field in address comparisons: $4-Block Shed, $C-Reserved, and $5-Block Restore. These three instructions use block addressing in which the low-order four bits of address information are ignored. These commands can be received by up to sixteen different non-master devices on the network.

UNIVERSAL ADDRESS INSTRUCTIONS

The following instructions employ no addressing: $D-Reserved, $6-Scram, and $E-Reserved. These instructions will be received by all devices on the network.

COMMAND FIELD: B7–B10

This 4-bit field defines the command in control messages. It is unused in all other control message types. The definition of the commands defined by this field is determined by a higher-level software protocol and will vary from product to product with the exception of two status commands. The fast status ICC hardware interprets and executes to status commands defined by a command of zero with either subcommand of zero or one. These two status command control messages are universally defined for all product types as follows:

SINGLE MESSAGE STATUS

A control message with an instruction of $3, command of 0, and subcommand of 0 is defined to be a Single Message Status request. The addressed device is expected to respond as defined below.

EXTENDED STATUS

A control message with an instruction of $3, command of 0, and subcommand of 1 is defined to be an Extended Status request. The addressed device is expected to respond as defined below.

SUBCOMMAND FIELD: B26–B23

This 4-bit field defines the subcommand in control messages. It is unused in all other control message types. The definition of the subcommands defined by this field is determined by a higher-level software protocol and will vary from product to product with the exception of subcommands zero and one in the status command.

COMMUNICATION NETWORK ARBITRATION

The INCOM network is a multi-drop communication bus on which a number of devices may transmit. Bus arbitration is performed by both hardware and software protocols. The network is arbitrated by a token-passing scheme in which control of bus transmission rights is defined by the message type and message contents. The arbitration protocol assumes a single network controller (network master) that is defined by system configuration. Multiple devices may be capable of performing the network master function, however, only one may be active at any given time.

The network master has several means of distributing bus transmission rights:

Sending a control message to a slave device requesting a reply. If the message did not request a reply, bus transmission rights remain with the network master. If the message requires reply, the slave will begin to transmit a single reply control message within one bit time of the receipt of the requesting message. In this case, bus transmission rights were granted to the slave for one message only. A slave is not able to transmit a message without receiving a control message requiring reply or having its interface enabled by the appropriate control message.

Sending a control message to a slave controller enabling its interface. In this case, bus transmission rights are passed to the enabled slave device. The slave may transmit as many messages as the software protocol requires. Its interface will remain enabled until it receives a disable interface control message or detects a control message (B2 set) to another address. The software communication protocol determines when bus transmission rights are returned to the network master controller or, possibly, another slave device. The hardware-level arbitration protocol will prevent more than two slave devices with different address from having their interfaces enabled at any one time.

STATUS TRANSACTIONS

All slave devices conforming to the INCOM standard protocol are required to reply to valid status requests. Three status request transaction sequences have been defined. All products are required to support the first type, and can optionally support all three.

REPLY

All slave devices are required to produce a reply when they receive control messages that require a reply. This assumes that the control message contains an address match and correct BCH. The reply status message will have bit B2 set and contain a two-bit status in bits B25 and B26. Bits B3 through B24 are undefined, but for many implementations, will be an echo of the status request message. As expected, the BCH will be computed on whatever bit pattern is sent in B1 through B26. The typical definition of the two status bits is shown in Table 21.

TABLE 21

| STANDARD STATUS DEFINITIONS | | |
|---|---|---|
| B26 | B25 | DEFINITION |
| 0 | 0 | Off or Ready (Normal, Inactive) |
| 0 | 1 | On or Running (Normalm Active) |
| 1 | 0 | Trip (Abnormal, Active) |
| 1 | 1 | Alarm (Abnormal, Active) |

The following INCOM control messages will produce a reply:

| | |
|---|---|
| 0 aaa 0 8 1 | Shed Load, Reply |
| 0 aaa 0 9 1 | Restore Load, Reply |
| 0 aaa 0 A 1 | Disable Interface, Reply |
| 0 aaa 0 F 1 | Status Reply Request |

Transmission rights are returned to the device that requested the status at the completion of the reply message.

SINGLE MESSAGE STATUS

Some slave devices are capable of responding to a single message status request. Microprocessor-based slaves are generally able to respond to this request. The single status request message is: "0 aaa 0 3 1". This message consists of the enable interface instruction, a command of zero, and a subcommand of zero. The slave has two options for its response:

The slave can return a reply message containing two status bits as described above.

The slave can return a product status message as described below.

Transmission rights are returned to the device that requested the status at the completion of the single response message.

PRODUCT STATUS MESSAGE

The product status message has the following format:

B2: 0

B8–3: 6-bit Division Code

B12–9: 4-bit Communication Software Version

B18–13: 6-bit Product ID

B21–19: 3-bit Product Specific Status

B26–22: 5-bit Standard Status Code

DIVISION CODE

This 6-bit field identifies the product division or company. The following are exemplary codes:

| B8-3 | Division |
|---|---|
| 00 | Reserved |
| 01 | Westinghouse Electrical Components (Asheville) |
| 04 | Westinghouse Breaker Components (Beaver) |

COMMUNICATION SOFTWARE VERSION

This 4-bit field may be used to define the communication software code version number that the slave product is using.

PRODUCT ID

This 6-bit field may be used to define the specific product within the division or company code.

PRODUCT SPECIFIC STATUS

This 3-bit field may be used by each product to define status conditions that are unique to the product.

STANDARD STATUS CODE

This 5-bit field may be used as the standard status code as defined in Table 21. Each product should attempt to define four operating states that best match these definitions.

EXTENDED STATUS

Some slave devices are capable of responding to an extended status request. Microprocessor-based slaves are generally able to respond to this request. The extended status request message is: "1 aaa 0 3 1". This message consists of the enable interface instruction, a command of zero, and a subcommand of one. The slave should respond with two messages:

The first message should be a product status message as described above.

The second should be an acknowledge message of the following format: "0 aaa 1 3 1". The 12 address bits should be the address of the slave.

Transmission rights are returned to the device that requested the status at the completion of the second response message.

OPERATION

The INCOM communication controller 29 has two operational modes: Master and Slave. In general, a given application will configure the ICC 29 to operate in only one of those modes; although it is possible to use it with a system that permits multiple masters on a single communication network. The following sections describe a typical programming interface to the ICC.

INITIALIZATION

As part of the IC 10 initialization software, certain parameters must be set in the ICC 29;

Configuration: Appropriate values must be loaded into CFR[7] (ICC Master Enable) and ACFR[6] (Divider Ratio). CFR[7] must be set if the application is permitted to operate in the master mode. If it is not set, the ICC cannot be placed in the master mode. ACFR[6] must be set as a function of the crystal frequency.

Communication Parameters: ICAH[7 ... 4] must be set for the appropriate bit rate and modulation method.

These values should not be changed during normal operation of the IC 10.

INCOM Address: If the IC 10 is configured as a INCOM slave, ICAH[3 ... 0] and ICAL[7 ... 0} must be loaded with the network address of the slave. INCOM masters do not need an address.

Mode: If the IC 10 is a master on the INCOM network, ICCR[5] must be set. When ICCR[5] is set, the ICC will receive all messages on the network regardless of address. Setting ICCR[5] will also permit the ICC to transmit messages. This will be indicated by the interface enabled status bit being set (ICSR[6]).

Interrupts: If the ICC subsystem is to be interrupt driven, ICCR[7] must be set to enable the interrupt. ICSR[3] and ICSR[2] are used to indicate interrupt requests. They may be polled in non-interrupt driven systems.

Once these parameters have been set, the ICC can function correctly in the communication network.

RECEIVE OPERATION

Operation of the IC 10 depends on the operating mode of the ICC 29. The receiver operates differently depending on whether it is in the master mode.

MASTER MODE

If the IC 10 is in the master mode, it will receive all INCOM network messages regardless of control message addressing. In the master mode, its interface is enabled (ICSR[6]=1) at all times. This will cause all network messages to be received.

SLAVE MODE

If the IC 10 has been configured as a slave, it will only receive control messages that match its address. Data messages will be received only if the ICC's interface is enabled (ICSR[6]=1) when the message is processed. A slave device's interface is enabled by a specific control message type containing the slave's address. Its interface will be disabled whenever a different slave device is enabled. All control messages with the correct address match will be received.

MESSAGE PROCESSING

When a message is received by the ICC the following events occur:

1. When two start bits are detected, the serial bit stream is framed and shifted into a buffer register.
2. If the message is a control message, the BCH and address are checked and the instruction executed.
3. If ICSR[6] is set, or if the message is an instruction message for this INCOM address, the message will be loaded into the receive buffer registers addressed as ICM3 through ICM0. This will only take place if ICSR[2] is reset. If ICSR[2] is set, the message will be discarded and ICSR[0] (receiver overrun) set.

While a message is being received, ICSR[7] (busy) will be read as a one. After the message has been processed, ICSR[2] will be set indicating that a new message has been placed into the receiver buffer. If an additional message that must be loaded into the receiver buffer registers is processed before the previous message has been acknowledged by the software, a receiver overrun will occur.

If interrupts are enabled, the setting of ICSR[2] will generate an interrupt. The software should read the ICC status register and retrieve the new message from the receive message registers. After the message has been read and status checked for overrun (ICSR[0]), BCH error (ICSR[1]), and receive operation complete (ICSR[2]), the software should set ICCR[1] to acknowledge the received message. This will reset ICSR[2 ... 0] and free the receive buffer for the next message. Clearing ICSR[2] will reset the interrupt request.

TRANSMIT OPERATION

The IC 10 software is only permitted to transmit a message on the INCOM network when the ICC interface is enabled (ICSR[6]=1). To transmit a message, the software should perform the following operations:

1. Reset ICCR[6] to disable fast status operation. This is required since the transmitter buffer registers are also used for fast status operation.
2. Load the message to be transmitted into the message registers ICM3 through ICM1. Load ICM0[7] with the transmitted message control bit. Read-modify-write instructions should not be used for the operation. ICM0[1 ... 0] must contain the correct reply status information at all times during this load operation.
3. Read ICSR[5] to verify that the transmitter is not busy and initiate the transmission by setting ICCR[0]. This will cause the transmitter to begin operation. The transmitter buffer registers can be changed as soon as the transmitter active bit (ICSR[5]) indicates the transmission is in progress.
4. The software should poll ICSR[3] for the transmitter complete flag or wait for the ICC interrupt at the end of the transmission. ICSR[3] and the interrupt request are cleared by setting ICCR[2].

REPLY STATUS OPERATION

The ICC generates reply status messages autonomously in response to INCOM network reply requests. The reply status message will contain ICM0[1,0] in message bits B26 and B25. The software should reload appropriate values in these two message register bits whenever the application's status changes.

FAST STATUS OPERATION

The IC 10 will transmit a fast status reply message automatically on receipt of the appropriate INCOM control message if properly programmed by the application software. In order for the fast status to be transmitted, the software should do the following:

1. Reset ICCR[6] to disable the transmission of fast status.
2. Update the fast status message in the message registers (ICM3 ... ICM0).
3. Set ICCR[6] to enable the transmission of fast status.

Whenever a fast status request is processed by the ICC, the message in the transmitter buffer registers will be sent if ICCR[6] is set. Whenever a new message is placed in the buffer registers, the ICCR[6] bit must be reset during the load operation to prevent 'data tearing' of the new message.

INTERRUPT VECTOR

The INCOM interrupts have the lowest priority in the microcontroller. They are assigned with a vector address of $FFF0–FFF1. The interrupt(s) must be acknowledged set ICCR[1, 2 or 3] prior to resetting the I bit in the processor to avoid reprocessing the interrupt.

ANALOG SUBSYSTEM SCHEMATICS

Figure 111:
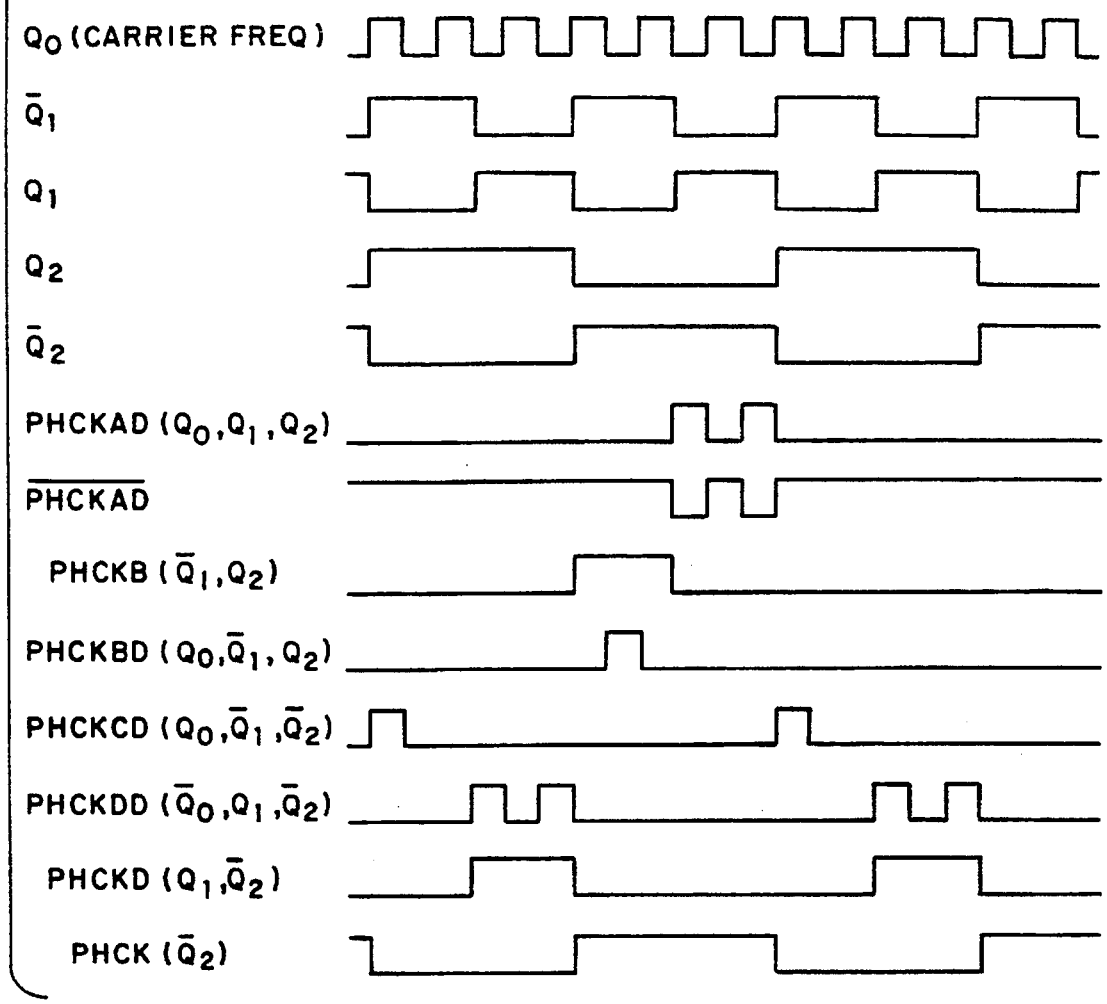
FIG. 111 is a timing diagram of various strobe signals utilized in the communication controller in accordance with the present invention.
Figure 112:
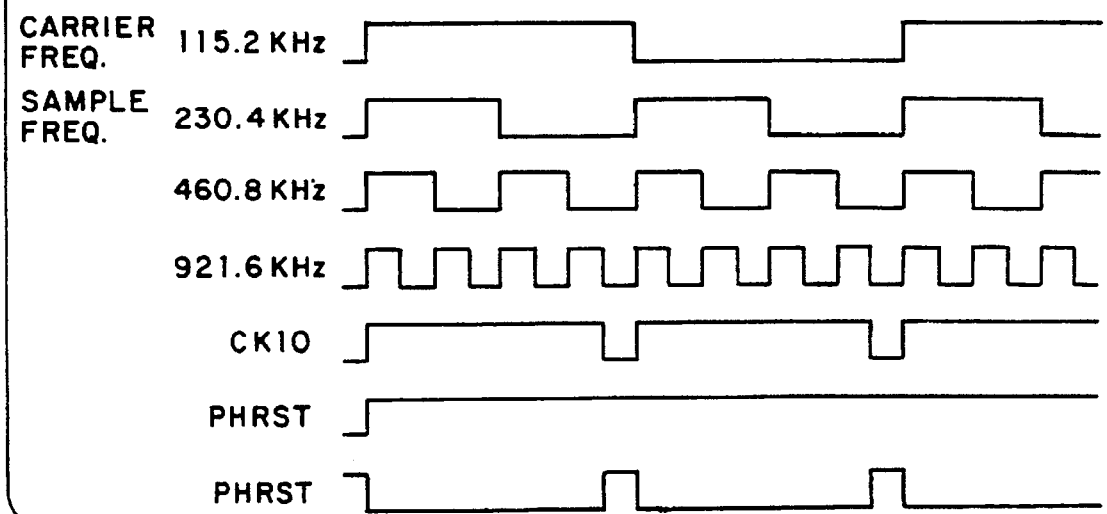
FIG. 112 is a timing diagram of a reset signal utilized in the communication controller in accordance with the present invention.

The analog subsystem for the IC 10 is illustrated in FIGS. 56–112. More specifically, FIGS. 56–71 illustrate the digital control logic while FIGS. 72–84 illustrate the analog circuitry. FIGS. 85–112 illustrate the digital logic for the ICC 29.

DIGITAL CONTROL LOGIC

1. Quadcomparator Subsystem Logic

Figure 57:
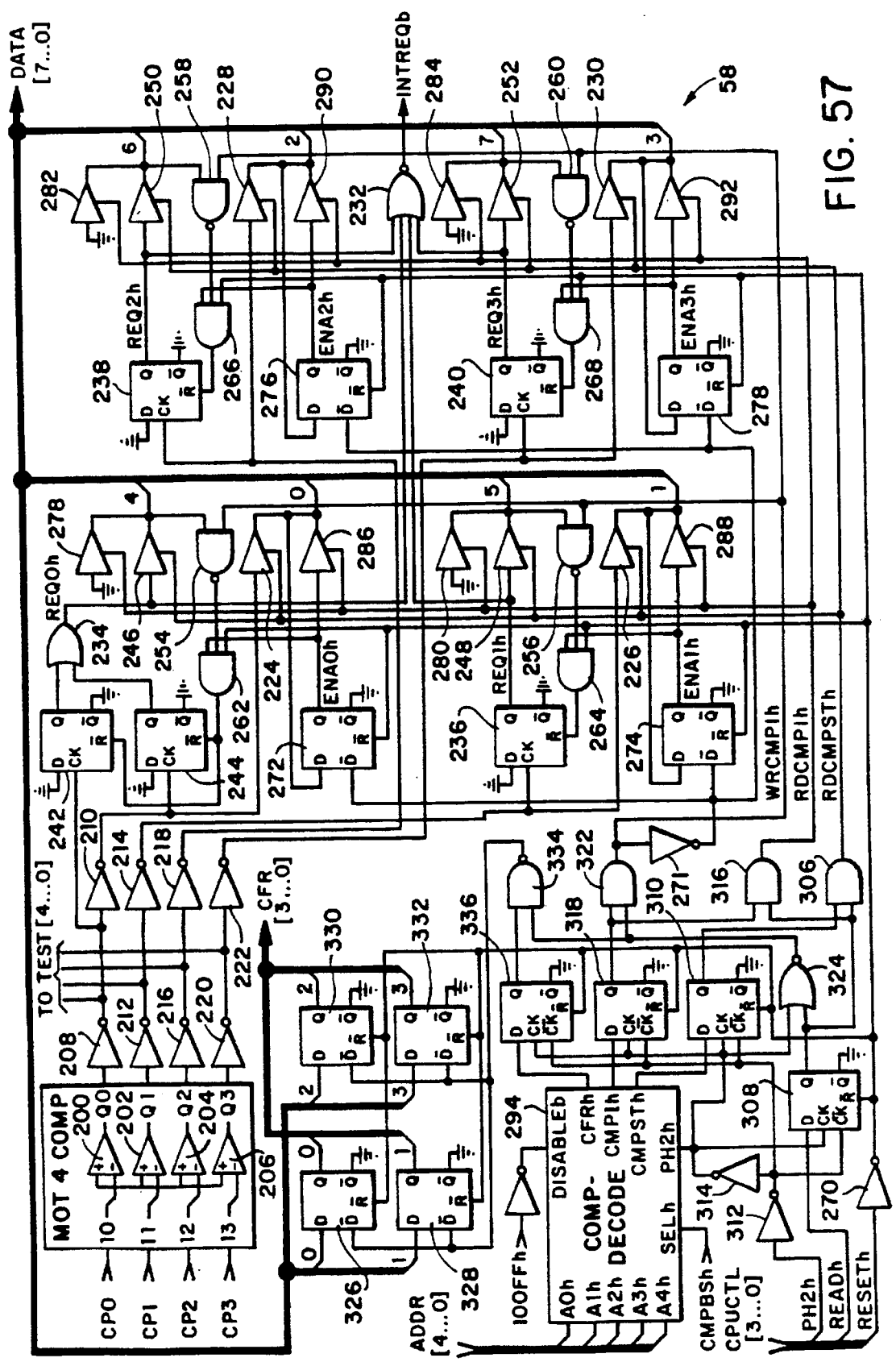
FIG. 57 is a schematic diagram of the quadcomparator subsystem in accordance with the present invention.
Figure 59:
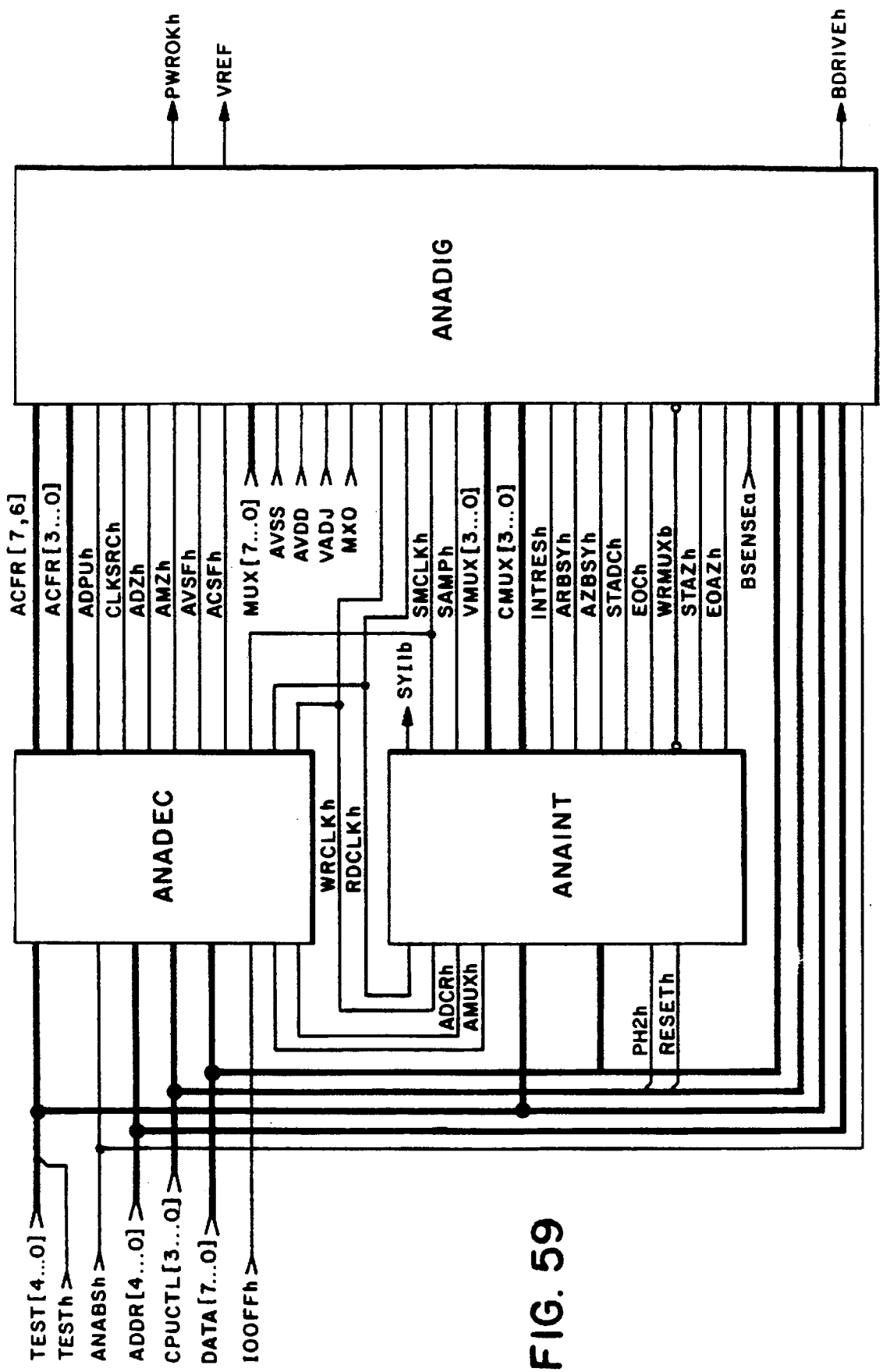
FIG. 59 is a block diagram of the analog subsystem in accordance with the present invention.

The quadcomparator subsystem 58 includes four individual comparators 200, 202, 204 and 206 (FIGS. 57 and 74). Each of these comparators 200, 202, 204 and 206 is referenced to a predetermined voltage, for example, +1.25 Vdc connected to a non-inverting input (FIG. 74). Input signals are applied to external pins CP0, CP1, CP2 and CP3 illustrated in FIG. 56.

The comparator subsystem 58 communicates with the microprocessor 30 through two registers CMPI and CMPST located in memory address space. An internal interrupt facility is provided to generate interrupts on selected edges of the comparator outputs $Q_0$, $Q_1$, $Q_2$ and $Q_3$. The comparator outputs $Q_0$, $Q_1$, $Q_2$ and $Q_3$ are read at the data bus DATA[3 ... 0]. More specifically, each of the comparator outputs $Q_0$, $Q_1$, $Q_2$ and $Q_3$ is connected to a pair of serially coupled inverters 208 and 210 (FIG. 57); 212 and 214; 216 and 218; and 220 and 222, respectively, for high gain. The outputs of the inverters 210, 214, 218 and 222 are applied to tristate devices 224, 226, 228 and 230. The outputs of these tristate devices are connected to the data bus DATA[3 ... 0] as CMPST[3 ... 0]. These comparator outputs comprise the CMPST[3 ... 0] status bits. Reading of these status bits is controlled by a read signal RDCMPSTh, which is active any time the microprocessor 30 addresses the CMPST register and initiates a read as discussed below.

The CMPI register is used for interrupt control. More specifically, CMPI [3 ... 0] is used to enable interrupts while CMPI[7 ... 4] is used to reset the interrupt request generated by the comparator subsystem 58. The interrupt request must be reset prior to clearing the I bit to prevent reprocessing the interrupt.

An interrupt request signal INTREQ is generated on selected edges of the comparator outputs $Q_0$, $Q_1$, $Q_2$ and $Q_3$. More specifically, the INTREQ signal is generated on rising and falling output states of the comparator 200 and on rising output states of the comparators 202, 204 and 206. This INTREQ signal is available at the output of a quad NOR gate 232. Comparator interrupt request signals REQ0h, REQ1h, REQ2h and REQ3h are applied to the inputs of the NOR gate 232. These interrupt request signals are available as outputs at an OR gate 234 for the comparator 200 and flip-flops 236, 238 and 240 for the comparators 202, 204 and 206, respectively. More specifically, the interrupt request signal REQ0h for the comparator 200 is generated at the output of the dual input OR gate 234. The inputs to the OR gate 234 are from flip-flops 242 and 244. The output $Q_0$ of the comparator 200 is applied to the clock input CK of the flip-flop 244 by way of the high gain inverters 208 and 210. The complement of this signal, available at the output of the inverter 208 is applied to the clock input CK of the flip-flop 242. The Q outputs of the flip-flops 242 and 244 are applied to the OR gate 234 to generate the REQ0h signal on rising and falling output states of the comparator 200. The $Q_1$, $Q_2$ and $Q_3$ outputs of the comparators 202, 204 and 206 are applied to clock inputs CK of the flip-flops 236, 238 and 240 to generate the REQ1h, REQ2h and REQ3h signals. These REQ0h, REQ1h, REQ2h and REQ3h signals may be read as status bits CMPST[7 . . . 4] by the microprocessor 30 on the data bus DATA[7 . . . 4]. More specifically, the REQ0h, REQ1h, REQ2h and REQ3h signals are applied to tristate devices 246, 248, 250 and 252. The outputs of these tristate devices 246, 248, 250 and 252 are connected to the data bus DATA[7 . . . 4]. The tristate devices 246, 248, 250 and 252 are under the control of the RDCMPSTh signal.

Four command bits CMPI[7 . . . 4] are used to reset the interrupt request. These command bits CMPI[7 . . . 4] are used to reset the flip-flops 236, 238, 240, 242 and 244, which generate the REQ0h, REQ1h, REQ2h and REQ3h signals. These command bits CMPI[7 . . . 4] may be written by way of the data bus DATA[7 . . . 4] and are applied to dual input NAND gates 254, 256, 258 and 260 along with a WRCMPIh signal. These NAND gates will only be enabled when the microprocessor 30 addresses the CMPI register and initiates a write. The outputs of the NAND gates 254, 256, 258 and 260 are applied to tri-input AND gates 262, 264, 266 and 268. The outputs of these AND gates are applied to the reset inputs $\overline{R}$ of the flip-flops 236, 238, 240, 242 and 244. The other two inputs to the AND gates 262, 264, 266 and 268 are the reset signal RESETb from the microprocessor 30, available at the output of an inverter 270 and interrupt enable signals ENA0h, ENA1h, ENA2h and ENA3h, available at Q outputs of flip-flops 272, 274, 276 and 278. The ENA0h, ENA1h, ENA2h and ENA3h signals allow the interrupt request to be cleared once acknowledged. The RESETb signal allows the microprocessor 30 to reset these flip-flops. In order to prevent reprocessing of the interrupt, a WRCMPIb signal, available at an output of an inverter 271, is applied to the $\overline{D}$ inputs of the interrupt enable flip-flops 272, 274, 276 and 278. These flip-flops are thus reset after the write signal WRCMPIh becomes inactive.

The command bits CMPI[7 . . . 4] are always read as zero on the data bus DATA[7 . . . 4]. More specifically, these command bits are read at the output of the tristate devices 278, 280, 282 and 284. The input to these tristate devices is connected to digital ground. The tristate devices 278, 280, 282 and 284 are under the control of a RDCMPIh signal which indicates that the microprocessor 30 has addressed the CMPI register and initiated a read.

Four status bits CMPI[3 . . . 0] are used to read comparator interrupt enable signals ENA0h, ENA1h, ENA2h and ENA3h. These signals ENA0h, ENA1h, ENA2h and ENA3h are available at the Q outputs of the flip-flops 272, 274, 276 and 278. These outputs are connected to tristate devices 286, 288, 290 and 292. The outputs of these tristate devices are connected to the data bus DATA[3 . . . 0]. The tristate devices 286, 288, 290 and 292 are under the control of a RDCMPIh signal which indicates that the microprocessor 30 has addressed the CMPI register and has initiated a read.

The RDCMPSTh, RDCMPIh and WRCMPIh signals are generated by a comparator decode system 294. The comparator decode subsystem 294 decodes addresses applied to the internal address bus ADDR[4:0] to allow the registers CMPST and CMPI to be written to and read. More specifically, as illustrated in Table 7 the CMPST register is located at address location $0008. Thus, when the address $0008 is placed on the internal address bus ADDR[4 . . . 0] an AND gate 296 (FIG. 58) is enabled. More specifically, the AND gate 296 is an eight input AND gate. The address inputs ADDR[4,2,1,0], identified as A4h, A2h, A1h and A0h, are applied through inverters 298, 300, 302 and 304. The address bit ADDR[3], identified as A3h, is applied directly to an input of the AND gate 296. Also applied to the AND gate 296 are signals SELh, DISABLEb and PH2h from the microprocessor 30.

The hexadecimal address $0008 corresponds to binary bits 00010. When the address 01000 is applied to the address inputs of A4h, A3h, A2h, A1h and A0h, the output of the AND gate 296 will be a logical one indicating that the CMPST register is being addressed by the microprocessor 30. More specifically, the RDCMPSTh signal is available at an output of a dual input AND gate 306 (FIG. 57). The inputs to the AND gate 306 are Q outputs of flip-flops 308 and 310. The CMPSTh signal, available at the output of the AND gate 296, is applied to a D input of the flip-flop 310. Timing for this flip-flop is provided by the microprocessor's phase 2 clock signal PH2h. More specifically, a PH2h signal is applied to a clock input CK of the flip-flop 310 by way of a pair of serially connected inverters 312 and 314. An inverted phase 2 clock signal, available at the output of the inverter 312 is applied to a $\overline{CK}$ input of the flip-flop 310. A READh signal, available from the microprocessor internal control bus CPUCTL[3 . . . 0], is applied to a D input of a flip-flop 308. The READh signal indicates that the microprocessor 30 is requesting a read operation. Timing signals are applied to the clock CK and $\overline{CK}$ inputs of the flip-flop 308 in the same manner as the flip-flop 310. Thus, whenever the microprocessor 30 addresses $0008, the signal RDCMPST is generated at the output of the AND gate 306, which indicates that the microprocessor 30 is reading the CMPST register.

An RDCMPIh signal is available at the output of a dual input AND gate 316. The output of the flip-flop 308 is applied to one input of the AND gate 316 which indicates that the microprocessor 30 has initiated a read. The other input to the AND gate 316 is a Q output of a flip-flop 318. A CMPIh decode signal is applied to a D input of the flip-flop 318. Timing control for the flip-flop 318 is identical to the flip-flops 308 and 310. The CMPIh signal is available at an output of an AND gate 320 (FIG. 53). The circuitry including the AND gate 320 and the inverters 298, 300, 302 and 304 generates the CMPIh signal whenever the microprocessor 30 addresses $0009.

The WRCMPIh signal is available at an output of a dual input AND gate 322 (FIG. 57). One input to the AND gate 322 is the output of the flip-flop 318, which indicates that the CMPI register was addressed. The other input to the AND gate 322 is from a NOR gate 324. The NOR gate 324 is used to develop a microprocessor write signal. Specifically, the output of the flip-flop 308 is applied to one input of the NOR gate 324. The output signal from the NOR gate 324 will be low during write operations. The other input is from the phase 2 clock, available at the output of the inverter 278.

Four configuration bits CFR[3 . . . 0] from the configuration register CFR are used for comparator mode control. These configuration bits CFR[3 . . . 0] allow the outputs of the comparators 200, 202, 204, 206 to be ORed with port C. A zero enables the OR operation while a one disables it. More specifically, the CFR register is a write only register and includes the flip-flops 326, 328, 330 and 332. The D inputs of these flip-flops are connected to the data bus DATA[3 . . . 0]. The Q outputs of these flip-flops are tied to an internal bus CFR[3 . . . 0] which allows the OR operation. These flip-flops 326, 328, 330 and 332 are under the control of a dual input NAND gate 334, which enables the write operation. One input to the NAND gate 334 is from the output of the NOR gate 324 which indicates a write operation. The other input is from a flip-flop 336. A CFRh signal, which indicates that the microprocessor 30 addressed the CFR register is applied to the D input of the flip-flop 336.

The CFRh signal is a decode signal and is available at the output of an AND gate 338 (FIG. 58). The AND gate 338 and the inverter 298 decode the address bus ADDR[4 . . . 0]

to enable the AND gate 338 and generate the CFRh signal any time the microprocessor 30 addresses $001E.

The microprocessor 30 is adapted to reset the comparator subsystem 58. More specifically, a reset signal RESETb from the computer control bus CPUCTL[3 ... 0] by way of the inverter 270 is applied to the AND gates 262, 264, 266 and 268 to reset the flip-flops 236, 238, 240, 242 and 244. The RESETb signal is also applied to the flip-flops 272, 274, 276, 278, 308, 310, 318, 326, 328, 330, 332 and 336 to allow the microprocessor 30 to reset the comparator subsystem 58.

2. Processor Bus Interface Logic

Figure 60:
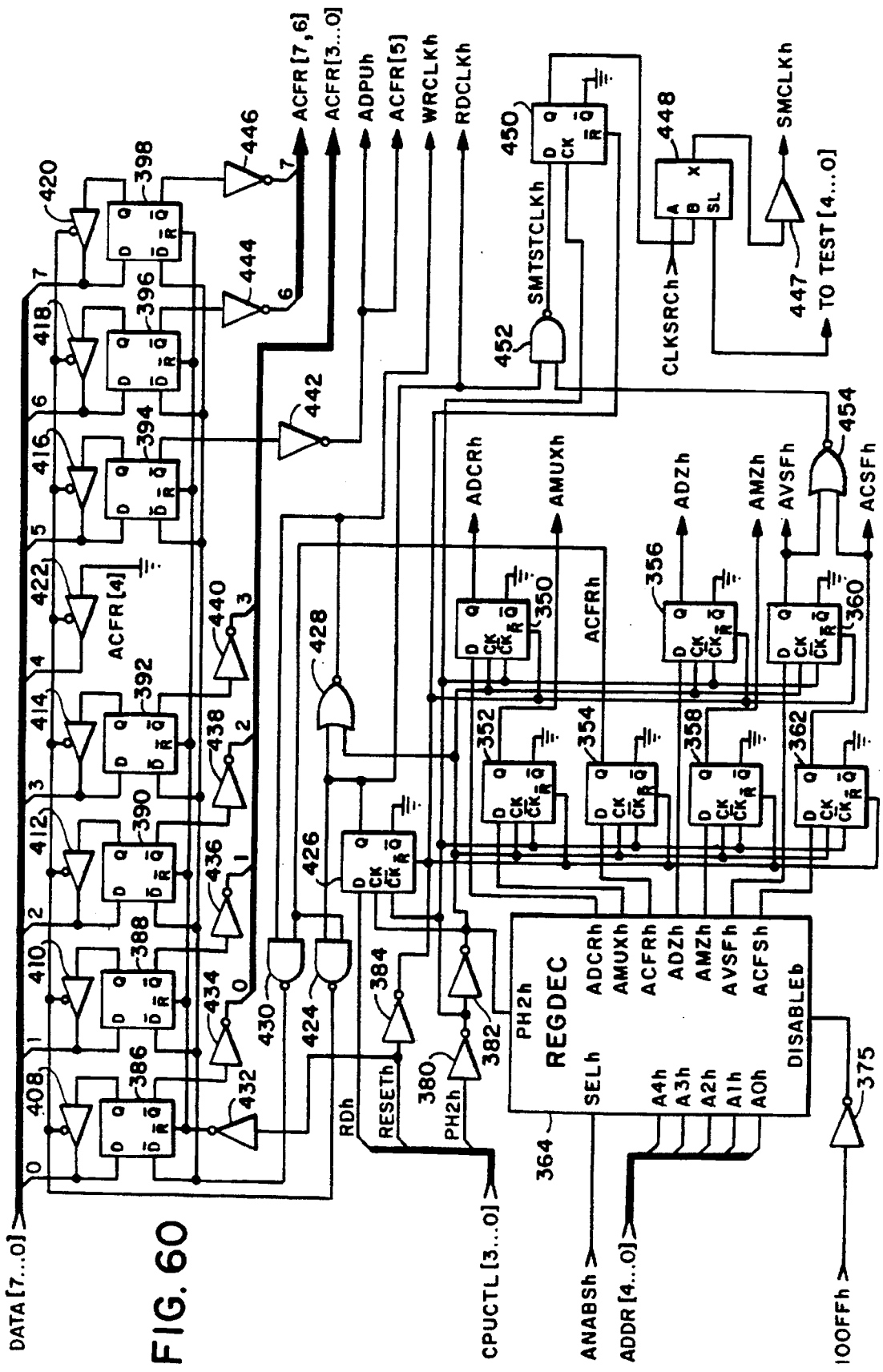
FIG. 60 is a schematic diagram of the microprocessor bus interface logic in accordance with the present invention.
Figure 61:
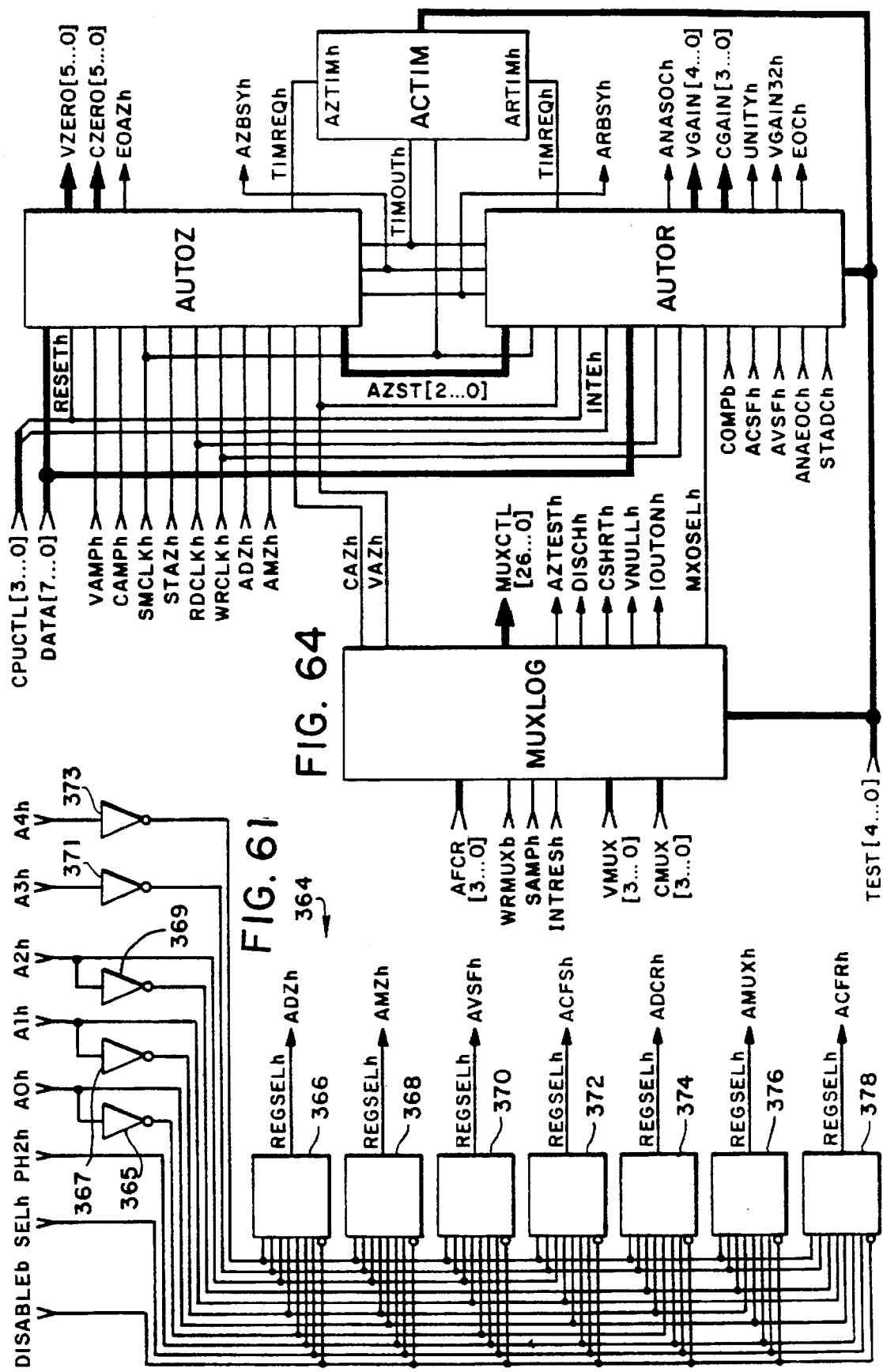
FIG. 61 is a schematic diagram of the address decode logic for the microprocessor bus interface registers in accordance with the present invention.

The microprocessor 30 communicates with the analog control system by way of, for example, seven registers ADCR, AMUX, ACFR, ADZ, AMZ, AVSF and ACFR located in memory address space as identified in Table 7. The format of the registers is illustrated in FIG. 40. These registers are selected by register select flip-flops 350, 352, 354, 356, 358, 360 and 362, illustrated in FIG. 60. These registers are all read-write registers and are decoded by a register decode subsystem 364 illustrated in FIG. 61. These registers may be decoded in various manners, for example, seven programmable logic arrays (PLA) 366, 368, 370, 372, 374, 376 and 378 may be provided. Each of these PLA's includes address inputs ADDR[4 ... 0] applied either directly or by way of inverters 366, 368, 370, 372 and 374 as shown in FIG. 61 and three control signals SELh, DISABLE and PH2h. The SELh signal corresponds to the microprocessor's ANABSh signal. The ANABSh signal is a register select signal from the microprocessor master chip address decoder which enables address decoding on a block basis. The DISABLEb signal corresponds to the microprocessor's IOOFF signal, used to disable all I/O devices during a test mode. The IOOFF signal is available at the output of a buffer 375. The PH2 signal is the microprocessor's phase 2 clock.

The outputs of the PLA's 366, 368, 370, 372, 374, 376 and 378 represents register select signals ADZh, AMZh, AVSFh, ACSFh, ADCRh, AMUXh and ACFRh indicating that a particular register has been addressed by the microprocessor 30. For example if the address $0020 is placed on the address bus ADDR[4 ... 0], the register ADCR will be selected. Similarly, when the addresses of the other registers are placed on the address bus ADDR[4 ... 0] in accordance with Table 7, those registers will be selected.

The output signals from the PLA's 366, 368, 370, 372, 374, 376 and 378 are applied to D inputs of the register select flip-flops 350, 352, 354, 356, 358, 360 and 362. Timing for these register select flip-flops is provided by the phase 2 clock signal PH2h, applied to the clock inputs CK of these flip-flops 350, 352, 354, 356, 358, 360 and 362 through a pair of inverters 380 and 382 and an inverted phase 2 clock signal, available at the output of the inverter 380, applied to the $\overline{CK}$ inputs of these flip-flops. A reset signal RESETh from the microprocessor control bus CPUCTL[3 ... 0] is applied to the reset inputs $\overline{R}$ of the flip-flops 350, 352, 354, 356, 358, 360 and 362 by way of an inverter 384 to set these flip-flops to zero on reset. The output of the register select flip-flops 350, 352, 354, 356, 358, 360 and 362 are the register select signals ADCRh, AMUXh, ACFRh, ADZh, AMZh, AVSFh and ACSFh.

ACFR REGISTER

The ACFR register is a read-write register utilized by the A/D subsystem 78. This register includes the flip-flops identified by the reference numerals 386, 388, 390, 392, 394, 396 and 398 (FIG. 60).

The ACFR register can be read or written to by the microprocessor 30. More specifically, the D inputs of the flip-flops 386, 388, 390, 392, 394, 396 and 398 are tied respectively to the data bus DATA[7 ... 0] to allow the microprocessor 30 to write to this register. The output Q of these flip-flops are also tied to the data bus DATA[7 ... 0] by way of the tristate devices 408, 410, 412, 414, 416, 418, 420 and 422 to allow this register to be read.

During read operations the tristate devices 408, 410, 412, 414, 416, 418, 420 and 422 are under the control of a read control NAND gate 424 and a read-write control flip-flop 426 to allow the Q outputs of these flip-flops to be tied to the data bus DATA[7 ... 0] and read by the microprocessor 30. The tristate device 422 for the ACFR[4] bit has its input tied to ground. Thus, this bit will always read zero.

A read signal is developed by the NAND gate 424. The NAND gate 424 is a two input NAND gate and is under the control of the read-write control flip-flop 426 and the ACFR select flip-flop 354. A read signal READh from internal control bus CPUCTL[3 ... 0] is applied to a D input of the read-write control flip-flop 426. Timing for this flip-flop is a phase 2 clock sign PH2h, applied to a clock input CK and an inverted phase 2 clock signal from the output of the inverter 380, applied to the $\overline{CK}$ input of a flip-flop 426. The Q output of the flip-flop 426 is a read clock signal RDCLKh, which is applied to the NAND gate 424. Thus, any time the microprocessor 30 addresses the ACFR register (eg. $0023) and places a read signal READh on the computer control bus CPUCTL[3 ... 0], the flip-flops 386, 388, 390, 392, 394, 396 and 398 as well as the ACFR[4] bit will be read.

During write operations the tristate devices 408, 410, 412, 414, 416, 418 and 420 are normally in a high impedance state. A write control signal is applied to the $\overline{D}$ inputs of these flip-flops. The write control signal is under the control of a write control NOR gate 428 and a NAND gate 430. The NOR gate 428 is a two input NOR gate with a one input from the phase 2 clock PH2h and one input from the read-write control flip-flop 426. The output of the NOR gate 428 is a write signal WRCLKh. The write signal WRCLKh is applied to one input of the dual input NAND gate 430. The other input to the NAND gate 430 is the ACFR register select signal ACFRh. The output of the NAND gate 430 is then applied $\overline{D}$ inputs of the ACFR flip-flops 386, 388, 390, 392, 394, 396 and 398. The data bus DATA[7 ... 5] and DATA[3 ... 0] are applied to the D inputs of these flip-flops to allow the microprocessor 30 to write to them. The bit ACFR[4] is tied to digital ground.

The ACFR register may be reset by the microprocessor 30. More specifically, a reset signal RESETh from the control bus CPUCTL[3 ... 0] is applied to the reset inputs R of the flip-flops 386, 388, 390, 392, 394, 396 and 398 through an inverter 432.

As heretofore discussed, the ACFR register is a configuration register used to configure the A/D subsystem 78. Thus the $\overline{Q}$ outputs of the flip-flops 386, 388, 390, 392, 394, 396 and 398 are connected to inverters 434, 436, 438, 440, 442, 444 and 446. The outputs of the inverters 434, 436, 438 and 440 are tied to an internal bus ACFR[3 ... 0]. The outputs of the inverters 444 and 446 are tied to an internal bus ACFR[7,6]. The output of the inverter 442 is applied to an internal bus ACFR[5] and also is used as a signal ADPUh.

The RDCLKh signal, available at the output of the read write control flip-flop 426, is used to develop a state machine clock signal SMCLKh for use in auto-zero and auto-range state machines to be discussed below. The SMCLKh signal is available at the output of a buffer 447. The input to the buffer is a MUX 448. The MUX 448 allows for inputs from an external clock source signal CLKSRCh under the control of test circuitry applied to its select input SL. During normal operation, the SMCLK signal is developed by a flip-flop 450. Timing for the flip-flop 450 is an inverted phase 2 clock signal, available at the output of the inverter 380. This flip-flop 450 may be reset by the microprocessor 30. An output from a NAND gate 452 is applied to a D input of the flip-flop 450. The NAND gate 452 is a dual input NAND gate. One input to the NAND gate 452 is the RDCLKh signal. The other input to the NAND gate 452 is an output of an OR gate 454. The inputs to the OR gate 454 are the ACSFh and AVSFh signals which indicate that the AVSF or ACSF registers have been addressed by the microprocessor 30 to allow the SMCLK signal to be generated when autozero and autoranging operations are initiated.

ADCR REGISTER

Figure 62:
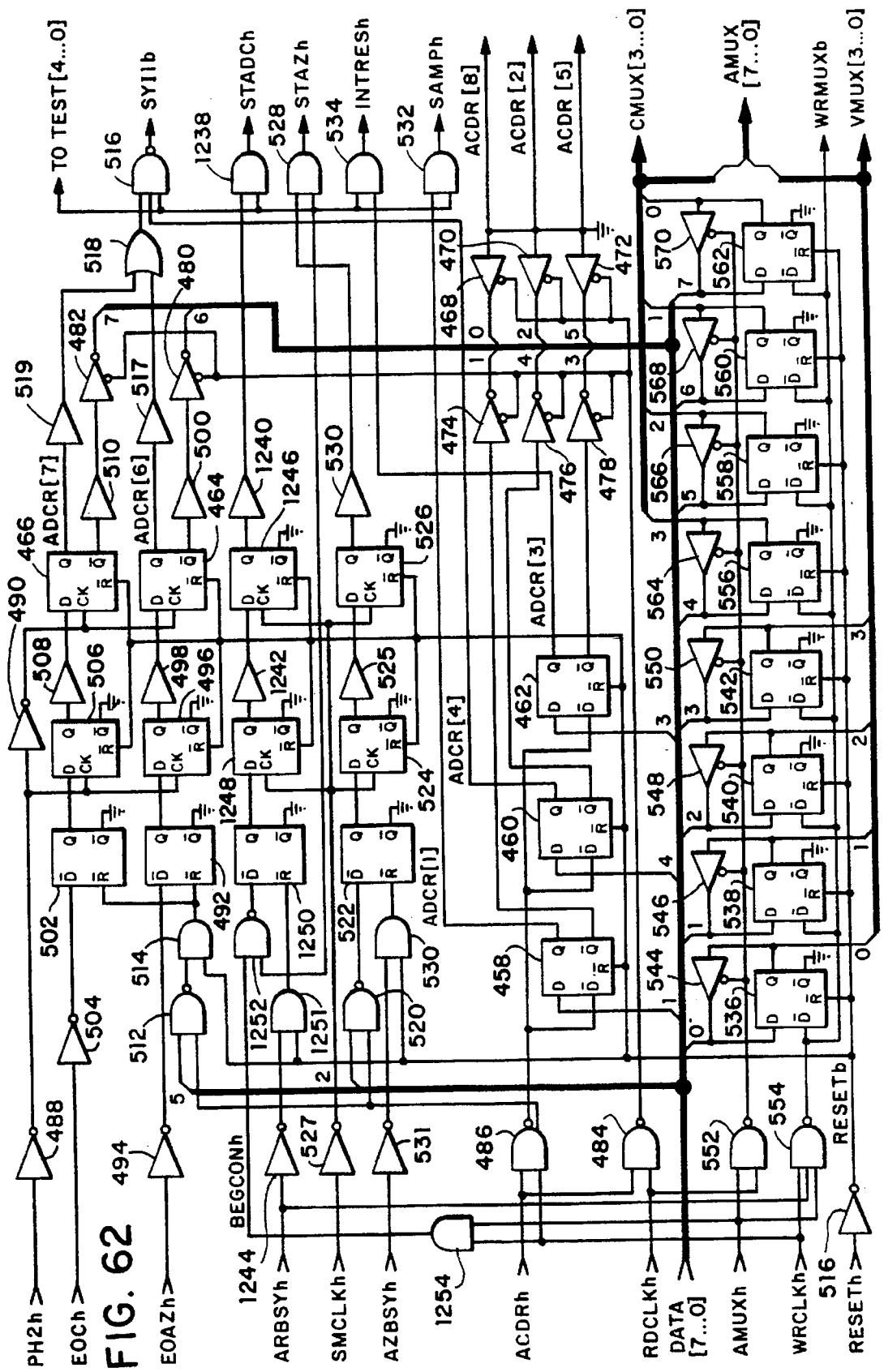
FIG. 62 is a schematic diagram of control and status registers in accordance with the present invention.
Figure 63:
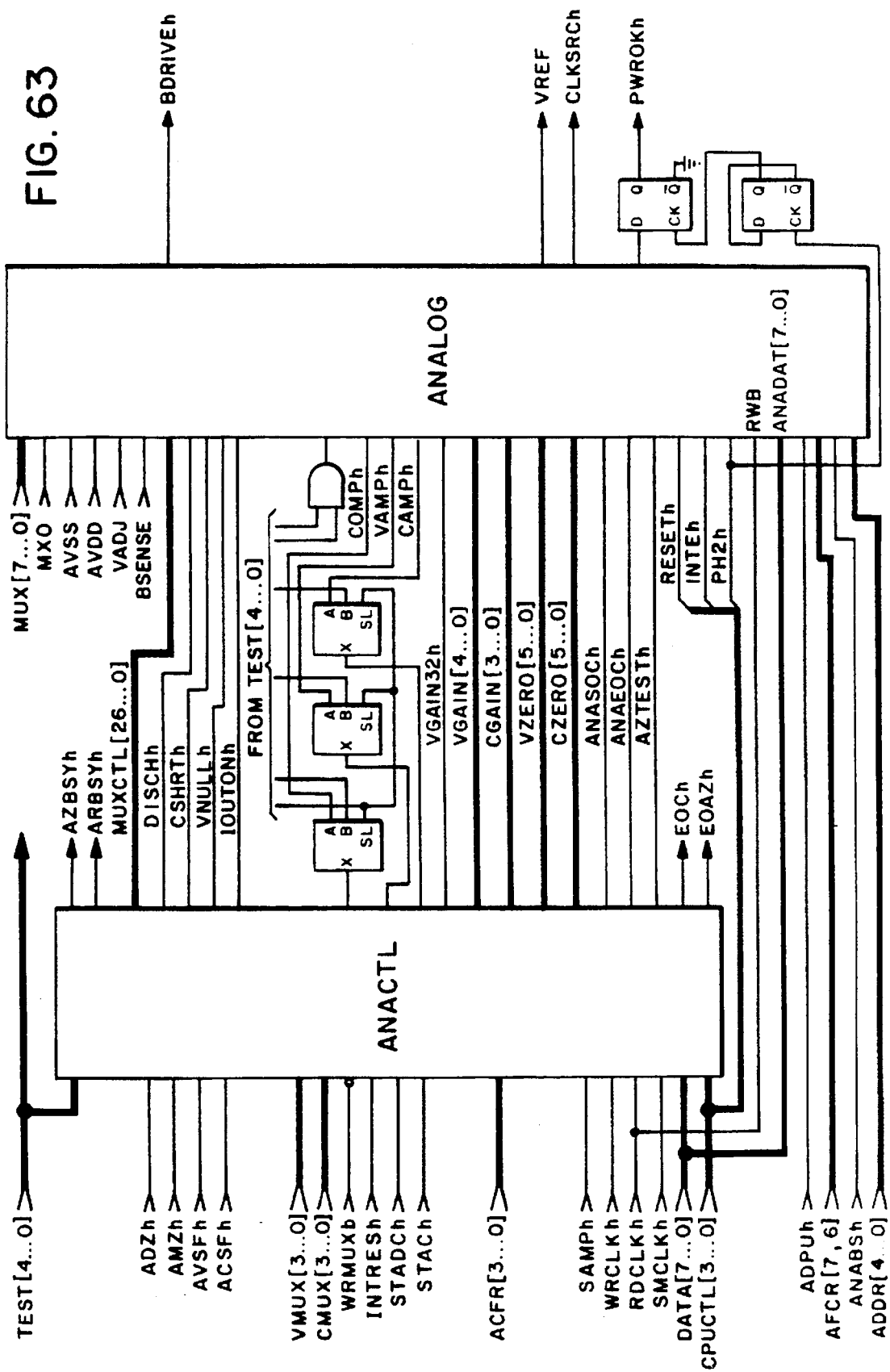
FIG. 63 is a block diagram of the analog digital control logic portions of the IC in accordance with the present invention.

The ADCR register is used to control the operation of the A/D subsystem 78. This register is a byte wide read-write register. This register includes the flip-flops 458, 460, 462, 464 and 466 (FIG. 62). Three bits ADCR[5], ADCR[2] and ADCR[0] are tied to ground and will always read zero. More specifically, the bit ADCR[0] is tied to ground and to the input of a tristate device 468. The output of the tristate device 468 is tied to the data bus DATA[0]. The bit ADCR [2] is also tied to ground and to a tristate device 470. The output of the tristate device 470 is tied to the data bus DATA[2]. Similarly, the bit ADCR[5] is also tied to ground and to a tristate device 472. The output of the tristate device 472 is connected to the data bus DATA[5].

The balance of the bits may also be read by the microprocessor 30. More specifically, the $\overline{Q}$ outputs of the flip-flops 458, 460, 462, 464 and 466 are coupled to tristate devices 474, 476, 478, 480 and 482. The outputs of these tristate devices are applied to the data bus DATA[1,3,4,6,7].

The tristate devices 468, 470, 472, 474, 476, 478, 480 and 482 for all the bits ADCR[7 . . . 0] are under the control of the read control NAND gate 484. Normally these tristate devices are in a high impedance state. However, during a read operation the NAND gate 484 enables these tristate devices to connect the ADCR[7 . . . 0] bits the data bus DATA[7 . . . 0]. The NAND gate 484 is a two input NAND gate. A ADCRh signal is applied to one input. This signal is a decode signal for the ADCR register. More specifically, the ADCR register is located at memory address $0020. Thus, any time this address is written by the microprocessor 30 the ADCRh signal will be active. The other input to the NAND gate 484 is the RDCLKh signal discussed above. Thus, any time the microprocessor 30 addresses the ADCR register and initiates a read, the NAND gate 484 will be enabled.

The bits ADCR[1], ADCR[3] and ADCR[4] are control bits which may be written by the microprocessor 30. More specifically, the D inputs of the flip-flops 458, 460 and 462 are connected to the data bus DATA[1, 3, 4]. The $\overline{D}$ inputs of these flip-flops are connected to an output of a dual input NAND gate 486. The ADCRh signal is applied to one input of the NAND gate 486 which indicates that the ADCR registers have been addressed by the microprocessor 30. A WRCLKh signal is applied to the other input. Thus, the NAND gate 486 will be enabled any time the microprocessor 30 addresses the ADCR register and initiates a write operation.

The bits ADCR[7] and ADCR[6] are read only status bits generated by the flip-flops 464 and 466. These bits indicate that the auto-zero sequence is complete and the A/D conversion is complete. These flip-flops 464 and 466 are clocked by the phase 2 clock signal PH2h by way of two inverters 488 and 490. Status signals EOCh and EOAZh, representative of the status of the A/D subsystem 78 and the auto-zero operation, are applied to the D inputs of these flip-flops 464 and 466 by way of control circuitry discussed below. More specifically, an end of auto-zero signal EOAZh, which indicates that the auto-zero process has finished is applied to an $\overline{S}$ input of a flip-flop 492 by way of an inverter 494. The Q output of the flip-flop 492 is applied to a D input of a delay flip-flop 496. The Q output of the flip-flop 496 is applied to the D input of the flip-flop 464 by way of a buffer amplifier 498. The $\overline{Q}$ output of the flip-flop 464 is applied to the data bus DATA[6] by way of the tristate device 480 and a buffer amplifier 500 to generate an end of auto-zero flag.

An EOCh signal is applied to the flip-flop 466, by way of an inverter 504 and control circuitry discussed below. The EOCh signal indicates the end of the A/D conversion process. The output of the inverter 504 is applied to an $\overline{S}$ input of a flip-flop 502. A Q output of the flip-flop 502 is applied to a D input of a flip-flop 506. The Q output of the delay flip-flop 506 is applied to the D input of the flip-flop 466 by way of a buffer amplifier 508. The output of the buffer 508 is applied to the D input of the flip-flop 466. The $\overline{Q}$ output of the flip-flop 466 is applied to the data bus DATA[7] by way of the tristate device 482 and a buffer amplifier 510 to generate an A/D conversion complete flag.

Timing for the flip-flops 496 and 506 is an inverted phase 2 clock signal available at the output of the inverter 488. The flip-flops 496 and 506 as well as the flip-flops 464 and 466 may be reset by the microprocessor 30 by way of a RESETb signal available at the output of an inverter 516.

ACFR[5] is a command bit which resets the auto-zero complete and A/D conversion complete flags and resets the bits ACFR[6] and ACFR[7] to remove an A/D interrupt request SYIIb signal from the microprocessor 30. The command bit ACFR[5] is available on the data bus DATA[5] and is applied to one input of a dual input NAND gate 512. The other input to the NAND gate 512 is a non-inverting output of the NAND gate 486 which enables write operations to the ADCR register. The output of the NAND gate 512 is applied to one input of a dual input AND gate 514. The other input to the AND gate 514 is the microprocessor reset signal RESETb available at the output of the inverter 516. The output of the AND gate 514 is applied to the reset inputs $\overline{R}$ of the flip-flops 492 and 502 to reset the complete flag and remove the A/D interrupt SYIB.

The A/D interrupt signal SYIIb is generated at an output of a three input NAND gate 516 at the completion of the autozero sequence and the A/D conversion when the A/D interrupt ADCR[4] is enabled. One input to the NAND gate 516 is an output of a two input OR gate 518. The inputs to the OR gate 518 are status bits ADCR[6] and ADCR[7], available at outputs of buffers 517 and 519, which are connected to the Q outputs of the flip-flops 464 and 466. These bits ADCR[7,6] indicate that the autozero operation is complete and the A/D conversion is complete, respectively. Another input to NAND gate 516 is the ADCR[4] bit, which indicates an interrupt enable. The third input is from the test circuitry, normally used only during testing.

The ADCR[2] is a command bit which may be written by the microprocessor 30 and is used to initiate an A/D sequence. This bit is available on the data bus DATA[2] and is applied to dual input NAND gate 520. The other input to the NAND gate 520 is from the ADCR register write control NAND gate 486. The output of the NAND gate 520 to an $\overline{S}$ input of a flip-flop 522. A Q output of the flip-flop 522 is applied to a D input of a flip-flop 524. The output of the flip-flop 524 is applied to a D input of another flip-flop 526 by way of a buffer 525. A Q output of the delay flip-flop 526 is used to generate the start auto-zero signal STAZh. More specifically, the Q output of the flip-flop 526 is applied to one input of a dual input AND gate 528 by way of a buffer 530. The other input to the AND gate 528 is from test circuitry. The output of the AND gate 528 is the STAZh signal.

The STAZh signal is cleared when the auto-zero state machine is busy (AZBSYh). More specifically, a AZBSYh signal is applied to one input of a two input AND gate 530 by way of an inverter 531. A RESETb signal from the microprocessor 30 is applied to the other input. The output of the AND gate 530 is applied to an $\overline{R}$ input of the flip-flop 522 to reset this flip-flop. Timing for the flip-flops 524 and 526 is provided by the SMCLKh signal available at an output of an inverter 527. The flip-flops 524 and 526 are reset by the microprocessor 30 by way of the RESETb signal applied to their reset inputs $\overline{R}$.

The ADCR[1] bit is used to control the four sample and hold switches 108, 110, 112 and 114. Specifically the D output of the flip-flop 458 is applied to one input of a AND gate 532. The other input to the AND gate 532 is from the test circuit. The output of the AND gate 532 is a signal SAMPh which controls the sample and hold switches 108, 110, 112 and 114.

Figure 81:
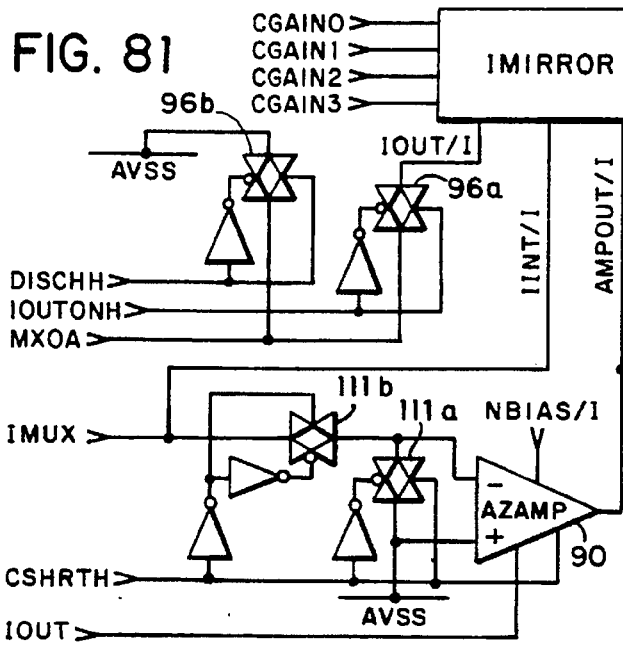
FIG. 81 is a schematic diagram of the current mirror and amplifier in accordance with the present invention.

The ADCR[3] bit available at the Q output of the flip-flop 462. This bit ACDR[3] is used to control the integrator reset. More specifically, the output of the flip-flop 462 is applied to a two input AND gate 534. The other input to the AND gate 534 is from the test circuit. The output of the AND gate 534 is an integrator reset signal INTRESh. This signal is applied to a buffer 757 (FIG. 66) to generate a DISCHh signal and applied to the switch 96 (FIG. 81). When this signal is high, the switch 96 (FIG. 34) disconnects and MXO pin from the current mirror 92 and shorts the MXO pin to analog ground AVSS. The switch 96 remains shorted as long as this bit remains set. The shorting switch 96 may be open by writing a zero to ADCR[3]. This signal is also representative of the present state of the switch 96.

INPUT MULTIPLEXER CONTROLS

An 8 bit read-write register AMUX[7 . . . 0] is used to control the voltage and current input MUXes 62 and 64. This register is divided into 2 four bit fields, one field controls the voltage inputs and generates a signal VMUX[3 . . . 0] and the other controls the current inputs and generates a signal CMUX[3 . . . 0].

The VMUX[3 . . . 0] signal is developed by the flip-flops 536, 538, 540 and 542 (FIG. 62). The D inputs of these flip-flops are tied to the data bus DATA[3 . . . 0] to allow the microprocessor 30 to write to them. The output of these flip-flops are tied to the data bus DATA[3 . . . 0] by way of tristate devices 544, 546, 548 and 550 to allow the contents of these flip-flops to be read by the microprocessor 30. The tristate devices 544, 546, 548 and 550 are normally in a high impedance state and are under the control of a NAND gate 552. The NAND gate 522 is a two input NAND gate. A read clock signal RDCLKh is applied to one input. The RDCLKh signal indicates a read operation by the microprocessor 30 as previously discussed. An AMUXh signal is applied to the other input. The AMUXh signal represents that this register has been addressed by the microprocessor 30. More specifically the AMUX register is located in memory at $0021. Thus any time the microprocessor 30 addresses this location, the AMUXh signal will be active high. This allows the microprocessor 30 to read the contents of the flip-flops 536, 538, 540 and 542 by connecting the Q outputs of these flip-flops to the data bus DATA[3 . . . 0].

Write operations to the flip-flops 536, 538, 540 and 542 are controlled by a NAND gate 554. This NAND gate 554 generates a write WRMUXb that is applied to the $\overline{D}$ inputs of these flip-flops. The NAND gate 554 is a three input NAND gate. The write clock WRCLKh signal is applied to one input. An AMUXh signal is applied to another input. Lastly, a signal ARBSYh is applied to the NAND gate 554. The ARBSYh signal represents that the auto-ranging system is busy and will be discussed in detail below.

The flip-flops 536, 538, 540 and 542 are reset by a RESETb signal, applied to the reset inputs $\overline{R}$ of these flip-flops. The RESETb signal allows the microprocessor 30 to reset these flip-flops.

The CMUX[3 . . . 0] signal is developed by the flip-flops 556, 558, 560 and 562. The D inputs of these flip-flops are tied to the data bus DATA[7 . . . 4] to allow the microprocessor 30 to write to them. The Q outputs of these flip-flops are connected to the data bus DATA[7 . . . 4] by way of tristate devices 564, 566, 568 and 570 for read operations. The tristate devices 564, 566, 568 and 570 are normally in a high impedance state and are under the control of the NAND gate 552 which allows these flip-flops to be read when the microprocessor 30 initiates a read operation and places the address $0021 on the address bus ADDR[4 . . . 0]. Write operations to the flip-flops 556, 558, 560 and 562 are controlled by the NAND gate 554 in a similar manner as the flip-flops 536, 538, 540 and 542.

Figure 73:
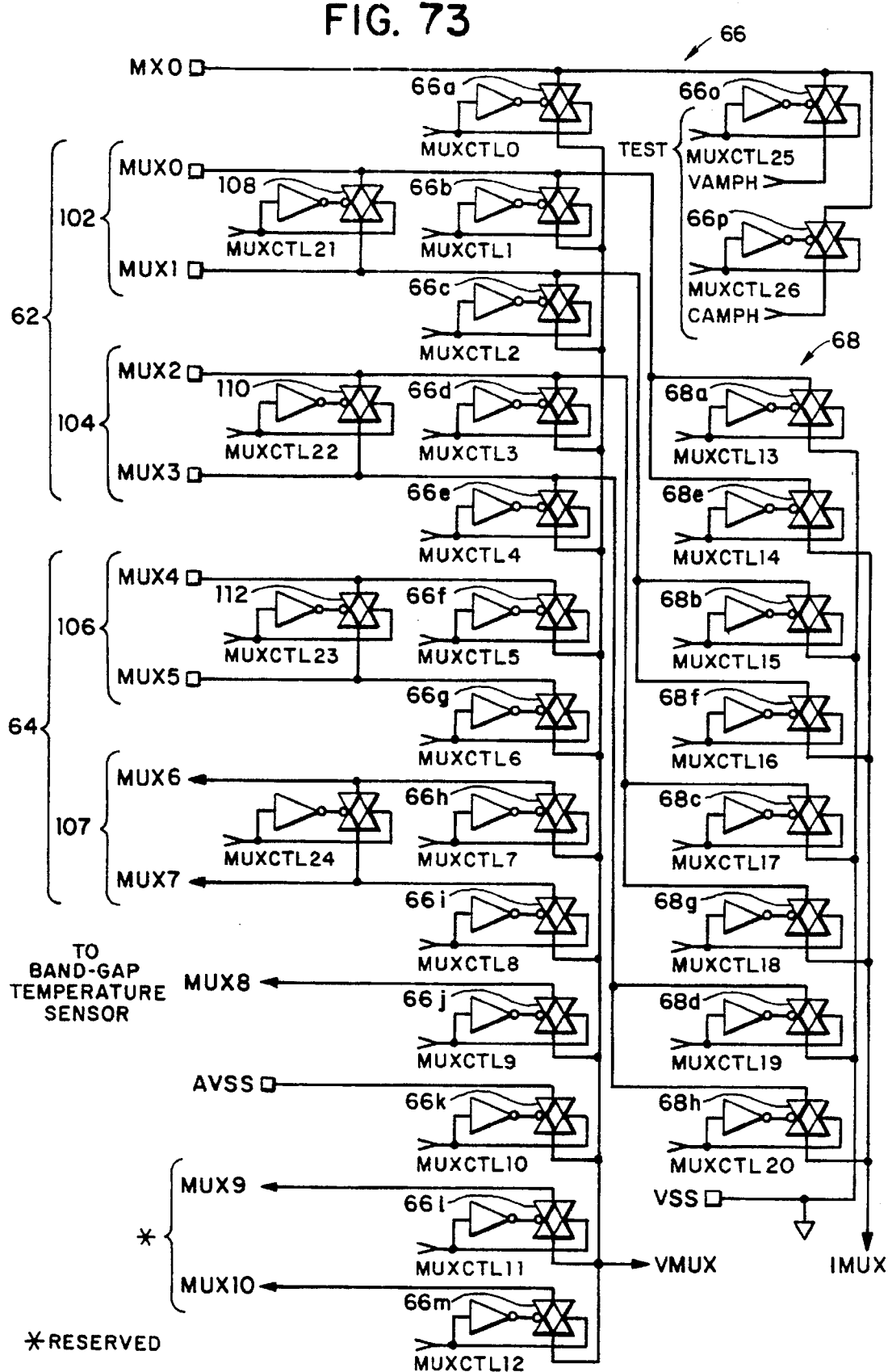
FIG. 73 is a schematic diagram of the input MUX system in accordance with the present invention.

The outputs of the flip-flops 536, 538, 540, 542, 556, 558, 560 and 562 are used to generate a MUX control signal MUXCTL[26 . . . 0] to control the current and voltage MUXes 66 and 68 as shown in FIGS. 34 and 73. More specifically, the voltage channel MUXes 66 and 68 are controlled by the control signal VMUX[3 . . . 0] while current channel MUXes 66 are controlled by the CMUX[3 . . . 0] signal. These signals are decoded by a series of inverters, OR gates and AND gates (FIG. 60) to generate the MUX control signals MUXCTL to allow individual control of each of the voltage and current channel MUXes. More specifically, the CMUX[3 . . . 0] signal is applied to one input of dual input AND gates 572, 574, 576 and 578.. The other inputs to these AND gates is a signal CAZh, which is applied to the AND gates 572,574,576 and 578 by way of an inverter 580. The signal CAZh indicates that the current amplifier 90 is being auto-zeroed. The signal CAZh is also used to develop a signal CSHRTh, used in the A/D subsystem 78. The signal CSHRTh is available at the output of an inverter 581, serially coupled to the inverter 580.

The output of the NAND gate 572 is coupled to a chain of serially connected inverters 582, 584, 586, 588, 590, 592 and 594. The output of the NAND gate 574 is coupled to a chain of serially connected inverters 596, 598, 600, 602, 604, 606 and 608. Similarly, the output of the NAND gate 576 is coupled to a chain of serially connected inverters 610, 612, 614, 616, 618, 620 and 622. Lastly, the NAND gate 578 is applied to a chain of serially connected inverters 624, 626, 628, 630, 632, 634 and 636. The outputs of the inverters 594, 608, 622 and 636 are coupled to inputs of dual input OR gates 638, 640, 642 and 644. The other inputs to these OR gates are the outputs from the inverters 582, 596, 610 and 624. The outputs of the NAND gates 572, 574, 576 and 578 are applied to inputs of dual input OR gates 646, 648, 650 and 652, respectively. The other inputs to these OR gates are from the outputs of the inverters 592, 606, 620 and 632, respectively. The outputs of the OR gates 638, 640, 642, 644, 646, 648, 650 and 652 are applied to inputs of dual input AND gates 654, 656, 658, 660, 662, 664, 666 and 668, respectively. The ACFR[3 . . . 0] bits from the internal bus ACFR[3 . . . 0] are applied to the other inputs of these AND gates to control whether the input MUXes 66 (FIG. 34) are in a current mode or a voltage mode. A one in these bits selects the current mode. More specifically, the ACFR[3] bit is applied to the inputs of the AND gates 654 and 656. The ACFR[2] bit is applied to the inputs of the AND gates 658 and 660. The ACFR[1] bit is applied to the inputs of the AND gates 608 and 610. Lastly, the ACFR[0] bit is applied to the inputs of the AND gates 666 and 668. The outputs of the AND gates 654, 656, 658, 660, 662, 664, 666 and 668 are decode signals MUXCTL[20 . . . 13] which allow for individual control of the current channel MUXes 66.

The sample and hold switches 108, 110, 112 and 114 may also be individually controlled by decode circuitry (FIG. 65) which includes inverters 670, 672, 674, 676, 678 and 680 and three input AND gates 682 and 684. More specifically, the inverters 670, 672, 674 and 676 are tied to the internal ACFR bus ACFR[3 . . . 0]. The outputs of the inverters 670 and 672 are applied to the AND gate 682 along with a SAMPh signal, available at its output of the NAND gate 532 (FIG. 62), which indicates that the command bit ACFR[1] has been set. The outputs of the inverters 674 and 676 are applied to the AND gate 684 along with the SAMPh signal. The SAMPh signal is also tied to the inverters 678 and 680 and the AND gate 684 represent the signal MUXCTL[24 . . . 21] which allows individual control of the sample and hold switches 108, 110, 112 and 114.

Figure 66:
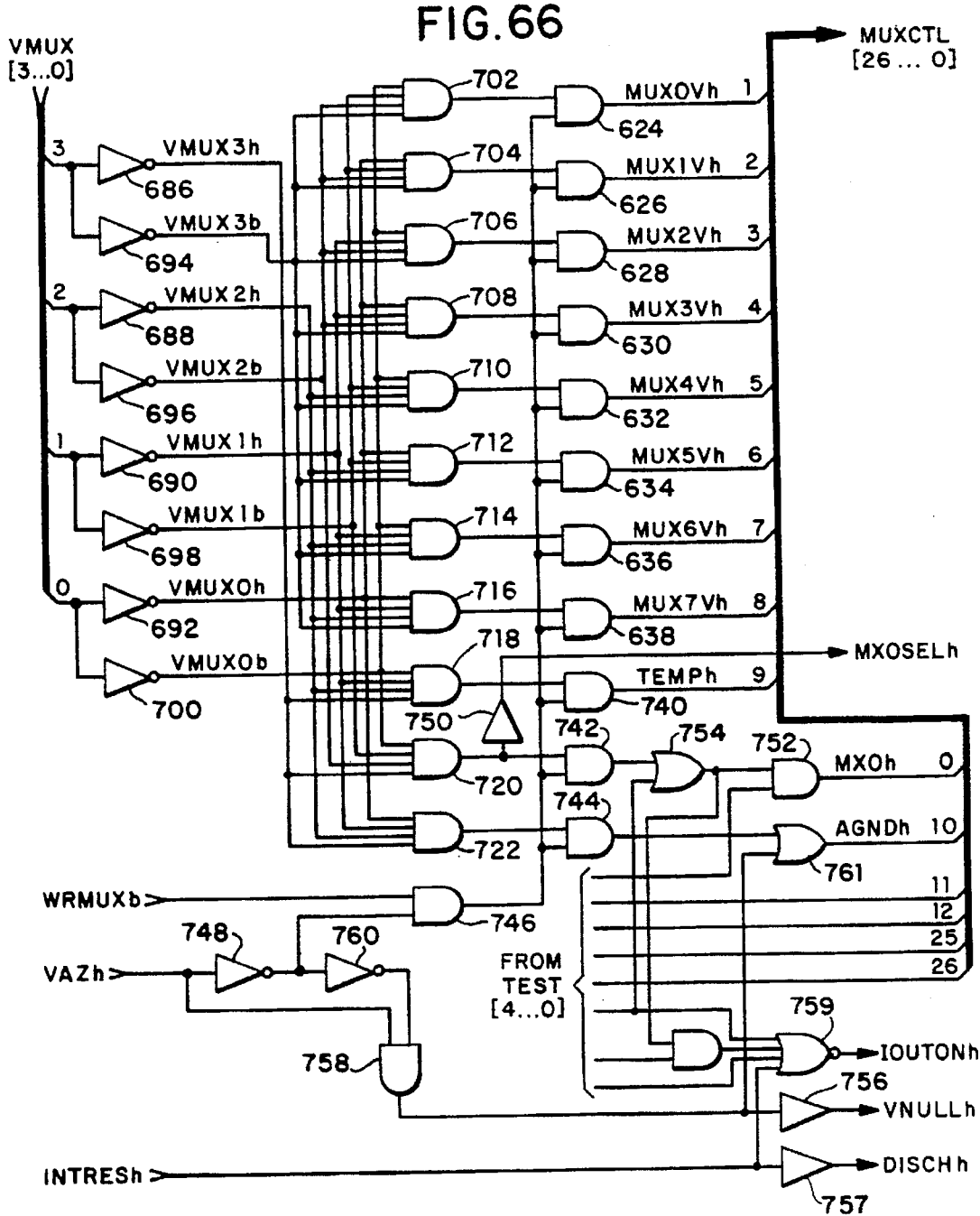
FIG. 66 is a schematic diagram of the voltage MUX control logic in accordance with the present invention.

The VMUX[3 . . . 0] bits of the AMUX register control the voltage channel MUXes 66 and 68 to generate the MUXCTL[10 . . . 0] signals and to generate the MUXCTL [10 . . . 0] signals (FIG. 66). The MUXCTL[26, 25, 12, 11] signals (also shown on FIG. 61) are used during a testing mode. More specifically, the voltage channel MUXes 66 and 68 are selected by the VMUX[3 . . . 0] bits. These four bits are decoded by circuitry (FIG. 66) consisting of buffer amplifiers 686, 688, 690 and 692; inverters 694, 696, 698 and 700; quad input AND gates 702; 704, 706, 708, 710, 712, 714, 716, 718, 720 and 722; and dual input AND gates 724, 726, 728, 730, 732, 734, 736, 738, 740, 742 and 744. More specifically, the VMUX[3 . . . 0] bits are applied to the inputs of the buffer amplifiers 686, 688, 690 and 692 and the inverters 694, 696, 698 and 700. The output of the buffer amplifier 686 is applied to the inputs of the AND gates 718, 720 and 722. The output of the inverter 694 is applied to the inputs of the AND gates 702, 704, 706, 708, 710, 712, 714 and 716. The output of the buffer amplifier 688 is applied to the inputs of the AND gates 710, 712, 714, 716, 718 and 722. The output of the inverter 696 is applied to the inputs of the AND gates 702, 704, 706, 708 and 720. The output of the buffer amplifier 690 is applied to the inputs of the AND gates 706, 708, 714, 716, 718 and 722. The output of the inverter 698 is applied to the inputs of the AND gates 702, 704, 710, 712 and 720. The output of the buffer amplifier 692 is applied to the inputs of the AND gates 704, 708, 712, 716 and 722. Lastly, the output of the inverter 700 is applied to the inputs of the AND gates 702, 706, 710, 714, 718 and 720. The output of the AND gates 702, 704, 706, 708, 710, 712, 714, 716, 718, 720 and 722 are a decode of the AMUX[3 . . . 0] bits. The outputs of these AND gates are applied to the inputs of dual input AND gates 724, 726, 728, 730, 732, 734, 736, 738, 740, 742 and 744. The other input to these AND gates is an AND gate 746 which controls write operation to the voltage channel MUXes. More specifically, the AND gate 746 is a two input AND gate. A WRMUXb signal is applied to one input. The other input to the AND gate 746 is a signal VAZh by way of an inverter 748. As will be discussed below, the signal VAZh is active high and indicates when the voltage amplifier 80 is being zeroed. This signal will be discussed in detail below. The outputs of the AND gates 724, 726, 728, 730, 732, 734, 736, 738 and 740 represent the signal MUXCTL[9 . . . 0].

As will be discussed in more detail below, auto-ranging is inhibited when the current channels are selected. Thus the output of the AND gate 720 is used to generate a signal MXOSELh by way of an inverter 750. More specifically, a signal MXOh, which indicates that a current channel has been selected, is generated at the output of an AND gate 752 and corresponds to an MUXCTL[9] signal. The AND gate 752 is a two input AND gate. One input is from the test circuit. The other input is from an OR gate 754. The OR gate 754 is a two input OR gate. One input is from a test circuit. The other input is from the AND gate 742 which indicates that the current channels have been selected.

A VNULLh signal is developed at the output of a buffer amplifier 756. This VNULLh signal controls the zero switch 86 (FIGS. 62 and 80) for auto-zeroing the voltage amplifier 80. The input to the buffer amplifier 756 is an output of a two input AND gate 758. One input to the AND gate 758 is the VAZh signal indicating that the amplifier 80 is being autozeroed. The other input to the AND gate 758 is the same signal VAZh applied by way of inverters 748 and 760.

An AGNDh signal is developed at the output of a two-input OR gate 761. One input to the OR gate 761 is the output from the AND gate 744. The VNULLh signal is applied to the other input. The AGNDh signal is used to connect the voltage channels to ground (FIG. 34). The AGNDh signal is available as MUXCTL[10].

Lastly, MUXCTL[26,25,12,11] are used in conjunction with the test circuit.

AUTO-ZERO REGISTERS ADZ AND AMZ

The ADZ and AMZ registers are used in connection with the auto-zero logic 98 for the current and voltage amplifiers 80 and 90. The auto-zero logic corrects for the offsets in the amplifiers 80 and 90 created by using a CMOS process to fabricate these amplifiers.

ADZ REGISTER

The ADZ register (FIG. 67) is a 6 bit read-write register which contains the offset correction value for the voltage amplifier 80. As previously discussed, write operations to this register are intended for diagnostic and verification purposes only. This register is loaded with the correction value for the amplifier 80 at the completion at the auto-zero sequence.

More specifically, the data bus DATA[7 . . . 0] is applied to this register, which includes the flip-flops 762, 764, 766, 768, 770 and 772. MUXes 774, 776, 778, 780, 782 and 784 allow the inputs of these flip-flops to be connected to either the data bus DATA[7 . . . 0] or to a zero bus ZERO[5 . . . 0]. The ZERO[5 . . . 0] bus contains the offset correction value for the amplifier being zeroed and allows the offset correction value to be written to the ADZ register. The data bus DATA[5 . . . 0] bits are applied to the A inputs of the MUXes 774, 776, 778, 780, 782 and 784. The ZERO[5 . . . 0] bus signal is applied to the B inputs of these MUXes. A ZERSEL signal is applied to the select inputs SEL of these MUXes. The ZERSEL signal controls whether the ADZ register is loaded from the data bus or the zero bus. The outputs of the MUXes 774, 776, 778, 780 and 782 are applied to the D inputs of the flip-flops 762, 764, 766, 768, 770 and 772. The ZERSELh signal (FIG. 69), generated by the autozero state machine, indicates that the state machine is in state S3. In state S3, the offset correction value is latched into the ADZ register by the VZCLKh signal discussed below. The VZCLKh signal is developed by the auto-zero state machine and is available at the output of a buffer 803. This signal VZCLKh is applied to the $\overline{G}$ inputs of the flip-flops 762, 764, 766, 768, 770 and 772.

The Q outputs of the flip-flops 762, 764, 766, 768, 770 and 772 are applied to an internal bus VZERO[5 . . . 0] for the voltage amplifier 80. The Q outputs of these flip-flops are also connected to the data bus DATA[5 . . . 0] by way of tristate devices 786, 788, 790, 792, 794 and 796 to allow these flip-flops to be read by the microprocessor 30. The bits ADZ[7,6] will always read zero since these bits are tied to the data bus DATA[7,6] by way of tristate devices 798 and 800 which have grounded inputs.

The tristate devices 786, 788, 790, 792, 794, 796, 798 and 800 are normally in a high impedance state except during a read operation when these tristate devices allow the outputs of the flip-flops 762, 764, 766, 768, 770 and 772 to be tied to the data bus DATA[7 . . . 0]. These tristate devices are under the control of a NAND gate 802. The output of the NAND gate 802 is a signal VZRDb signal, which represents a ADZ register read. The inputs to the NAND gate 802 are the signals RDCLKh and ADZh. The read signal RDCLKh is the read clock signal. The ADZh signal represents a microprocessor 30 has placed the address $0024 on the address bus ADDR[4 . . . 0]. The ADZ register is loaded by a VZCLKh signal.

The ADZ register can also be reset by the microprocessor 30. More specifically, a RESb signal is applied to the reset inputs of the flip-flops 762, 764, 766, 768, 770 and 772.

AMZ REGISTER

The AMZ register is a 6 bit read-write register that contains the offset correction value for the current mirror amplifier 92. This register is loaded with the correction value at the completion of the auto-zero sequence. Write operations to this register are diagnostic and verification purposes only.

The AMZ register includes the flip-flops 804, 806, 808, 810, 812 and 814. The Q outputs of the flip-flops 804, 806, 808, 810, 812 and 814 are tied to an internal bus CZERO[5 . . . 0].. The data bus DATA[7 . . . 0] is applied to the inputs of these flip-flops by way of the MUXes 774, 776, 778, 780, 782 and 784. These flip-flops are clocked by a CZCLKb signal, developed by the auto-zero state machine to latch the offset correction value for the current amplifier 90 (FIG. 34) into the AMZ register in state S7 (see Appendix C) as discussed below. The CZCLKb signal is applied to $\overline{D}$ inputs of these flip-flops by way of a buffer 816. A RESb signal is applied to the reset inputs R of these flip-flops for reset. The Q outputs of the flip-flops 804, 806, 808, 810, 812 and 814 are applied to the data bus DATA[5 . . . 0] by way of tristate devices 818, 820, 822, 824, 826 and 828 The bits AMZ[7,6] are not used and will always read zero. More specifically, the data bus DATA[7, 6] are connected to the outputs of tristate devices 830 and 832, respectively. The input to the tristate devices 830 and 832 are connected to ground. Thus the AMZ[7, 6] bits will always read zero.

All of the tristate devices 818, 820, 822, 824, 826, 828, 830 and 832 are under the control of a NAND gate 834. The output of the NAND gate 834 is a signal CZRDb, which indicates an AMZ register read. The RDCLKh is applied to one input of the NAND gate 834. An AMZh signal is applied to the other input. The AMZh represents that the microprocessor 30 has written to the address $0025.

The flip-flops 804, 806, 808, 810, 812 and 814 are reset by the microprocessor 30. More specifically, a RESb signal is applied to the reset inputs of these flip-flops.

AUTO-ZERO STATE MACHINE

Figure 83:
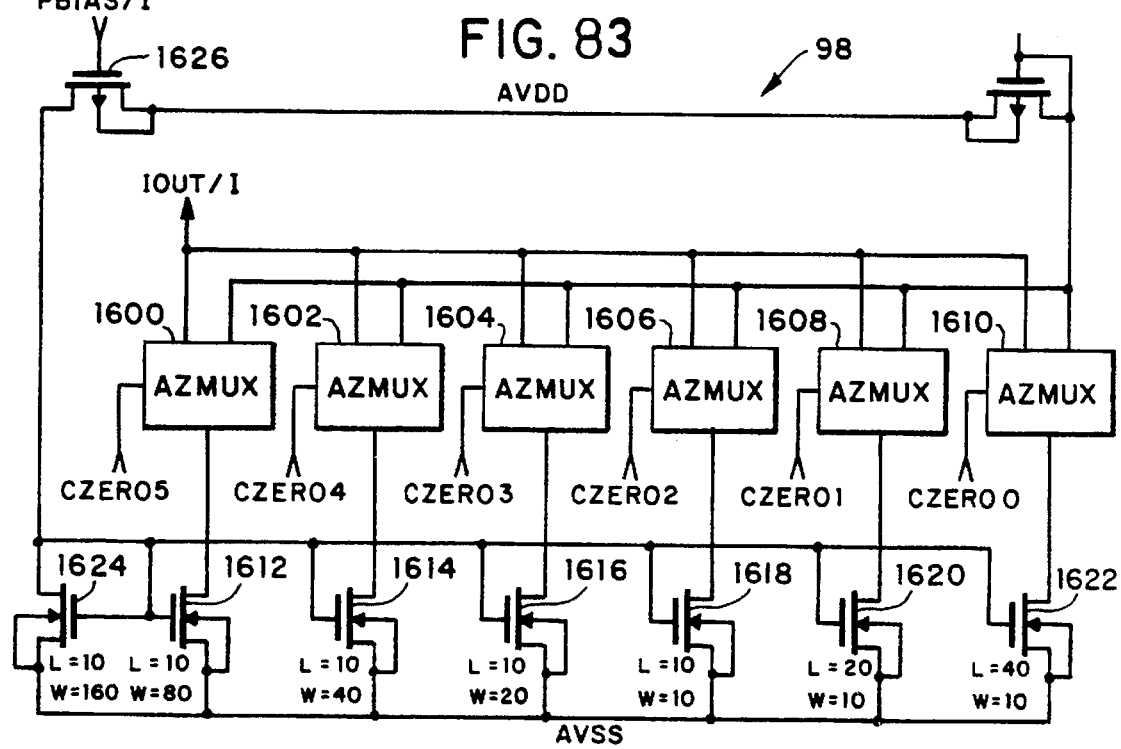
FIG. 83 is a schematic diagram of the offset correction circuitry in accordance with the present invention.
Figure 84:
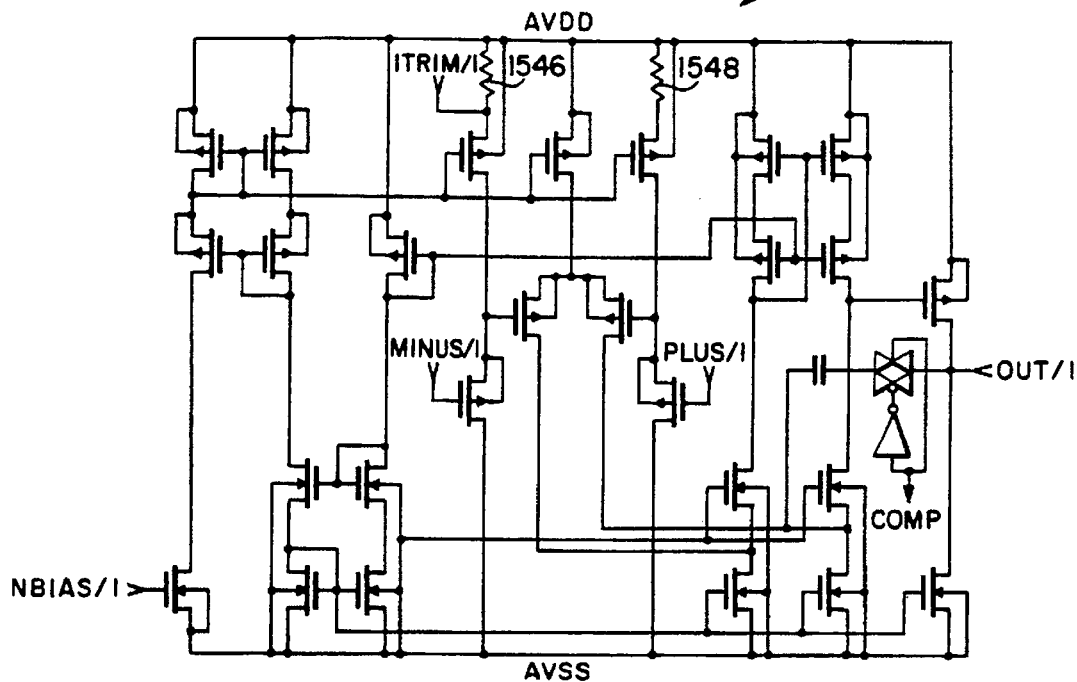
FIG. 84 is a schematic diagram of the auto-zeroable voltage and current amplifiers in accordance with the present invention.

An auto-zero state machine generates the sequencing required to zero the voltage and current amplifiers 80 and 90 by adjusting the internal bias currents. During an autozero sequence, the amplifier's inputs and output are isolated from associated circuitry and the inputs are grounded. The autozero state machine differentially varies the bias currents in discrete steps by way of current divider (FIG. 83) until the amplifier's output changes states. The autozeroable amplifier is illustrated in FIG. 84. The number of steps corresponding to the change in state represents the offset correction value. This correction value stored in the ADZ and AMZ registers is discussed above.

Figure 114:
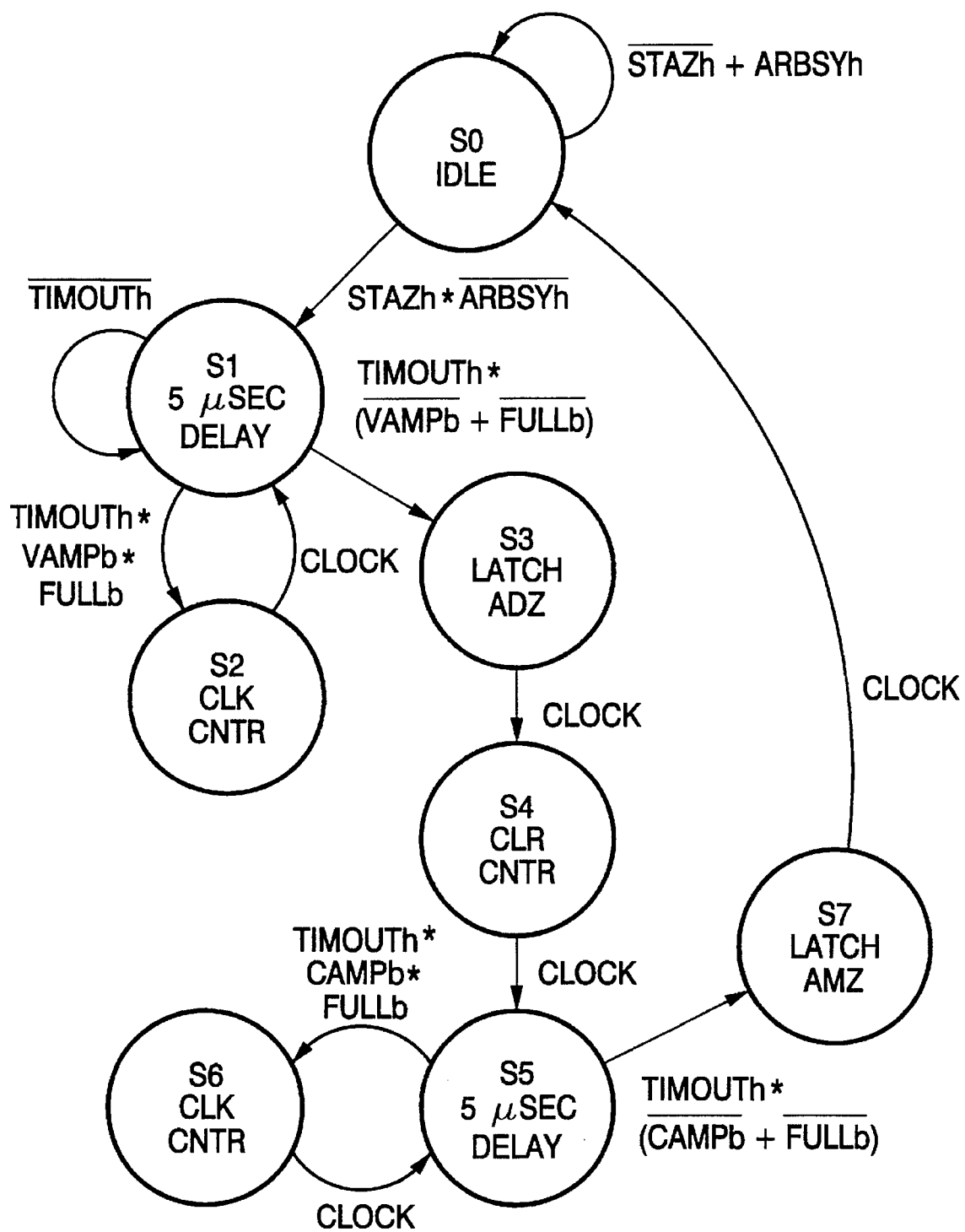
FIG. 114 is a state diagram for an auto-zero function of the IC in accordance with the present invention.

The auto-zero state machine is illustrated in FIG. 114. An auto-zero state transition table, state diagram and transition table state equations are provided in Appendix C.

Figure 69:
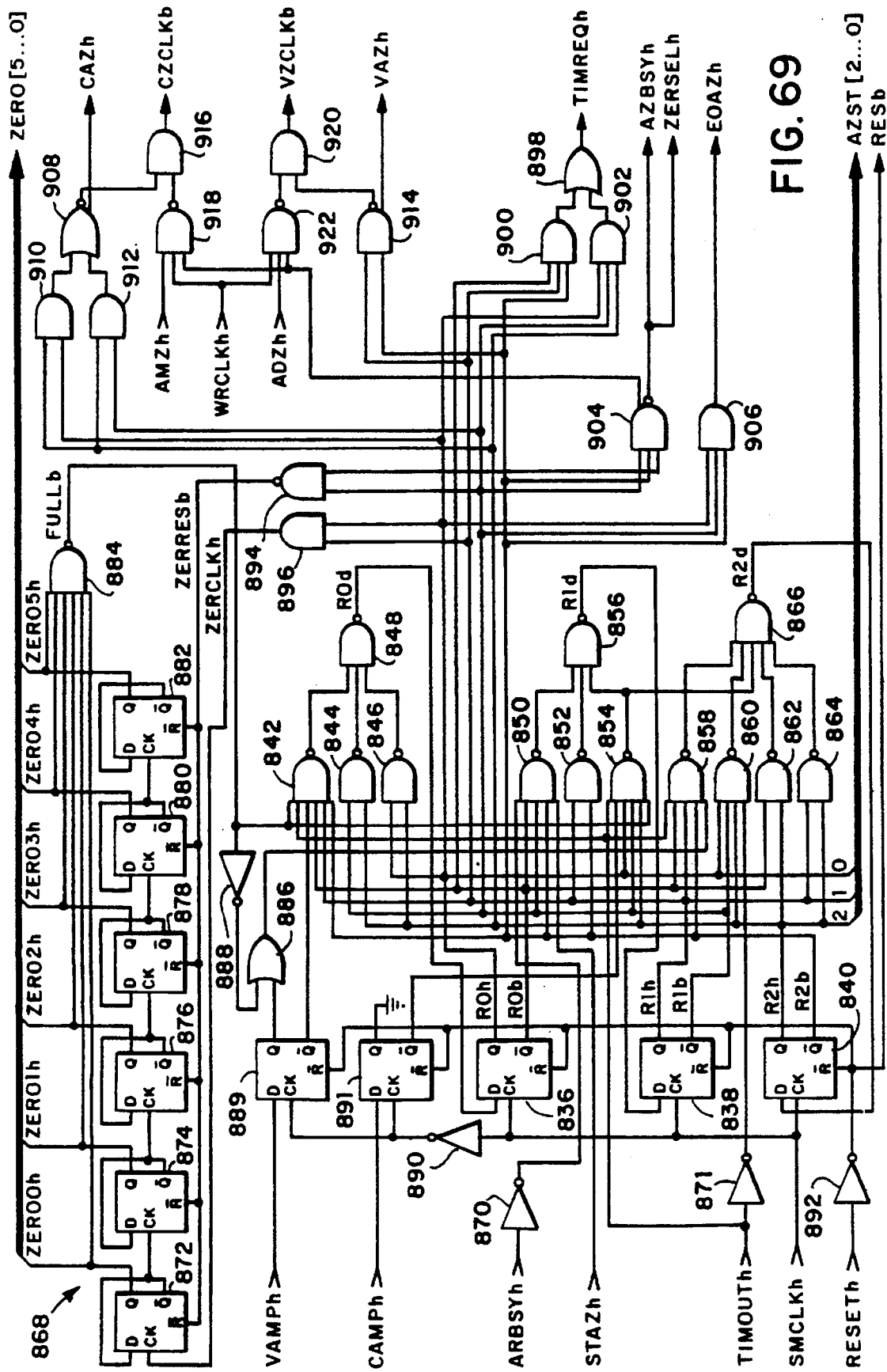
FIG. 69 is a schematic diagram of the auto-zero control logic in accordance with the present invention.

The state machine includes three state register flip-flops 836, 838 and 840 as well as NAND gates 842, 844, 846, 848, 850, 852, 854, 856, 858, 860, 862, 864 and 866 and as shown in FIG. 69. There are also various inputs to and outputs from the state machine as discussed below. The state register flip-flops produce state variables R0h, R0b, R1h, R1b, R2h and R2b. These variables, along with the variables R0d, R1d and R2d, available at the outputs of the NAND gates 848, 856 and 866 are used in the development of the state equations in Appendix C.

Each of the state register flip-flops is clocked by the SMCLKh signal discussed above. The reset signal RESETb, available at the output of an inverter 892 is applied to the reset inputs R of these flip-flops.

The outputs of the state register flip-flops 836, 838 and 840 define the auto-zero state assignments for the auto-zero state machine in accordance with Table C1, Appendix C. Eight permissible states S0–S7 are defined as follows:

S0—Idle. The state machine is in the idle state waiting for a start auto-zero signal STAZh to become active. The state machine also stays idle as long as the auto-range state machine is busy. This interlock between the two state machines is implemented by an auto-range busy signal ARBSYh. When the STAZh signal is active, the ARBSYh signal is inactive to allow the state machine to transfer to state S1.

Figure 68:
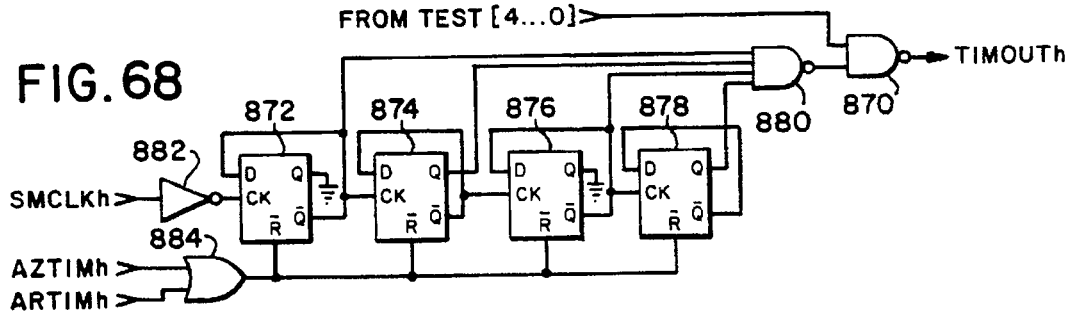
FIG. 68 is a schematic diagram of a five microsecond timer in accordance with the present invention.

S1—Five microsecond delay. States S1 and S2 form a loop which is repeated until either the voltage amplifier output changes state or a counter 868 reaches a final count. During state S1, a time request signal TIMREQh is active and a time out signal TIMOUTh is monitored. The act of the time request signal going active, which happens in state S1, triggers a five microsecond timer (FIG. 68). When the timer has timed five microseconds, the time out TIMOUTh signal becomes active. This causes the state machine to transfer to either state S2 or state S3. The state machine proceeds to state S2 if the amplifier output VAMPh signal is still high indicating that the bias current is not yet high enough and the counter 868 has not yet reached the final count as indicated by a FULLb flag. The state machine transfers to state S3 if either the amplifier output signal goes low or the counter 868 reaches the final count. The five microsecond delay permits the amplifier 80 to settle and reach a stable output.

S2—clock counter. State S2 is entered when the counter 868 does not yet contain a full count and the count is not enough to generate a suitable bias current for zeroing the amplifier 80. The clock counter signal is active in state S2 incrementing the count value by one. The state machine always transfers to state S1 on the next clock pulse.

S3—Latch ADZ value. State S3 is reached when either the voltage amplifier output has switched states or the counter 868 has reached the final count. The present count in the counter is latched into the ADZ register by activating the VZCLKh signal for one state time. The state machine always transfers to state S4.

S4—Clear Counter. State S4 sets up the state machine for auto-zeroing the current amplifier 90. The counter is cleared via a ZERRESb signal and the MUXes 774, 776, 778, 780, 782 and 784 on the output of the counter switch to direct the count value to the AMZ register and the current amplifier 90. The state machine always transfers to state S5.

S5—Five microsecond delay. State S5 and S6 are analogous to state S1 and S2 except the counter is applied to the current amplifier 90 and the output of the current amplifier CAMPh is examined to transfer from S5 to S7.

S6—Clock Counter. This state is identical to state S2. The state machine always transfers to state S5.

S7—Latch AMZ value. This state is analogous to state S3. Current contents of the counter 868 are latched in the AMZ register. Additionally the end of auto-zero signal EOAZh is active to indicate that the auto-zero operation has been complete.

AUTO-ZERO INPUTS

There are various input and on signals to the auto-zero machine identified as follows:

ARBSYh—Auto-Range Busy. This signal is active high when the auto-range state machine is not idle. This signal is applied to the state machine by way of an inverter 870. This signal is discussed in connection with the auto-range state machine.

STAZh—Start Auto-Zero. This signal is active high when the initiate auto-zero bit of a command register has been written. This signal is available at the output of the AND gate 528 (FIG. 62).

VAMPb—Voltage Amp Output. This signal is active low when the voltage amplifier 80 has been auto-zeroed. The VAMPh signal is the output signal of the voltage amplifier 80 and is applied to a flip-flop 889.

CAMPb—Current Amp Output. This signal is low when the current amplifier 90 has been auto-zeroed. The CAMPh signal is available at the output of the current amplifier 90. This signal is applied to a flip-flop 891.

TIMOUTh—Time Out. This signal is active high when a five microsecond time delay has expired. The TIMOUTh signal is available at the output of a NAND gate 870 (FIG. 68). The NAND gate 870 is a two input NAND gate. One input is active during the test mode. The other input is from a five microsecond timer comprised of flip-flops 872, 874, 876 and 878 and a NAND gate 880. The Q outputs of these flip-flops are tied to the inputs of the NAND gate 880. The flip-flops 842 and 846 are configured such that their $\overline{Q}$ outputs are connected to their D inputs. The $\overline{Q}$ outputs of the flip-flops 872, 874 and 876 are applied to clock inputs CK of the flip-flops 874, 876 and 878, respectively. A TIMOUTb signal, available at an output of an inverter 871 (FIG. 69), is also applied to the auto-zero state machine. The TIMOUTb signal is applied to the NAND gate 860. The SMCLKh signal is applied to an inverter 882, whose output is connected to the clock input CK of the flip-flop 872. The reset inputs $\overline{R}$ of the flip-flops 872, 874, 876 and 878 are controlled by an OR gate 884. The OR gate 884 is a two input OR gate. Signals AZTIMh and ARTIMh are applied to the inputs.

FULLb—Counter Full. This signal is active low when the counter 868, used to set a bias current, is at 111111 count. This is a maximum bias count value. The counter 868 includes the flip-flops 872, 874, 876, 878, 880 and 882 and a NAND gate 884 connected as shown in FIG. 64. The Q outputs of the flip-flops 872, 874, 876, 878, 880 and 882 are connected to the NAND gate 884, which is the FULLb flag and the internal ZERO[5 . . . 0] bus. The FULLb flag is applied to the inputs of the NAND gates 842 and 854. It is also applied to an OR gate 886 by way of an inverter 888. The other input to the OR gate 886 is from a flip-flop 889. The input to the flip-flop 889 is a signal VAMPh, which is the output of the voltage amplifier 80. This flip-flop is clocked by the complement of the SMCLKh signal, available at an inverter 890. The flip-flop 889 is reset by a RESETb signal available at the output of an inverter 892. The output of the OR gate 886 is applied to the NAND gate 858.

RESETh—Reset. This signal is active high to reset the state register flip-flops 836, 838 and 840 during system reset. This signal is available at the output of the inverter 892.

AUTO-ZERO OUTPUTS

ZERRESb—Zero Counter Reset. This signal is active low to reset the counter 868 used to generate the bias counter and is active in states S0 and S4. This signal is available at an output of a NAND gate 894.

ZERCLKh—Zero Counter Clock. This signal is active high to increment the bias current counter 868. This signal is active in states S2 and S6 and is available at an output of a NAND gate 896.

TIMREQh—Time Request. This signal is active high to request a five microsecond delay period and is active in states S1 and S5. This signal is available at an output of a two input OR gate 898. Outputs from AND gates 900 and 902 are applied to inputs of the OR gate 898. Inputs to these AND gates are from the state machine.

AZBSYh—Auto-Zero Busy. This signal is active high to indicate when an auto-zero operation is active. This signal is used to interlock the auto-zero and auto-range state machines. The AZBSYh signal also inhibits the microprocessor 30 from writing to the auto-zero registers by disabling NAND gates which decode the register select signals AMZh and ADZh and the write clock signal WRCLKh. This signal is active in states S1, S2, S3, S4, S5, S6 and S7. This signal is available at an inverting output of a NAND gate 904. The output of the NAND gate 904 is also the ZERSELh signal.

EOAZh—End of Auto-Zero. This signal is in active high signal which sets the flip-flop 492 (FIG. 62) in the ADCR status register to indicate an auto-zero process has finished. It also clears a flip-flop which generates the STAZh signal and is active in S7. This signal is available at an output of an AND gate 906.

CAZh—Current Auto-Zero. This signal is active high to indicate when the current amplifier 90 is being auto-zeroed. This signal is active in states S4, S5 and S6. This signal is available at an inverting output of a two input NOR gate 908. Inputs to the NOR gate 908 are from AND gates 910 and 912 which is connected to the state machine.

VAZh—Voltage Auto-Zero. This signal is active high to indicate when the voltage amplifier 80 is being auto-zeroed and is active in state S1 and S2. This signal is available at a non-inverting output of a NAND gate 914.

CZCLKh—Current Zero Register Clock. This signal is active low to clock the AMZ register for the current amplifier bias count. When the state machine is idle, this signal is generated by decoding the register select signal AMZh and the write clock signal WRCLKh. When the state machine is active, S7 is decoded to generate a clock pulse to the register. This signal is active in S7. This signal is available at an output of a two input AND gate 916. One input to the AND gate 916 is an inverting output from the NOR gate 908. The other input is from a three input NAND gate 918. One input to the NAND gate 918 is a non-inverting output of the NAND gate 904. The other inputs are the AMZh and WRCLKh signals.

VZCLKh—Voltage Zero Register Clock. This signal is active low to clock the ADZ register for the voltage amplifier bias count. When the state machine is idle, this signal is generated by decoding the register select signal ADZh and the write clock signal WRCLKh. When the state machine is active, S3 is decoded to generate a clock pulse to the register. This signal is active in S3. This signal is available at an output of two input AND gate 920. An inverting output of the NAND gate 914 is applied to one input. The other input is from a three input NAND gate 922. The ADZh and WRCLKh signals are applied to two inputs. A non-inverting output from the NAND gate 904 is applied to the other input.

AZST bus—Auto-Zero States. This three bit wide bus contains the auto-zero state machine flip-flops 836, 838 and 840. This bus is used to permit reading of these flip-flops during a test condition.

AUTO-ZERO STATE MACHINE OPERATION

The auto-zero state machine auto-zeros the voltage 80 and current amplifier 90. The auto-zero function is initiated by the software setting a bit in the command register which includes the flip-flops 522, 524 and 526. More specifically, referring to FIG. 62 when the command bit ADCR[2] is written to the NAND gate 520 this, in turn, controls the flip-flops 522, 524 and 526 to generate the start auto-zero signal STAZh at the output of the AND gate 528.

The voltage 80 and current 90 amplifiers are auto-zeroed in the following manner. After the generation of the start auto-zero signal STAZh. First, the six bit counter 868 (FIG. 67) is cleared. This counter 868 is cleared by the ZERRESb signal in states S0 and S4. After the six bit counter 868 is cleared the voltage amplifier 80 is placed in the auto-zero state by shorting its non-inverting input to ground by way of the MUXes 66 and 86. This is accomplished by the VAZh signal which is active in states S1 and S2. This signal generates an AGNDh signal at the output of an OR gate 924, which shorts the non-inverting input of the voltage amplifier 80 to ground by way of the MUXes 66 and 86. MUX 88 removes the internal compensation from the voltage amplifier 80. Next the output of the counter 868 is gated onto a ZERO[5 . . . 0] bus for the amplifier being auto-zeroed. Subsequently, a five microsecond delay is timed. This is accomplished by the circuitry in FIG. 68 previously discussed. At the end of the five microsecond delay, a TIMOUTh signal is generated at the output of the NAND gate 870. At the end of the delay, the output signal VAMPh, which is the output signal of the voltage amplifier 80, is examined. Also, the counter 868 full counter count signal FULLb is examined. If either of these signals is active, the count is latched into the ADZ register by the state machine. Otherwise, the counter 868 is incremented and the five microsecond delay is timed again. After the count is latched the sequence is repeated with the current amplifier 90.

AVSF AND ACSF AUTO-RANGE REGISTERS

Figure 80:
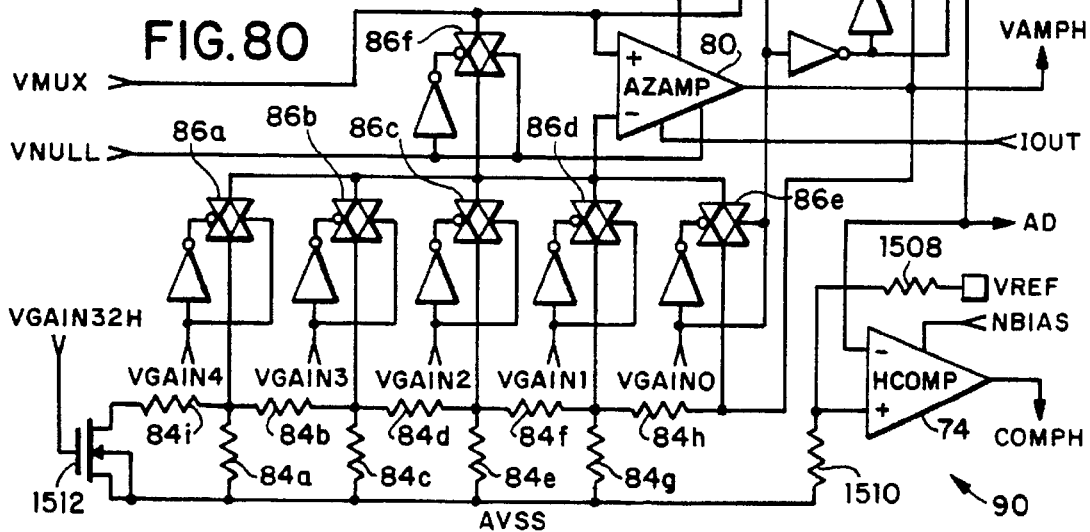
FIG. 80 is a schematic diagram of the ranging circuitry for the voltage amplifier in accordance with the present invention.

The voltage scale register AVSF (FIG. 70) is a read-write register that is used to control operation of the voltage input ranging circuitry 84 (FIGS. 34 and 80). The value written into this register determines the voltage amplifier 80 auto-ranging mode. If a zero is written to this register, the voltage amplifier 80 is placed in an auto-ranging mode. A nonzero value inhibits the auto-ranging and sets the voltage amplifier 80 in a fixed gain mode. The register is not a true read-write register. The value read from it will not necessarily be the value that was written into it. Writing a zero into the AVSF register enables auto-ranging. However, a zero cannot be read from this register. The possible values are provided in Table 9. The value read from this register is one of the scale factors to properly scale the 8 bit A–D output. Five values are possible: ×1, ×2, ×4, ×8 and ×16.

The AVSF register includes six flip-flops 944, 946, 948, 950, 952 and 954. The D inputs of these flip-flops are connected to the data bus DATA[5 . . . 0] operations during ranging. Any non-zero value written to the AVSF register is detected by a NAND gate 998 which disables autoranging. The $\overline{D}$ inputs of the flip-flops 944, 946, 948, 950, 952 and 954 are tied to the output of a buffer amplifier 955. The input to the buffer amplifier 955 is the signal VRCLKb. This signal will be defined in connection with the auto-range state machine and is used to control read and write operations of the AVSF register. The Q outputs of the flip-flops 944, 946, 948, 950 and 952 are tied to the B inputs of MUXes 956, 958, 960, 962 and 964, respectively. The D output of the flip-flop 954 is a signal VGAIN32h. This signal VGAIN 32h along with GAIN[4 . . . 0] from autoranging circuit which includes counter 1170 (FIG. 71) are applied to ranging circuitry 84 and MUXes 86 of the voltage amplifier 80 (FIGS. 34 and 80) to control the voltage gain. The counter 1170 as will be discussed below, includes the ranged value as a result of autoranging of the voltage amplifier 80 and the current amplifier 90. More specifically, the MUXes 956, 958, 960, 962 and 964 allow the Q outputs of the flip-flops 944, 946, 948, 950, 952 and 954 to be connected to either to a gain bus GAIN[4 . . . 0] or to A inputs of MUXes 966, 968, 970, 972 and 974. The B inputs of the MUXes 966, 968, 970, 972 and 974 are connected to ground which allows the output signals of the flip-flops 944, 946, 948, 950, 952 and 954 to either be grounded or connected to the data bus DATA[5 . . . 0] by way of tristate devices 976, 978, 980, 982 and 984 for read operations. The tristate devices 976, 978, 980, 982 and 984 are under the control of a signal VRRDb (FIG. 71) which read operations of this AVSF register.

The output of the MUXes 966, 968, 970, 972 and 974 are also tied to one input of a plurality of AND gates 986, 988, 990, 992 and 994. The other input to the AND gates 986, 988, 990, 992 and 994 is from an inverter 996. The input to the inverter 996 is the VAZh signal (FIG. 69), the voltage auto-zero signal, which indicates the voltage amplifier 80 autoranging is active. The output of the AND gates 986, 988, 990, 992 and 994 are connected to the VGAIN[4 . . . 0] bus which controls the autoranging MUXes 86 (FIG. 80).

The MUXes 956, 958, 960, 962 and 964 are under the control of a NAND gate 998 which generates a signal VRZEROh. This signal indicates that the microprocessor 30 wrote a zero to the AVSF register to initiate voltage autoranging. The signal VRZEROh is active high and determines whether the voltage amplifier 80 is placed in an auto-ranging mode or a fixed gain mode. The input to the NAND gate 998 are the Q outputs of the flip-flops 944, 946, 948, 950 and 952. A zero written to the AVSF register will cause the Q outputs of the flip-flops 944, 946, 948, 950 and 952 to be high or true. This will, in turn, cause the signal VRZEROh to be active which, in turn, will cause the MUXes 956, 958, 960, 962 and 964 to connect the Q output signals from the flip-flops 944, 946, 948, 950, 952 and 954 to the VGAIN[4 . . . 0] bus for auto-ranging. Non-zero values written to the register AVSF are detected by the NAND gate 998 will place the circuitry in a fixed gain mode. This will cause the MUXes 956, 958, 960, 962 and 964 to connect the Q output signals from the flip-flops 944, 946, 948, 950, 952 and 954 to the MUXes 966, 968, 970, 972 and 974. The MUXes 966, 968, 970, 972 and 974 either ground the Q outputs of the flip-flops 944, 946, 948, 950, 952 and 954 or allow them to be tied to the AND gates 986, 988, 990, 992 and 994 which, in turn, are connected to the VGAIN[4 . . . 0] bus. The MUXes 966, 968, 970, 972 and 974 are under the control of an AND gate 1000 which inhibits autoranging of the voltage amplifier 80 when the current mode has been selected and is being autoranged. The AND gate 1000 is a three input AND gate 1000. The VRZEROh, indicating voltage amplifier autoranging signal is applied to one input. The AZBSYb signal, which represents that the auto-zero signal is busy, is applied to another input. The output of an AND gate 1002 is a signal CURRENTh, which represents that the current mode has been selected. The CURRENTh signal is applied to the third input of the AND gate 1000. The AZBSYb signal, used to inhibit the auto-range state machine when the auto-zero machine is active. The AND gate 1002 inhibits auto-ranging when the current subsystem is selected.

Figure 71:
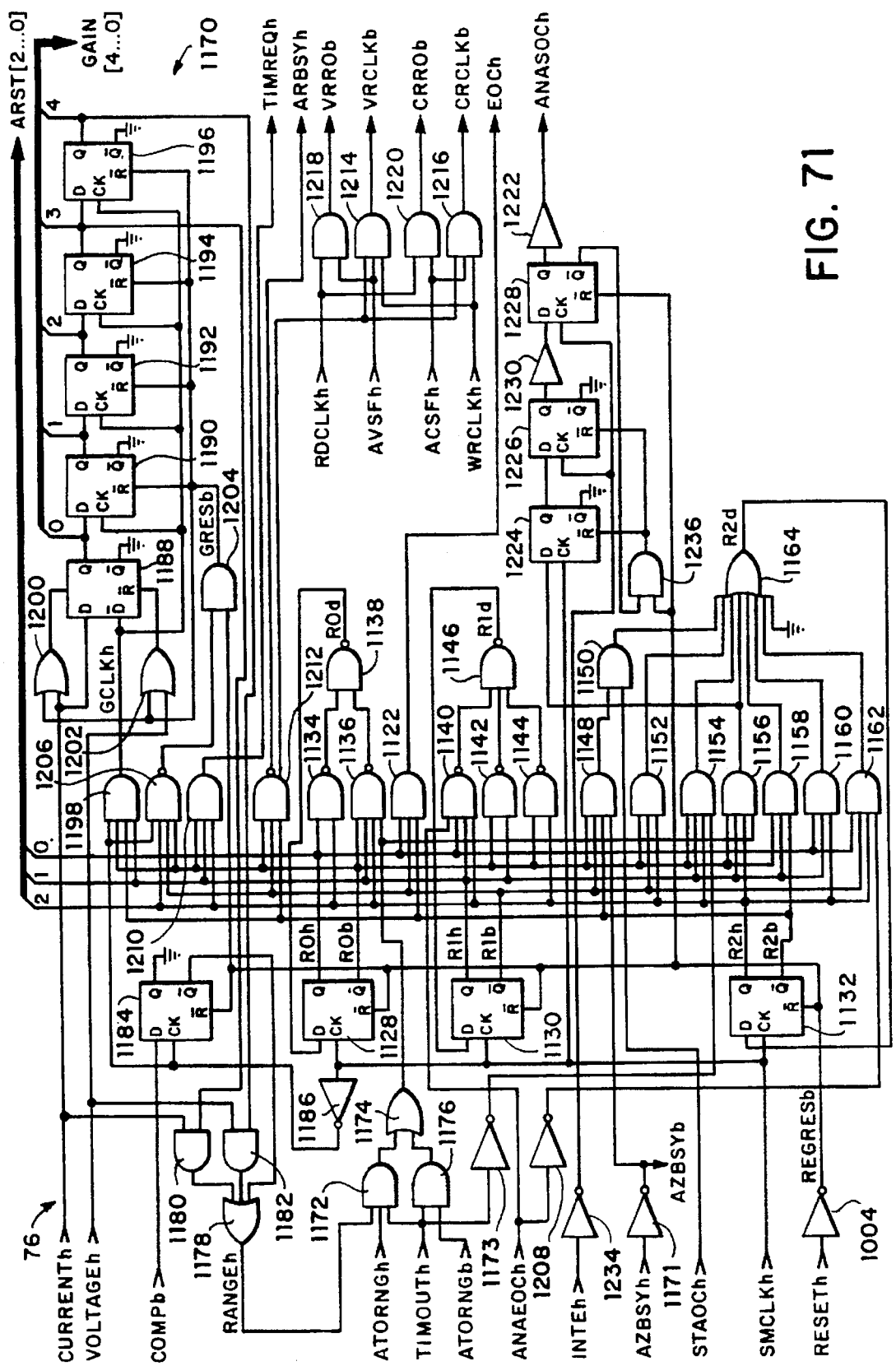
FIG. 71 is a schematic diagram of the auto-range state machine in accordance with the present invention.
Figure 72:
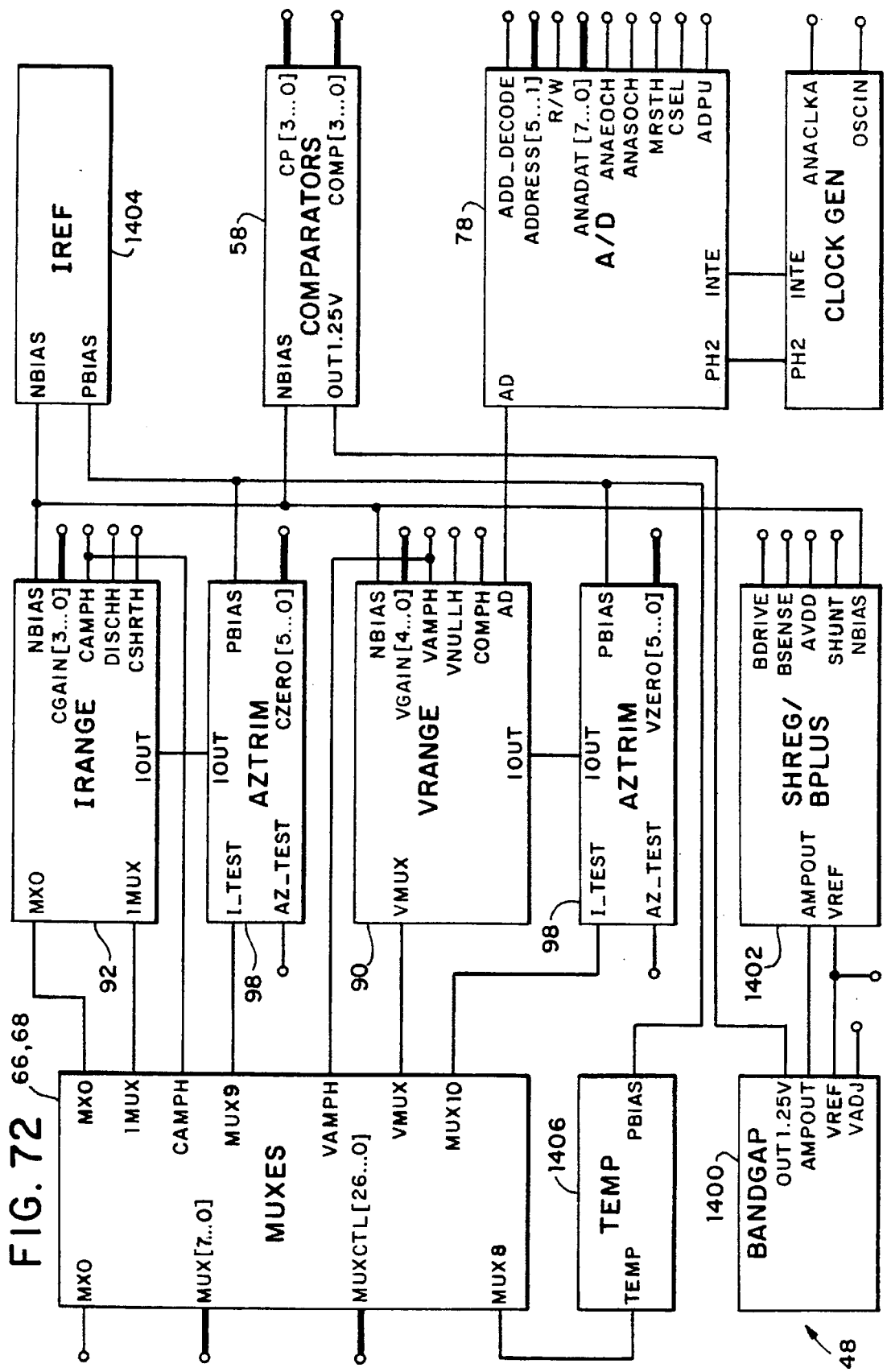
FIG. 72 is an overall block diagram of the analog circuitry in accordance with the present invention.

A REGRESb signal is applied to the reset inputs R of the flip-flops 944, 946, 948, 950, 952 and 954. The REGRESb signal is available at the output of an inverter 1004 (FIG. 71). The input to the inverter 1004 is the signal RESETh from the CPCTL[3 . . . 0] bus.

The current scale factor register ACSF is a read-write register used to control the operation of the current input auto-ranging circuitry. The value written to this register determines the current subsystem auto-ranging operating mode. The zero is written the current subsystem is placed in an auto-ranging mode. A non-zero value inhibits the auto-ranging mode and sets the current mirror into a fixed scale value. The register is not a true read-write register. In other words, the value read from it is not necessarily the value that was written into it. Although writing a zero into the ACSF register enables the auto-ranging mode, a zero will never be read from it.

The ACFR register (FIG. 70) includes the flip-flops 1006, 1008, 1010, 1012, 1014. The data bus DATA[4 . . . 0] is applied to the D inputs of these flip-flops for write operations in a fixed gain mode. A NAND gate 1048 detects non-zero values written to this register to enable a fixed gain mode. The $\overline{D}$ inputs of the flip-flops 1006, 1008, 1010, 1012 and 1014 are tied to a buffer amplifier 1016. The input to the buffer amplifier 1016 is a signal CRCLKb, which will be discussed in connection with the auto-range state machine, latches the gain value in this register at the completion of autoranging. The signal REGERSSb is applied to the reset inputs R. The MUXes 1018, 1020, 1022 and 1024 allow the Q outputs of the flip-flops 1006, 1008, 1010 and 1012 to be connected to the CGAIN[4 . . . 0] bus, indicating that the auto-range function has been selected, or to MUXes 1026, 1028, 1030 and 1032. The CGAIN[3 . . . 0] bus is applied to the current mirror 92 (FIG. 81) to control the divider ratio of the current mirror 92. The MUXes 1026, 1028, 1030 and 1032 either allow the output signals Q from the flip-flops 1006, 1008, 1010 and 1012 to either be grounded or applied to the gain bus CGAIN[3 . . . 0] or tied to tristate devices 1034, 1036, 1038 and 1040 to allow the them to be read at the data bus DATA[3 . . . 0]. More specifically, the Q output of the flip-flop 1006 is applied to a B input of the MUX 1018. An A input of the MUX 1018 is applied to the gain bus bit GAIN[3]. The Q output of the flip-flop 1006 is also applied to inputs of OR gates 1042, 1044 and 1046. The Q output of the flip-flop 1008 is also applied to other inputs of the OR gates 1042, 1044 and 1046. Also, the Q output of the flip-flop 1010 is applied to the OR gates 1044 and 1046. Lastly, the Q output of the flip-flop 1012 is also applied to an input of the OR gate 1046.

The outputs of the OR gates 1042, 1044 and 1046 are applied to the B inputs of the MUXes 1020, 1022 and 1024. The fixed gain bus bits GAIN[3 . . . 0] are applied to the A inputs of the MUXes 1018, 1020, 1022 and 1024. The MUXes 1018, 1020, 1022 and 1024 are under the control of a NAND gate 1048. The NAND gate 1048 generates a CRZEROh signal which indicates that the microprocessor 30 has written a zero to the ACSF register to initiate current auto-ranging. A non-zero value written to this register which places the current mirror 92 into a fixed scale value. The Q outputs of the flip-flops 1006, 1008, 1010, 1012 and 1014 are applied as inputs to the NAND gate 1048. If a zero is written into the ACSF register the MUXes 1018, 1020, 1022 and 1024 connect the Q output of the flip-flop 1006 and the Q outputs of the flip-flops 1008, 1010 and 1012 to the gain bus GAIN[4 . . . 0]. Non-zero values written into the ACSF register causes the MUXes 1018, 1020, 1022 and 1024 to be connected to the A inputs of the MUXes 1026, 1028, 1030 and 1032. The B inputs of the MUXes 1026, 1028, 1030 and 1032 are grounded. The MUXes 1026, 1028, 1030 and 1032 are under the control of an AND gate 1049 which disables the auto-ranging of the current amplifier 70 when the system is in a voltage mode. In this condition, the output signals from the flip-flops 1006, 1008, 1010 and 1012 are grounded. There are two inputs to the AND gate 1049. One input to the AND gate 1049 is from the NAND gate 1048. The output of a NAND gate 1048 indicates that auto-ranging has not been selected. The $\overline{Q}$ outputs of the flip-flops 1006, 1008, 1010, 1012 and 1014 are applied as inputs to the NAND gate 1048. The other input to the AND gate 1049 is an inverter 1050. The output of the inverter is a VOLTAGEh signal which indicates that the MUX 66 is in a voltage mode. The input to the inverter 1050 is the output of the AND gate 1002 which indicates that the MUX 66 is in a current mode. The inputs to the AND gate 1002 is a MXOSELh signal (FIG. 66) which indicates that a current mode has been selected. The outputs of the MUXes 1026, 1028, 1030 and 1032 are connected to a pair of serially coupled inverter amplifiers 1052, 1054, 1056, 1058, 1060, 1062, 1064 and 1066. The outputs of the inverters 1054, 1058, 1062 and 1066 are applied to the gain bus CGAIN[3 . . . 0] as well as to the tristate devices 1034, 1036, 1038, 1040 either directly or by way of AND gates, 1068, 1070 and 1072. More specifically, the output of the inverter amplifier 1054 is applied to the tristate device 1034. The output of the inverter amplifier 1058 is applied to an AND gate 1068 along with the output of the inverter amplifier 1052. The output of the inverter amplifier 1062 is applied to the AND gate 1070 along with the output of the inverter amplifier 1056. The output of the inverter amplifier 1066 is applied to the input of the AND gate 1072 along with the inverter amplifier 1060.

These tristate devices 1034, 1036, 1038 and 1040 are also applied to the data bus DATA[3 . . . 0] to allow the ACSF register to be read. The output of the inverter amplifier 1064 is applied to a tristate device 1068. This tristate device 1068 is applied to the DATA[4] bit. The tristate devices 1034, 1036, 1038, 1040 and 1068 are controlled by a signal CRRDb. This signal will be identified in connection with the auto-range state machine.

Figure 67:
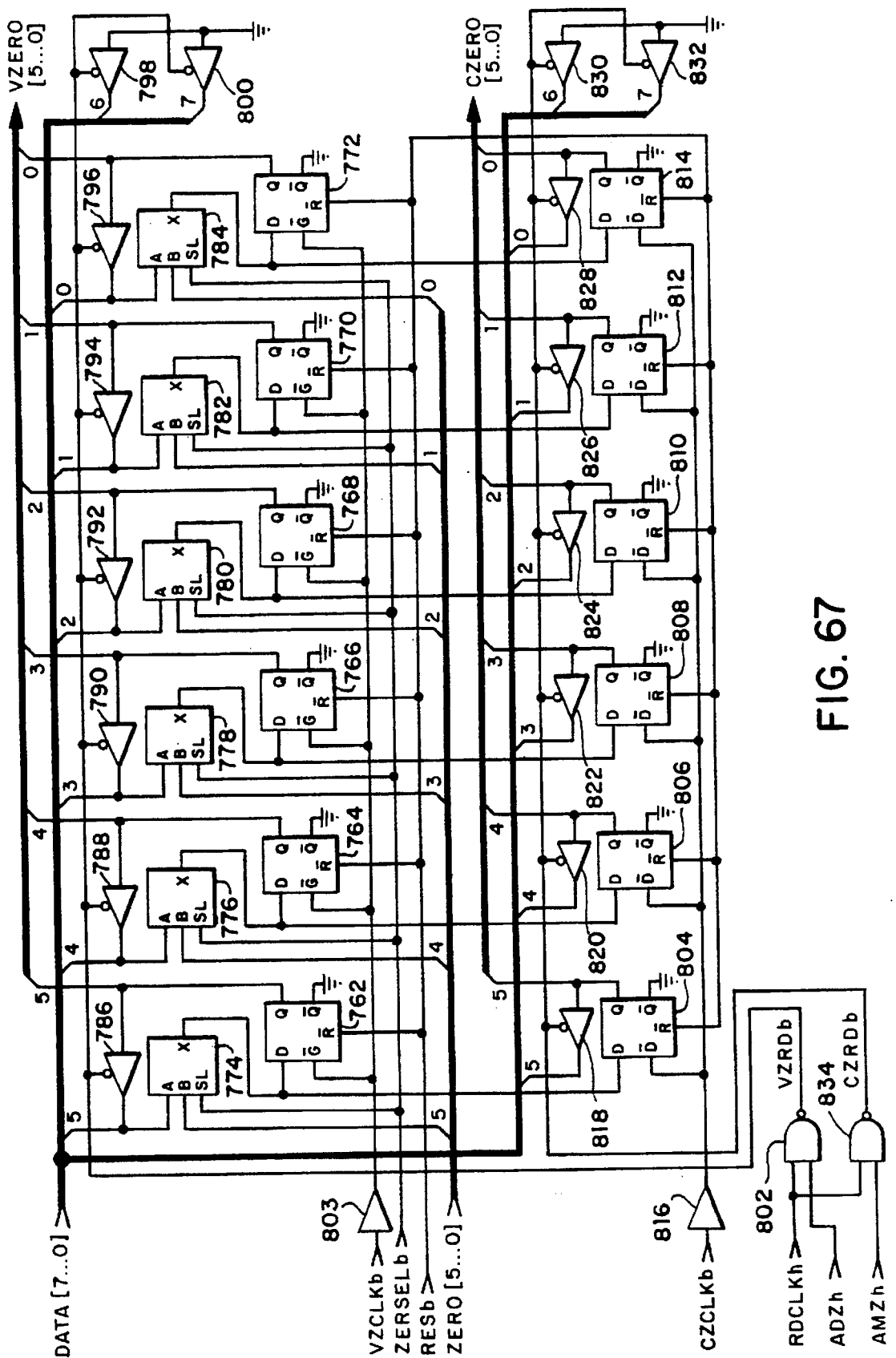
FIG. 67 is a schematic diagram of the auto-zero registers in accordance with the present invention.

A signal AZST[2 . . . 0], representative of the states of the auto-zero state machine, is applied to AND gates 1070, 1072 and 1074 (FIG. 67). This signal represents the Q output signals of the auto-zero state register flip-flops 836, 838 and 840 (FIG. 69). Also applied to the AND gates 1070, 1072 and 1074 are test signals. The TEST signals are also applied to the reset input R of the flip-flop 954. The outputs of the AND gates 1070, 1072 and 1074 are applied to tristate devices 1076, 1078 and 1080. The outputs of the tristate devices 1076, 1078 and 1080 are applied to the data bus DATA[7 . . . 5] to allow these signals to be read by the microprocessor 30. The tristate devices 1076, 1078 and 1080 are under the control of a signal CRRDb.

The states of the auto-range state machine ARST[2 . . . 0] are applied to the inputs of AND gates 1082, 1084 and 1086. Test signals are also applied to the inputs of the AND gates 1082, 1084 and 1086. The ARST[2 . . . 0] signal represents the states of the auto-ranging state register flip-flops and will be discussed in connection with the auto-ranging state machine. The outputs of the AND gates 1082, 1084 and 1086 are applied to tristate devices 1088, 1090 and 1092. The outputs of these tristate devices are applied to the data bus DATA[7 . . . 5]. The tristate devices 1088, 1090 and 1092 are under the control of a VRRDb signal. This signal controls the reading of the auto-range state register flip-flops states by the microprocessor 30 and will be discussed in connection with the auto-range state machine.

AUTO-RANGE STATE MACHINE

The auto-range state machine is illustrated in FIG. 71. A state transition table, state diagram and transition state equations are provided in Appendix D.

This state machine auto-ranges the voltage 80 and current 90 amplifier gains before initiating an analog to digital conversion. During voltage autoranging, the output signals of the voltage amplifier 80 is compared with a predetermined value by the comparator 74 (FIG. 34) to determine if the amplifier output is either too large or out of range of the A/D. At the start of the autoranging a gain shift register 1170 (FIG. 71) is initialized and incremented during a predetermined time period (TIMOUTh). When either the comparator 74 switches state or the time period expires, the value of the gain shift register will represent the gain. This gain value is stored in the AVSF register and is used to control the ranging circuitry 84.

During current autoranging, ranged currents are directed out of the MXO pin and applied to an external register. The voltage across the external resister is then applied to a voltage input. Ranging is then accomplished in a similar manner as the voltage autoranging. Gain values in this mode are stored in the ACSF register.

The auto-range state machine includes three state register flip-flops 1128, 1130 and 1132; NAND gates 1134, 1136, 1138, 1140, 1142, 1144, 1146; AND gates 1148, 1150, 1152, 1154, 1156, 1158, 1160 and 1162; OR gate 1164 and various output gates connected as shown in FIG. 71. The Q outputs of the state flip-flops 1128, 1130 and 1132 indicate the state variables R0h, R1h and R2h. The $\bar{Q}$ output of the state register flip-flops 1128, 1130 and 1132 generate the state variables R0b, R1b and R2b. The state variable R0d is generated at the output of the NAND gate 1138. The state variable R1d is generated at the output of the NAND gate 1146. The state variable R2d is generated at the output of the OR gate 1164.

Each of the state register flip-flops 1128, 1130 and 1132 is clocked by the SMCLKh signal. The reset signal REGRESb, available at the output of the inverter 1004, is applied to the reset inputs R of these state register flip-flops.

The outputs of the state register flip-flops 1128, 1130 and 1132 define permissible output states for the auto-range state machine in accordance with Table D-1, Appendix D. The state register flip-flops 1128, 1130 and 1132 allow for eight states. However, only seven are necessary and are defined as follows:

S0—Idle. The state machine is in the idle state waiting for a start auto-range signal (STADCh) to be active. The state machine also stays in the idle state as long as the auto-zero state machine is busy. This interlock between the two independent state machines is implemented by the auto-range busy signal (ARBSYh). When the state start auto-range signal is active and the auto-range busy signal is inactive the auto-zero state machine moves to state S1.

S1—Reset shift register. State S1 initializes a shift register 1170 for the type of conversion. For a voltage conversion the shift register 1170 is initialized to the binary value 0001 where the least significant set bit is set. This corresponds to a voltage gain of 1. For a current conversion the shift register 1170 is set to the binary value 00000. This corresponds to a current gain of 1. Only the four least significant bits are used for setting the current gain. The least significant bit is set or cleared by the GRESh signal by additional decoding of the VOLTAGEh and CURRENTh signals.

S2—Five microsecond delay. State S2 and S3 form a loop that is repeated until either the comparator 74 (FIG. 34) output switches or the shift register 1170 reaches the final gain. During S2, the time request signal (TIMREQh) is active in the time-out (TIMOUTh) signal is monitored. When the time request signal goes active, the state machine enters the state S1, this triggers the five microsecond time delay. When the time delay has timed out, the time-out signal becomes active. This causes the state machine to transfer either to state S3 or S4. State S3 is entered if the RANGEh signal is inactive indicating that either the gain setting is not high enough yet or the shift register 1170 has not yet reached the final gain setting. The final gain setting is detected by decoding the VOLTh and CURRh signals with the fourth and fifth bits of the shift register 1170. For a current channel, indicated by an active CURRh signal, a fourth bit indicates that a maximum gain has been reached. Maximum gain for a voltage channel is decoded by a fifth bit of the shift register 1170 and an active VOLTh signal.

The state machine transfers to state S4 when the RANGEh signal is active, if the auto-range function is active. If the auto-range function is disabled indicated by an inactive ATORNGh signal, the state machine transfers to state S4 after the five microsecond time delay. This five microsecond time delay permits the amplifier 80, 90 to settle and reach a stable output value.

S3—Clock shift register. State S3 is entered when the shift register 1170 does not yet contain a maximum gain and the gain is not enough to generate a sufficiently high input signal. The clock signal is active in state S3 causing the shift register 1170 to shift one bit. For voltage channel signals a zero is shifted into the least significant bit of the shift register 1170. This causes the shift register to shift a one across the register generating the following sequence of values: 00001, 00010, 00100, 01000, 10000.

For current channels a 1 is shifted into the least significant bit which results in the following sequence of values: 00000, 00001, 00011, 00111, 01111. Only the four bits of the gain are used in setting the current amplifier 90. The state machine always transfers to the state S2 on the next clock pulse.

S4—General SOC pulse. State S4 is used to generate a start of conversion pulse to the analog digital converter. The state machine stays in state S4 until the SOC3b signal becomes active at which time the state machine moves to state S5. The SOC3b signal is active when the start of conversion pulse has been active for three state machine clock periods.

S5—Wait for conversion. The state machine is waiting for the analog end of conversion signal while in state S5. When the analog end of conversion goes high indicating that the conversion has finished, the state machine transfers to state S6.

S6—EOC pulse. End of Conversion EOAZh is active in state S6. This indicates to the commands/status register section that the conversion process has been completed.

AUTO-RANGE INPUTS

The inputs to the auto-range state machine are as follows:

AZBSYh—Auto-Zero Busy. This signal is active high when the auto-zero state machine is not idle. This signal is applied to the state machine by way of an inverter 1171.

Figure 70:
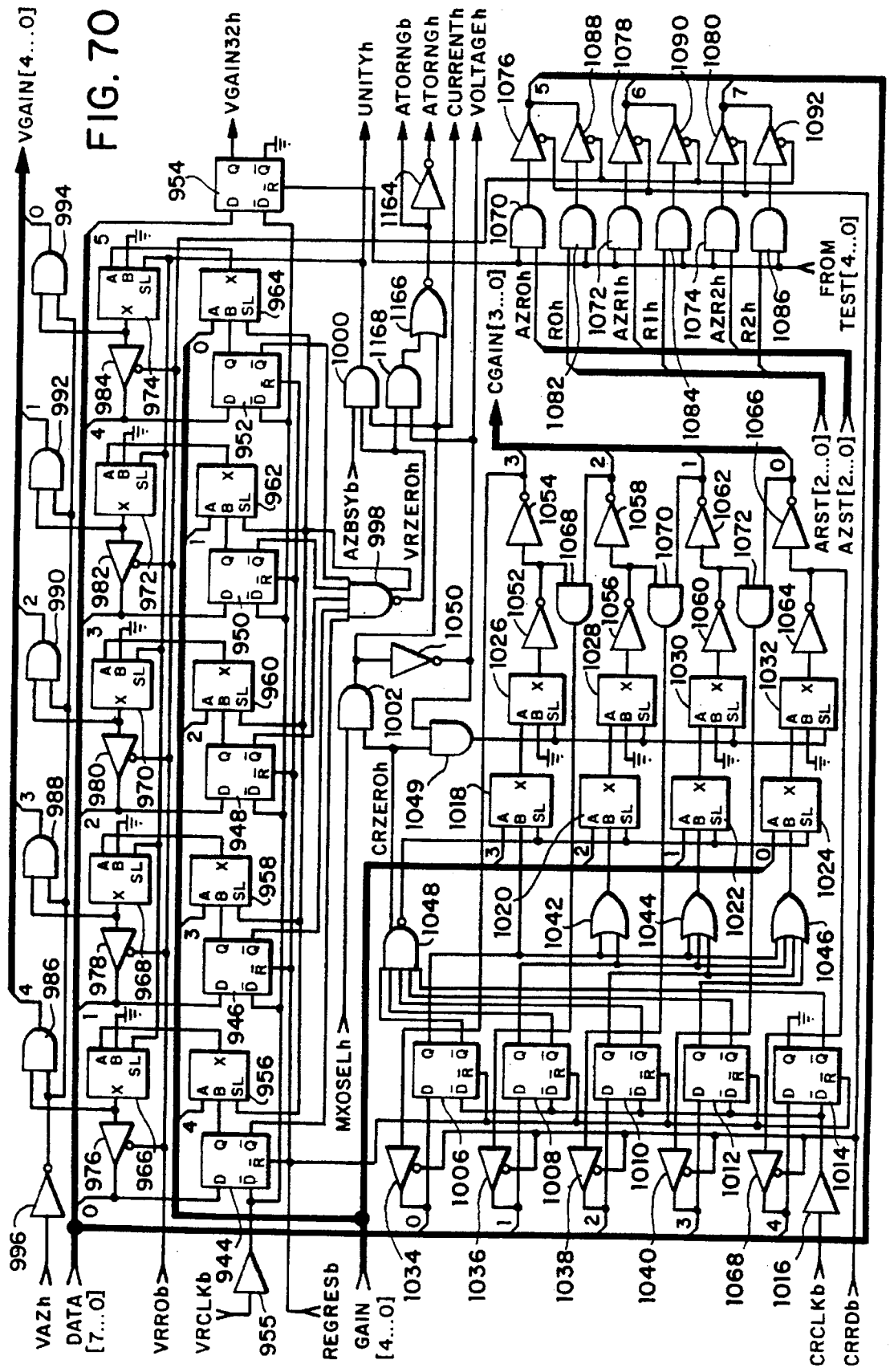
FIG. 70 is a schematic diagram of the auto-range control logic in accordance with the present invention.

ATORNGH—Auto-range Active. The auto-range active signal ATORNG represents that the auto-ranging has been activated when the microprocessor 30 writes a zero into a shift register 1170. More specifically, the ATORNGh signal is available at the output of an inverter 1164 (FIG. 70) while the ATORNGb signal is available at the output of a dual input NOR gate 1166 (FIG. 70). The NOR gate 1166 is controlled by two AND gates 1168 and 1002. The VOLTAGEh signal is applied to one input of the AND gate 1116. The signal VRZEROh is applied to the other input. The output of the AND gate 1002 in applied to the other input of the NOR gate 1166. The output of the AND gate 1002 indicates that the current mode has been selected and that the microprocessor has a zero to the ASCF register to initiate auto-ranging.

The ATORNGb and ATORNGh signals are applied to the state machine by way of circuitry which includes an AND gate 1172, an inverter 1173, an OR gate 1174 and an AND gate 1176. The OR gate 1174 is a two-input OR gate. One input is from the AND gate 1172. The AND gate 1172 is a three-input AND gate. The ATORNGb, TIMOUTh and RANGEh signals are applied to the AND gate 1172. The other input to the OR gate 1174 is from a two input AND gate 1176. One input to the AND gate 1176 is the ATORNGb signal. The other input is the TIMOUTh signal.

RANGEh—In Range Signal. This signal is active high to indicate that either the comparator 74 output signal COMPb has gone low or that the gain shift register 1170 has reached the maximum gain setting for the operating mode selected. The auto-ranging sequencing circuitry 76 includes the gain register 1170, an OR gate 1178, AND gates 1180 and 1182 and a flip-flop 1184. The RANGEh signal is available at the output of the NOR gate 1178.

The gain shift register 1170 is comprised of the flip-flops 1188, 1190, 1192, 1194 and 1196. The Q outputs of these flip-flops are tied to the D input of the next flip-flop in succession. The Q outputs are also tied to the gain bus GAIN[4 . . . 0]. A GCLKh signal is applied to the clock CK inputs of each of these flip-flops. The GCLKh signal is available at the output of an AND gate 1198. The inputs to the AND gate 1198 are the state register signals R0b, R1h and R2b which indicate the auto-range state machine is in S3. Also applied to the AND gate 1194 is the signal SMCLKb.

The GCLKh signal is used to shift a zero into the flip-flop 1188 when a voltage channel has been selected and to shift a 1 into the flip-flop 1188 when a current channel has been selected. More specifically, OR gates 1200, 1202, AND gate 1204 and a NAND gate 1206 control this function. A CURRENTh signal which is active high is applied to the input of the OR gate 1200. The other input to the OR gate 1200 is a signal GRESb available at the output of the AND gate 1204. The output of the OR gate 1200 is applied to the preset input of the flip-flop 1188 to shift a 1 into this flip-flop. This value is shifted across the shift register by the GCLKh signal.

Similarly, a VOLTAGEh signal is applied to one input of the OR gate 1202. The other input to the OR gate 1202 is a GRESb signal. The output of the OR gate 1202 is applied to the reset input R of the flip-flop 1188 to shift a zero into this flip-flop when the voltage channel is selected.

The comparator 74 output signal COMPb is monitored by the flip-flop 1184. The SMCLKb signal is applied to the clock CK input of this flip-flop. The REGRESb signal is applied to the reset input R. The output of this flip-flop indicates that the comparator 74 output signal has not yet switched which means that the comparator 74 output signal is less than, for example, 1.25 Vdc to indicate that one-half the maximum has not been reached. This signal is applied to one input of the OR gate 1178. The other inputs to the OR gate 1206 are from the outputs of the AND gates 1180 and 1182. These AND gates indicate that the shift register 1170 has reached the maximum gain setting for the operation modes specified. More specifically, the AND gate 1180 relates to the current mode. The CURRENTh signal is applied to one input of the AND gate 1188. The other input is from the output of the shift register flip-flop 1194 which when active indicates the highest gain setting when the current mode is selected.

Similarly, the VOLTAGEh signal is applied to an input of the AND gate 1182. The other input to the AND gate 1182 is the output of the shift register flip-flop 1196 which represents the highest gain setting when the voltage mode is selected.

The outputs of the AND gates 1180 and 1182 are applied to the inputs of the OR gate 1178 along with the Q output of the flip-flop 1184 to generate the RANGEh signal. The RANGEh signal indicates that either the comparator 74 output signal COMPb has gone low or that the gain shift register 1170 has reached the maximum gain setting for the operating mode selected.

TIMOUTh—Time Out. This signal is active high when the five microsecond time delay has expired. This signal is available at the output of the NAND gate 870 (FIG. 68).

SOC3b—Start of Conversion Three. This signal is active low when the start of conversion pulse has been active for three clock periods.

ANAEOCh—Analog End Of Conversion. This signal is active high when the A/D 78 has finished the conversion. This signal is applied to the AND gate 1140 and to the AND gate 1162 by way of an inverter 1208.

RESETh—Reset. This signal is active high to reset the state register flip-flops during system reset.

STADCh—Start Conversion. This signal is active high when the AMUX register is written. This signal is discussed below.

AUTO-RANGE OUTPUTS

The output signals of the auto-range state machine are as follows:

GRESh—Gain Shift Register Reset. This signal is active high to reset the shift register 1170 used to generate the gain. This signal is active in state S1.

GCLKh—Gain Shift Register Clock. This signal is active high to shift the shift register and is active in state S3.

TIMREQh—Time Request. This signal is active high to request a five microsecond delay period. This signal is active in state S2. The TIMREQh signal is generated at the output of an AND gate 1210. The signals R0b, R1h and R2h are applied to the input of the AND gate 1210 to generate the TIMREQh signal when the auto-range state machine is in state S2.

ARBSYh—Auto-Range Busy. This signal is active high to indicate when a conversion operation is active. This signal is also used to interlock the auto-zero and auto-range state machines. The ARBSYh also inhibits the microprocessor 30 from writing to the gain registers by disabling the NAND gates which decode the register select signals (AVSFh, ACSFh) and the write clock WRCLKh signal. This signal is active in states S1, S2, S3, S4, S5 and S6 and is available at an inverting output of a NAND gate 1212. The state variables R0b, R1B, R2b are applied to the inputs to the NAND gate 1212 to generate the ARBSYh signal in states S1, S2, S3, S4, S5 and S6.

The signal ARBSYb is used to control write and read operations to the ASCF and AVSF registers. More specifically, ARBSYb signals inhibits the microprocessor 30 from reading or writing to the ASCF or AVSF registers when the auto-range state machine is active. The signal ARBSYb is generated at a non-inverting output of the NAND gate 1212. A non-inverting output of this NAND gate is applied to inputs of NAND gates 1214 and 1216. The AVSFh signal, which is generated when the microprocessor 30 places the address $0026 on the address bus ADDR[5 ... 0], is applied to the NAND gate 1214 and an AND gate 1218. An ACSFh signal is applied to the inputs of the NAND gate 1216 and a NAND gate 1220. This ACSFh signal is generated any time the microprocessor 30 places the address $0027 on the address bus ADDR[5 ... 0]. The RDCLKh signal is applied to the inputs of the NAND gates 1218 and 1220. The WRCLKh signal is applied to the inputs of the NAND gates 1214 and 1216. The outputs of the NAND gates 1214 and 1218 are the VRRDb and VRCLKb signals, which are used to control read and write operations to the AVSF register. The outputs of the NAND gates 1216 and 1220 are the CRRDb and CRCLKb signals which are used to control read and write operations to the ACFS register.

EOCh—End of Conversion. This signal is active high which sets a flip-flop in the status register to indicate that the conversion process has finished. It also clears the flip-flop 1246 (FIG. 62) which generates the STADCh signal and is active in state S6. This signal is available at an output of an AND gate 1222. The signals R0h, R1b and R2b are applied to the inputs of this AND gate to generate the EOCh signal only when the state machine is in state S6.

ANASOCh—Analog Start of Conversion. This signal is active high to initiate an analog to digital conversion and is active for three clock cycles. This signal is active in state S4. The analog of start of conversion signal ANSOCh is generated by circuitry which includes flip-flops 1224, 1226 and 1228, buffer amplifiers 1230, 1232 and 1234 and an AND gate 1236. This signal is active high for three clock cycles and is active in state S4. A signal representing that the auto-range state machine is in state S4 is available at the AND gate 1156 and applied to the D input of the flip-flop 1224. The state machine clock signal SMCLKh is applied to the clock input of the flip-flop 1224. The Q output of the flip-flop 1170 is applied to the D input of the flip-flop 1226. The Q output of the flip-flop 1226 is applied to the input of a buffer amplifier 1230. The output of the buffer amplifier 1230 is applied to the D input of the flip-flop 1228. The Q output of the flip-flop 1228 is applied to the buffer amplifier 1232 and represents the analog start of conversion ANASOCh. The AND gate 1236 controls resetting the flip-flops 1224 and 1226 after the flip-flop 1228 is reset. More specifically, the REGRESb signal is applied to one input of the AND gate 1226 as well as to the reset input of the flip-flop 1228. The $\overline{Q}$ output of flip-flop 1228 is applied to the other input of the AND gate 1236. The output of the AND gate 1180 is applied to the R reset inputs of the flip-flops 1224 and 1226.

The clock inputs of the flip-flops 1226 and 1228 are controlled by the microprocessor 30 interrupt signal INTEh. More specifically, the interrupt signal INTEh, which is active high is applied to the input of an inverter 1234. The output of inverter 1234 is applied to the clock CK inputs of the flip-flops 1226 and 1228.

AUTO-RANGE STATE MACHINE OPERATION

The auto-range function is initiated by the software writing to the AMUX register. More specifically, a STADCH signal (FIG. 62) is active high whenever the register AMUX is written to by the microprocessor 30. This signal STADCH is available at the output of an AND gate 1238. One input to the AND gate 1238 is a test circuit. The other input to the AND gate 1238 is from circuitry which includes buffer amplifiers 1240, 1242, 1244; flip-flops 1246, 1248, 1250; a NAND gate 1252 and AND gates 1254 and 1256. The WRCLKh signal is applied to one input of the AND gate 1254. This signal indicates that the microprocessor 30 is writing to one of the registers. An AMUXh signal is applied to the other input of the AND gate 1254. The AMUXh signal represents that the microprocessor 30 has written to the AMUX register by writing the address $0021 on the ADDR[5 ... 0] bus. The output of the AND gate 1254 is a begin conversion signal BEGCONh which indicates that the AMUX register has been written to. This BEGCONh signal is applied to the input of the NAND gate 1252. The other input to the NAND gate 1252 is from the TEST[4 ... 0] bus. The output of the NAND gate 1254 is applied to the D input of the flip-flop 1250 by way of the NAND gate 1252. The other input to the NAND gate 1252 is from test circuitry. The output of the flip-flop 1250 is applied to the input of a flip-flop 1248. The R input of the flip-flop 1250 is connected to the output of the AND gate 1256. The AND gate 1256 is a two input AND gate. The RESETb signal available at the output of the inverter amplifier 516 is applied to one input. An ARBSYh signal is applied to the other input by way of the inverter amplifier 1244. The AND gate 1256 resets the flip-flop 1250 when the auto-range state machine is busy. A Q output of the flip-flop 1250 is applied to a D input of the flip-flop 1248. The output of the flip-flop 1248 is applied to the input of the buffer amplifier 1242. The output of the buffer amplifier 1242 is applied to the input of the flip-flop 1246. The clock inputs of the flip-flops 1246 and 1248 are tied to the output of the inverter 527. The SMCLKb is applied to the input of the inverter 527. The reset inputs R of both of the flip-flops 1246 and 1248 are controlled by the RESETb signal. The output of the flip-flop 1246 is applied to the input of a buffer amplifier 1240. The output of the buffer amplifier 1240 is applied to the other input of the AND gate 1236 to generate the STADCh signal to indicate that the microprocessor 30 has written to the AMUX register.

When the AMUX register has been written to, the control circuitry requests that the auto-range operation be performed followed by an analog digital conversion. More specifically, the auto-range state machine performs the following functions. First, the shift register 1170 is initialized. The output of the shift register 1170 is tied to a GAIN[4 ... 0] bus which sets the gain for the amplifier. The initial state of the shift register 1170 depends on whether the voltage or current channel has been selected for conversion. If a voltage channel has been selected, the initial value is a binary 00001. If a current channel has been selected the initial value of the shift register 1170 will be a binary 0000. Next a five microsecond setting delay is timed. The TIMOUTh signal will be active high at the output of the five microsecond delay. When the TIMOUTh signal is active, the output of a comparator 74 is checked. If the comparator 74 has switched or if the maximum gain setting has been reached, a start of conversion signal is generated. Otherwise the gain is increased and the delay is timed again.

After the conversion has been initiated, the auto-range state machine waits for an end of conversion signal ANAEOCh to inform the microprocessor 30 to generate a processor interrupt.

A/D CONTROL LOGIC

The A/D converter 78 is an eight bit successive approximation A/D converter. The ranging circuitry for the voltage 80 and current amplifier 90 provides an additional four bits of dynamic range. The A/D converter 78 is described in detail in Section 7 of *MC68HC11A8 HCMOS SINGLE-CHIP MICROCOMPUTER* by Motorola, copyright 1987, hereby incorporated by reference.

ANALOG CONTROL LOGIC

The function block diagram for the analog control logic is shown in FIG. 34. This figure, in connection with the block diagram shown in FIG. 72 will be used to explain the analog control logic.

These figures illustrate the control logic for the current and voltage channel MUXes 66 and 68, zeroing of the voltage amplifier 80 and the current amplifier 90 and ranging of the voltage amplifier 80 and the current mirror 92. Also illustrated is an analog power supply subsystem 48 which consists of a band gap regulator subsystem 1400, a shunt regulator 1402 and the power monitor portion of subsystem 47. Biasing circuitry 1404 is illustrated for the quadcomparator subsystem 58 (FIG. 74), the band gap regulator 1400, the B⁺ comparator subsystem 50, the power monitor subsystem 47, the voltage amplifier 80 and the current amplifier 90. Lastly, temperature monitoring circuitry 1406 is illustrated which allows the microprocessor 30 to read the ambient temperature.

MUX CONTROL

The MUXes 66 and 68 are illustrated in FIG. 73. The input channels MUX0, MUX1, MUX2 and MUX3 can be used for either voltage inputs or current inputs. The input channels MUX4, MUX5, MUX6 and MUX7 can only be used for voltage channels. The channel MUX8 is for temperature sensing while the MUX 66K is tied to analog ground. More specifically, the input channels are configured by MUXes 66a–66g. The MUXes 68a–68d allow the input channels MUX1, MUX2, MUX3 and MUX4 to be tied to the current channel IMUX. The MUXes 68e–68h allow the input channels to be tied to digital ground VSS.

Sample and hold MUXes 108, 110, 112 and 114 are connected between the channels MUX0 and MUX1, MUX2 and MUX3, MUX4 and MUX5 and MUX6 and MUX7, respectively.

ANALOG POWER SUPPLY

The analog supply pins AVDD and AVSS are used to provide power to the analog portion of the IC 10. The analog supply pin AVDD is designed to be connected to a current source. The IC 10 contains an internal shunt regulator (FIG. 76) to regulate the voltage on the AVDD pin to approximately 5.0 Vdc. More specifically, the analog power supply consists of a 2.5 Vdc reference and a shunt regulator subsystem 1402. The 2.50 Vdc reference contains a +1.25 Vdc band gap regulator reference circuit 1406 (FIG. 75) and a buffer amplifier 1412 to generate a 2.50 Vdc reference: VREF. An adjustment pin VADJ is provided to allow the voltage to be trimmed to exactly 2.5 Vdc±0.5 Vdc. In order to trim the reference, a two resistor voltage divider 1410 which includes resistors 1414 and 1416 is connected between the VREF and AVSS pins with the mid-point connected to VADJ. The buffer amplifier 1412 has a source follower output such that it can only source current. This will permit multiple devices to be paralleled. Also, the regulator of the IC 10 can be slaved to another by connecting its VADJ pin to the VREF pin.

The band gap regulator subsystem 1406 is illustrated in FIG. 75. A band gap reference is a precision voltage reference. In general, the band gap reference circuit utilizes as a reference the base-to-emitter voltage of a parasitic transistor which has a negative temperature coefficient (–TC) connected in series with a resistor which has a voltage developed across it with a positive temperature coefficient (+TC). The voltage developed across the resistor is a function of a predetermined current supplied to the resistor from circuitry internal to the band gap regulated reference. The difference in temperature coefficients between the base-to-emitter voltage of the parasitic transistor and the voltage across the series connected resistor provides a voltage reference signal having essentially a zero temperature coefficient. As the base-to-emitter voltages of the parasitic transistors decreases with an increase in temperature, the voltage across the current-fed series connected resistor increases generally proportionally to provide an output reference voltage which remains relatively constant. This reference voltage is then applied to a non-inverting input of an amplifier; an inverting input of the amplifier is connected to an externally divided portion of the output of the amplifier. The output of the amplifier is a voltage proportional to the reference voltage, relatively independent of temperature.

More specifically, the output of the band gap regulator reference circuit 1406 is nominally 1.25 Vdc. This output voltage is doubled by a buffer comparator 1412 and the external resistors 1414 and 1416 to produce a +2.5 Vdc reference at the external pin VREF. The external resistors 1414 and 1416 are connected in series between the output of the buffer comparator 1412 and an analog ground pin AVSS.

The midpoint of these resistors 1414 and 1416 is connected to the inverting input of the buffer comparator 1412 to allow the reference voltage VREF to be adjusted. The band gap regulator circuit includes diode connected parasitic transistors 1426 and 1428, a transistor 1418, resistors 1420, 1422 and 1424 and a comparator 1441. Start-up circuitry 1432 is provided for the condition when power is first applied to the IC 10. The start-up circuitry 1432 includes the transistors 1434, 1436 and 1438. During this condition, voltages begin to rise from a zero level to a level that will ultimately be regulated by the band gap reference circuit 1406. Initially there is no current in any of the devices. In this condition, the transistor 1438 is biased on by a PBIAS circuit 1440 which will be discussed below. This, in turn, turns on the transistor 1434 to generate a current that flows into a diode connected parasitic transistor 1428. This produces a voltage at the transistor 1428 which is applied to a non-inverting input of the comparator 1441. That generates a positive signal at the output of the comparator 1440 which, in turn, turns on the transistor 1418 and produces currents in the transistors 1426 and 1428. Consequently, the band gap reference approaches a stable regulating point based upon the voltages across the diode connected transistors 1426 and 1428. When these voltages reach a steady state value, the transistor 1436 is turned on which turns off the transistor 1434, in which case all of the current is generated by the transistor 1418.

During regulation, the current applied to the emitters of the transistors 1426 and 1428 is essentially equal. This is because the resistors 1420 and 1424 are the same value and are relatively large compared to the other voltage drops. The base emitter voltage across transistors 1426 and 1428 is dependent upon the current density through these transistors. The current density is the total current divided by the area of the transistors. The current densities of the transistors 1426 and 1428 are different by a factor of 11 to 1, thus, their base emitter voltages will be different. The difference in base emitter voltages appears across the resistor 1422. Since the temperature coefficient is a function of the voltage across the device, as the base emitter voltage across the transistors 1426 and 1428 goes down, their negative temperature coefficient increases. Due to the relative current density in the transistor 1426 relative to the current density in the transistor 1428, the series combination of the resistor 1422 and transistor 1426 will have a positive temperature coefficient (+TC) and is applied to an inverting terminal of comparator 1441. The base emitter voltage of the transistor 1428, which has a negative temperature coefficient (−TC), is applied to a non-inverting terminal of the comparator 1441. As the temperature changes voltage across the base emitter junctions of the transistors 1426 and 1428, the voltage across the resistor 1422 will change by a proportional amount, thus yielding an output signal from the comparator 1441 that is relatively temperature independent.

SHUNT REGULATOR

The shunt regulator 1400 (FIG. 76) provides a nominal +5.0 Vdc at the AVDD pin based on the reference voltage at VREF. The shunt regulator 1400 includes an amplifier 1443 and resistors 1444 and 1446. More specifically, the VREF from the buffer comparator 1412 is applied to a non-inverting input of an amplifier 1443. The AVDD bus is the regulated 5.0 Vdc supply. The inverting terminal of the amplifier 1443 is connected to the AVDD bus by way of the resistor 1444. The inverting terminal of the amplifier 1443 is also connected to the AVSS bus by way of the resistor 1446. The resistors 1444 and 1446 have equal value which causes the output of the amplifier 1443 to be twice VREF. Since VREF is nominally 2.5 volts, the regulated supply bus AVDD will nominally be 5.0 volts. A shunt element transistor 1447 is connected between AVDD and AVSS. The gate of the shunt element is controlled by output of the amplifier 1443. When the regulated supply AVDD becomes a little too high, the negative terminal of the amplifier 1443 will be a little higher than VREF. This will drive the output of the amplifier 1443 negative. This, in turn, will cause a shunt transistor 1447 to turn on a little bit more. This draws current away from the supply bus AVDD and brings the voltage down until the two inputs to the amplifier 1443 are essentially identical.

The circuitry which includes the transistors 1448, 1450 and 1452 is part of the start-up circuitry. Transistors 1448, 1450 and 1452 turn off the shunt transistor 1447 during start-up to avoid sinking a lot of current away from AVDD.

An important aspect of the invention relates to the fact that the IC 10 is current driven. This provides immunity to voltage spikes typical in applications in the automotive industry. More specifically, the IC 10 is driven by an input current, developed by an external resistor 1453 and an external voltage identified as VEXT applied to the AVDD bus.

POWER MONITOR SUBSYSTEM

The circuitry which consists of the transistors 1454, 1456, 1458 and 1460 and the comparator 1462 (FIG. 76) performs the power on reset and loss of +5.0 Vdc function. Power on reset is a delay of 8128 oscillator cycles plus an additional 1 ms from the time the reset is removed by clearing the external control pin RESN.

The series connected transistors 1454, 1456, 1458 and 1460 form a voltage divider circuit. The drain of the transistor 1454 is applied to a non-inverting input of the comparator 1462. The output of the amplifier 1443 is applied to an inverting input of the comparator 1462. The output of the comparator 1462 is a signal SHUNT which is an output pin which may be applied to the RESN pin of the microprocessor 30 for the power monitor function to reset the microprocessor 30 upon detection of an under-voltage.

The comparator 1462 monitors the conductive state or gate voltage of the shunt transistor 1447. Whenever the shunt transistor 1447 is determined to be off, as indicated by the amplifier 1442 output being at a more positive voltage than the divided voltage at the drain of the transistor 1454, the comparator 1462 output signal shunt will be driven negative, indicating insufficient current available to maintain the AVDD bus regulated at 5.0 volts.

B+ COMPARATOR SUBSYSTEM 50

The B+ comparator subsystem (FIG. 76A) is used for power supply generation and includes the following circuitry, resistors 1462, 1464, a comparator 1466 and a transistor 1468. VREF is applied to an inverting input of the comparator 1466 providing a +2.5 Vdc reference. The output of the comparator 1466 is an external pin BDRIVE. Inputs to the comparator 1466 are applied to a non-inverting terminal of the comparator 1466 by way of an external pin BSENSE. The resistor 1464 and the transistor 1468 are exemplary of the hysteresis mask option, available for all comparators. The resistor 1464 and the transistor 1468 are connected in series to provide feedback from the output of the comparator 1466 to the inverting terminal. FIGS. 76B and 76C illustrate exemplary circuitry for power supply generation and power supply regulation for the IC 10, respectively. FIG. 76B also illustrates the conditioning circuitry 19.

Referring first to FIG. 76B, the IC 10 is used to monitor the condition of the circuit breaker 12 (FIG. 32) by way of the current transformers (CT) 14, 16 and 18. These CT's may be of the donut type which consist of a secondary winding disposed about the A, B and C phase conductors of the circuit breaker 12. During certain loading conditions, the output from the CT's may be of the order of 100 milliamps (mA). In order to reduce this output current to a level suitable for the IC 10, for example, 20 microamps, the signal conditioning circuitry 19 is provided. Various conditioning circuitry may be utilized. It should be understood that the conditioning circuitry illustrated in FIG. 76B is merely exemplary.

The CT's 14, 16 and 18 may be connected to the diode bridge 1467 in various ways. For example, the CT's 14, 16 and 18 may be connected in series with the output connected to the terminals 1469 and 1471. Also, only a single CT, for example, the B phase CT 16, may be tied to the bridge 1467 or the CT's may be paralleled.

The conditioning circuitry 19 includes a full wave diode bridge 1467 defining a pair of alternating current terminals 1469 and 1471 and a pair of rectified terminals 1473 and 1475; the positive terminal identified as 1473 and the negative terminal identified as 1475. The conditioning circuitry 19 also includes a resistor 1477 and a resistor 1479. Exemplary values for the resistors 1477 and 1479 are 10 ohms and 50 kilohms, respectively.

The resistor 1477 is connected between the negative terminal 1475 on the bridge 1467 and ground. One side of the resistor 1479 is also tied to the negative terminal 1475. The other side of the resistor 1479 is then connected to one of the MUX inputs MUX0, MUX1, MUX2 or MUX3.

In operation, the current from the current transformers 14, 16 and 18 will flow through the resistor 1477 from ground to the negative terminal 1475 of the bridge 1469 to produce a negative voltage across the resistor 1477. If the value of the resistor 1477 is, for example, 10 ohms, a −1.0 volt will be produced across the resistor 1477 for a CT current of about 10 mA. This will, in turn, cause a −1.0 volt drop across the resistor 1479. If the resistor 1479 has a value of, for example, 50 kiloohms, this will, in turn, produce a current of 20 microamps to be applied to one of the current inputs 62 (e.g., MUX0, MUX1, MUX2 or MUX3) of the IC 10 as discussed below.

The exemplary circuitry illustrated in FIG. 76B, identified within the dashed box 1481, in conjunction with the B+ comparator system 50 (FIG. 76A) is used for power supply generation. More specifically, the power supply circuitry 1481 includes a transistor 1483, connected between the positive terminal 1473 of the bridge 1469 and ground with its gate terminal connected to BDRIVE (FIG. 76A). Also connected to the positive terminal 1473 is the anode of a diode 1485. The cathode of the diode 1485 is connected to a terminal, identified in FIG. 76B as B+. A power supply capacitor 1487 is connected between the B+ terminal and ground. A pair of series connected resistors 1489 and 1491 are also connected between the B+ terminal and ground with the junction between the resistors 1489 and 1491 identified as BSENSE.

In operation, the comparator 1466 (FIG. 76A) is used to monitor the voltage at the BSENSE junction. A fraction of the voltage at the B+ junction, for example, 2.5 volts, and compare it with the voltage available at the VREF terminal. When the BSENSE voltage is greater than the VREF voltage, the output of the comparator 1466 goes high and turns on the transistor 1483 to shunt excess current to ground. When the voltage at the BSENSE junction drops below VREF, the comparator goes low which allows the transistor 1483 to be turned off to allow the capacitor 1487 to be charged up to the desired value, for example, 30 volts.

FIG. 76C illustrates exemplary circuitry for regulating the voltages at the VDD and AVDD pins and does not form a portion of the present invention.

BIASING CIRCUITRY FOR OPERATIONAL AMPLIFIER OFFSET CORRECTION

Figure 78:
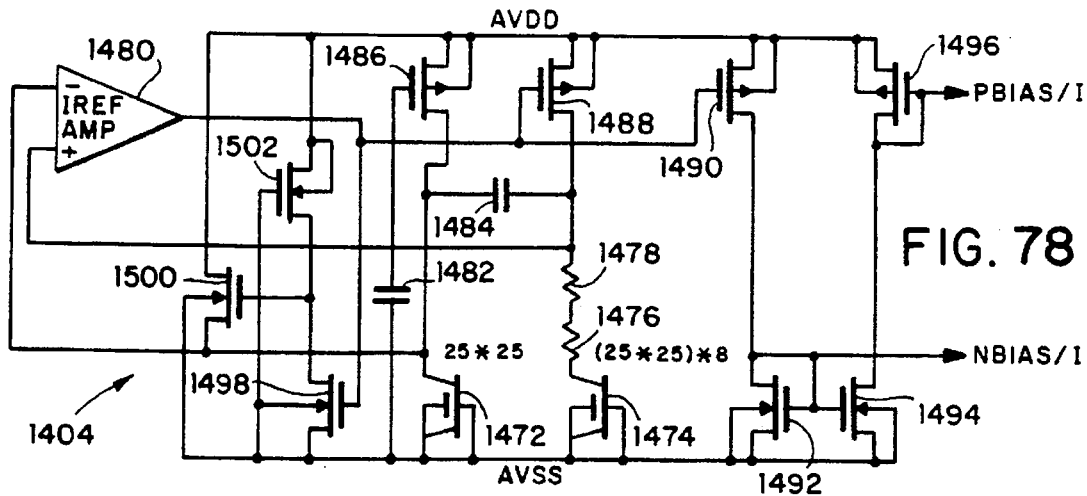
FIG. 78 is a schematic diagram of another biasing circuit in accordance with the present invention.

Biasing signal PBIAS 1440 for the comparators 1412, 1440 (FIG. 75) and 1442 (FIG. 76) is illustrated in FIG. 77. Biasing signals PBIAS and NBIAS for the quadcomparator 200, 202, 204 and 206 (FIG. 74), the B+ comparator 1466 (FIG. 76), the power monitor comparator 1462 (FIG. 76), the voltage amplifier 80 (FIG. 80) and the current amplifier 90 (FIG. 81) are illustrated in FIG. 78. The PBIAS and NBIAS signals from such circuitry are reference voltages that are used to set the operating current of the particular operational amplifier to which they are applied. The above-mentioned biasing circuitry is in addition to the auto-zeroing circuitry for the voltage amplifier 80 and the current amplifier 90 are illustrated in FIG. 83 and identified as IOUT.

The circuitry illustrated in FIG. 77 is identified by the function block 1440. The PBIAS circuit 1440 includes a transistor 1470 and a resistor 1493, connected in series between AVDD and AVSS, forming a voltage divider. The voltage divider produces a gate to source voltage across the transistor 1470, identified as PBIAS.

The circuitry illustrated in FIG. 78 is used to generate the signals PBIAS and NBIAS for the quadcomparators 200, 202, 204 (FIG. 74), the voltage amplifier 80 and the current amplifier 90. This circuitry includes its own band gap regulator reference circuit which includes diode connected parasitic transistors 1472, 1474, resistors 1476, 1478, a comparator 1480 and capacitors 1482 and 1484. These signals are identified as PBIAS/I and NBIAS/I to indicate that the signals are temperature independent since the circuitry includes the band gap reference. This band gap reference operates in a manner similar to the band gap reference 1406 described above with the exception of the additional capacitors 1482 and 1484 are used to control the biasing time of the circuitry. The output of the comparator 1480 is applied to the gates of transistors 1486, 1488 and 1490, forming current mirrors. The current mirrors 1486 and 1488 are used to source the band gap regulator portion of the circuitry. The output current mirror 1490 is the NBIAS/I signal. The current mirror 1490 turns on transistors 1492 and 1494 which develop a gate to source voltage across a transistor 1496 which is the PBIAS/I reference. The transistors 1498, 1500 and 1502 form start-up circuitry for the band gap regulator portion of the circuit.

TEMPERATURE SENSING

Figure 79:
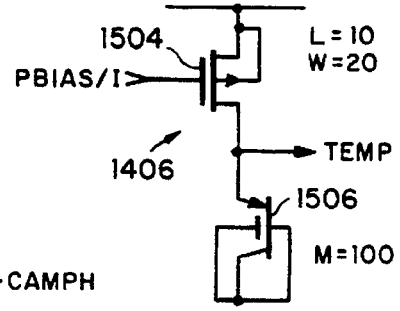
FIG. 79 is a schematic diagram of an analog temperature sensing circuit in accordance with the present invention.

The circuitry illustrated in FIG. 79 allows the microprocessor 30 to sense the ambient temperature in which the IC 10 is located. This circuitry includes a transistor 1504 and a diode connected parasitic transistor 1506. The voltage of the parasitic transistors is temperature dependent as previously discussed. The resulting TEMP signal is applied to a MUX 66j and converted to a digital value and read by the microprocessor 30.

VOLTAGE AMPLIFIER RANGING

The voltage amplifier 80 and ranging circuitry is illustrated in FIG. 80. This circuitry includes the voltage amplifier 80, gain circuitry 84 and a plurality of MUXes 86 to produce a voltage signal for A/D conversion that is at least half scale. The voltage ranging may be controlled either automatically or manually to provide gains of 1, 2, 4, 8 or 16 of the input voltage signal VMUX applied to a non-inverting input of the voltage amplifier 80. The gain circuitry includes resistors 84a–84h and MUXes 86a–86f. The gain circuitry is controlled by the VGAIN[4 . . . 0] bus and the gain signal VGAIN 32h as previously discussed. The resistor 84i and 1512 form test circuitry.

If the gain is one, the voltage signal is applied directly to the A/D converter 78 by way of a MUX 88a. In this condition the MUXes 86e and 88b disconnect the voltage amplifier 80 from the A/D circuitry 78 and the signal is connected directly to the A/D 78 by the MUX 88a. During ranging, the MUXes 86a–86f connect the gain circuitry 84 to an inverting terminal of the voltage amplifier 80. For gains other than one, the MUX 88b connects the output of the voltage amplifier 80 to the A/D 78. The MUXes 88a and 88b are selected by the AVSF register.

The comparator 74 is used for auto-ranging. This comparator is referenced to a fixed voltage, for example +1.25 Vdc, developed by a pair of serially coupled resistors 1508 and 1510, connected between VREF and AVSS. The midpoint of these resistors 1508 and 1510 is applied to a non-inverting terminal of the comparator 74. The output of the comparator 74 is a CAMPH signal, which is monitored by the flip-flop 1184 (FIG. 71) and forms a portion of the auto-range logic as discussed above. The MUX 86f is used for auto-zeroing. This MUX 86f shorts the inverting and non-inverting terminals of the voltage amplifier 80 together to determine the offset correction value. During this condition, the offset value of the voltage amplifier 80 is loaded into the flip-flop 888 (FIG. 69). The MUX 86f is controlled by the VNULL signal available at the output of the buffer amplifier 756 (FIG. 66).

CURRENT AMPLIFIER RANGING

Current amplifier 90 ranging is accomplished by the current mirror 92 (FIG. 81) as previously discussed. Current inputs are applied to the current channel IMUX (FIG. 73). This channel IMUX is tied to the current mirror 92 and to an inverting input of the current amplifier 90. A non-inverting terminal of the amplifier 90 is tied to analog ground to maintain the current input channels MUX0, MUX1, MUX2 and MUX3 at virtual ground. Negative currents (e.g., currents flowing out of the MXO pin) to be ranged are generated, for example, by connecting an external resistor (not shown) between the MUX0 pin and a negative voltage source. This causes ranged currents to flow out of the MUX0, MUX1, MUX2 or MUX 3 pins since these pins are maintained at virtual ground.

The MUXes 96a and 96b connect the output signal IOUT/I from the current mirror 92 either to the output pin MX0 or to the analog ground bus AVSS. More specifically, the MUX 96a is used to connect the output signal IOUT/I of the current mirror 92 to the MX0 pin under the control of a signal IOUTONh; available at the output of a NAND gate 759 (FIG. 66). The signal IOUTONh indicates that the integrator is not in a reset mode. An INTREShh signal as well as test signals are applied to the NAND gate 759. The MUX 96b is used to connect the current mirror 92 output signal IOUT/I to the analog ground bus under the control of a signal DISCHh, available at the output of a buffer 757. The input to the buffer 757 is an integrator reset signal INTREShh, available at the output of the AND gate 534 (FIG. 62).

Figure 65:
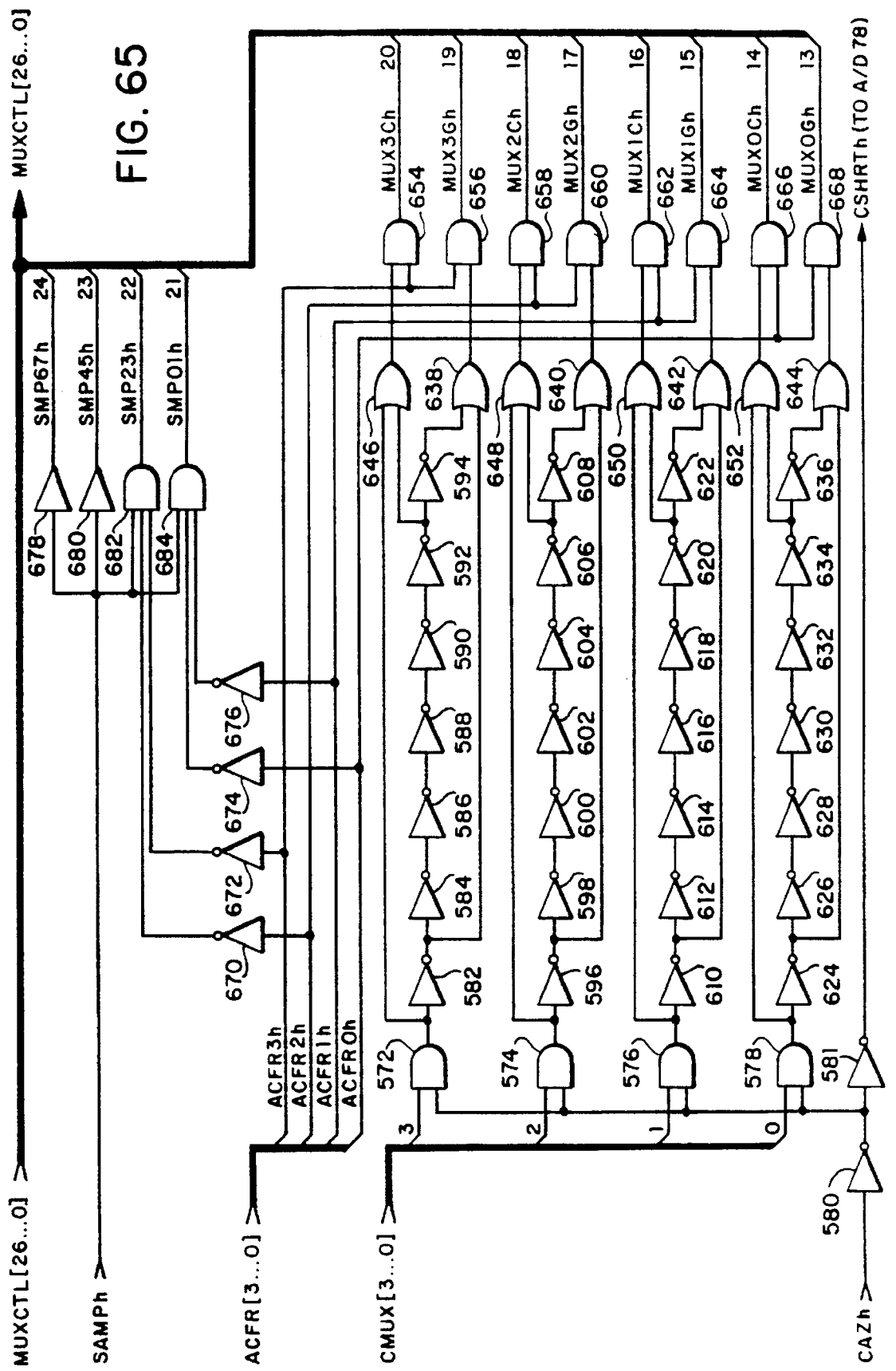
FIG. 65 is a schematic diagram of the current multiplexer (MUX) control logic in accordance with the present invention.

The MUX 111a is used for auto-zeroing the current amplifier 90. Specifically, the MUX 111a connects both the inverting and non-inverting inputs of the current amplifier 90 to the analog ground bus AVSS under the control of a signal CSHRTh, available at the output of an inverter 581 (FIG. 65). The inverter 581 is serially connected to the output of the inverter 580. The input to the inverter 580 is the signal CAZh, which indicates the current amplifier 90 is being auto-zeroed.

The MUX 111b is used to connect the inverting input of the amplifier 90 to the IMUX output of the MUXes 68 (FIG. 73) whenever the amplifier 90 is not being auto-zeroed.

The ranged current from the current mirror 92 may then be dropped across an external resistor (not shown) to convert the signal to a voltage and converted by the A/D converter 78 as discussed above.

Figure 82:
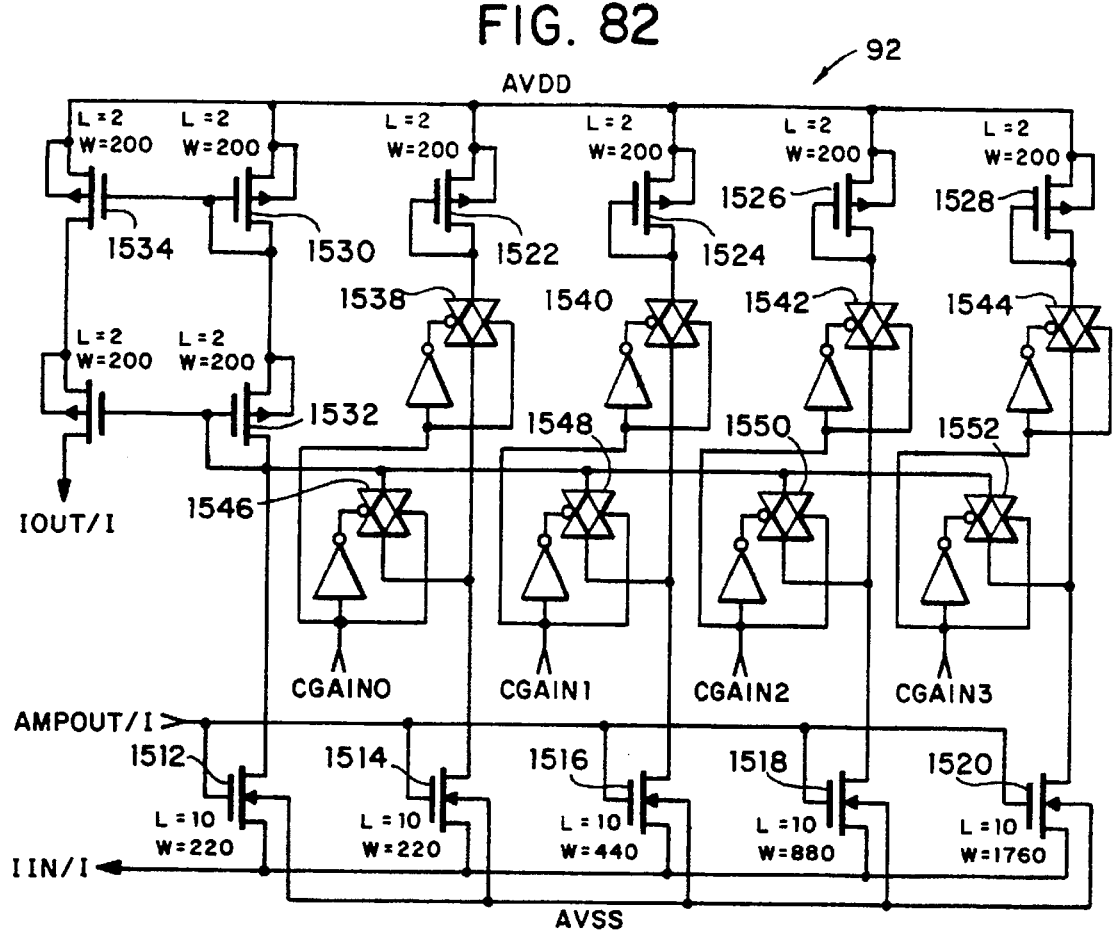
FIG. 82 is a schematic diagram of the current mirror in accordance with the present invention.

The current mirror 92 is illustrated in FIG. 82. The current mirror 92 includes current divider transistors 1512, 1514, 1516, 1518 and 1520, shunt transistors 1522, 1524, 1526 and 1528 and current mirrors 1530, 1532, 1534 and 1536. MUXes 1538, 1540, 1542 and 1544 control current shunting while MUXes 1546, 1548, 1550 and 1552 control the gain of the circuitry. These MUXes are controlled by the CGAIN[3 . . . 0] bus discussed above.

Negative currents are directed into the current mirror 92 at IIN/I. This input current is divided into five parts by the current divider transistors 1512, 1514, 1516, 1518 and 1520 which are all connected in parallel. More specifically, the sizes of the transistors 1512 and 1514 are maintained equal at a value, for example, A. The sizes of transistors 1516, 1518 and 1520 are 2A, 4A and 8A, respectively. Since the transistors 1512, 1514, 1516, 1518 and 1520 are connected as current mirrors, the current through each of the transistors will be a function of the size of the transistor. Thus, the output of transistors 1512 and 1514 each will be 1/16 of IIN/I. The output of transistor 1516 will be 1/8 IIN/I. The output of transistor 1518 will be 1/4 IIN/I. The output of the transistor 1520 will be 1/2 IIN/I. These fractions of the input current IIN/I are either summed together to produce the desired gain which is controlled by the MUXes 1546, 1548, 1550 and 1552 and directed to the output by way of the current mirrors 1530, 1532, 1534 and 1536 or shunted around the mirrors 1530, 1532, 1534 and 1536 by way of the transistors 1522, 1524, 1526 and 1528 and the MUXes 1538, 1540, 1542 and 1544.

This is an important aspect of the invention. Specifically, in known bipolar current ranging circuitry (for example, as disclosed in U.S. Pat. No. 4,626,831), the current dividers are cascaded. However, cascading of the current dividers is not viable for the IC 10 because of the relatively small operating voltage (e.g., +5.0 Vdc).

CURRENT AND VOLTAGE AMPLIFIER ZEROING

Representative circuitry for the voltage and current amplifier 80 and 90 is illustrated in FIG. 84. These amplifiers are differential input amplifiers defining an internal bias current ITRIM/I. The differential inputs are identified as PLUS/I and MINUS/I. This internal bias current flows through resistors 1546 and 1548 which controls the offset voltage that appears at the amplifier 80 and 90 output. Known techniques have attempted to control the offset voltage by externally adjusting the resistor values of resistors 1546 and 1548, which requires precision variable resistors, such as digital-to-analog converter (DAC). Such DACs are relatively expensive. The auto-zeroing circuitry in accordance with the present invention, obviates the need for DACs and instead controls the bias current ITRIM/I to control the voltage across the resistors 1546 and 1548 to control the offset voltage. The bias current is ranged by a current dividing circuitry illustrated in FIG. 83. The ranged bias current is then applied to the amplifier 80 or 90 to control the bias current and the offset voltage.

The bias current ranging circuitry includes the MUXes 1600, 1602, 1604, 1606, 1608 and 1610, the current mirrors 1612, 1614, 1616, 1618, 1620, 1622 and 1624 and the transistors 1626 and 1628. The MUXes 1600, 1602, 1604, 1606, 1608 and 1610 are controlled by the VZERO[5 . . . 0] bus for the voltage amplifier 80 and the CZERO[5 . . . 0] bus for the current amplifier 90 as discussed above. These current mirrors are connected in parallel to allow the bias current to be divided into composite values and allow selected portions to be added together to generate the ranged current and operate in a similar manner as the current mirror 92.

ICC 29 CONTROL LOGIC

The INCOM communication controller (ICC) 29 provides the microprocessor 30 access to a two way communication network, known as INCOM, described in detail in U.S. Pat. No. 4,644,566 and hereby incorporated by reference. This controller 29 provides modem functions, serialization/ deserialization of messages and implements the required network protocol. The ICC 29 is capable of operating both as a master and slave controller. Master operation is inhibited unless a permissive flag is set in the configuration register CFR.

The microprocessor 30 communicates with the ICC 29 through eight interface registers located in memory address space. Four registers are used to transfer INCOM messages between the ICC 29 and the microprocessor 30, while the other four are used for setting the communication address, speed, modulation method and control of transmit/receive operations.

The ICC 29 supports a fast status request message which will reduce network response time. Since the transmit and receive registers for the ICC 29 are independent of each other, a message, such as the fast status, can be periodically updated in the transmit registers. This allows the ICC 29 to transmit the response without the microprocessor 30 intervention when a fast status request is received.

Figure 85:
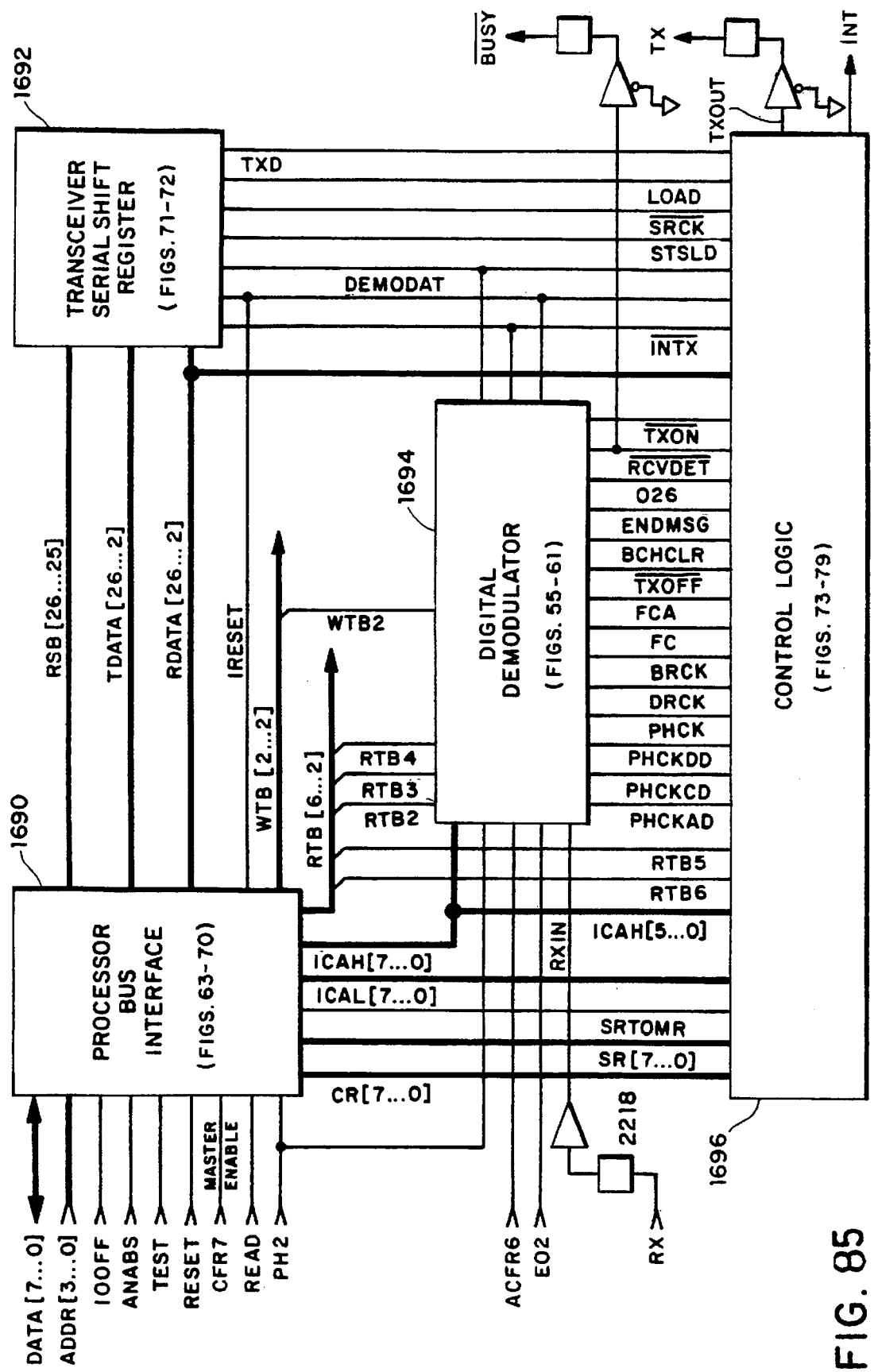
FIG. 85 is a block diagram of the communication controller which forms a portion of the IC in accordance with the present invention.

A general block diagram of the ICC 29 is illustrated in FIG. 85. The ICC 29 includes a processor bus interface 1690, illustrated in FIGS. 94–101; a transceiver serial shift register 1692, illustrated in FIGS. 102 and 103; a digital demodulator 1694, illustrated in FIGS. 86–92 and control logic circuitry 1696, illustrated in FIGS. 104–110.

PROCESSOR BUS INTERFACE

The microprocessor 30 communicates with the ICC 29 by way of interface registers ICAH, ICAL, ICM3, ICM2, ICM1, ICM0, ICSR and ICCR located in memory address space as illustrated in Table 7. The configuration of these registers is illustrated in FIGS. 94–101.

The registers ICAL and ICAH are address registers, identified with the reference numeral 1700. The registers ICM0, ICM1, ICM2 and ICM3 are message registers, identified with the reference numeral 1702. The registers ICCR and ICSR are control and status registers, identified with the reference numeral 1704.

Figure 94:
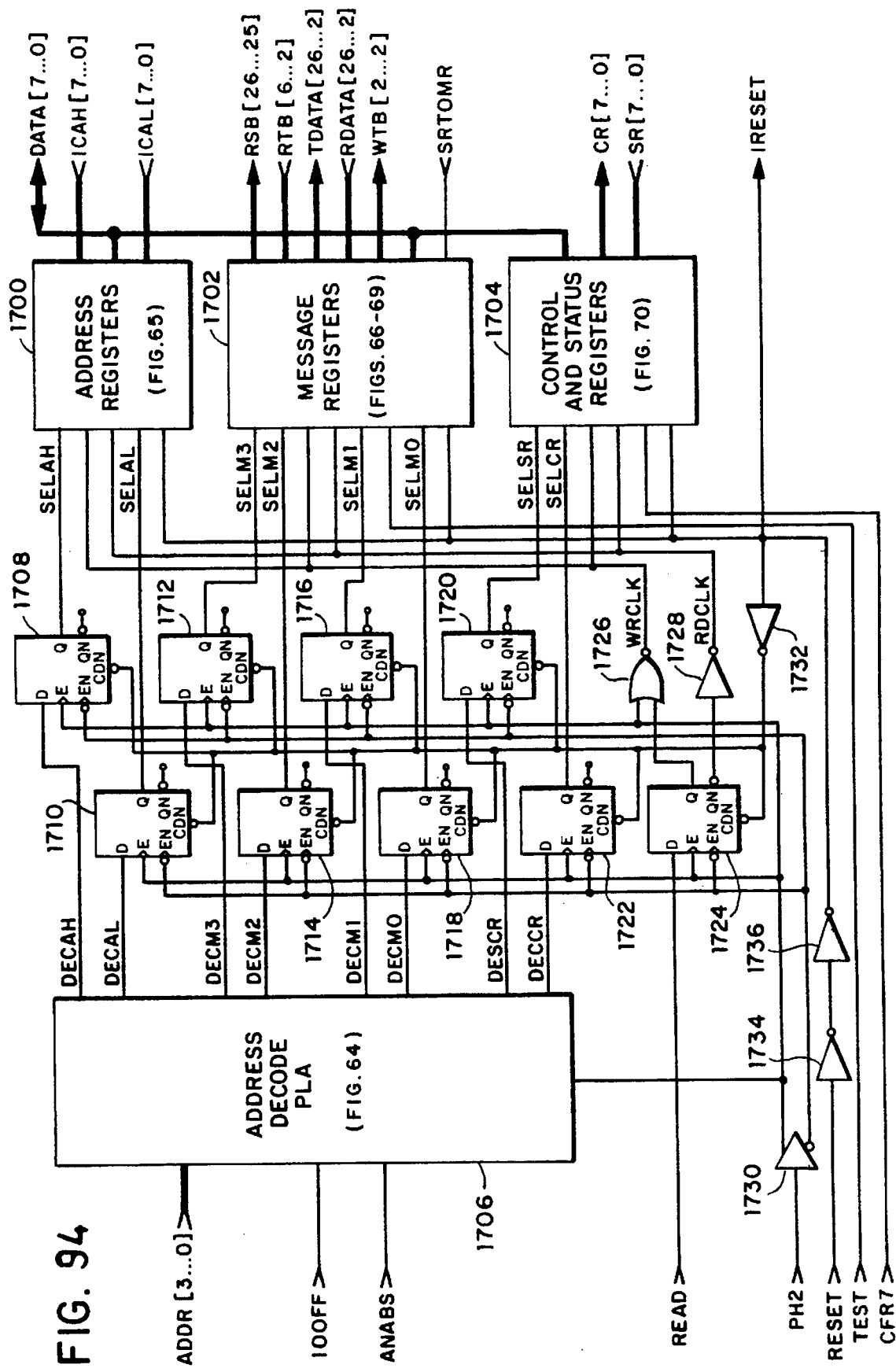
FIG. 94 is a schematic diagram of bus interface logic circuit for the communications controller which forms a portion of the communications controller in accordance with the present invention.

All of these registers are addressed by the microprocessor 30 by placing the appropriate address on the address bus ADDR[3 . . . 0]. The address is decoded by decoding circuitry, identified with the reference numeral 1706 (FIG. 94). The address decoding circuitry 1706 generates decoding signals DECAH, DECAL, DECM3, DECM2, DECM1, DECM0, DECSR and DECCR that are applied to D inputs of flip-flops 1708, 1710, 1712, 1714, 1716, 1718, 1720 and 1722. Register select signals SELAH, SELAL, SELM3, SELM3, SELM1, SELM0, SELSR and SELCR are available at Q outputs of these flip-flops.

All of these registers are read write registers with the exception of the ICSR status register, which is a read only register. Read and write operations are controlled by RDCLK and WRCLK signals, which are generated by circuitry which includes a read write control flip-flop 1724, a NOR gate 1726 and an inverter 1728. The WRCLK signal is available at the output of the NOR gate 1726. The RDCLK signal is available at the output of the inverter 1728. A READ signal generated by the microprocessor 30 is applied to a D input of the flip-flop 1724 by way of the internal control bus CPUCTL[3 . . . 0]. A Q output from the flip-flop 1724 is applied to one input of the dual input NOR gate 1726 to develop the WRCLK signal. The other input to the NOR gate 1726 is the phase 2 clock signal PH2, available at a non-inverting output of the an inverter 1730. A $\overline{Q}$ output of the flip-flop 1724 is applied to an input of the inverter 1728 to generate the RDCLK signal.

Timing for the read write control flip-flop 1724 as well as for the address decode flip-flops 1708, 1710, 1712, 1714, 1716, 1718, 1720 and 1722 is provided by the PH2 and $\overline{PH2}$signal, available at the outputs of the inverter 1730. More specifically, the PH2 signal, available at the non-inverting output of the inverter 1730, is applied to E inputs of the flip-flops 1708, 1710, 1712, 1714, 1716, 1718, 1720, 1722 and 1724. The $\overline{PH2}$ signal, available at the inverting output of the inverter 1730, is applied to EN inputs of these flip-flops.

These flip-flops are all reset by the microprocessor 30. More specifically, a $\overline{RESET}$ signal is applied to CDN inputs of these flip-flops. The $\overline{RESET}$ signal is available at the output of an inverter 1732. The $\overline{RESET}$signal is generated from a RESET signal, applied to the input of the inverter 1732 by way of high gain inverters 1734 and 1736. The $\overline{RESET}$ signal is also applied to the address register 1700, the message register 1702 and the control and status register 1704. This allows the registers to be set to zero on system reset.

Figure 95:
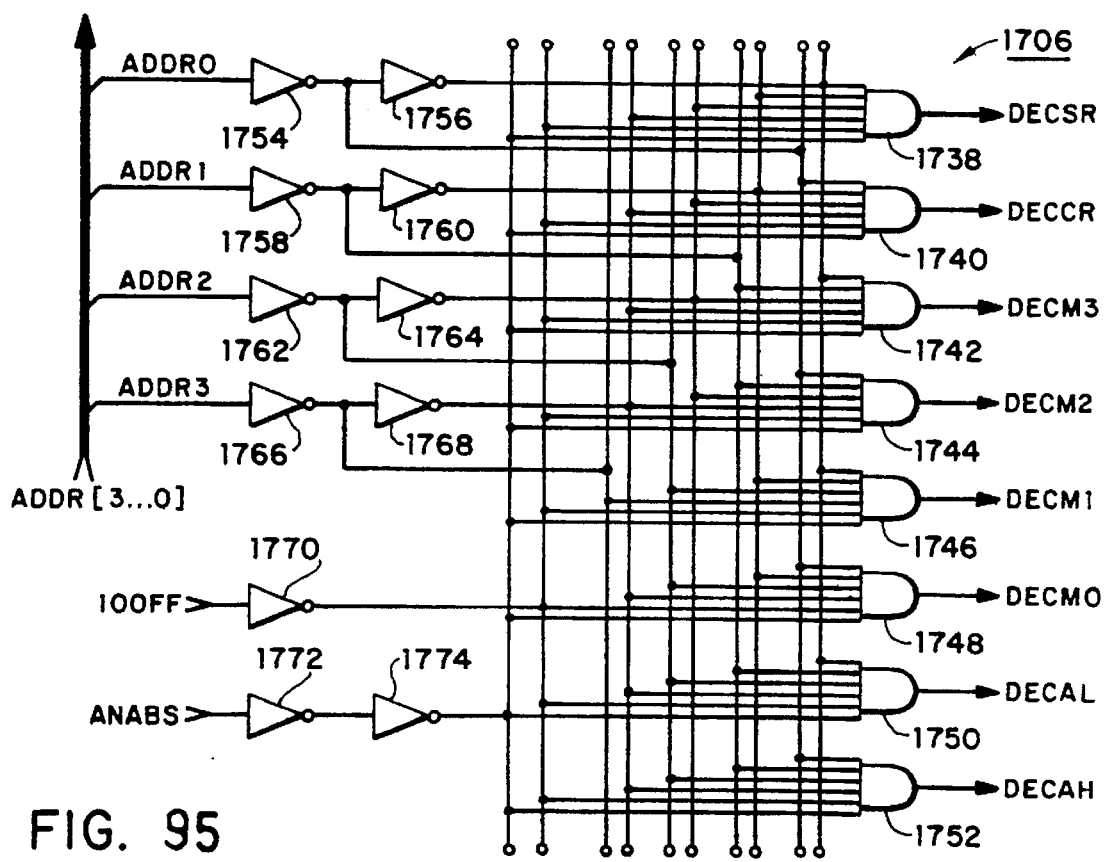
FIG. 95 is a schematic diagram of an address decode logic circuit for the communications controller's bus interface register in accordance with the present invention.

The address decoding circuitry 1706 for all of the above-identified registers is illustrated in FIG. 95. This circuitry consists of AND gates 1738, 1740, 1742, 1744, 1746, 1748, 1750 and 1752 and inverters 1754, 1756, 1758, 1760, 1762, 1764, 1766, 1768, 1770, 1772 and 1774. The outputs of the AND gates 1738, 1740, 1742, 1744, 1746, 1748, 1750 and 1752 are the address decode signals DECSR, DECCR, DECM3, DECM2, DECM1, DECM0, DECAL and DECAH, respectively. More specifically, the address signals ADDR0, ADDR1, ADDR2 and ADDR3 from the address bus ADDR[3 . . . 0] are applied to high gain inverter pairs 1754 and 1756; 1758 and 1760; 1762 and 1764; and 1766 and 1768. The output of the inverter 1756 is applied to inputs of AND gates 1738, 1742, 1746 and 1750. The output of the inverter 1754 is applied to inputs of the AND gates 1740, 1744, 1748 and 1752. The output of the inverter 1760 is applied to the inputs of the AND gates 1738, 1740, 1746 and 1748. The output of the inverter 1758 is applied to the inputs of the AND gates 1742, 1744, 1750 and 1752. The output of the inverter 1764 is applied to the inputs of the AND gates 1738, 1740, 1742 and 1744. The output of the inverter 1762 is applied to the inputs of the AND gates 1746, 1748, 1750 and 1752. The output of the inverter 1768 is applied to the inputs of the AND gates 1738, 1740, 1742, 1744, 1746, 1748, 1750 and 1752.

Control signals I00FF and ANABS from the microprocessor 30 are used to enable or disable the address decoder 1706. The I00FF signal is used to disable I/O devices during a test mode. The ANABS signal is a register select signal from the microprocessor 30 master chip address decoder which enables address decoding on a block basis. The I00FF signal is available at the output of the inverter 1770 and is applied to the inputs of the AND gates 1738, 1740, 1742, 1744, 1746, 1748, 1750 and 1752. The ANABS signal is applied to a pair of high gain inverters 1772 and 1774. The output of the inverter 1774 is applied to the AND gates 1738–1752.

The ICAH and ICAL address registers 1700 are shown in FIG. 96. These registers are byte wide read-write registers, used to set the communication bit rate, modulation method and the 12-bit INCOM address for the ICC 29. Both of these registers are set to zero on reset and power up.

Referring first to the ICAH register, bits ICAH[7,6] determine the communication bit rate of the ICC 29. Bits ICAH[5,4] determine the modulation method used by the ICC 29. Bits ICAH[3 . . . 0] determine the higher order 4 bits of the INCOM address.

The ICAH register includes the flip-flops 1776, 1778, 1780, 1782, 1784, 1786, 1788 and 1790. The data bus DATA[7 . . . 0] is connected to D inputs of these flip-flops to allow the microprocessor 30 to write to this register. Q outputs of these flip-flops are connected to the data bus DATA[7 . . . 0] by way of tristate devices 1792, 1794, 1796, 1798, 1800, 1802, 1804 and 1806 for read operations. The Q outputs of these flip-flops are also attached to an internal control bus ICAH[7 . . . 0].

The tristate devices 1792, 1794, 1796, 1798, 1800, 1802, 1804 and 1806 are under the control of a two input NAND gate 1808. A RDCLK signal is applied to one input along with the address decode signal SELAH to allow the microprocessor 30 to read this register by initiating a read operation and addressing $0028.

Write operations to the ICAH register are controlled by a two input NAND gate 1810. One input to the NAND gate 1810 is the address decode signal SELAH. The other input to the NAND gate 1810 is a WRCLK signal. The output of the NAND gate 1810 is applied to an inverter 1812. A non-inverting output from the inverter 1812 applied to EN inputs of the flip-flops 1792, 1794, 1796, 1798, 1800, 1802, 1804 and 1806. An inverting output of the inverter 1812 is applied to E inputs for timing.

The ICAH register flip-flops (1776–1790) are set to zero on reset. More specifically, an $\overline{\text{IRESET}}$ signal, available at the output of an inverter 1814 is applied to CDN inputs to set these flip-flops to zero on reset.

The ICAL register is a byte wide register that determines the lower order 8 bits of the INCOM address. This register includes the flip-flops 1816, 1818, 1820, 1822, 1824, 1826, 1828 and 1830. The data bus DATA[7 . . . 0] is applied to D inputs of these flip-flops to provide for write operations. Q outputs of these flip-flops are tied to the data bus DATA[7 . . . 0] for read operations by way of tristate devices 1832, 1834, 1836, 1840, 1842, 1844 and 1846. The Q outputs of these flip-flops are also tied to an internal control bus ICAL[7 . . . 0].

Read operations of this register are controlled by a two input NAND gate 1848. One input to the NAND gate 1848 is the address decode signal SELAL. The read clock RDCLK signal is applied to the other input. The output of the NAND gate 1848 is applied to a control terminal OEN of each of the tristate devices.

Write operations to this register are controlled by a two input NAND gate 1850. One input to the NAND gate 1850 is the write clock WRCLK signal. The register select signal SELAL is applied to the other input. The output of the NAND gate 1850 is applied to an inverter 1852. A non-inverting output of the inverter 1852 is applied to EN inputs of these flip-flops. An inverting output of the inverter 1852 is applied to E inputs.

This register is set to zero on device reset and power up. More specifically, the $\overline{\text{IRESET}}$ signal is applied to the CDN inputs of these flip-flops.

The registers ICM3, ICM2, ICM1 and ICM0, illustrated in FIGS. 97–100, are byte wide read write registers which include a transmit buffer and a receive buffer. These registers are used to transfer INCOM messages between the ICC 29 and the microprocessor 30. These registers are not true read write registers since read operations access the receive buffer and write operations write to the transmit buffer.

The ICM1 register is an 8-bit register and contains the INCOM message bits 10 through 3. The transmit buffer for this register includes the flip-flops 1854, 1856, 1858, 1860, 1862, 1864, 1866 and 1868. The receive buffer for this register includes the flip-flops 1870, 1872, 1874, 1876, 1878, 1880, 1882 and 1884.

The transmit buffer flip-flops 1854, 1856, 1858, 1860, 1862, 1864, 1866 and 1868, can only be written to by the microprocessor 30. More specifically, the data bus DATA[7 . . . 0] is applied to D inputs of these flip-flops. Q outputs of these flip-flops contain INCOM message bits TDATA[10 . . . 3].

Write operations to the transmit buffer are controlled by a two input NAND gate 1866. The write clock WRCLK signal is applied to one input. An address decode signal SELM1 is applied to the other input. The output of the NAND gate 1866 is applied to an inverter 1888. A non-inverting output of the inverter 1888 is applied to EN inputs of these flip-flops. An inverting output of the inverter 1888 is applied to E inputs of these flip-flops.

The receive buffer of the ICM1 register includes the flip-flops 1870, 1872, 1874, 1876, 1878, 1880, 1882 and 1884. INCOM messages, received on a receive data bus RDATA[10 . . . 3] are applied to D inputs of these flip-flops. The contents of these flip-flops may be read by the microprocessor 30 on the data bus DATA[7 . . . 0] by way of tristate devices 1892, 1894, 1896, 1898, 1900, 1902, 1904 and 1906. These tristate devices are under the control of a two input NAND gate 1908. The read clock RDCLK signal is applied to one input. An address decode signal SELM1 is applied to the other input.

Timing for the receive buffer and transmit buffer flip-flops is provided by a signal SRTOMR (FIG. 109) which will be discussed below. This signal SRTOMR is applied to an inverter 1910. A non-inverting output of the inverter 1910 is applied E inputs of these flip-flops. An inverting output of the inverter 1910 is applied to EN inputs.

The receive and transmit buffers are set to zero on reset and power up. More particularly, an $\overline{\text{IRESET}}$ signal available at the output of an inverter 1890 is applied to CDN inputs of these flip-flops. The $\overline{\text{IRESET}}$ signal is applied to an inverter 1889 to generate an MRCLR signal, used to reset the registers ICM2, ICM3 and ICM0 registers, as discussed below.

The ICM2 register is an 8-bit register and contains the INCOM message bits 18 through 11. The transmit buffer of the ICM2 register includes the flip-flops 1912, 1914, 1916, 1918, 1920, 1922, 1924 and 1926. The receive buffer of the ICM2 register includes the flip-flops 1928, 1930, 1932, 1934, 1936, 1938, 1940 and 1942.

The transmit buffer may only be written to by the microprocessor 30. More particularly, the data bus DATA[7 . . . 0] is applied to D inputs of the flip-flops 1912, 1914, 1916, 1918, 1920, 1922, 1924 and 1926. Q outputs of these flip-flops are tied to a transmit data bus TDATA[18 . . . 11].

Write operations to the transmit buffer are under the control of a two input NAND gate 1944. The write clock WRCLK signal is applied to one input. The address decode signal SELM2 is applied to the other input. The output of the NAND gate 1944 is applied to an inverter 1946. A non-inverting output of the inverter 1946 is applied to EN inputs of the flip-flops 1912, 1914, 1916, 1918, 1920, 1922, 1925 and 1926. An inverting output of the inverter 1946 is applied to E inputs of these flip-flops.

The receive buffer of the ICM2 register includes the flip-flops 1928, 1930, 1932, 1934, 1936, 1938, 1940 and 1942. INCOM messages, received on an internal bus RDATA[18 . . . 11], are applied to D inputs of these flip-flops. The message bits contained in these flip-flops may be read by the microprocessor 30 on the data bus DATA[7 . . . 0] by way of tristate devices 1950, 1952, 1954, 1956, 1958, 1960, 1962 and 1964. These tristate devices are under the control of a two input NAND gate 1966. The register decode signal SELM2 is applied to one input. The read clock RDCLK signal is applied to the other input to allow the microprocessor 30 to read the contents of this buffer by initiating a read operation and placing the address $002C on the address bus ADDR[3 . . . 0].

Timing for the receive buffer flip-flops is provided by the SRTOMR signal and an inverter 1968. More specifically, the SRTOMR signal is applied to an input of the inverter 1968. A non-inverting output of the inverter 1966 is applied to E inputs of these flip-flops. An inverting output of the inverter 1968 is applied to EN inputs of these receive buffer flip-flops.

The transmit and receive buffer flip-flops are set to zero by the $\overline{\text{MRCLR}}$ signal available at the output of the inverter 1969. This signal $\overline{\text{MRCLR}}$ is applied to CDN inputs of each of these flip-flops.

The ICM3 message register contains the INCOM message bits 26 through 19. The transmit buffer for the register ICM3 includes the flip-flops 1970, 1972, 1974, 1976, 1978, 1980, 1982 and 1984. The receive buffer for this register includes the flip-flops 1986, 1988, 1990, 1992, 1994, 1996, 1998 and 2000.

The microprocessor 30 writes to the transmit buffer by way of the data bus DATA[7 . . . 0], applied to D inputs of the flip-flops 1970, 1972, 1974, 1976, 1978, 1980, 1982 and 1984. Q outputs of these flip-flops are applied to the transmit data bus TDATA[26 . . . 19].

Write operations to the transmit buffer are under the control of a two input NAND gate 2002. The write clock WRCLK signal is applied to one input. The register select signal SELM3 is applied to the other input. The output of the NAND gate 2002 is applied to an inverter 2004. A non-inverting output of the inverter 2004 is applied to the two EN inputs of these flip-flops. An inverting output of the inverter 2004 is applied to E inputs of these flip-flops.

The receive buffer includes the flip-flops 1986, 1988, 1990, 1992, 1994, 1996, 1998 and 2000. INCOM message bits received from the INCOM network are transmitted by the receive data bus RDATA[26 . . . 19] and applied to D inputs of these flip-flops. The microprocessor 30 can read the contents of these flip-flops on the data bus DATA[7 . . . 0] by way of tristate devices 2008, 2010, 2012, 2014, 2016, 2018, 2020 and 2022. These tristate devices are under the control of a two input NAND gate 2024. The read clock RDCLK signal is applied to one input. The register select signal SELM3 is applied to the other input to allow the microprocessor 30 to read the contents of this buffer any time it initiates a read operation and it places the address $002D on the address bus ADDR[3 . . . 0].

Timing for the ICM3 receive buffer is provided by the SRTOMR signal and an inverter 2026. More specifically, the SRTOMR signal is applied to an input of the inverter 2026. A non-inverting output of the inverter 2026 is applied to E inputs of these flip-flops. An inverting output of the inverter 2026 is applied to EN inputs of these flip-flops.

The ICM3 transmit and receive buffers are set to zero by the $\overline{\text{MRCLR}}$ signal. This signal $\overline{\text{MRCLR}}$ is available at the output of the inverter 2006. This signal $\overline{\text{MRCLR}}$ is applied to CDN inputs of these flip-flops.

The ICM0 register is for transmitting and receiving a control and status bits of the INCOM message. The transmit buffer for this register includes the flip-flops 2028, 2030 and 2032 and the tristate devices 2034, 2036, 2038, 2040, 2042, 2044, 2046 and 2048. The receive buffer includes one flip-flop 2029.

Bit ICM0[7] corresponds to bit 2 of the INCOM message. For transmit operations, this bit is written by the microprocessor 30 over the data bus DATA[7] and applied to a D input of the flip-flop 2028. Write operations to this flip-flop 2028 are under the control of a two input NAND gate 2050. A write clock WRCLK signal is applied to one input. A register select signal SELM0 is applied to the other input. The output of the NAND gate 2050 is applied to an inverter 2052. A non-inverting output of the inverter 2052 is applied to an EN input of the flip-flop 2028. An inverting output of the inverter 2052 is applied to an E input of the flip-flop 2052. A Q output of the flip-flop 2028 is applied to the transmit data bus TDATA[2].

Bit 2 of an incoming INCOM message is received along an internal receive data bus RDATA[2] and applied to a D input of a flip-flop 2029. Timing for this flip-flop 2029 is provided by the SRTOMR signal. The SRTOMR signal is applied to an inverter 2031. A non-inverting output of the inverter 2031 is applied to an E input of the flip-flop 2029. An inverting output of the inverter 2031 is applied to an EN input of this flip-flop. In order to allow the contents of this flip-flop to be read by the microprocessor 30, a Q output of the flip-flop 2029 is applied to the data bus DATA[7] by way of a tristate device 2033. The tristate device 2034 is under the control of the NAND gate 2054.

ICM0 bits ICM0[6 . . . 2] are reserved for test. These bits are read by the microprocessor 30 on the data bus DATA[6 . . . 2]. More specifically, a read test bus RTB[6 . . . 2] is tied to the data bus DATA[6 . . . 2] by way of tristate devices 2036, 2038, 2040, 2042 and 2044. These tristate devices are under the control of the NAND gate 2054. One input to the NAND gate signal 2054 is the read clock signal RDCLK. The SELM0 register select decode signal is applied to the other input.

Two AND gates 2055 and 2056 are also part of the test circuitry. More specifically, the AND gate 2055 is a three input AND gate. A write clock signal WRCLK is applied to one input. An IMC0 register decode signal SELM0 is applied to another input. A test signal TEST is applied to the other input. The output of the AND gate 2055 is applied to the AND gate 2056 along with DATA[2]. The output of the AND gate 2056 is applied to a write test bus WTB[2 . . . 0].

The bits ICM0[1,0] are status bits. Both of these bits are true read write bits. The microprocessor 30 can write these bits by way of the data bus DATA[1,0], which is tied to D inputs of the flip-flops 2030 and 2032. Write operations to these flip-flops are controlled by the NAND gate 2050 and the inverter 2052. More specifically, the non-inverting output of the inverter 2052 is applied to an EN input of the flip-flops 2030 and 2032. The inverting output of the inverter 2052 is applied to E inputs of these flip-flops. Q outputs of these flip-flops are tied to an internal status bit read bus RSB[26,25]. The Q outputs are also tied to the data bus DATA[1,0] by way of the tristate devices 2046 and 2048 to allow the microprocessor 30 to read the contents of these flip-flops. The tristate devices 2046 and 2048 are under the control of the read control NAND gate 2054.

The flip-flops 2028, 2029, 2030 and 2032 are all set to zero on system reset. More specifically, the $\overline{MRCLR}$ signal is applied to CDN inputs of these flip-flops. This signal $\overline{MRCLR}$ is available at the output of an inverter 2057.

The ICCR register is a byte wide read write control register used to control operation of the ICC 29. This register is illustrated in FIG. 101 and includes the flip-flops 2058, 2060, 2062 and 2064 as well as the AND gates 2066, 2068, 2070 and 2072. More particularly, the data bus DATA[7 . . . 4] is applied to D inputs of the flip-flops 2058, 2060, 2062 and 2064. Timing for these flip-flops 2058, 2060, 2062 and 2064 is provided by a write control NAND gate 2074 and an inverter 2076. More specifically, an ICCR register decode signal SELCR is applied to one input of the NAND gate 2074. A write clock signal WRCLK is applied to the other input. The output of the NAND gate 2074 is applied to an input of an inverter 2076. An inverting output of the inverter 2076 is applied to E inputs of these flip-flops. A non-inverting output of the inverter 2076 is applied to EN inputs of these flip-flops.

Q outputs of these flip-flops 2058, 2060, 2062 and 2064 are applied to an internal control bus CR[7 . . . 4] for the control bits ICCR[7 . . . 4] discussed below. These Q outputs are also connected to the data bus DATA[7 . . . 4] by way of tristate devices 2078, 2080, 2082 and 2084 to allow the contents of these flip-flops 2058, 2060, 2062 and 2064 to be read by the microprocessor 30. The tristate devices 2078, 2080, 2082 and 2084 are under the control of a two input NAND gate 2086. One input to the NAND gate 2086 is an ICCR register decode signal SELCR. The write clock signal WRCLK is applied to the other input.

The flip-flops 2058, 2060, 2062 and 2064 are set to zero on system reset. More particularly, an $\overline{IRESET}$ signal is applied to CDN inputs of these flip-flops. This signal is available at the output of an inverter 2088.

The bits ICCR[7 . . . 4] are control bits. Bit ICCR[7] enables the interrupt operation of the ICC 29. Bit ICCR[6] enables automatic response to a fast status request message. The control bit ICCR[4] is not used.

The bit ICCR[5] is a permissive bit that allows the INCOM communication controller 29 to be switched into the master mode. A zero in this bit prevents the ICC 29 from entering the master mode while a one permits it. This bit is also set to zero on system reset. This is accomplished by a two input AND gate 2089. One input to the AND gate 2089 is a permissive bit from the CFR status register bit CFR[7]. The other input to the AND gate 2089 is the $\overline{IRESET}$ signal.

The output of the AND gate 2089 is applied to a CDN input of the flip-flop 2062.

The bits ICCR[3 . . . 0] are command bits and are defined below. These command bits are written by the microprocessor 30 on the data bus DATA[3 . . . 0] and applied to inputs of the AND gates 2066, 2068, 2070 and 2072. A write control signal, available at the output of the inverter 2086, is applied to the inputs of the AND gates 2066, 2068, 2070 and 2072 along with the data bus DATA[3 . . . 0]. The input of the inverter 2086 is connected to the output of the write control NAND gate 2074. The outputs of the AND gates 2066, 2068, 2070 and 2072 are applied to the internal ICCR register bus CR[3 . . . 0].

These bits ICCR[3 . . . 0] are not true read write bits. These bits will always read zero when read by the microprocessor 30. More specifically, the bits ICCR[3 . . . 0] are tied to the data bus DATA[3 . . . 0] by way of tristate devices 2090, 2092, 2094 and 2096. The inputs to these tristate devices are grounded. These tristate devices are under the control of the NAND gate 2086.

The ICSR is a byte wide read only status register which contains the ICC 29 status flags that the microprocessor 30 communicates to the INCOM communication controller 29. This register includes the tristate devices 2098, 2100, 2102, 2104, 2106, 2108, 2110 and 2112. An internal ICSR control register bus SR[7 . . . 0] is applied to the inputs of these tristate devices. The outputs of these tristate devices are applied to the data bus DATA[7 . . . 0]. These tristate devices are under the control of a two input NAND gate 2114. An ICSR register select decode signal SELSR is applied to one input. A read clock signal RDCLK is applied to the other input.

DIGITAL DEMODULATOR

Figure 86:
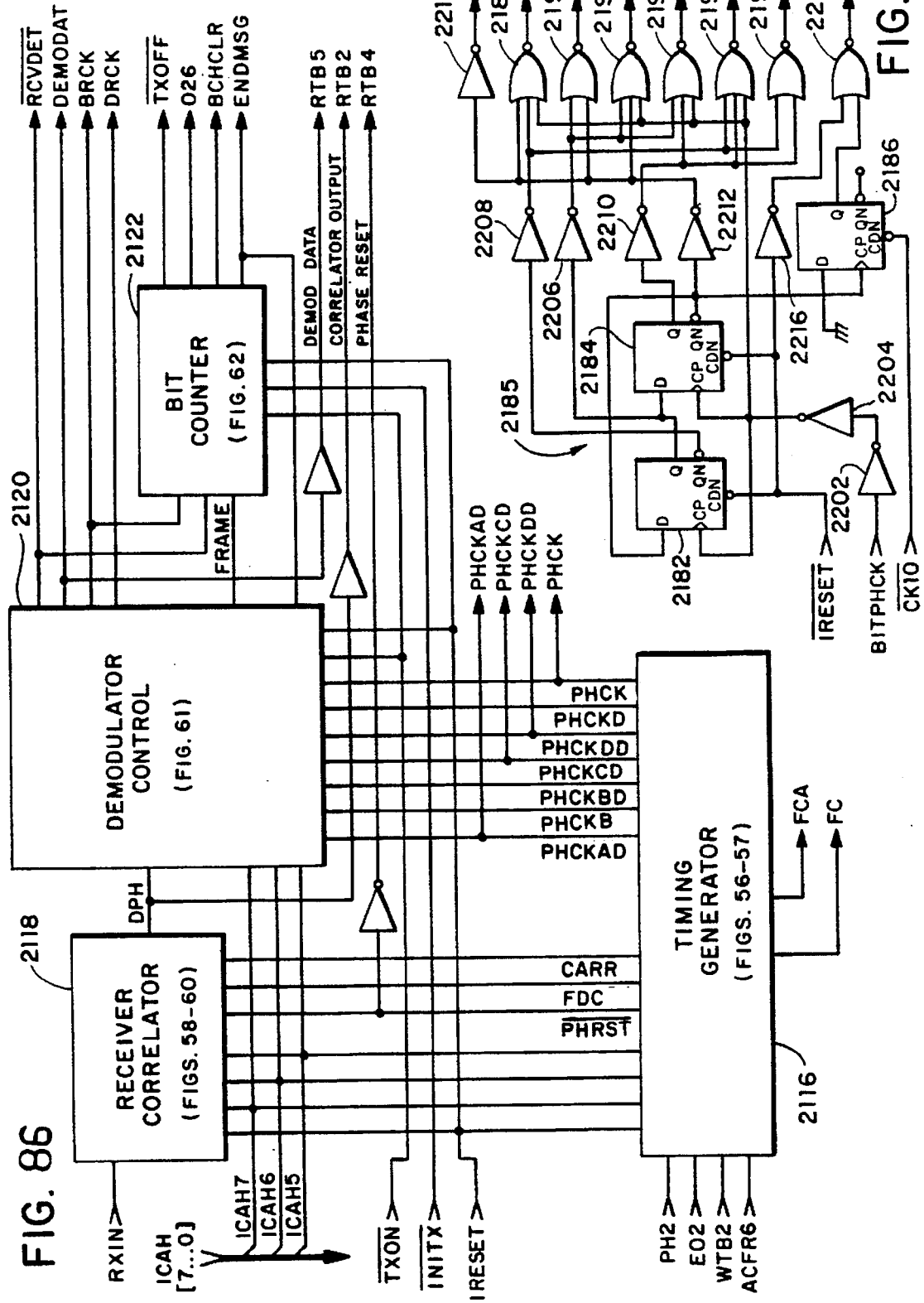
FIG. 86 is a block diagram of a digital demodulator which forms a portion of the communication controller in accordance with the present invention.

The digital demodulator 1694 demodulates incoming INCOM messages and provides a demodulated output bits identified as a signal DEMODAT. This demodulator 1694 is illustrated in FIGS. 86–93. A block diagram for the digital demodulator 1694 is illustrated in FIG. 86. The digital demodulator 1694 includes a timing generator 2116, a receiver correlator 2118, demodulator control circuitry 2120 and a bit counter 2122.

Figure 87:
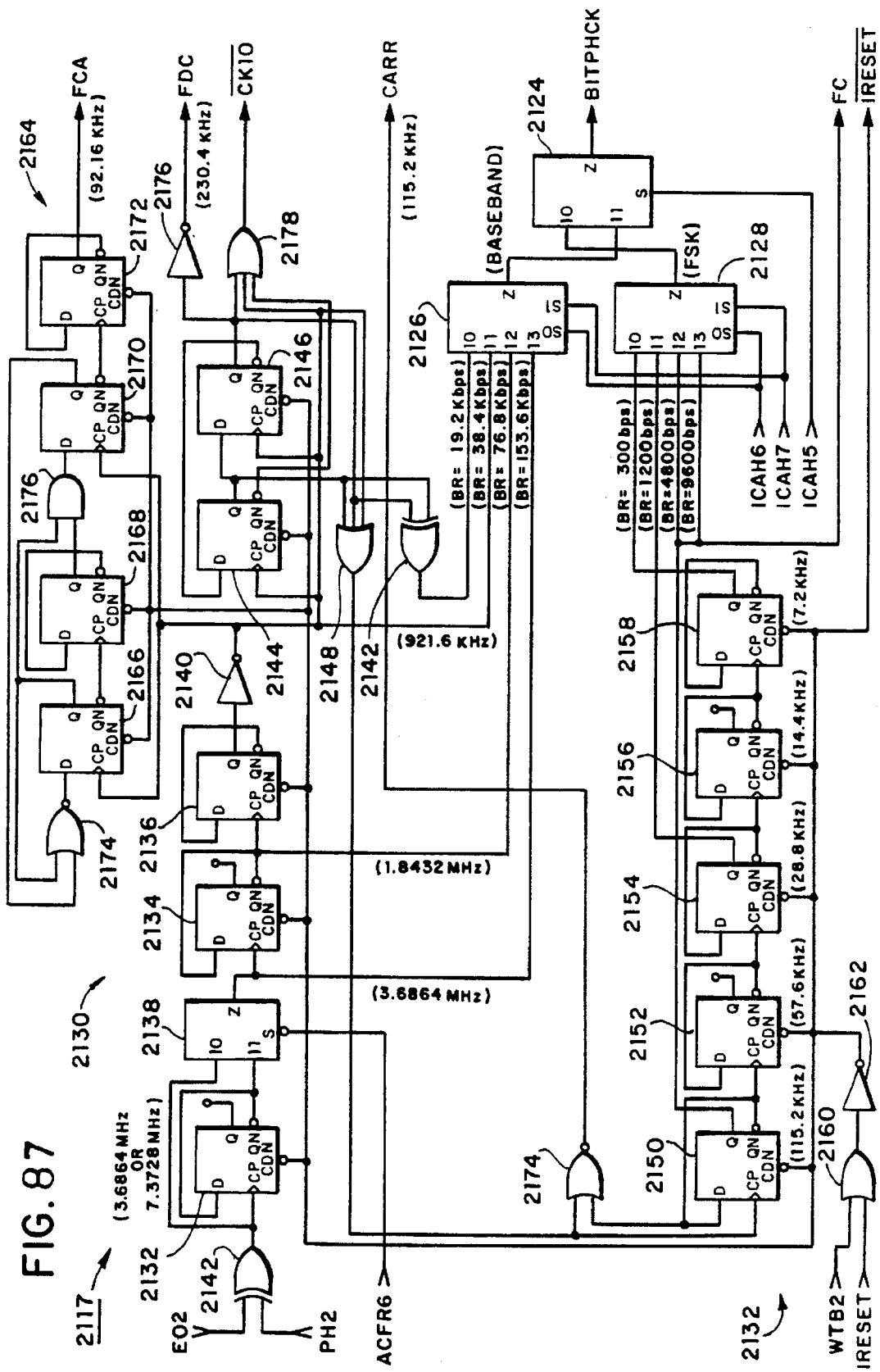
FIG. 87 is a schematic diagram of a master clock generator which forms a portion of the communication controller in accordance with the present invention.
Figure 89:
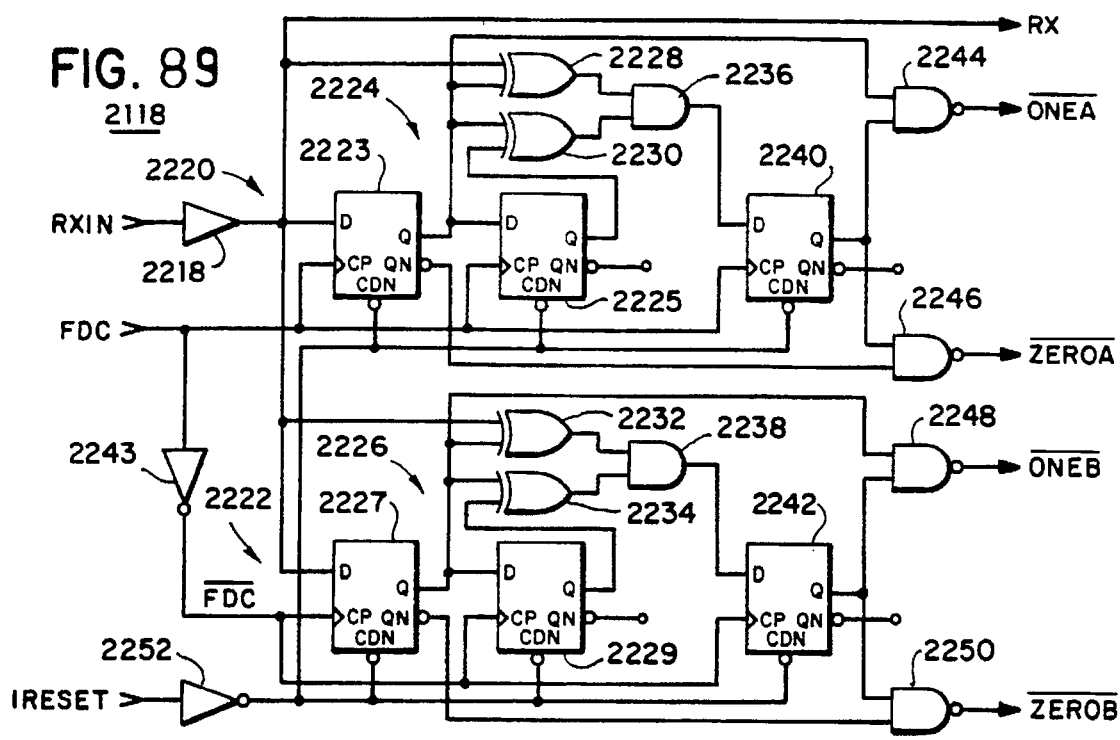
FIG. 89 is a schematic diagram of a receiver correlator which forms a portion of the communication controller in accordance with the present invention.

The timing generator 2116 is illustrated in FIGS. 87 and 88. Timing diagrams for the various outputs of the timing generator are illustrated in FIGS. 111 and 112. The timing generator 2116 includes a master clock generator 2117, illustrated in FIG. 87 and a bit phase timing generator 2119, illustrated in FIG. 88.

The ICC 29 may be configured to operate at a variety of bit rates depending on the transmission mode selected. Exemplary bit rates are delineated in Table 19. The master clock generator 2117 provides the various clock signals for the selectable bit rates. The ICAH register bits ICAH[7,6] determine the bit rate, while the bit ICAH[5] determines the modulation method. As discussed above, since the ASK and FSK modulation schemes are compatible, thus only one bit ICAH[5] is necessary to select between baseband and FSK/ASK. The selected bit rate is available at the output of a MUX 2124. A Z output of the MUX 2124 is a bit phase clock signal BITPHCK which corresponds to the selected bit rate and modulation method in accordance with Table 19. The command bit ICAH[5] is applied to a select input S of the MUX 2124. The inputs to the MUX 2124 are from a baseband MUX 2126 and an ASK/FSK MUX 2128.

The various baseband bit rates in accordance with Table 19 are applied to the inputs of the MUX 2126. The various ASK/FSK bit rates, also in accordance with Table 19, are applied to the inputs of the FSK MUX 2128. The various bit rates are selectable by the command bits ICAH[7,6] which are applied to select inputs of the MUXes 2126 and 2128. The various bit rates are all derived from the IC 10 crystal and the timing generator 2116 which includes counters 2130 and 2132.

The counter 2130 is used to generate the baseband bit rates. This counter 2130 includes the flip-flops 2132, 2134, 2136, a MUX 2138, an inverter 2140 and an exclusive OR gate 2142. If the ICC 29 is active, either a 7.3728 MHz or a 3.6864 MHz crystal must be used. Depending on the crystal selected, one of these frequencies will be available at the output of the exclusive OR gate 2142 based upon the phase 2 clock signal PH2 and an EO2 signal applied to inputs of the exclusive OR gate 2142. The EO2 is a signal that is 90° out of phase with PH2.

The flip-flops 2132, 2134 and 2136 are connected as divide by two ripple counters. More specifically, $\overline{Q}$ outputs of these flip-flops are applied to D inputs. The $\overline{Q}$ output of the previous flip-flop is also applied to a clock input CP of the succeeding flip-flop. The outputs of the flip-flops 2132, 2134 and 2136 thus are divided by two of the input. Because of the option of crystals, the output of the exclusive OR gate 2142 is applied to one input of the MUX 2138. The $\overline{Q}$ output of the flip-flop 2132 is applied to the other input of the MUX 2138. If a 7.3728 MHz crystal is used, the flip-flop 2132 divides this frequency by two to produce a 3.6864 MHz signal at a Z output of the MUX 2138. If a 3.6864 MHz crystal is used, this signal is applied directly to another input of the MUX 2138 for a baud rate of 153.6 Kbps. The MUX 2138 is controlled by the configuration register bit ACFR[6], which is applied to an S input of the MUX 2138. The bit ACFR[6] selects the divider ratio. The Z output of the MUX 2138 is a 3.6864 MHz signal. This signal is applied to one input of the baseband MUX 2126 and also to a clock input CP of another divide by two counter 2134 to produce a 1.83432 MHz signal at its $\overline{Q}$ output. The 1.8232 MHz signal is applied to another input of the baseband MUX 2126 for a baud rate of 76.8 Kbps. A $\overline{Q}$ output of the counter 2134 is also applied to a clock input of another divide by two counter 2136. The output of this counter is applied to an inverter 2140. The output of the inverter 2140 is a 921.6 kHz signal. This signal is applied to another input of the baseband MUX 2126 for a baud rate of 38.4 Kbps signal.

The 19.2 Kbps baseband baud rate signal is generated by the circuitry which includes an exclusive OR gate 2142, and flip-flops 2144 and 2146. More specifically, the 921.6 kHz signal, available at the output of the inverter 2140, is applied to a Johnson counter, which includes the flip-flops 2144 and 2146. More specifically, the output of the inverter 2140 is applied to clock inputs CP of the flip-flops 2144 and 2146. A Q output of the flip-flop 2144 is applied to a D input of the flip-flop 2146. A $\overline{Q}$ output of the flip-flop 2146 is applied to a D input of the flip-flop 2144. A Q output of the flip-flop 2146 is a 230.4 kHz signal. This signal is applied to one input of the exclusive OR gate 2142. The other input to the exclusive OR gate 2142 is the Q output signal from the flip-flop 2144. The output of the exclusive OR gate 2142 is a 460.8 kHz signal, equivalent to a bit rate of 19.2 Kbps.

The ASK/FSK bit rates signals are developed by the counter 2132 and an OR gate 2148. More specifically, the Q output of the flip-flop 2144 is applied to one input of the OR gate 2148. This signal represents a 230.4 kHz signal. The Q output of the flip-flop 2146 is also applied to another input of the OR gate 2148. Lastly, the output of the inverter 2140 is applied to a third input of the OR gate 2148. The output of the OR gate 2148 is applied to the counter 2132, which includes the flip-flops 2150, 2152, 2156 and 2158, all connected as divide by two counters with their $\overline{Q}$ outputs connected to their D inputs. More specifically, the output of the OR gate 2148 is a 230.4 kHz signal which is applied to a clock input CP of the flip-flop 2150. This flip-flop 2150 divides the input frequency by two to generate a 115.2 kHz signal at its Q output which is applied to one input the ASK/FSK MUX 2128 to generate a bit rate signal of 9600 bps. A $\overline{Q}$ output of the counter 2150 is applied to a clock input of the counter 2152 to generate a 57.6 kHz signal at its $\overline{Q}$ output. This signal is applied to a clock input CP of the counter 2154 to generate a 28.8 kHz signal at its Q output. This 28.8 kHz signal is applied to a clock input CP of the counter 2156 to generate a 14.4 kHz signal at its Q output. The 14.4 kHz signal is applied to a clock input CP of the counter 2158 to generate a 7.2 kHz signal at its Q output. This 7.2 kHz signal is applied to the ASK/FSK MUX 2128 to generate a 300 bps signal.

The counters 2130, 2132 and the Johnson counter which includes the flip-flops 2144 and 2146 are set to zero by reset and during test. More particularly, an $\overline{IRESET}$ reset signal is applied to one input of a two input OR gate 2160. A signal from the write test bus WTB2 is applied to the other input. The output of the OR gate 2160 is applied to an input of an inverter 2162. Output of the inverter 2162 is applied to CDN inputs of the flip-flops 2132, 2134, 2136, 2144, 2146, 2150, 2152, 2154, 2156 and 2158.

The FSK modulation scheme uses two carrier frequencies; 115.2 kHz and 92.16 kHz. The 92.16 kHz signal is available at the output of a decade counter 2164. This decade counter includes the flip-flops 2166, 2168, 2170 and 2172, as well as the NOR gate 2174 and an AND gate 2176. The 92.16 kHz signal is available as a signal FCA, available at a Q output of the flip-flop 2172. A 921.6 kHz signal is applied to clock inputs of the flip-flops 2166 and 2170. A $\overline{Q}$ output of the flip-flop 2166 is applied to a clock input CP of the flip-flop 2168. A Q output of the flip-flop 2166 is applied to one input of a two input NOR gate 2174. The other input to the NOR gate 2174 is a Q output from the flip-flop 2170. The output of the NOR gate 2174 is applied to a D input of the flip-flop 2166. A $\overline{Q}$ output of the flip-flop 2168 is applied to a D input of this flip-flop. A Q output of the flip-flop 2168 is applied to one input of a two input AND gate 2176. The other input to the AND gate 2176 is the Q output of the flip-flop 2166. The output of the AND gate 2176 is applied to a D input of the flip-flop 2170. The $\overline{Q}$ output of the flip-flop 2170 is applied to a clock input of the flip-flop 2172. A $\overline{Q}$ output of the flip-flop 2172 is applied to its D input. The Q output of the flip-flop 2172 is thus a divide by ten of the input signal 921.6 kHz.

The decade counter flip-flops 2166, 2168, 2170 and 2172 are set to zero during reset and also during the test mode. More specifically, the output of the inverter 2162 is applied to the CDN inputs of these flip-flops.

The 92.16 kHz FSK signal FCA as well as a 115.2 kHz carrier signal FC are used for FSK modulation. The FC signal is available at the output of the counter 2150. A 115.2 kHz baseband signal CARR is available at the output of a NOR gate 2174. One input to the NOR gate 2174 is the output of the OR gate 2148. Another input to the NOR gate 2174 is the output of the counter 2150. The output of the NOR gate 2174 is a 115.2 kHz signal.

Signals FDC and CK10 are used for demodulation control. The signal FDC is a 230.4 kHz signal, available at the output of an inverter 2176. A 230.4 kHz signal from the output of the counter 2146 is applied to the input of the inverter 2176. This frequency is selected as a sampling frequency at twice the carrier frequency of 115.2 kHz.

The CK10 signal is used to reset the bit phase timing generator 2119, illustrated in FIG. 88. This CK10 signal is available at the output of an OR gate 2178. There are three inputs to the OR gate 2178. One input is from the Q output of the counter 2146. The other input is from the output of the inverter 2140. Lastly, a $\overline{Q}$ output of the flip-flop 2144 is applied to the OR gate 2178. The inputs to the OR gate 2178 are thus signals representative of twice the carrier frequency (230.4 kHz), four times the carrier frequency (460.8 kHz) and eight times the carrier frequency (921.6 kHz). As illustrated in FIG. 112, the CK10 signal available at the output of the OR gate 2178 will thus produce a one-zero-one pattern every one half cycle at 115.2 kHz, equivalent to 230.42 kHz; the sampling frequency.

The bit phase timing generator 2119 is used to count the phase coherence of the carrier frequency. The bit phase timing generator 2119 produces timing control signals PHCKAD, PHCKB, PHCKBD, PHCKCD, PHCKDD, PHCKD, PHCK and PHRST. These signals are illustrated in the form of timing diagrams in FIGS. 111 and 112. These timing signals are developed by flip-flops 2182, 2184 and 2186; NOR gates 2188, 2190, 2192, 2194, 2196, 2198 and 2200 and inverters 2202, 2204, 2206, 2208, 2210, 2212, 2214 and 2216.

The bit phase clock signal BITPHCK is applied to the bit phase timing generator 2119. The BITPHCK signal is available at a Z output of the MUX 2124 (FIG. 87). The BITPHCK signal corresponds to the selected baseband or ASK/FSK baud rate. This BITPHCK signal is applied to the bit phase timing generator 2119 by way of high gain inverters 2202 and 2204. The output of the inverter 2204 is applied to clock inputs CP of the flip-flops 2182 and 2184, which are configured as a Johnson counter 2185. More specifically, a Q output of the flip-flop 2182 is applied to a D input of the flip-flop 2184. A $\overline{Q}$ output of the flip-flop 2184 is applied to a D input of the flip-flop 2182. The Q output of the flip-flops 2182 and 2184 are used to generate the timing signals. More specifically, a Q output of the flip-flop 2182 is applied to an inverter 2206. A $\overline{Q}$ output of the flip-flop 2182 is applied to an inverter 2208. A Q output of the flip-flop 2184 is applied to an inverter 2210. A $\overline{Q}$ output of the flip-flop 2184 is applied to the inverter 2212. An output of the inverter 2206 is applied to inputs of the NOR gates 2190, 2192 and 2194. An output of the inverter 2208 is applied to inputs of the OR gates 2188, 2196 and 2198. An output from the inverter 2210 is applied to inputs of the inverters 2194, 2196 and 2198. An output of the inverter 2212 is applied to inputs of the NOR gates 2188, 2190 and 2192. The output of the inverter 2212 is also applied to an input of an inverter 2214 to generate the PHCK signal. The BITPHCK signal, available at the output of the inverter 2204, is also applied to inputs of the NOR gates 2188, 2192, 2194 and 2196. The outputs of the NOR gates 2188, 2190, 2192, 2194, 2196 and 2198 are the bit phase timing signals PHCKAD, PHCKB, PHCKBD, PHCKCD, PHCKDD, PHCKD and PHCK.

A bit phase reset signal PHRST is generated every one-sixth bit at the output of a NOR gate 2200. A timing diagram for this signal is illustrated in FIG. 112. The NOR gate 2200 is a two input NOR gate. One input is from an output of an inverter 2216. A reset signal $\overline{IRESET}$ is applied to the input of the inverter 2216. A D input of the flip-flop 2186 is normally grounded. This flip-flop 2186 is clocked by the $\overline{Q}$ signal, available at the output of the Johnson counter 2185. The CK10 signal is applied to the CDN input of the flip-flop 2186 to clear this flip-flop every one-half carrier cycle. A Q output of the flip-flop 2186 is applied to an input of the NOR gate 2200 to generate the pulse signal PHRST at every one-sixth bit or 64 carrier cycles at 300 baud.

The carrier input signal is applied to a RXIN terminal on the IC 10 by way of a buffer amplifier 2218 (FIG. 85). This signal is then applied to a pair of carrier confirmation circuits 2220 and 2222, which form a portion of the receiver correlator 2118. These circuits operate at 90° out of phase with respect to each other. Each of these carrier confirmation circuits 2220 and 2222 examines the input carrier signal to determine if it is within the acceptable band of frequencies centered about the carrier. This is done on a cycle by cycle basis. Each carrier confirmation circuit 2220 and 2222 has two outputs. One output produces a pulse if the signal is within the pass band and the sample phase of the input signal is a logic 1. The other produces a pulse if the signal is within the pass band and the sample phase of the input signal is a logic 0. The four outputs ONEA, ZEROA, ONEB and ZEROB are used as inputs to a series of phase counters 2224, 2226, 2228 and 2230 (FIG. 90) which are reset by the PHRST signal, which resets these counters every one-sixth of a bit.

The digital demodulator 1694 requires phase coherence over the short term, i.e., over one and one-half cycles for frequency detection and is able to determine continued phase coherence in the longer term, i.e., one-sixth of a bit or 64 carrier cycles at 300 baud to discriminate against noise. The digital demodulator 1694 thus senses both frequency and phase of an incoming signal over a one-sixth of a bit interval. If the input frequency is correct and maintains phase coherence for at least three-fourths of the one-sixth bit interval, a counter 2338 is incremented. After six of these one-sixth bit intervals are processed, the contents are examined. If the counter counts up to four or more, a demodulated output bit DEMODAT is outputted.

Each of the carrier confirmation circuits 2220 and 2222 stores its three most recent samples of the incoming carrier by way of two stage shift registers 2224 (with stages 2223 and 2225) and 2226 (with stages 2227 and 2229). The incoming carrier frequency is applied to a D input of these shift registers 2224 and 2226. The shift registers 2224 is clocked at twice the carrier frequency by the signal FDC. The shift register 2226 is also clocked at twice the carrier frequency with a signal $\overline{FDC}$. The signal $\overline{FDC}$ is available at the output of an inverter 2243. The output of each stage of the shift registers 2224 and 2226 is exclusive ORed with its input by way of the exclusive OR gates 2228, 2230, 2232 and 2234. The outputs of the exclusive OR gates 2228, 2230 and 2232 and 2234 are ANDed by AND gates 2236 and 2238. The outputs of the AND gates 2236 and 2238 are applied to D inputs of a third stage shift register 2240 and 2242.

Assuming a 1-0-1 pattern exists on a D input to the first stage 2223, 2227 of the shift registers 2224 and 2226, the Q output of the first stage 2223, 2227 of the shift registers 2224 and 2226 and the Q output of the second stage 2225, 2229, this means that the past sample, which is zero, is stored in the first stage 2223, 2227 and the sample before that, which is a one, is stored in the second stage 2225, 2229. The present sample at the input of the first stage 2223, 2227 is stored on the next clock pulse.

The outputs of the first stage 2223, 2227 and the third stage 2240, 2242 of the shift registers are applied to NAND gates 2244, 2246, 2248 and 2250 to generate the confirmation signals $\overline{ONEA}$, $\overline{ZEROA}$, $\overline{ONEB}$ and $\overline{ZEROB}$. A pulse on either the ONEA or ZEROA output means that over a relatively short term of one and one-half carrier cycles, the input carrier is generally in phase with the timing signals developed through crystal oscillator. More specifically, a Q output of the first stage 2223 of the shift register 2224 is applied to one input of the NAND gate 2244. Another input to the NAND gate 2244 is a Q output of the third stage 2240. The Q output of the third stage 2240 is also applied to an input of the NAND gate 2246 along with a $\overline{Q}$ output of the first stage 2223. The outputs of the NAND gates 2244 and 2246 are the signals $\overline{ONEA}$ and $\overline{ZEROA}$. These NAND gates 2244 and 2246 will produce a pulse on every other sample provided the three stored samples form a 1-0-1 pattern. If the most recent sample is a logical 1, output of the NAND gate 2244 will be a logical 1. If the most recent sample is a 0, the output of the NAND gate 2246 will be a logical 1. The NAND gates 2248 and 2250 of the carrier confirmation circuit 2222 operate in a similar manner to produce to $\overline{ONEB}$ and $\overline{ZEROB}$ signals.

The shift registers 2224, 2226, 2240 and 2242 are set to zero on reset. More specifically a $\overline{IRESET}$ signal available at the output of an inverter 2252 is applied to CDN inputs of these shift registers.

The phase counters 2224, 2226, 2228 and 2230 are used to separately count the number of pulses developed on the four outputs (e.g., NAND gates 2244, 2246, 2248 and 2250) of the confirmation circuits 2220 and 2222 during a time interval equal to one-sixth of a bit. If any of these counters reaches and count of 48 during 64 carrier cycles which occur during one-sixth bit intervals at 300 baud or 12 out of 16 at 1200 baud, it is assumed that a valid carrier signal existed for that one-sixth bit interval.

Figure 91:
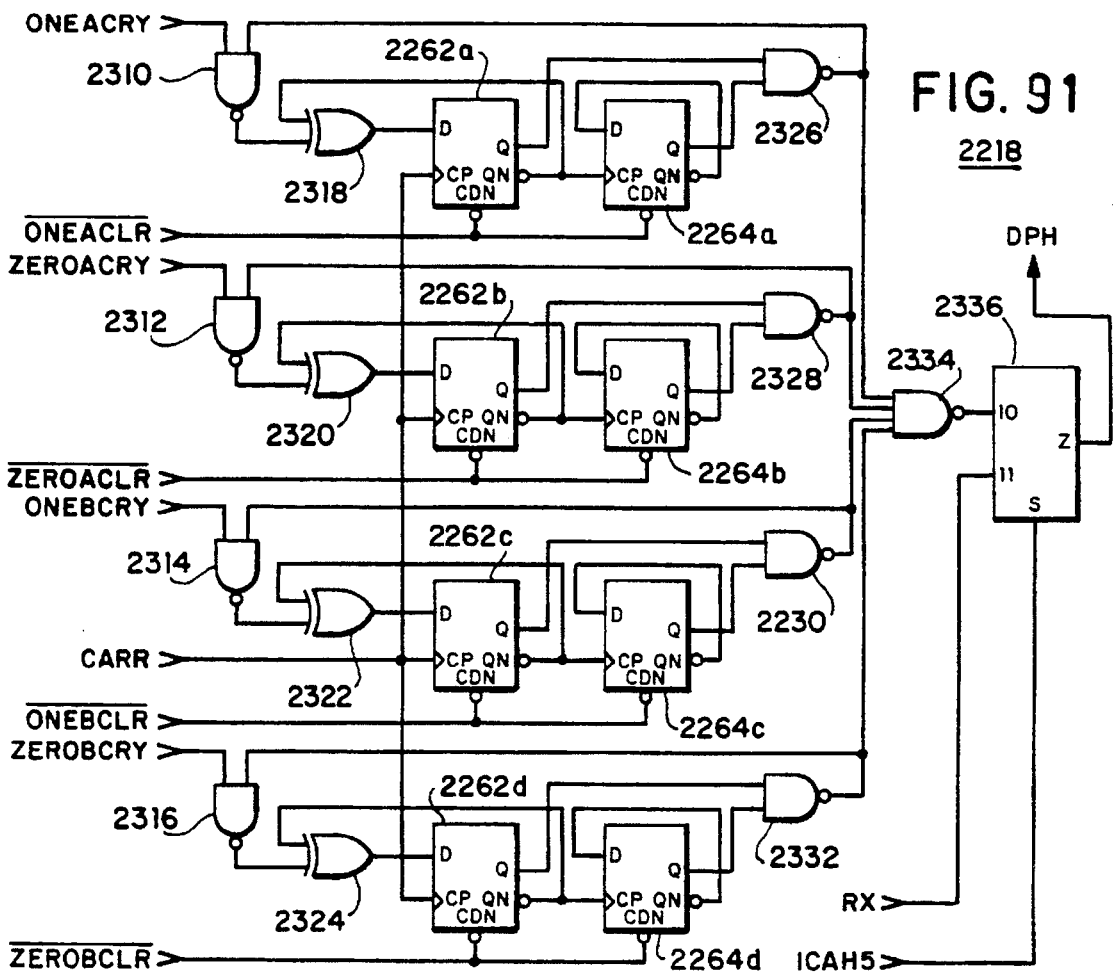
FIG. 91 is the remaining portion of the schematic diagram of a correlator counter which forms a portion of the communication controller in accordance with the present invention.
Figure 90:
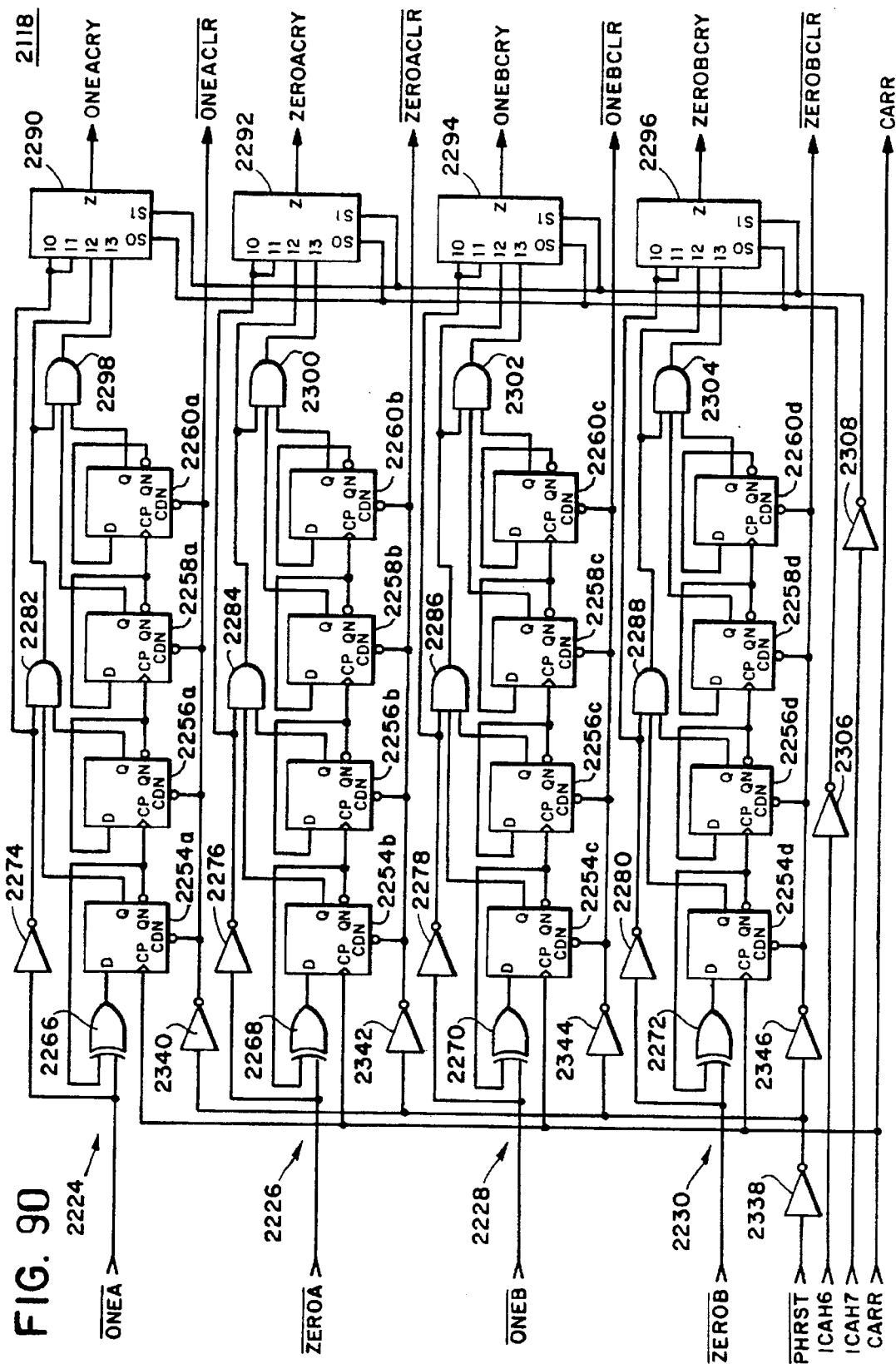
FIG. 90 is a partial schematic diagram of a correlator counter which forms a portion of the communication controller in accordance with the present invention.

The output signals $\overline{ONEA}$, $\overline{ZEROA}$, $\overline{ONEB}$ and $\overline{ZEROB}$ signals from the carrier confirmation circuits 2220 and 2222 are applied to the inputs of the phase counters 2224, 2226, 2228 and 2230. These phase counters illustrated in FIGS. 90 and 91 are used to separately count the number of pulses developed at the outputs of the phase confirmation circuits 2220 and 2222 during a time interval of one-sixth of a bit at the various baud rates of 300 baud, 1200 baud and 4800 baud. At 9600 baud, the counters count the number of pulses on the confirmation circuit 2220 and 2222 during a one-third bit interval. Each of the counters 2224, 2226, 2228 and 2230 includes six stages: 2254a–2254d, 2256a–2256d, 2258a–2258d, 2260a–2260d, 2262a–2262d and 2264a–2264d. The output signals ONEA, ZEROA, ONEB and ZEROB are applied to inputs of exclusive OR gates 2266, 2268, 2270 and 2272. These carrier confirmation output signals are also applied to inverters 2274, 2276, 2278 and 2280. The outputs of the inverters 2274, 2276, 2278 and 2280 are applied to three input AND gates 2282, 2284, 2286 and 2288 along with output signals from the first two stages 2254 and 2256. The outputs of these AND gates 2282, 2284, 2286 and 2288 are applied to MUXes 2290, 2292, 2294 and 2296. These AND gates are used to generate the 1200 baud signals at the MUXes 2290, 2292, 2294 and 2296. The third and fourth stages 2258 and 2260 of each of the counters 2224, 2226, 2228 and 2230 are applied to AND gates 2298, 2300, 2302 and 2304 along with the outputs of the AND gates 2282, 2284, 2286 and 2288 to develop the 300 baud signal available at the MUXes 2290, 2292, 2294 and 2296. The output of the inverters 2274, 2276, 2278 and 2280 is applied directly to the MUXes 2290, 2292, 2294 and 2296 for the 4800 baud and 9600 baud signals.

As previously mentioned, the baud rate is selected by the bits ICAH[7,6]. The complements of these signals are available at the outputs of inverters 2306 and 2308. These complemented signals are applied to select inputs S0, S1 of the MUXes 2290, 2292, 2294 and 2296 to select the proper baud rate and generate signals ONEACRY, ZEROACRY, ONEBCRY and ZEROBCRY at Z outputs of the MUXes 2290, 2292, 2294 and 2296. These output signals are applied to the fifth stages 2262a–2262d of the phase counters 2224, 2226, 2228 and 2230 by way of NAND gates 2310, 2312, 2314 and 2316 and exclusive OR gates 2318, 2320, 2322 and 2324. The outputs of the fifth and sixth stages 2262 and 2264 are applied to AND gates 2326, 2328, 2330 and 2332. These NAND gates 2326, 2328, 2330 and 2332 generate a pulse every one-sixth of a bit at baud rates 300, 1200 and 4800 and at one-third bit intervals at 9600 baud. The output of these NAND gates are applied to a NAND gate 2334 which, in turn, is applied to an input of a MUX 2336 along with a baseband signal available at the RX pin of the IC 10.

The ICAH5 bit selects between ASK/FSK and baseband. The baseband carrier signal CARR, available at the output of the NOR gate 2174, is applied to clock inputs CP of the first stage 2254 of each of the phase counters 2224, 2226, 2228 and 2230.

Each of the counter stages 2254, 2256, 2258, 2260, 2262 and 2264 are reset by the phase reset signal PHRST by way of inverters 2338, 2340, 2342, 2344 and 2346. The outputs of the inverters 2340, 2342, 2344 and 2346 are the signals ONEACLR, ZEROACLR, ONEBCLR and ZEROBCLR. These signals are applied to reset inputs of stages five and six 2262 and 2264.

The output of the phase counters 2224, 2226, 2228 and 2230 is a signal DPH, which indicates correlation of the carrier signal, available at the output of the MUX 2336. This signal DPH is applied to a demodulator counter 2338 by way of a flip-flop 2340. The strobe signal PHCK is also applied to the flip-flop 2340. The strobe signal PHCK is six times the bit rate except at 9600 baud where it is only three times the bit rate. The output of the flip-flop 2340 is applied to the demodulator counter 2338 and a flip-flop 2342 to generate a demodulator reset signal DEMODRST. The demodulator counter 2338 counts the number of outputs from the phase counters 2224, 2226, 2228 and 2230. The demodulator counter 2338 includes three stage flip-flops 2346, 2348 and 2350. The demodulated output signals DEMODAT from the demodulator counter 2338 are applied to an OR gate 2352 which, in turn, is applied to a message shift register and BCH computer discussed below.

In order to account for the various selectable baud rates, circuitry is provided which includes an exclusive OR gate 2354, a flip-flop 2356, an OR gate 2358 and a MUX 2360 is used. This circuitry is applied to the demodulator counter 2338 by way of an exclusive OR gate 2362 along with a stage one output signal from the flip-flop 2346. The output of the MUX 2360 provides a strobe signal which is either three or six times the bit rate. More specifically, a Q output of the flip-flop 2340 is applied to one input of the exclusive OR gate 2354. A $\overline{Q}$ output of the flip-flop 2356 is applied to the other input of the exclusive or gate 2354. The output of the exclusive OR gate 2354 is applied to an input of the flip-flop 2356. This flip-flop 2356 is clocked by a strobe signal PHCHAD at six times the bit rate. The output of the flip-flop 2356 along with the output of the flip-flop 2340 are applied to inputs of the OR gate 2358. The output of the OR gate 2358 is applied to one input of the MUX 2360 to generate a signal that is three times the bit rate when 9600 baud is selected. The output of the flip-flop 2340 is also applied directly to another input of the MUX 2360 to generate a signal that is six times the bit rate.

The bit rates are selected by the command bits ICAH[7, 6,5] as well as circuitry which includes a NAND gate 2364 and an inverter 2366. The NAND gate 2364 and the inverter 2366 decode the baud rate and modulation method command bits ICAH[7,6,5]. The output of the NAND gate 2364 is applied to a select input S of the MUX 2360.

A bit framing counter 2344 is used to count 12 one-sixth bit intervals to provide a frame of reference to determine whether the incoming signal comprises two start bits; both logic one's. Should the phase counters 2224, 2226, 2228 and 2230 count to eight during the 2-bit interval, a valid start bit is assumed and a signal BRCK is generated. The bit framing counter 2344 is a four stage counter and includes the flip-flops 2368, 2370, 2372 and 2374 as well as AND gates 2376, 2378 and 2380. This counter 2344 is clocked by the strobe signal PHCKAD. The first, second, third and fourth stages outputs are applied to the AND gate 2376 to provide a divide by twelve signal DIV12. The first, second and third stage outputs are applied to the AND gate 2378 to provide a divide by six DIV6 signal. The first and second stage outputs are applied to the AND gate 2380 to provide a divide by three DIV3 signal. The DIV12, DIV6 and DIV3 signals are applied to a MUX 2382. These signals are selected by inputs applied to S0 and S1 inputs on the MUX 2382.

A command bit decode signal from the NAND gate 2364 is applied to an S0 input. The other input S1 is under the control of a NAND gate 2384. The NAND gate 2384 is a two input NAND gate. The NAND gate 2384 allows the bit framing counter 2344 to be adjusted after a valid start bit has been detected. More particularly, $\overline{RCVDET}$ and $\overline{TXON}$ signals are applied to inputs of the NAND gate 2384. The $\overline{RCVDET}$ signal at the output of an inverter 2377, which is serially connected to a receive detect latch 2379. If during the first two bit interval, the demodulator counter 2338 has counted to eight indicating that eight of the twelve one sixth bit intervals corresponding to the two start bits of a received message have been received, the $\overline{RCVDET}$ latch 2379 is set. When this latch 2379 is set, the signal $\overline{RCVDET}$ is low for the remainder of the message. Since the bit framing counter 2344 is also used for transmitting messages, the other input to NAND gate 2384 is a $\overline{TXON}$. This signal is active low when the ICC 29 is transmitting a message.

The output of the NAND gate 2384 is then applied to the select input S1 of the MUX 2382 to select one of the four inputs of the MUX from the bit counter 2344. The output of the MUX 2382 is applied to a D input of the flip-flop 2386. This flip-flop 2386 is clocked by the strobe signal PHCKAD. The output of the flip-flop 2386 is applied to an input of the inverter 2388. The output of the inverter 2388 is a frame signal FRAME which produces a pulse after each bit is detected.

Circuitry is also provided to reset the system each time the demodulator counter 2338 counts to eight during the 2 start interval. This circuitry includes the NAND gates 2397 and 2398 and AND gates 2400 and 2402. The output of the AND gate 2402 is a reset word signal RSTWORD that is applied to a CDN input of the flip-flop 2340. The RSTWORD signal is active at the end of a message as will be discussed below. This RSTWORD signal is also applied to a CDN input of the flip-flop 2342 used to generate the demodulator counter reset signal DEMODRST which, in turn, resets the demodulator counter 2338. The DEMODRST signal is generated by circuitry which includes inverters 2381 and 2385, an OR gate 2383 and an AND gate 2387 is used to generate the $\overline{DEMODRST}$. This signal is available at an output of the inverter 2381. An output of the OR gate 2383 is tied to the input of the inverter 2381. The OR gate 2383 is a three input OR gate. An IRESET signal is applied to one input, available at the output of high gain inverters 2385 and 2405, to allow the circuitry to be reset on system reset. An output from the AND gate 2400 is applied to another input of the OR gate 2383. The FRAME signal is ANDed with the strobe signal PHCKCD to produce a pulse at the start of each bit. Lastly, an output of the AND gate 2387 is applied to the OR gate 2383. The AND gate 2387 is a three input AND gate. A $\overline{TXON}$ signal, indicating that the transmitter is off is applied to one input. The $\overline{RCVDET}$ signal, indicating that the start bits have been detected, is applied to another input. Thirdly, a $\overline{Q}$ output from the flip-flop 2342 is applied to an input. The flip-flop 2342 is used to release the reset on the demodulator counter 2338 near the end of each one-sixth bit interval.

The AND gate 2402 is a three input AND gate. An $\overline{IRESET}$ signal is applied to one input. This signal is available at the output of an inverter 2404. The other inputs are from the NAND gates 2396 and 2398. The output of the NAND gate 2398 represents an end of message. More specifically, the ENDMSG signal is applied to an end of message latch 2404, which includes the NOR gates 2406 and 2408. The other input to the end of message latch 2404 is a strobe signal PHCKDD. The other input to the NAND gate 2398 is a strobe signal PHCKD.

The NAND gate 2396 is a two input NAND gate. One input is the receive detection signal RCVDET, which is active when a signal is being received by the ICC 29 as discussed above. The other signal is from the AND gate 2400. The AND gate 2400 is a two input AND gate. One input is the strobe signal PHCKCD. The other signal is the frame signal FRAME available at the output of the inverter 2388.

Circuitry which includes a NAND gate 2410 and an inverter 2412 is used to develop a bit clock signal BRCK. This signal is used to clock a bit counter 2414. The NAND gate 2410 is a three input NAND gate. One input is a strobe signal PHCKBD. A bit frame signal FRAME is applied to another input. The output of the NAND gate 2384 is applied to the third input. The NAND gate 2384 represents that a message is being received. The output of the NAND gate 2410 is applied to the input of the inverter 2412. The output of the inverter 2412 is the signal BRCK.

A DRCK signal is generated at the output of an AND gate 2416. This signal is used in conjunction with the ICC 29 transmitter as will be discussed below. The AND gate 2416 is a two input AND gate. One input is the strobe signal PHCKCD. The other input is the FRAME signal.

Figure 93:
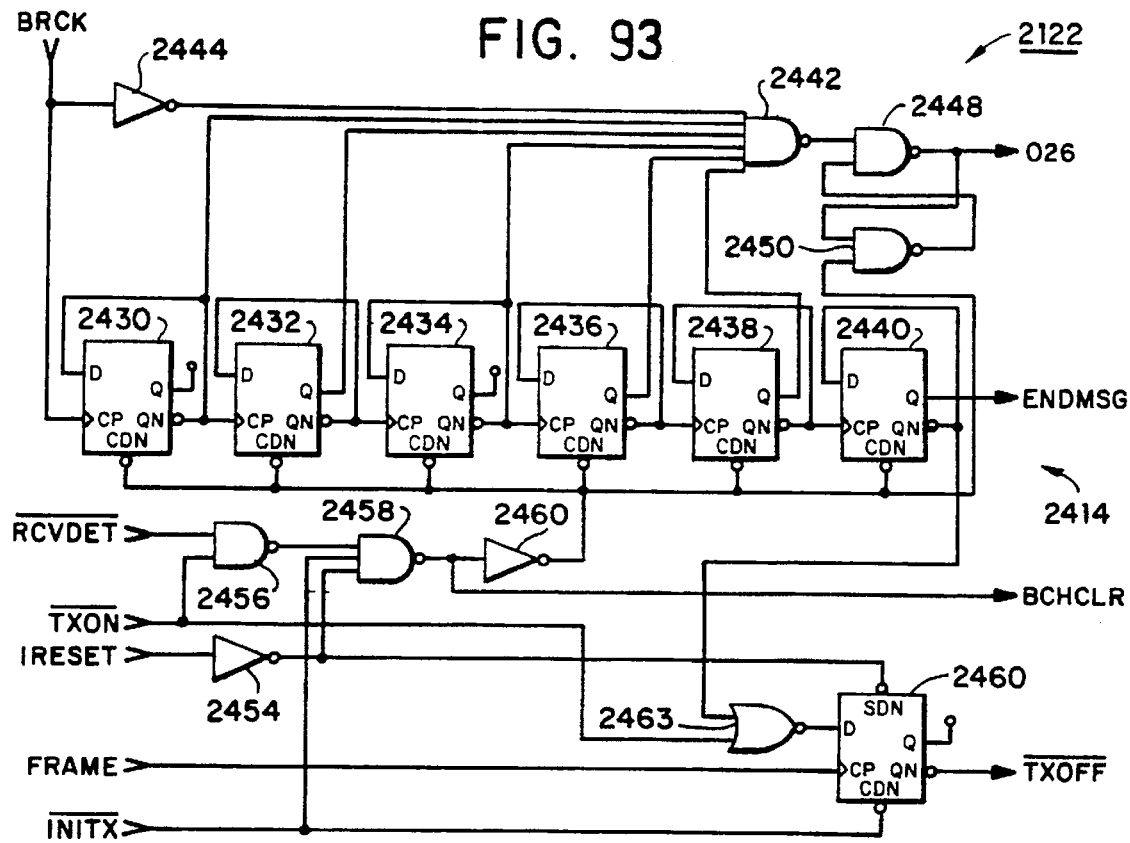
FIG. 93 is a schematic diagram of a bit counter which forms a portion of the communication controller in accordance with the present invention.

The bit counter 2414 is illustrated in FIG. 93. This bit counter 2414 is a six stage counter and includes the flip-flops 2430, 2432, 2434, 2436, 2438 and 2440. The bit rate clock signal BRCK is applied to the input of the first stage 2430. The output of the last stage of the bit counter 2414 is the end of message signal ENDMSG.

The output of the outputs of the first five stages 2430, 2432, 2434, 2436 and 2438 are applied to a six input NAND gate 2442 along with a $\overline{BRCK}$ signal, available at the output of an inverter 2444. The output of the NAND gate 2442 is applied to a latch 2446, which includes the NAND gates 2448 and 2450. The other input to the latch 2446 is an output from an inverter 2452. The output of the latch 2446 is a signal 026, which is applied to a BCH computer to be discussed below. The 026 signal latches when the bit counter counts to 26.

Since this counter 2414 is used both for receiving messages and transmitting messages to determine the end of a word, after a word is counted, the counter 2414 as well as the latch 2446, is reset by circuitry which includes the inverter 2452 and inverter 2454 and NAND gates 2456 and 2458.

When messages are being received by the ICC 29, a receive detection signal RCVDET and $\overline{TXON}$, applied to the inputs of the NAND gate 2456, are active. The output of this NAND gate 2456 indicates that a message is being received by the ICC 29. During conditions when the ICC 29 is transmitting messages an INITX signal, applied to another input of the NAND gate 2458, is active. The INITX signal indicates that a message transmission has been initiated. Lastly, a reset signal $\overline{IRESET}$, available at the output of the inverter 2054, is applied to the third input. The output of the NAND gate 2458 indicates that either a message is being received or that the ICC 29 is transmitting a message. The output of the NAND gate 2458 is applied to an input of the inverter 2452. The output of the inverter 2452 is used to reset the bit counter 2414 as well as the latch 2446. More specifically, the output of the inverter 2452 is applied to CDN inputs of all six stages of the bit counter 2414. The output of the inverter 2414 is also applied to one input of the 026 signal latch 2446. The output of the NAND gate 2458 is also used to reset the BCH computer which will be discussed later.

Circuitry which includes a flip-flop 2460 and a NOR gate 2463 is used to develop a transmitter signal identified as $\overline{TXOFF}$. This signal is used in conjunction with the transmitter control circuits discussed below. More particularly, a Q output of the sixth stage of the 2440 of the bit counter 2414 is applied to one input of the two input NOR gate 2462. The $\overline{TXON}$ signal is applied to the other input. The $\overline{TXON}$ signal is active low indicates that the transmitter is on. The output of the NOR gate 2462 is applied to a D input of the flip-flop 2460. The flip-flop 2460 is clocked by the frame signal FRAME. The $\overline{TXOFF}$ signal is available at a QN output of the flip-flop 2460. This flip-flop is reset by an INITX signal, which is applied to a CDN input of the flip-flop 2460.

INCOM SHIFT REGISTER

A 32 stage serial shift register 2462 is used for INCOM messages in both receive and transmit operations. This shift register 2462 includes the flip-flops 2464–2514, illustrated in FIGS. 102 and 103. Each stage of the shift register 2462 is adapted to receive two inputs which are selected by a LOAD signal used for loading messages into the shifted register 2462. More specifically, as discussed previously, a transmit data bus TDATA[26 . . . 0] which allows the microprocessor 30 to communicate with the ICC 29, is applied to DA inputs of each stage of the shift register 2462. The demodulated output bits DEMODAT for received messages are applied to DB inputs of the first stage 2464 of the shift register 2462 for received messages. Received messages are then shifted through the shift register 2462. The receive data bus RDATA[26 . . . 0] is applied to Q outputs of each of the stages. The RDATA[26 . . . 0] bus allows demodulated incoming messages to be communicated to the microprocessor 30.

A $\overline{LOAD}$ signal is applied to the select inputs SA of each stage to allow the shift register 2462 to select between received messages and transmitted messages. The LOAD signal is available at the outputs of parallel connected inverters 2516 and 2518. The output of the inverter 2520 is connected to the input of the parallel connected inverters 2516 and 2518. The LOAD signal, discussed in conjunction with FIG. 109 below, is applied to the input of the inverter 2520. The $\overline{LOAD}$ signal is available at the output of the parallel connected inverters 2516 and 2518.

A shift register clock signal SRCK, discussed in conjunction with FIG. 110, is applied to the clock inputs of each stage of the shift register 2462. The SRCK signal is available at the outputs of the parallel connected inverters 2520 and 2522. The input to the parallel connected inverters 2520 and 2522 is an $\overline{SRCK}$ signal.

Except for stage one 2464 and stage two 2466, which are the status bits for the reply message, the balance of the stages 2468–2514 are set to zero on system reset. More particularly, a $\overline{IRESET}$ signal available at the output of the parallel connected inverters 2524 and 2526 is applied to CDN reset inputs of the third through thirty-second stage. The inputs to these inverters 2524 and 2526 are tied together and to the output of an inverter 2528. The input of the inverter 2528 is connected to the output of an inverter 2530. The $\overline{IRESET}$ signal is applied to the input of the inverter 2530.

The status bits for the reply message are available on an internal reply status bit bus RSB[26,25]. These status bits are available at the Q outputs of the flip-flops 2030 and 2032 which form a portion of the ICM0 message register. Definitions for the status bits are provided in Table 21. These status bits RSB[26,25] are applied to either the set SDN or reset CDN inputs of the first and second stage flip-flops 2464 and 2466. More particularly, these bits RSB[26,25] are applied to inputs of dual input NAND gates 2532 and 2534 along with a STSLD signal, which indicates that a reply message is being formulated. The outputs of the NAND gates 2532 and 2534 are applied to the select inputs SDN of the stage one and stage two shift register flip-flops 2464 and 2466 to shift ones into these flip-flops when selected. These reply status bits RSB[26,25] are also applied to inputs of inverters 2536 and 2538. The output of these inverters are applied to two input NAND gates 2540 and 2542 along with the STSLD signal. The outputs of the NAND gates 2540 and 2542 are applied to the reset inputs CDN of the flip-flops 2464 and 2466 to set these flip-flops to zero when selected.

ICC CONTROL LOGIC

Figure 104:
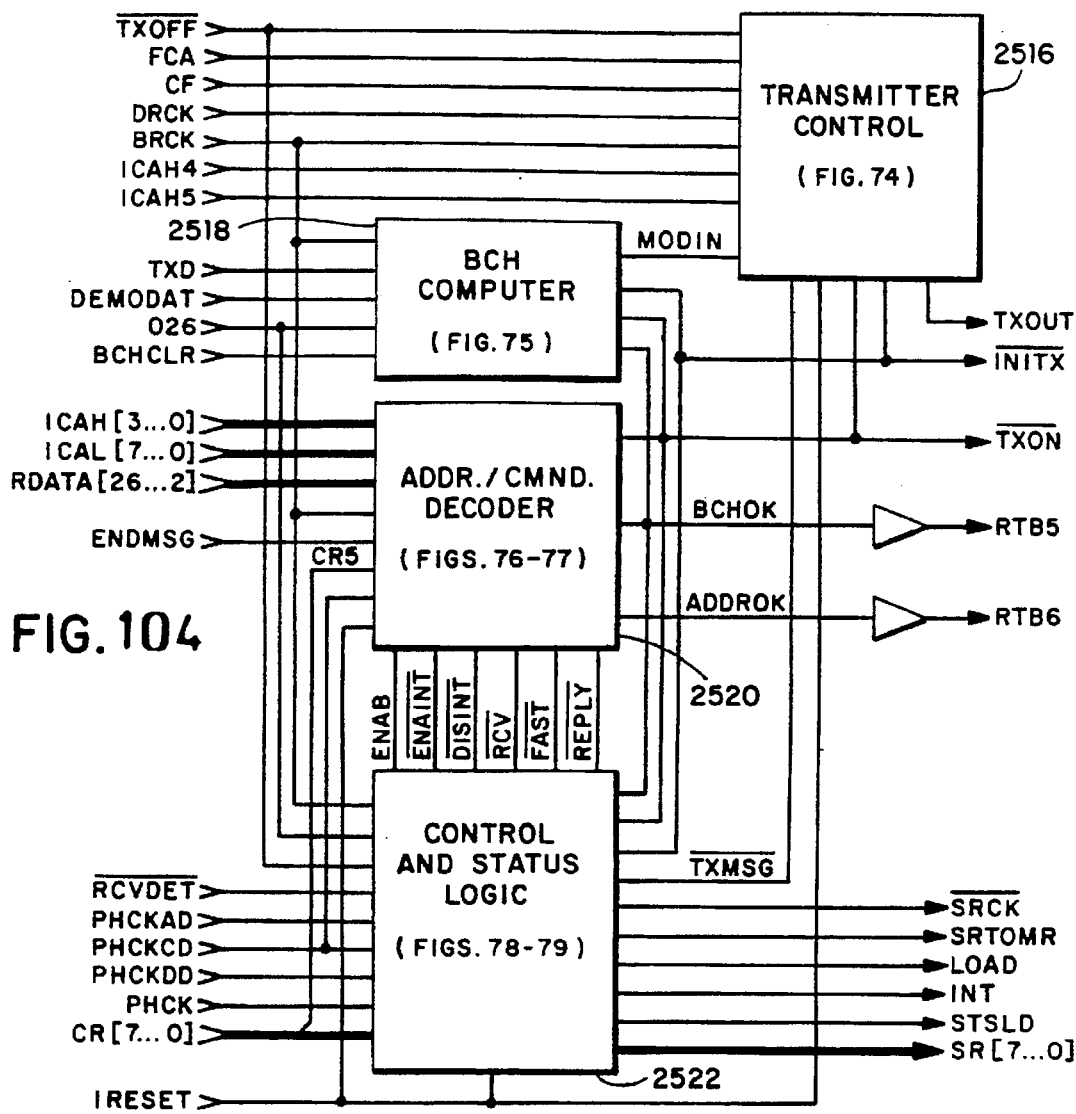
FIG. 104 is a block diagram of the communication controller control logic which forms a portion of the IC in accordance with the present invention.

The control logic for the ICC 29 is illustrated in block diagram form in FIG. 104. The control logic includes transmitter control logic circuitry 2516, illustrated in FIG. 105, a BCH computer 2518 illustrated in FIG. 106, address and command decoder logic 2520, illustrated in FIGS. 107 and 108 and control and status logic 2522 illustrated in FIGS. 109 and 110.

Figure 105:
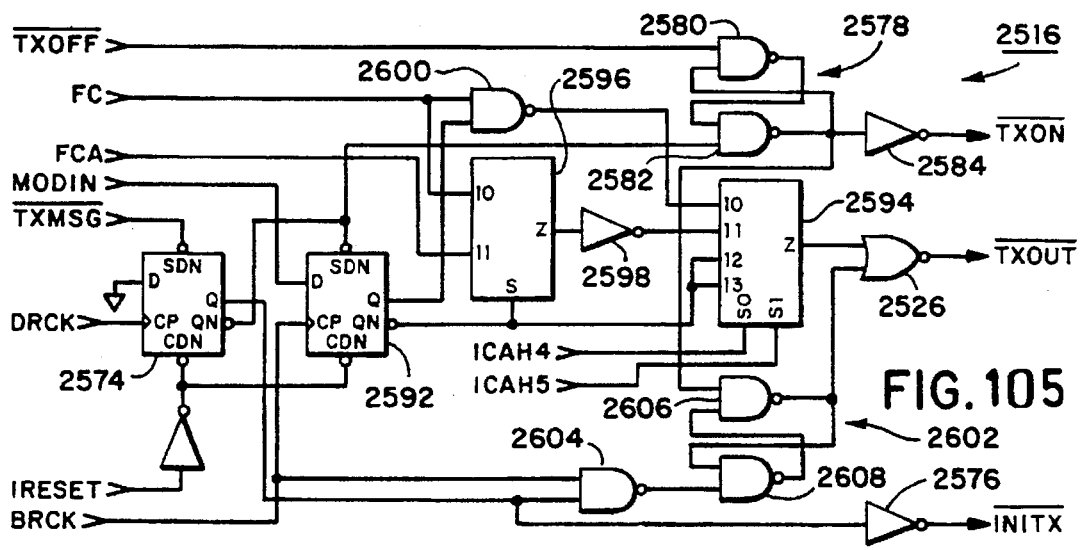
FIG. 105 is a schematic diagram of the transmitter control logic circuit which forms a portion of the communication controller in accordance with the present invention.

Referring first to the transmitter control logic 2516, the ICC 29 transmitter output is a signal TXOUT. This signal is applied to a tristate device 2524 (FIG. 85) whose output is tied to the external pin TX. The TXOUT pin is available at the output of a NOR gate 2526 (FIG. 105). When the ICC 29 is operated in the master mode, it can transmit any time. When the ICC 29 is operated in the slave mode, it can only transmit if a reply is requested by the initiating controller. In the slave mode, the ICC 29 is under the control of an AND gate 2528 (FIG. 110). The AND gate 2528 is a two input AND gate. One input is an interface enable signal ENAINT. This signal is available from the address/command decoder 2520, which will be discussed below. The other input is a slave mode signal available at the output of an inverter 2530. The input to the inverter 2530 is the command bit ICCR[5]. When this command bit is a logical zero, the ICC 29 will be in the slave mode. The output of the AND gate 2528 is applied to the input of an interface enable latch 2532, which includes the NAND gates 2534 and 2536. The output of the latch 2532 is the control bit ICSR[6] which indicates that the communication controller 29 interface is enabled. The latch 2532 is also used to generate an ENAB signal, available at an output of a flip-flop 2533. More particularly, the output of the latch 2532 is applied to a D input of the flip-flop 2533. The signal ENAB is available at a Q output of this flip-flop. The strobe signal PHCKAD, available at the output of the inverter 2590, is applied to a clock input CP of this flip-flop.

The interface enable latch 2532 may be disabled by a two input AND gate 2538. One input to the AND gate 2538 is a reset signal $\overline{\text{RESET}}$. The other input is a disable interface signal DISINT, available at the output of the address/ command decoder 2520. The DISINT signal disables the interface enable latch 2532 when a reply is not necessary.

Figure 92:
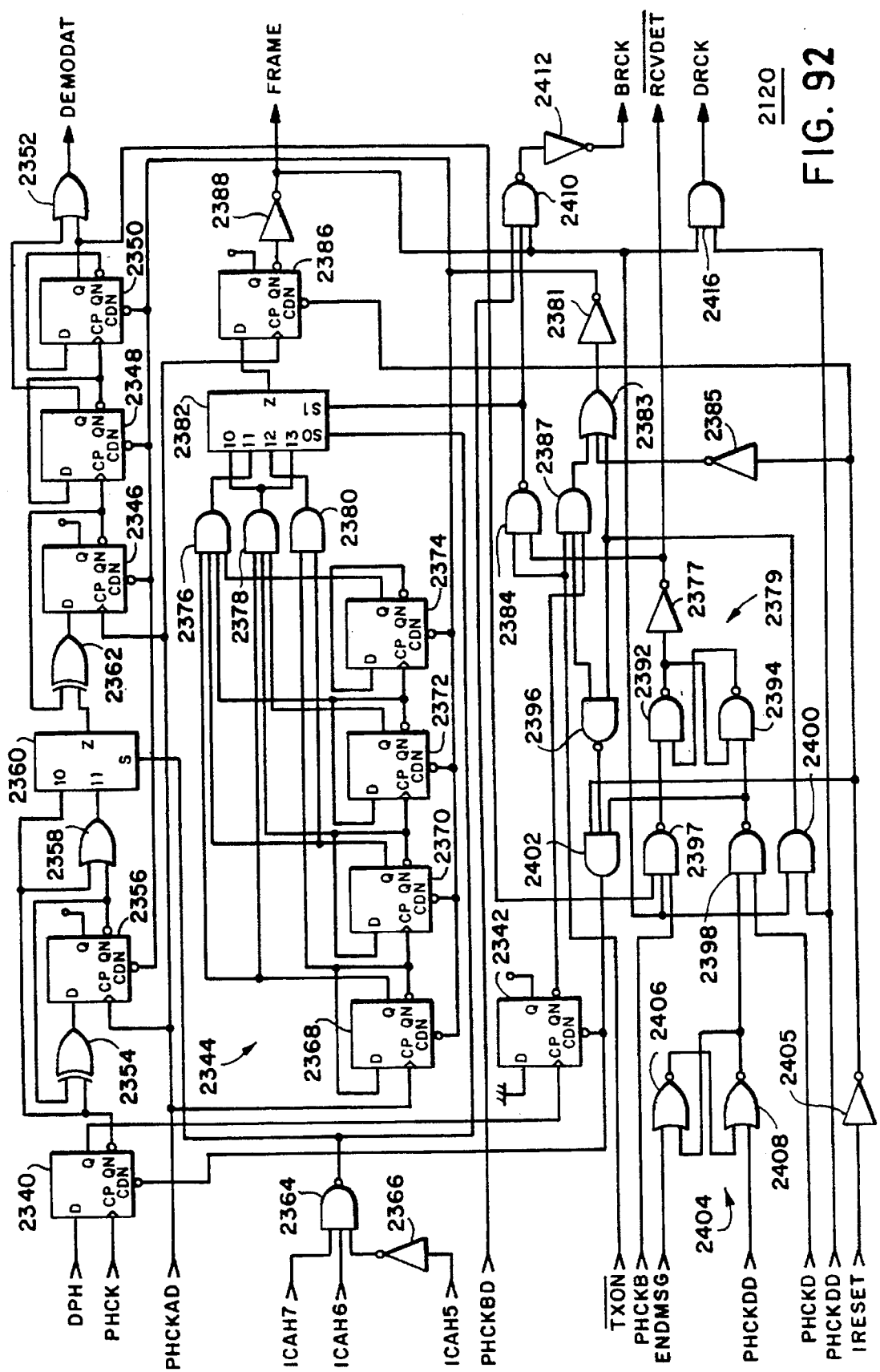
FIG. 92 is a schematic diagram of the demodulator control logic which forms a portion of the communication controller in accordance with the present invention.
Figure 109:
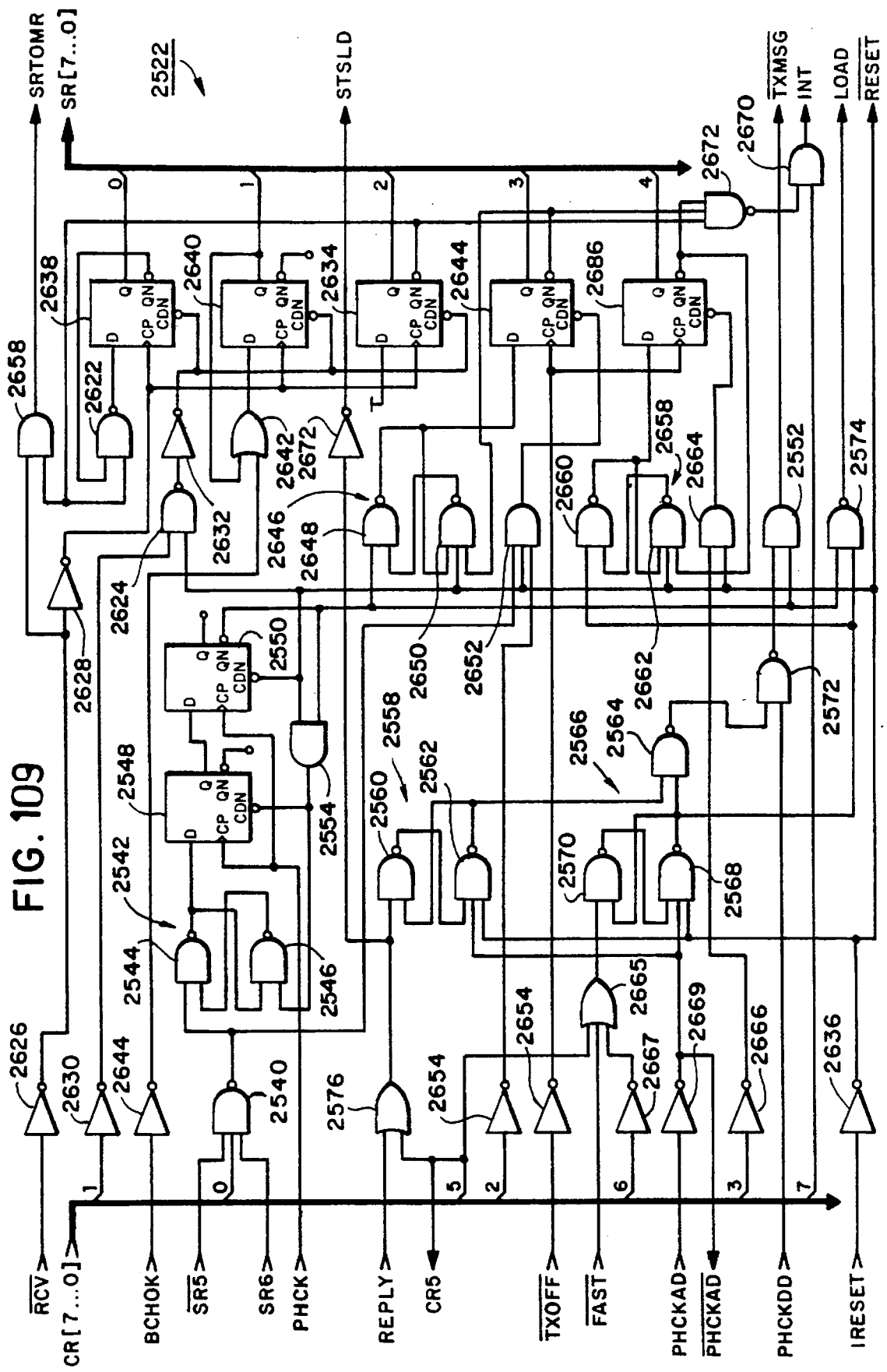
FIG. 109 is a schematic diagram of a control and status logic circuit which forms a portion of the communication controller in accordance with the present invention.

In the master mode, the ICC 29 can transmit any time. Initiation of transmissions is under the control of a three input NAND gate 2540 (FIG. 109). The command bit ICCR[0], which indicates a transmission command, is applied to one input. The control bits ICSR[6,5] are applied to the other inputs. The control bit ICSR[6] indicates that the interface is enabled. The control bit ICSR[5] is active low when the transmitter is inactive to allow the message start bits (e.g., two 1's) to be generated. More particularly, the output of the NAND gate 2540 is applied to a start bit latch 2542, which includes the NAND gates 2544 and 2546. The output of the start bit latch 2542 is applied to a pair of flip-flops 2548 and 2550 to generate the start bits. A $\overline{Q}$ output of the flip-flop 2550 is applied to an input of a message transmit AND gate 2552. The other input to the AND gate 2552 is from a FAST STATUS AND gate 2572, which will be discussed below. The output of the AND gate 2552 is a transmit message signal $\overline{\text{TXMSG}}$. The $\overline{\text{TXMSG}}$ signal is applied to a SDN input of the flip-flop 2574 (FIG. 105) to set this flip-flop to one during the start bit interval. A D input of the flip-flop 2574 is grounded. The flip-flop 2574 is strobed by a transmitter control strobe signal DRCK, available at the output of the AND gate 2416 (FIG. 92).

After the two start bits are generated, an AND gate 2554 resets the flip-flops 2548 and 2550 and the start bit latch 2542. The AND gate 2554 is a two input AND gate. One input is from the output of the flip-flop 2550. A $\overline{\text{IRESET}}$ signal is applied to the other input to allow the flip-flops to be set to zero on system reset. The $\overline{\text{IRESET}}$ signal is available at the output of an inverter 2556. The flip-flops 2548 and 2550 are strobed by PHCK signal which strobes the flip-flops every bit.

In both the master mode and the slave mode, a reply latch 2558, which includes the NAND gates 2560 and 2562, is set. The reply latch 2558 is under the control of the two input NOR gate 2526. One input to the NOR gate 2526 is the $\overline{\text{REPLY}}$ signal, which indicates that a reply is required. The command bit ISCR[5] is applied to the other input. The output of the latch 2558 is applied to one input of a two input NAND gate 2564. The other input to the NAND gate 2564 is a fast status latch 2566 which includes the NAND gates 2568 and 2570. The output of the NAND gate 2564 is applied to one input of a two input NAND gate 2572 along with a strobe signal PHCKDD. The output of the NAND gate 2572 is applied to the NAND gate 2552 along with the output of the flip-flop 2550 to generate a transmit message signal $\overline{\text{TXMSG}}$.

Signals $\overline{\text{INITX}}$ and $\overline{\text{TXON}}$ are also generated by the transmitter control logic circuitry 2516. More particularly, a Q output of the flip-flop 2574 is applied to the inverter 2576. The output of the inverter 2576 is an initiate transmit signal $\overline{\text{INITX}}$. This signal $\overline{\text{INITX}}$ is interlocked with the BCH computer 2518 as will be discussed below.

A $\overline{Q}$ output of the flip-flop 2574 is applied to a transmitter latch 2578 which includes the NAND gates 2580 and 2582 to generate a $\overline{\text{TXON}}$ signal. The transmitter latch 2578 is reset by the $\overline{\text{TXOFF}}$ signal. This signal is available at a $\overline{Q}$ output of the flip-flop 2460 (FIG. 93) and indicates that the message counter has counted 32 bits. The output of the transmitter latch 2578 is applied to an input of an inverter 2584. The output of the inverter 2584 is the $\overline{\text{TXON}}$ signal, active low, indicates that the transmitter is on. This $\overline{\text{TXON}}$ is used to develop the control bit ICSR[5], which indicates that the transmitter is active. More particularly, the $\overline{\text{TXON}}$ signal is applied to an inverter 2586 (FIG. 110). The output of the inverter 2586 is applied to a D input of a flip-flop 2588. A Q output of the flip-flop 2588 is the control bit ICSR[5]. Flip-flop 2588 is strobed by a PHCKAD signal, available at the output of an inverter 2590. The input to the inverter 2590 is the strobe signal $\overline{\text{PHCKAD}}$.

A $\overline{Q}$ output of the flip-flop 2588 is also used to generate a BUSY signal as well as the $\overline{\text{SR5}}$ signal, which is active low. More specifically, a $\overline{Q}$ output of the flip-flop 2588 is applied to one input of a two input NAND gate 2591. The other input is the RCVDET signal which indicates that a message is being received. The output of the NAND gate 2591 is the BUSY signal.

TRANSMITTER CONTROL

Various modulation methods are available: ASK, FSK and baseband. The start bits are shifted into a flip-flop 2592 by tying a $\overline{Q}$ output of the flip-flop 2574 to a SDN input of the flip-flop 2592 as discussed above. The signal MODIN, available from the BCH computer 2518, which will be discussed below, is applied to a D input of the flip-flop 2592. The flip-flop 2592 is strobed by the BRCK signal available at the output of the inverter 2412 (FIG. 92). The baseband signal, available at a $\overline{Q}$ output of the flip-flop 2592, is applied to an input of a MUX 2594. It is also applied to an FSK modulator MUX 2596. More particularly, 115.2 kHz (FC) and 92.16 kHz (FCA) signals are applied to the inputs of the MUX 2596. The $\overline{Q}$ output of the flip-flop 2592 is applied to the select S input of the MUX 2596 to shift between 115.2 kHz and 92.16 kHz for FSK modulation. The output of the MUX 2596 is applied to an inverter 2598 which, in turn, is applied as an FSK input of the MUX 2594. A Q output of the flip-flop 2592 is applied to one input of a two input NAND gate 2600, used for ASK modulation along with the carrier signal FC. The output of the ASK modulator 2600 is applied to another input of the MUX 2594. The control bits ICAH[5,4] are applied to the select inputs S1 and S0 of the MUX 2594 to select between ASK, FSK or baseband. The output of the MUX 2594 is applied to the OR gate 2526 along with an intermessage spacing generator latch 2602 output. The intermessage spacing latch 2602 includes the NAND gates 2604 and 2606 and provides zeros between messages. The output of the intermessage spacing latch 2602 is applied to another input of the OR gate 2526. The output of the OR gate 2526 is the TXOUT signal.

The intermessage spacing latch 2602 is under the control of a two input NAND gate 2604. The NAND gate 2604 is a two input NAND gate. One input is from the counter signal BRCK. The other input is the Q output of the flip-flop 2574. Thus, whenever a transmission is initiated, the BRCK signal times the transmission and provides zeros at the end of a message.

CONTROL AND STATUS LOGIC

Various control and status signals are generated by the control and status logic circuitry 2522. The control bits ICSR[7 . . . 5] have previously been discussed. Status bits ICSR[4 . . . 0] are derived from the circuitry illustrated in FIG. 109.

The status bit ICSR[0] indicates a receiver (RX) overrun. This status bit is developed by the circuitry which includes a flip-flop 2620, NAND gates 2622 and 2624 and inverters 2626, 2628, 2630 and 2632. A receive signal $\overline{\text{RCV}}$, available from the instruction decoder 2520, is applied to a clock input CP of the flip-flop 2620 by way of inverters 2626 and 2628. A $\overline{Q}$ output of the flip-flop 2620 is NANDed with the status bit ICSR[2], by way of the NAND gate 2622 and applied to a D input of the flip-flop 2620. The bit ICSR[0] is set if the message register has not been released (ICSR[2]=1) when a new message is ready to be loaded into the message register. This status bit is cleared by system reset or writing to ICCR[1]=1. More specifically, reset is under the control of the AND gate 2624. The NAND gate 2624 is a two input NAND gate. One input is the bit ICCR[1] which is applied by way of the inverter 2630. The other input is the $\overline{\text{IRESET}}$ signal, available at the output of an inverter 2636. The output of the AND gate 2624 is applied to a reset input CDN of the flip-flop 2620 by way of the inverter 2632.

The $\overline{\text{RCV}}$ signal is also used to generate a message register receive buffer strobe signal SRTOMR. This signal is applied to an AND gate 2638 along with a $\overline{Q}$ output of the flip-flop 2634, indicating that the receive operation is not complete.

The bit ICSR[1] indicates a BCH error which is set after a message containing an error is received. This bit is generated by circuitry which includes a flip-flop 2640, an OR gate 2642 and an inverter 2644. A $\overline{\text{BCHOK}}$ signal, indicating an error, is available at the output of the inverter 2644. This signal is applied to one input of the OR gate 2642 along with a Q output of the flip-flop 2640. The flip-flop 2640 is clocked by the $\overline{\text{RCV}}$ signal. The flip-flop 2640 is reset in the same manner as the flip-flop 2620.

The bit ICSR[2] when set, indicates that a received message has been loaded into receive message buffer. This bit is available at the output of the flip-flop 2634. A D input of this flip-flop is grounded. The flip-flop 2634 is clocked by the $\overline{\text{RCV}}$ signal and is reset in the same manner as the flip-flops 2620 and 2640.

The bit ICSR[3] when set indicates the completion of a message transmission. Circuitry for generating this bit includes the flip-flop 2644, a transmitter latch 2646, which includes NAND gates 2648 and 2650 and an AND gate 2652. The transmitter latch 2646 output is applied to a D input of the flip-flop 2644. This latch 2646 is latched while the transmitter is active. More specifically, a TXOFF signal, available at an output of an inverter 2654 is applied to a clock input of the flip-flop 2644. The TXOFF signal is active high and indicates that the transmitter is off. A $\overline{Q}$ output of the flip-flop 2660, which is low after the message start bits are generated. Thus, the bit will be set at the end of message after the TXOFF signal becomes high, indicating that the transmitter is off.

The bit ICSR[3] is cleared on reset by the AND gate 2652. The $\overline{\text{IRESET}}$ signal is applied to one input. The bit can also be reset by writing to ICCR[2]=1. The ICCR[2] signal is available at an output of an inverter 2654. An output from the NAND gate 2540 is also applied to another input of the AND gate 2652 to reset the flip-flop 2644 when a new transmission is initiated.

The bit ICSR[4] is set after completion of a fast status message transmission. Circuitry for generating this bit includes a flip-flop 2656, a latch 2658 which includes the NAND gates 2660 and 2662 and an AND gate 2664. The latch 2658 is set by the fast status enable latch 2566. The fast status enable latch 2566 is under the control of a three input OR gate 2665. The command bit ICCR[5] indicating master mode is applied to one input. The bit ICCR[6], which indicates a fast status enable, available at an output of an inverter 2567 is applied to another input. Lastly, a signal $\overline{\text{FAST}}$ is applied to the third input. The $\overline{\text{FAST}}$ signal indicates that a fast status reply message has been requested in an incoming message. The fast status enable latch is strobed by the strobe signal $\overline{\text{PCKAD}}$, available at an output of an inverter 2669.

An output of the latch 2658 is applied to a D input of the flip-flop 2656. The TXOFF signal is applied to the clock input CP to set this bit when the transmitter is off after the fast status enable latch 2566 is set. A $\overline{Q}$ output of the flip-flop 2656 is applied to an input of the latch 2658 to reset it after the status bit ICSR[4] is set.

Reset of this bit is under the control of the two input AND gate 2664. The $\overline{\text{IRESET}}$ signal is applied to one input. The bit may also be reset by writing to ICCR[3]. The bit ICCR[3] is available at an output of an inverter 2666.

An interrupt signal INT is generated at an output of an AND gate 2670. When set, this bit will generate an interrupt on receive and transmit operations. More specifically, the bit ICCR[7], which indicates interrupt enable is applied to one input of the AND gate 2670. An output of a NAND gate 2672 is applied to another input. The NAND gate 2672 is a three input NAND gate. $\overline{Q}$ outputs from the flip-flops 2634, 2644 and 2656 are applied to the inputs to generate interrupts during receive and transmit operations.

The LOAD signal, used to load messages into the shift register 2462 is generated by a NAND gate 2574. The NAND gate 2574 is a two input NAND gate. One input is from the fast status enable latch 2566. The other input is from the flip-flop 2550, which indicates the message start bits have been generated.

Figure 102:
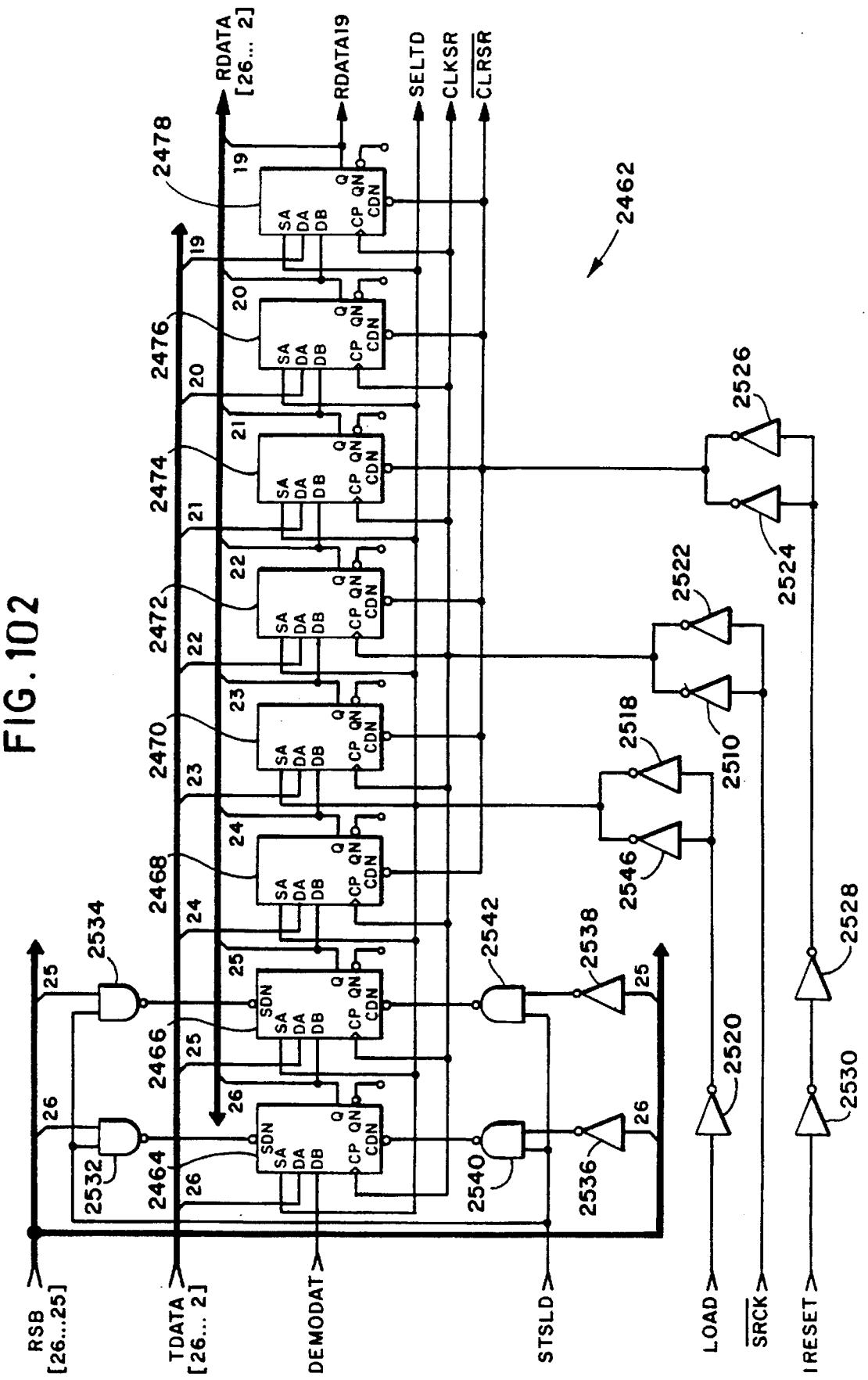
FIG. 102 is a schematic diagram of bits 26–19 of a shift register which forms a portion of the communication controller in accordance with the present invention.
Figure 103:
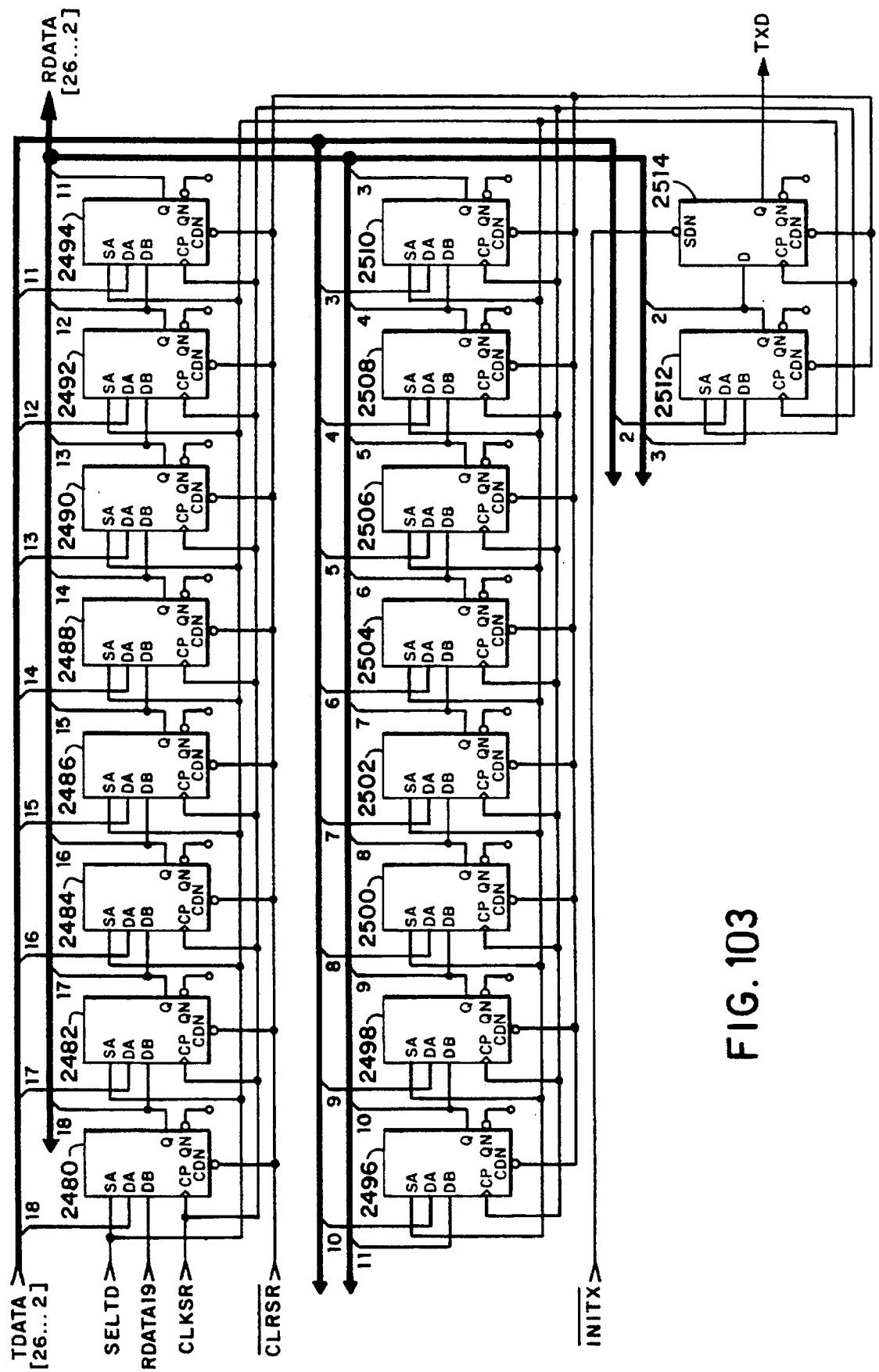
FIG. 103 is a schematic diagram of bits 18–2 of the shift register of FIG. 102.

The signal STSLD, is used to enable the AND gates 2532 and 2534 (FIG. 102). This signal is a status bit load signal and is used to allow the status bits to be loaded into the first two stages 2464, 2466 of the shift register 2462. This signal STSLD is available at an output of an inverter 2572. The output of the NOR gate 2526, previously discussed is applied to the input of the inverter 2672.

Lastly, the $\overline{\text{SRCK}}$ signal, used to strobe the shift register 2462, is generated by circuitry which includes an AND gate 2674, NAND gates 2676 and 2678 and an inverter 2680 (FIG. 110). Outputs of the NAND gates 2676 and 2678 are applied to inputs of the AND gate 2674. The signal $\overline{\text{O26}}$, available at an output of the inverter 2680, indicates that the bit counter 2414 has not yet counted 26 bits, is applied to one input of the NAND gate 2676 along with the bit rate clock signal BRCK and the $\overline{\text{INITX}}$ signal. The strobe signal PHCKCD and the LOAD signal are applied to inputs of the NAND gate 2678.

BCH COMPUTER

Figure 106:
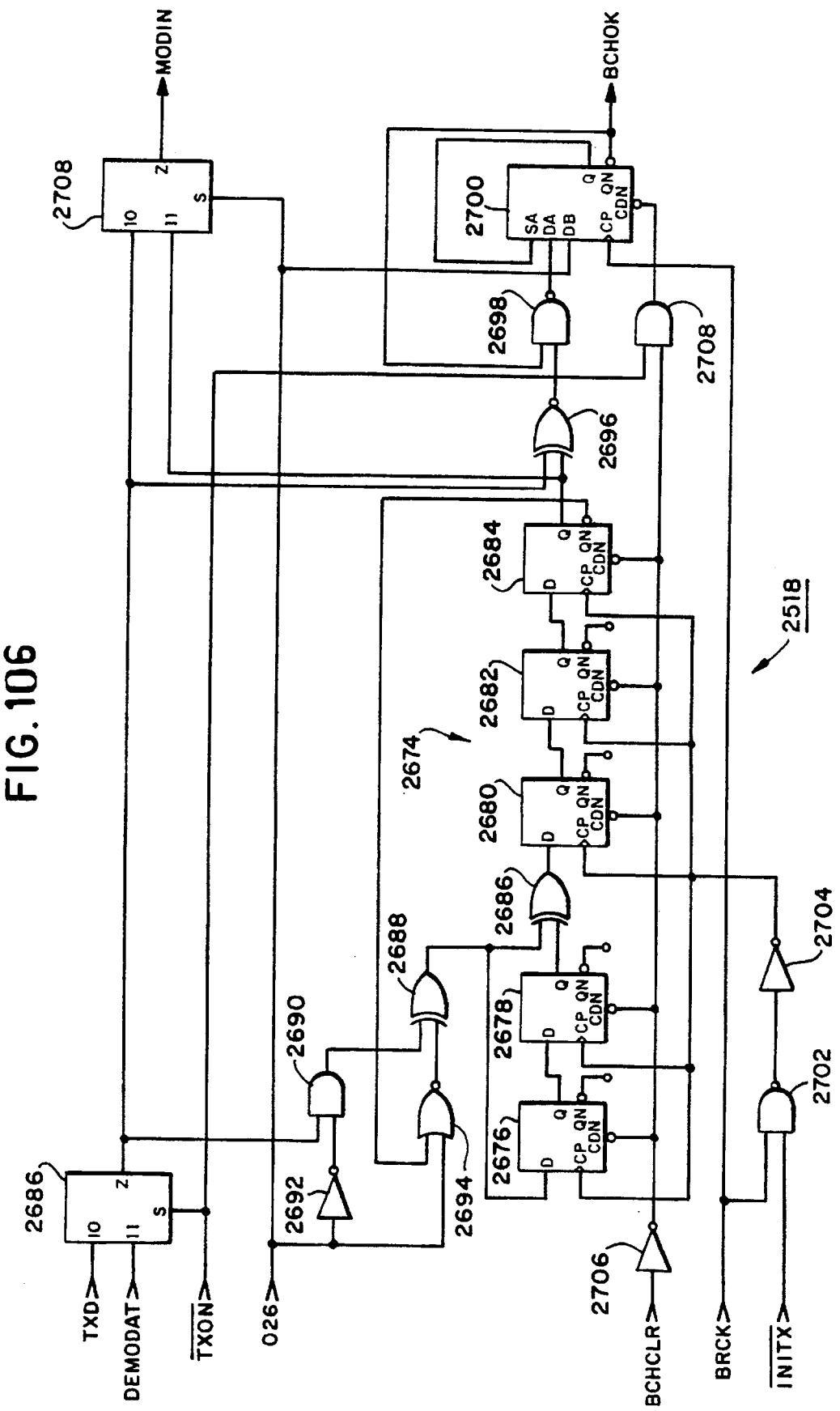
FIG. 106 is a schematic diagram of a BCH computer which forms a portion of the communication controller in accordance with the present invention.

The BCH computer 2518 is illustrated in FIG. 106 and computes a five bit error code based upon the first 27 message bits. The BCH computer 2518 is implemented as a five stage shift register 2674, which includes flip-flops 2676, 2678, 2680, 2682 and 2684 and an exclusive OR gate 2686.

In the message receive mode, as the demodulated bits DEMODAT are loaded into the shift register 2462, they are simultaneously applied to a receive/transmit MUX 2686. The input signals to the MUX 2686 are selected by the TXON signal, applied to a select input S of the MUX 2686.

Before the 26th message bit is received, the demodulated message bits DEMODAT are applied to an exclusive OR gate 2688 by circuitry, which includes an AND gate 2690, an inverter 2692 and a NOR gate 2694. More specifically, an O26 signal is applied to the inverter 2692, whose output is applied to one input of the AND gate 2690. The demodulated message bits DEMODAT are applied to the other input of the AND gate 2690. The output of the AND gate 2690 is applied to an input of the exclusive OR gate 2688 along with an output of the NOR gate 2694 to allow the first 26 message bits to be shifted into the shift register 2674 to generate the error code. After the first 26 message bits are received, the error code stored in the shift register is shifted out under the control of the NOR gate 2694. The NOR gate 2694 is a two input NOR gate. The O26 signal is applied to one input. A $\overline{Q}$ signal from the last stage 2684 of the shift register 2674 is applied to the other input.

The error code is compared with the error code in the received message by way of an exclusive OR gate 2696. The output of the exclusive OR gate 2696 is applied to a two input NAND gate 2698. The output of the NAND gate 2698 is applied to a DA input of a flip-flop 2700 which selects the DA input after the 26 message bits are received to generate a BCHOK signal if the error codes match. The BCHOK signal is fed back as an input to the AND gate 2698. While the error code is being computed, the previous BCKOK signal is latched by tying a Q output of the flip-flop 2700 to a DB input.

The BCH shift register 2674 is clocked by a BCH clock signal BCHCLK, generated by circuitry which includes a NAND gate 2702 and an inverter 2704. More particularly, the bit rate clock signal BRCK along with the $\overline{INITX}$ are applied to the inputs of the NAND gate 2702. The output of the NAND gate 2702 is applied to an input to the inverter 2704. The BCHCLK signal is available at the output of the inverter 2704.

The BCH shift register 2674 is cleared by a $\overline{BCHCLR}$ signal, available at an output of an inverter 2706. The input to this inverter 2706 is a BCHCLR signal, which is available at the output of the NAND gate 2458 (FIG. 93), which indicates that a message has been received. Clearing of the flip-flop 2700 is under the control of a two input AND gate 2708. One input to the AND gate 2708 is the $\overline{TXON}$ signal indicating that the transmitter is off. The other input is the BCHCLR signal.

It is also necessary to compute a BCH error code for reply messages. Thus, the TXD output of the message shift register 2462 is applied to the MUX 2686. This input is selected by the $\overline{TXON}$ signal during transmission of a message. The message bits are shifted into the shift register 2674 to generate a BCH error code in the same manner as before. In the meantime, the message bits are also applied to a MUX 2708 to develop a MODIN signal which is applied to the transmitter (FIG. 105). After 26 message bits, the signal O26 selects another input of the MUX 2708 to allow the error code to be added at the end of the message.

ADDRESS COMMAND DECODER

Figure 107:
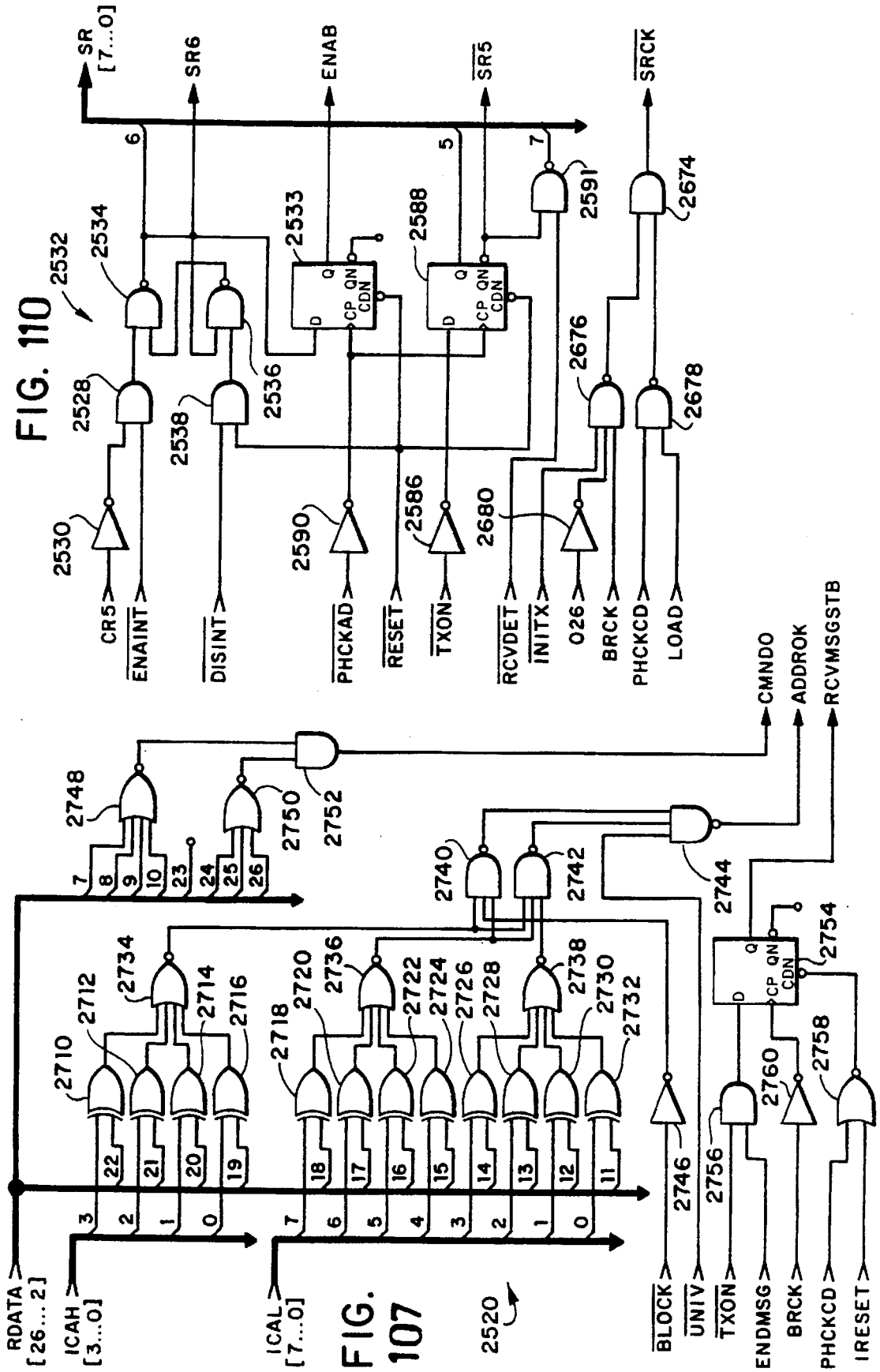
FIG. 107 is a schematic diagram of an address comparator circuit which forms a portion of the communication controller in accordance with the present invention.

The address command decoder 2520 is illustrated in FIG. 107. The INCOM address, stored in the ICAH[3 . . . 0] register and the ICAL[7 . . . 0], is compared with the address received on the receive data bus RDATA[22 . . . 11] by way of exclusive OR gates 2710, 2712, 2714, 2716, 2718, 2720, 2722, 2724, 27265, 2728, 2730 and 2732; NOR gates 2734, 2736 and 2738 and NAND gates 2740, 2472 and 2744 to generate an ADDROK signal if the received address matches the address in the ICAH and ICAL registers.

The address bit comparisons of the bits B22–B19 are applied to the NOR gate 2734. The address bit comparisons of the bits B18–B15 are applied to the NOR gate 2736. Lastly, the address bit comparisons of the bits B14–B11 are applied to the NOR gate 2738.

The outputs of the NOR gates 2734 and 2736 for bit comparisons are applied to the NAND gate 2240 along with a $\overline{BLOCK}$ signal, available at an output of an inverter 2746. When block instructions are employed, the lower four order bits B11–B14 are ignored. The output of the NAND gate 2740 is applied to one input of the NAND gate 2744.

When no BLOCK instructions are employed, the NAND gate 2744 is under the control of the NAND gate 2742. The NAND gate 2742 receives inputs from the NOR gates 2734, 2736 and 2738 and provides address comparisons for all of the address bits B22–B11. The NAND gate 2744 is also controlled by the UNIV address signal. This signal allows messages to be received by all devices on the network.

The command field B10–B7 is used to define the command in enable interface control messages. These bits B10–B7 are decoded by a four input NOR gate 2748. A subcommand field I defines the subcommand in enable interface control messages. These bits are decoded by a NOR gate 2750. The outputs of the NOR gates 2748 and 2750 are applied to an AND gate 2762 whose output is a command signal CMNDO.

A receive message strobe signal RCVMSGSTB, used to generate the receive message signal RCV, is developed by the circuitry which includes a flip-flop 2754, on AND gate 2756, a NOR gate 2758 and an inverter 2760. A $\overline{TXON}$ and end of message signal ENDMSG are ANDed by the AND gate 2756 and applied to a D input of the flip-flop to indicate that a message has been received and the transmitter is not on. This signal is shifted into the flip-flop on a $\overline{BRCK}$ signal available at an output of the inverter 2760.

The flip-flop 2754 is reset by the NOR gate 2758. The strobe signal PHCKCD is applied to one input of the NOR gate 2758 while the RESET signal is applied to the other input to reset the RCVMSGSTB signal on system reset and by the strobe signal PHCKCD.

INSTRUCTION DECODER

Figure 108:
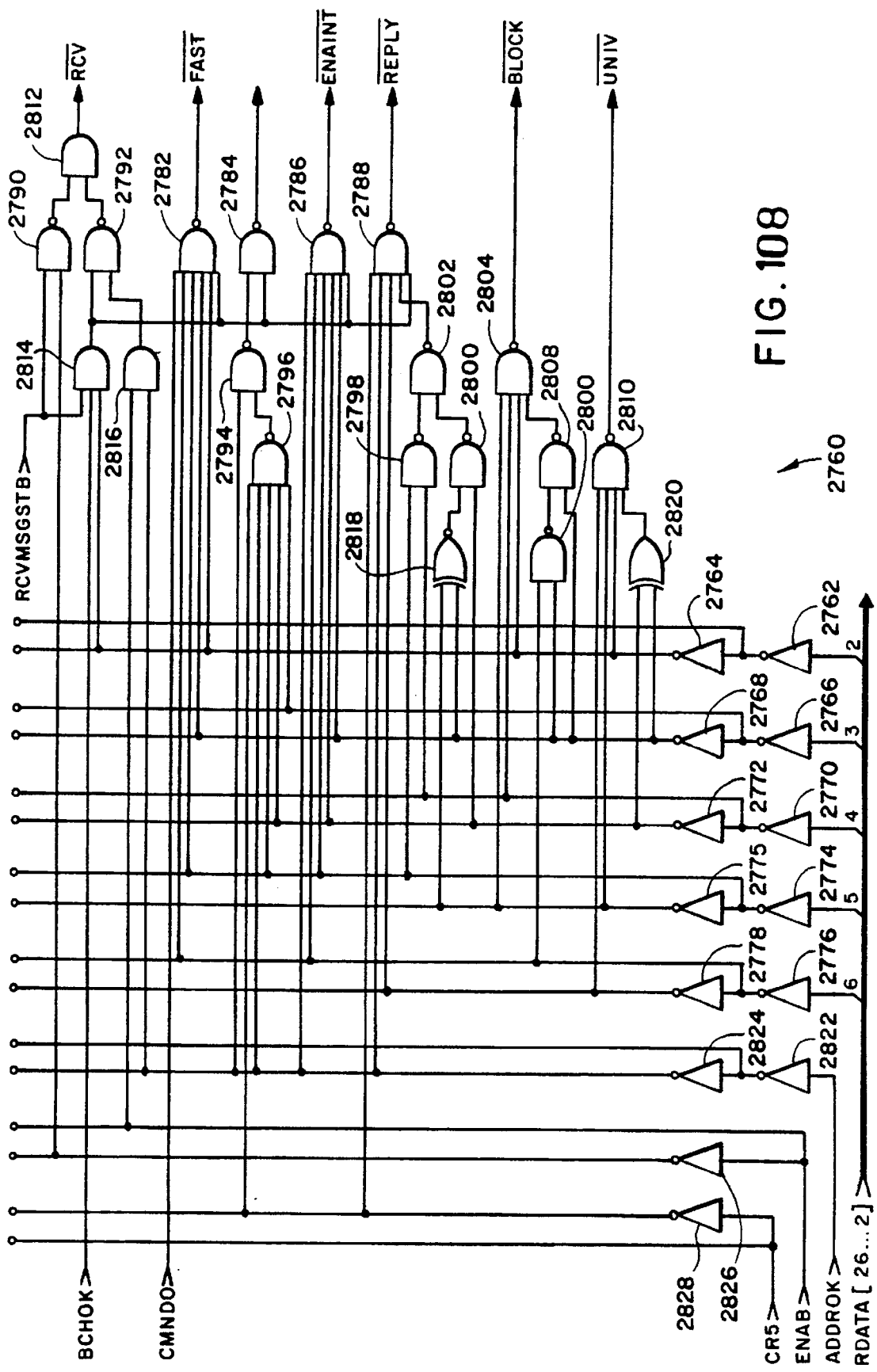
FIG. 108 is a schematic diagram of an instruction decoder circuit which forms a portion of the communication controller in accordance with the present invention.

Instruction decoder circuitry 2760 is illustrated in FIG. 108. The instruction field consists of the message bits B6–B3. Message bit B2 defines the meaning of the message bits. These bits are applied to decoder circuitry which includes inverters 2762–2780; NAND gates 2782–2810; AND gates 2812, 2814 and 2816 and exclusive OR gates 2818 and 2820.

The instruction field B6–B2 definitions are defined in Table 20 along with the control bit B2. These bits are applied to the inverters 2762, 2766, 2770, 2774 and 2778 which, in turn, are connected to serially coupled inverters 2764, 2768, 2772 and 2776, respectively. The output signals from the inverters 2762–2780 are connected to the various NAND gates, AND gates and exclusive OR gates as shown to generate the signals $\overline{RCV}$, $\overline{FAST}$, $\overline{DISINT}$, $\overline{ENAINT}$, $\overline{REPLY}$, $\overline{BLOCK}$ and $\overline{UNIV}$ available at outputs of the AND gate 2812 and the NAND gates 2782, 2783, 2786, 2788, 2804 and 2810, respectively. These signals are all active low.

More particularly, the $\overline{UNIV}$ addressing type is available at an output of the four input NAND gate 2810. Bits B6, B5 and B2 are applied to the NAND gate 2810 along with an output of the exclusive OR gate 2820. Bits B3 and B4 are compared by the exclusive OR gate 2820. B2 is a control bit and will both be a logical 1 for instruction decoding. Bits B5 and B6 will both be logical 1's for the instructions $C, $D, $E and $F (Table 20). The output of the exclusive OR gate 2820 will produce a logical 1 for instructions $1, $2, $5, $6, $9, $A, $D and $E. Thus, the output of the NAND gate 2810 will be low for instructions $6, $D and $E.

The $\overline{BLOCK}$ addressing type instruction is available at the output of the NAND gate 2804. Bits B5, $\overline{B4}$ and B2 are applied to the inputs of the NAND gate 2804. Since these bits must be a logical 1 in order to produce an active low signal at the output of the NAND gate 2804, this portion of the circuitry will decode instructions $4, $5, $C and $D as long as the output of the NAND gate 2808 is a logical 1. Bit B3 is applied to one input of the NAND gate 2808. An output of the NAND gate 2806 is applied to the other input. Bits $\overline{B6}$ and B3 are applied to the inputs of the NAND gate 2806 to produce a logical 1 at the output of the NAND gate 2806 to produce a logical 1 at the output of the NAND gate 2808 for the instructions $4, $5, $B and $C to generate the $\overline{BLOCK}$ signal.

The REPLY, $\overline{ENAINT}$, $\overline{DISINT}$, $\overline{FAST}$ and $\overline{RCF}$ signals are all enabled by a three input AND gate 2814. The RCVMSGSTB, BCHOK and control bit B2 signals are ANDed to generate a permissive signal, identified as DECODE, indicating that a correct message has been received. The output of the AND gate 2814 is applied to inputs of the NAND gates 2782, 2784, 2786, 2788 and 2792.

The $\overline{REPLY}$ signal is available at an output of the NAND gate 2788. Also applied to the NAND gate 2788 are the control bit $\overline{CR5}$, available at an output of an inverter 2828, which indicates whether the ICC 29 is in the master mode, the ADDROK signal, bit B6 and the output of the NAND gate 2802. If the correct address has been decoded and the ICC 29 is in the slave mode, an active low $\overline{REPLY}$ signal will be generated when bit B6=1, which occurs for instructions $8, $9, $A, $B, $C, $D, $E and $F, and the output of the NAND gate 2802=1. The inputs to NAND gate 2802 are outputs from the NAND gates 2709 and 2800. The circuitry which includes the NAND gates 2798, 2800 and 2802 and the exclusive OR gate 2818 will produce a 1 at the input of the NAND gate 2788 for the instructions $8, $9, $A and $F.

The $\overline{ENAINT}$ signal is available at the output of the NAND gate 2786. In addition to the DECODE signal, An ADDROK and bits B3, B4, $\overline{B5}$ and $\overline{B6}$ are applied to its inputs to generate the $\overline{ENAINT}$ signal for instruction $3.

The $\overline{DISINT}$ signal is available at an output of the NAND gate 2784 and decodes the instructions $2. One input to the NAND gate 2784 is the DECODE signal. The output of the NAND gate 2794 is applied to the other input. The NAND gate 2794 is a two input NAND gate. The ADDROK signal is applied to one input. The output of the NAND gate 2796 is applied to the other input. The $\overline{CR5}$, ADDROK signals as well as bits B5, B4 and B3 are applied to the inputs of the NAND gate 2796.

The $\overline{FAST}$ signal is available at an output of the NAND gate 2782. If the control bit B2 is set, an instruction field of $3 is decoded and a command field CMDO of O exists, the $\overline{FAST}$ signal is generated. The CMDO and DECODE signals as well as bits B2, B3, $\overline{B5}$ and $\overline{B6}$ are applied to the input of the NAND gate 2782 to generate the $\overline{FAST}$ signal.

The $\overline{RCV}$ signal is available at an output of the AND gate 2812. The outputs of the NAND gates 2790 and 2792 are applied to the inputs. The NAND gate 2790 is a two input NAND gate. The signals RCVMSGTB and ENAB are applied to its inputs to generate this active low signal anytime a message with the interface enable instruction. During other conditions, the signal $\overline{RCV}$ is under the control of the two input NAND gate 2792. In order to generate an active low $\overline{RCV}$ under these conditions, the output of the input of the NAND gate 2782 to generate the $\overline{FAST}$ signal.

The $\overline{RCV}$ signal is available at an output of the AND gate 2812. The outputs of the NAND gates 2790 and 2792 are applied to the inputs. The NAND gate 2790 is a two input NAND gate. The signals RCVMSGTB and ENAB are applied to its inputs to generate this active low signal anytime a message with the interface enable instruction. During other conditions, the signal $\overline{RCV}$ is under the control of the two input NAND gate 2792. In order to generate an active low $\overline{RCV}$ under these conditions, the output of the NAND gate 2792 must be low which requires its inputs to both be high. The inputs to the NAND gate 2792 are the outputs from the AND gates 2814 and 2816. The output of the AND gate 2814 is the DECODE signal which indicates that a correct message has been received and the control bit B2 is set. The AND gate 2816 is a two input AND gate. The ENAB and ADDROK signals are applied to its inputs. The AND gate 2792 produces a high output when the ICC 29 has been addressed and a message has been received with an enable interface instruction.

GENERAL DESCRIPTION OF THE IC 10

In the illustrated embodiment, the IC 10 is housed in an 80 pin quad plastic flat package (QPFP), gull wing, surface mount package. The IC 10 is a hybrid device fabricated utilizing CMOS technology and implemented in a way to overcome the shortcomings of utilizing CMOS for analog functions. Various ratings, operating conditions and dc characteristics are provided in Appendix A.

A detailed pin assignment for the IC 10 is shown in FIG. 113. Some pins have a dual function. For example, a pin may have one function in one configuration and a different function in another configuration as will be discussed in more detail below.

The following is a brief description of the signal definitions for each of the pins illustrated in FIG. 113. A pin summary is provided in Table 22.

PA7 ... PA0: Port A—These eight bidirectional port pins can be individually programmed to be inputs or outputs by the software.

PB7 ... PB0: Port B—These eight bidirectional port pins have multiple functions depending on the operating mode of the IC 10. In the single-chip mode, these port pins can be individually programmed as inputs or outputs by the software. In the expanded, emulation, or test modes, these eight port pins contain the high-order address bus.

PC7 ... PC0: Port C—These eight bidirectional port pins can be individually programmed to be inputs or outputs by the software. The low-order four pins can also be configured to be the logical OR of the outputs of the four comparators.

PD7 ... PD0: Port D—These eight bidirectional port pins have multiple functions depending on the operating mode of the IC 10. In the single-chip mode, these port pins can be individually programmed as inputs or outputs by the software. In the expanded, emulation, or test modes, these eight bidirectional port pins form a multiplexed data and address bus. When PH2 is asserted, these pins are outputs and contain the least-significant 8-bits of the address. When PH2 is negated, these pins are bidirectional and contain read or write data.

EXPN—This low-true signal enables the expanded mode of operation. The single-chip mode is enabled by connecting EXPN to VDD. This input is sampled when RESN changes from an electrical low level to an electrical high level. The operating mode of the IC 10 is determined when the device leaves the reset state. Table 1 defines the pin input levels for various operating modes.

PH2—The function of this output pin depends on the operating mode of the IC 10. In single-chip and self-test modes it will remain low. In all others, it is the processor's phase 2 clock. Phase 2 is the oscillator output divided by two, and changes on the falling edge of OSC2. Table 2 defines the output of PH2 for various operating modes.

REN—The function of this output pin depends on the operating mode of the IC 10.

In single-chip and self-test modes it is used as a diagnostic pin. It will remain high except during internal read operations between $4000–$7FFF.

In expanded mode, it is used as the write strobe for external memory devices mapped in the address range of $4000 to $7FFF. When low, the memory device can strobe data from the Port D pins.

In emulation and test modes, it becomes the processor's internal E clock signal. E clock is PH2 delayed by 90°.
Table 2 defines the output of REN for various operating modes.

WEN—The function of this output pin depends on the operating mode of the IC 10.

In single-chip and self-test modes it is used as a diagnostic pin. It will remain high except during internal read operations between $4000–$7FFF.

In expanded mode, it is used as the write strobe for external memory devices mapped in the address range of $4000 to $7FFF. When low, the memory device can strobe data from the Port D pins.

In emulation and test modes, it becomes the processor's internal E clock signal. E clock is PH2 delayed by 90°.
Table 2 defines the output of WEN for various operating modes.

PSEN—The function of this output pin depends on the operating mode of the IC 10.

In single-chip and self-test modes it is used as a diagnostic pin. It will remain high except during internal read operations between $8000–$EEFF.

In expanded mode, it is used as the read strobe for external read-only-memory devices mapped in the address range of $8000 to $FFFF. When low, the memory device should place read data on the Port D pins.

In emulation and test modes, it becomes the processor's internal LIR signal. This pin then indicates when the processor is reading an instruction from the external data bus. A high indicates that the instruction register is being loaded.

Table 2 defines the output of PSEN for various operating modes.

ALE—The function of this output pin depends on the operating mode of the IC 10.

In single-chip and self-test modes it will remain low.

In all other modes, it is used to latch the least-significant 8 bits of the address present on Port A.
Table 2 defines the output of ALE for various operating modes.

TX—This digital output is the transmitter output from the ICC subsystem.

RX—This digital Schmitt input is the receiver input to the ICC subsystem.

BUSYN—This low-true digital output is the busy output from the ICC subsystem.

SCK—This bidirectional pin is the serial clock for the SPI subsystem.

MISO—This bidirectional pin is the 'master in, serial out' for the SPI subsystem.

MOSI—This bidirectional pin is the 'master out, serial in' for the SPI subsystem.

SSN—This low-true input pin is the 'slave select' input for the SPI subsystem.

PWM—This digital output is the pulse-width modulated output from the PWM subsystem.

TCMP—This digital output is the timer primary output compare.

TCAP—This digital input is the timer input capture signal.

IRQN—This low-true digital input is the asynchronous external input to the microcontroller. A mask programmable option permits selection of two triggering methods: 1) negative edge-sensitive triggering only, or 2) both negative edge-sensitive and low level-sensitive triggering. In the latter case, either type of input to the IRQN pin will produce an interrupt. The interrupt request must be present at least 125 ns in edge-triggered mode.

If the level-sensitive mask option is selected, the IRQN pin requires an external resistor to $V_{DD}$ for 'wire-OR' operation.

The IRQN pin also puts the IC 10 in a test mode when placed at +9 V during reset. This mode is for test only and should not be used during normal operation.

RESN—This low-true input provides an external method of initializing the IC 10. When using the external reset, RESN must stay low for a minimum of 1.5 processor phase 2 cycles. RESN is received by a Schmitt receiver.

BSENSE—This analog input is the non-inverting input to the B+ comparator.

BDRIVE—This analog output is the output of the B+ comparator.

APOS, ANEG—These analog inputs are the inverting and non-inverting inputs of the comparator.

AOUT—This analog output is the comparator output pin. In many applications, this comparator is used as the input receiver for the ICC subsystem and is connected to RX.

MUX3 . . . MUX0—These four analog input pins are one half of the A/D subsystem inputs. They can be individually programmed to operate in either the voltage or current modes. In the voltage mode, they are high impedance inputs.

In the current mode, an active current source maintains a virtual ground level for currents out of the device pin. When unselected in the current mode, each pin is connected to digital ground.

MUX7 . . . MUX4—These four analog input pins are the other half of the A/D subsystem inputs. They can operate only in the voltage input mode. They are always high impedance inputs.

MXO—This analog output is used by the A/D subsystem in the current mode of operation. An external resistor or capacitor between this pin and analog ground converts the mirrored and ratioed current from the selected input into a voltage for A/D conversion. If an external capacitor is used, the internal amplifier is configured as an integrator and current autoranging must be disabled.

CP3 . . . CP0—These four high-impedance analog inputs are the inverting inputs of four comparators.

These pins are also used during testing to select various test modes.

VADJ—This analog input is used to adjust the analog reference voltage: VREF.

VREF—This analog output is the internal +2.5 V reference. It is the output of the reference buffer amplifier and must be connected to the external reference trim resistor network.

AVDD—This pin is the +5 V analog supply voltage. An external resistor is used to create a current source for the shunt-regulated power supply. AVDD will be regulated to approximately 2 * VREF.

AVSS—This pin is the analog ground reference.

OSC1—This is the input of the oscillator circuit.

OS2—this pin is the output of the crystal oscillator circuit. It is the inversion of the OS1 input.

VDD—these pins are the digital +5 volt DC supply.

VSS—these pins are the digital negative supply. They should be connected externally to the AVSS pin.

SHUNT—This output pin is high when the power supply is shunting current from AVDD.

NC—Not connected.

TABLE 22

| SIGNAL | PIN | DIRECTION | TYPE |
|---|---|---|---|
| BSYN | 1 | Output | CMOS |
| PD7...Pd0 | 2...9 | Bi-directional | CMOS |
| SCK | 10 | Bi-directional | Schmitt |
| MISO | 11 | Bi-directional | CMOS |
| MOSI | 12 | Bi-directional | CMOS |
| SSN | 13 | Input | CMOS |
| PH2 | 14 | Output | CMOS |
| PB7...PB0 | 15...22 | Bi-directional | CMOS |
| PA7...PA0 | 23...30 | Bi-directional | CMOS |
| VDD | 31 | Supply | Digital + Supply |
| VSS | 32 | Supply | Digital + Supply |
| PC7...PC0 | 33...40 | Bi-Directional | CMOS |
| CP0...CP3 | 41...44 | Input | Analog |
| BDRIVE | 45 | Output | Analog |
| BSENSE | 46 | Input | Analog |
| APOS | 47 | Input | Analog |
| ANEG | 48 | Input | Analog |
| AOUT | 49 | Output | Analog |
| AVDD | 50 | Supply | Analog + Supply |
| AVSS | 51 | Supply | Analog + Supply |
| MUX7...MUX0 | 52...59 | Input | Analog |
| MX0 | 60 | Output | Analog |
| NC (not connected) | 61 | | |
| VREF | 62 | Output | Analog Reference |
| VADJ | 63 | Input | Analog |
| REN | 64 | Output | CMOS |
| WEN | 65 | Output | CMOS |
| ALE | 66 | Output | CMOS |
| PWM | 67 | Output | CMOS |
| TCMP | 68 | Output | CMOS |
| SHUNT | 69 | Output | CMOS |
| VSS | 70 | Supply | Digital − Supply |
| VDD | 71 | Supply | Digital + Supply |
| TCAP | 72 | Input | CMOS |
| PSEN | 73 | Output | CMOS |
| OSC2 | 74 | Output | Analog |
| OSC1 | 75 | Input | Analog |
| RESN | 76 | Input | Schmitt |
| IRQN | 77 | Input | CMOS |
| EXPN | 78 | Input | CMOS |
| TX | 79 | Output | CMOS |
| RX | 80 | Input | Schmitt |

APPENDIX A

The following specifications apply to the EEPROM 40 memory under the conditions that $V_{DD}$–5.0 Vdc ±10% and the ambient temperature TA is between –40° C. and +85° C. The specifications are indicated in Table A1.

TABLE A1

EEPROM SPECIFICATIONS

| CHARACTERISTIC | SYMBOL | MIN | MAX | UNIT |
|---|---|---|---|---|
| EEPROM Erase Time | ERA | | 10 | ms |
| EEPROM Program Time 2 MHz osc. | PROG | | 10 | ms |
| EEPROM Program Time 1–2 MHz osc. | PROG | | 20 | ms |
| Write/Erase Endurance | | | 10,000 | cycles |

APPENDIX B

TABLE B1

B+ COMPARATOR SPECIFICATIONS

| SYMB. | PARAMETER | VALUE |
|---|---|---|
| $V_{IO}$ | Input offset voltage | ±20 mV max |
| $V_H$ | Hysteresis | 20 mV min |
| $I_{IO}$ | Input offset current | 1 nA max |
| $I_{IB}$ | Input bias current | 20 Na max |
| $V_{IN}$ | Input voltage range | $V_{SS}$ to $V_{REF}$ +.5V |
| $A_{VD}$ | Voltage amplification | 80 dB min |
| $V_{OL}$ | Output voltage @$I_{OL}$ = 3 mA | 700 mV max |
| $V_{OH}$ | Output voltage @$I_{OH}$ = –3 mA | $V_{DD}$ –700 mV min |
| $t_R$ | Response time $V_{DIFF}$ = 100 mV | 1 µs max |

TABLE B2

QUADCOMPARATOR SPECIFICATIONS

| SYM | PARAMETER | MIN | TYP | MAX | UNITS |
|---|---|---|---|---|---|
| $V_{IO}$ | Input offset voltage | | | ±20 | mV |
| $I_{IO}$ | Input offset current | 0 | — | ±1 | nA |
| $I_{IB}$ | Input bias current | | | 20 | nA |
| $V_{IN}$ | Input voltage range | $V_{SS}$ | — | $V_{DD}$ | V |
| $V_{TH-}$ | Negative threshold (output high) | 1.2 | 1.25 | 1.3 | V |
| $A_{VD}$ | Voltage amplification | 80 | | | dB |
| $V_{OL}$ | Output voltage @$I_{OH}$ = 3 mA | 0 | — | 700 | mV |
| $V_{OH}$ | Output voltage @$I_{OH}$ = 3 mA | $V_{DD}$ –700 | — | $V_{DD}$ | mV |
| $t_R$ | Response time $V_{DIFF}$ = 100 mV | | | 1 | µs |
| $t_R$ | Hysteresis | 20 | — | 80 | mV |

TABLE B3

A COMPARATOR SPECIFICATIONS

| SYMB. | PARAMETER | VALUE |
|---|---|---|
| $V_{IO}$ | Input offset voltage | ±20 mV max |
| $I_{IO}$ | Input offset current | 1 nA max |
| $I_{IB}$ | Input bias current | 20 nA max |
| $V_{IN}$ | Input voltage range | $V_{SS}$ to $V_{REF}$ +.5 V |
| $A_{VD}$ | Voltage amplification | 80 dB min |
| $V_{OL}$ | Output voltage @$I_{OL}$ = 3 mA | 700 mV max |
| $V_{OH}$ | Output voltage @$I_{OH}$ = –3 mA | $V_{DD}$–700 mV min |
| $t_R$ | Response time $V_{DIFF}$ = 100 mV | 1 µs max |

APPENDIX C

AUTO-ZERO STATE MACHINE

STATE DIAGRAM

FIG. 114 is a state diagram for the auto-zero function. Each bubble represents an operating state. The arrows between state show permissible transitions and the conditions required for the transition. Table C-1 shows the transitions from state to state in table form.

TABLE C-1

| STATE ASSIGNMENT AUTO-ZERO STATE ASSIGNMENT | |
|---|---|
| State | R0 R1 R2 |
| S0 | 000 |
| S1 | 010 |
| S2 | 110 |
| S3 | 011 |
| S4 | 001 |
| S5 | 101 |
| S6 | 111 |
| S7 | 100 |

STATE TRANSITION TABLE

Figure 115:
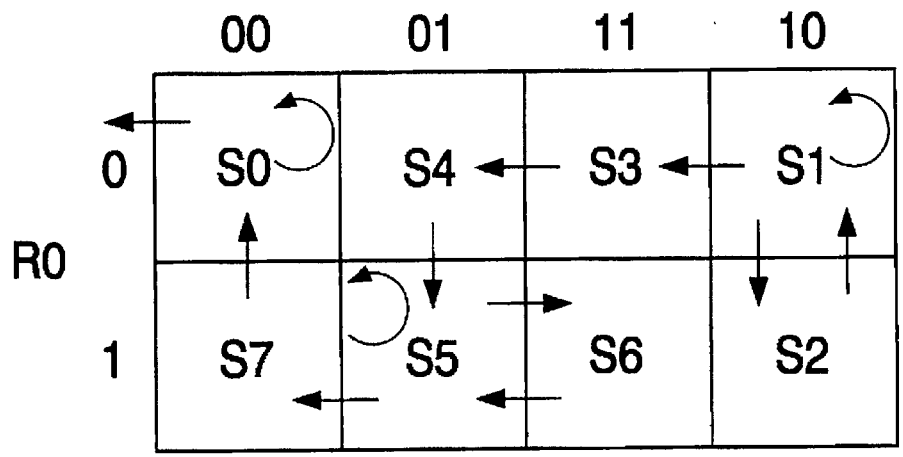
FIG. 115 is a 3-bit Karnaugh map for the state assignments and allowable state transitions of the auto-zero function of the IC in accordance with the present invention.
Figure 116:
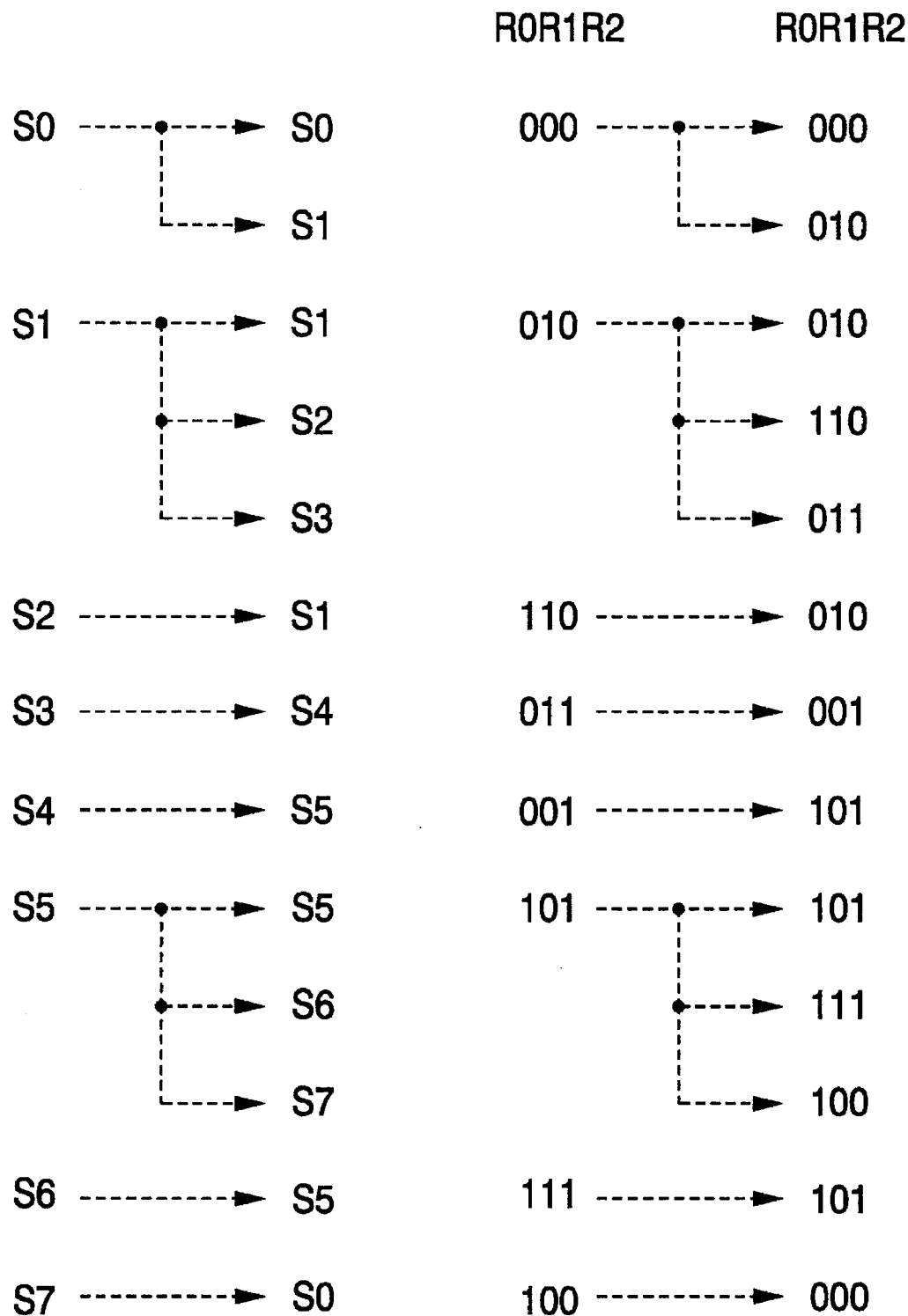
FIG. 116 is a state transition table for the auto-zero function of the IC in accordance with the present invention.

FIG. 115 shows the state assignment on the 3-bit Karnaugh map along with the allowable state transitions. FIG. 116 shows the state transition table.

TRANSITION TABLE STATE EQUATIONS

The logic equations for R0, R1 and R2 are given in the following sections. The equations are written for the states in the transition table where the resulting state is a logic 1. For example, in the first line of the transition table, the only equation that needs to be written is the equation for R1 resulting from the transition from state S0 to S1. The equations below are referenced to the transition table by the originating state.

The following notation is used:

| ! | not operator |
|---|---|
| * | and operator |
| + | or operator |
| h suffix | high true signal |
| b suffix | low true signal |
| d suffix | flip-flop D input signal |

The * operator has precedence over the + operator.

| STATE EQUATIONS FOR R0d | |
|---|---|
| state S0 | No terms needed for this state. |
| state S1 | R0d = !R0h * R1h * !R2h * TIMOUTh * VAMPb * FULLb |
| state S2 | No terms needed for this state. |
| state S3 | No terms needed for this state. |
| state S4 | R0d = !R0h * !R1h * R2h |
| state S5 | R0d = !R0h * !R1h * R2h |
| state S6 | R0d = R0h * R1h * R2h |
| state S7 | No terms needed for this state |

REDUCED STATE EQUATIONS FOR R0

Reducing the terms which only involve R0h, R1h and R2h, using Karnaugh map techniques, and combining with terms which cannot be reduced yields the following equation for R0d.

R0d = !R0h * R1h * !R2h * TIMOUTh * VAMPb & FULLb +
!R1h * R2h
R0H * R2h

| STATE EQUATIONS FOR R1 | |
|---|---|
| state S0 | R1d = !R0h * !R1h * !R2h * STAZh * !ARBSYh |
| state S1 | R1d = !R0h * R1h * !R2h |
| state S2 | R1d = R0h * R1h * !R2h |
| state S3 | No terms needed for this state. |
| state S4 | No terms needed for this state. |
| state S5 | R1d = R0h & /!R1h * R2h * TIMOUTh * CAMPb * FULLb |
| state S6 | No terms needed for this state. |
| state S7 | No terms needed for this state. |

REDUCED STATE EQUATIONS FOR R1

R1d = !R0h * !R1h * !R2h * STAZh * !ARBSYh +
R0h * !R1h * R2h * TIMOUTh * CAMPb & FULLb +
R1 * !R2

| STATE EQUATIONS FOR R2 | |
|---|---|
| state S0 | No terms needed for this state. |
| state S1 | R2d = !R0h * R1h * !R2h * TIMOUTh * (!VAMPb + !FULLb) |
| state S2 | No terms needed for this state. |
| state S3 | R2d = !R0h * R1h * R2h |
| state S4 | R2d = !R0h * !R1h * R2h |
| state S5 | R1d = R0h * !R1h * R2h * (!TIMOUTh + TIMOUTh * CAMPb * FULLb) |
| state S6 | R2d = R0h & R1h * R2h |
| state S7 | No terms needed for this state. |

REDUCED STATE EQUATIONS FOR R2

R2d = !R0h * R1h * !R2h * TIMOUTh * (!VAMPb + !FULLb) +
R0h * !R1h * R2h * !TIMOUTh +
R0h * !R1h * R2h * TIMOUTh * CAMPb * FULLb +
!R0h * R2h + R1h * R2h

OUTPUT EQUATIONS

!ZERRESb = !R0h * !R1h
ZERCLKh = R0h * R1h
TIMREQh = !R0h * R1h * !R2h + R0h * !R1h * R2h
AZBSYh = !(!R0h * !R1h * !R2h)
EOAZh = R0h * !R1h * !R2h
CAZh = R0h * R2h + !R1h * R2h
VAZh = R1h * !R2h
CZCLKh = !CAZh
VZCLKh = !VAZh

APPENDIX D

AUTO-RANGE STATE MACHINE

STATE DIAGRAM

Figure 117:
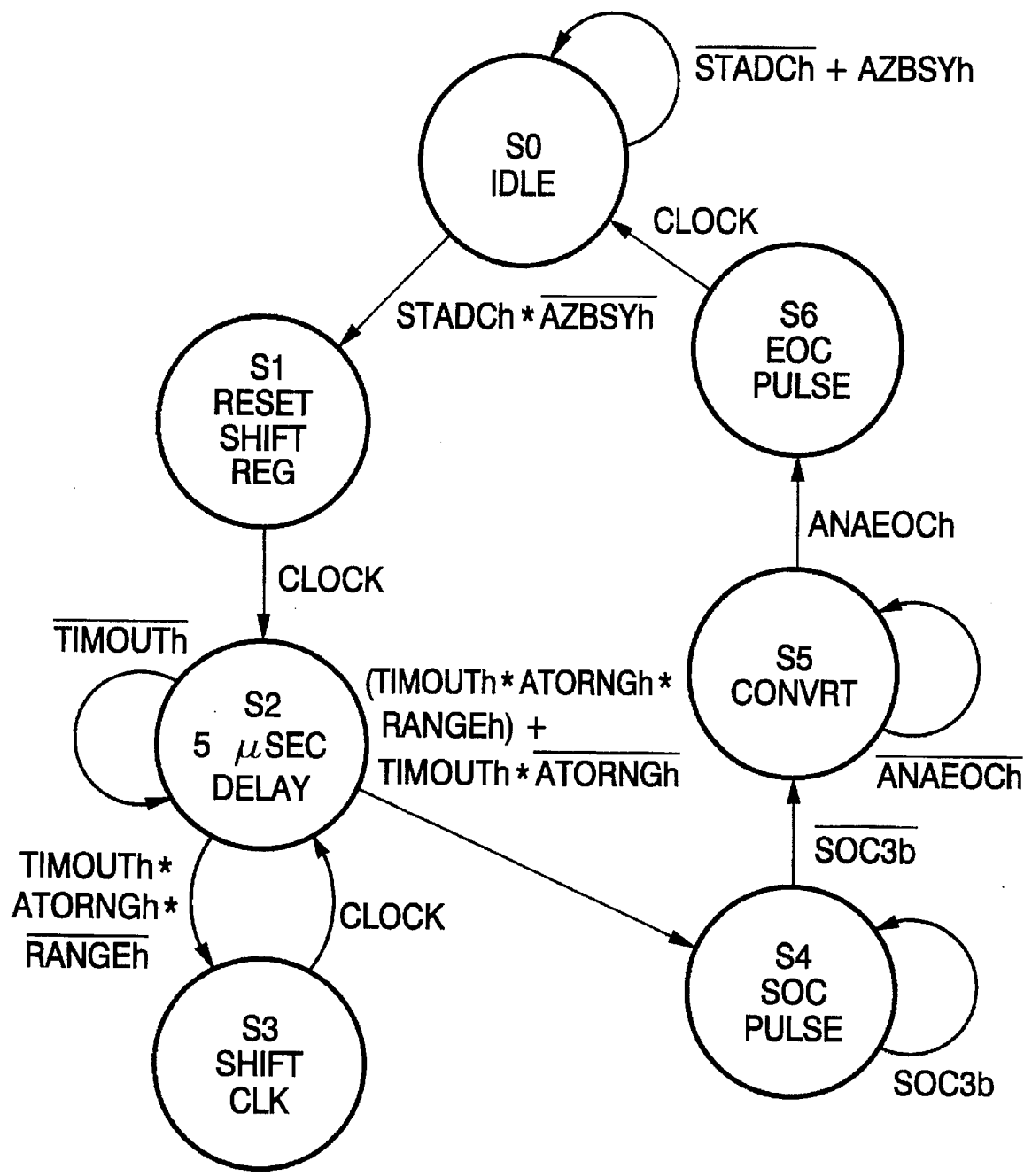
FIG. 117 is a state diagram for an auto-range function of the IC in accordance with the present invention.

FIG. 117 is the state diagram for the auto-range function. Each bubble represents an operating state. The arrows between state show permissible transitions and the conditions required for the transition. Table D-1 shows the transitions from state to state in table form.

TABLE D-1

| STATE ASSIGNMENT AUTO-ZERO STATE ASSIGNMENT | |
|---|---|
| State | R0 R1 R2 |
| S0 | 000 |
| S1 | 001 |
| S2 | 011 |
| S3 | 010 |
| S4 | 111 |
| S5 | 101 |
| S6 | 100 |

STATE TRANSITION TABLE

Figure 118:
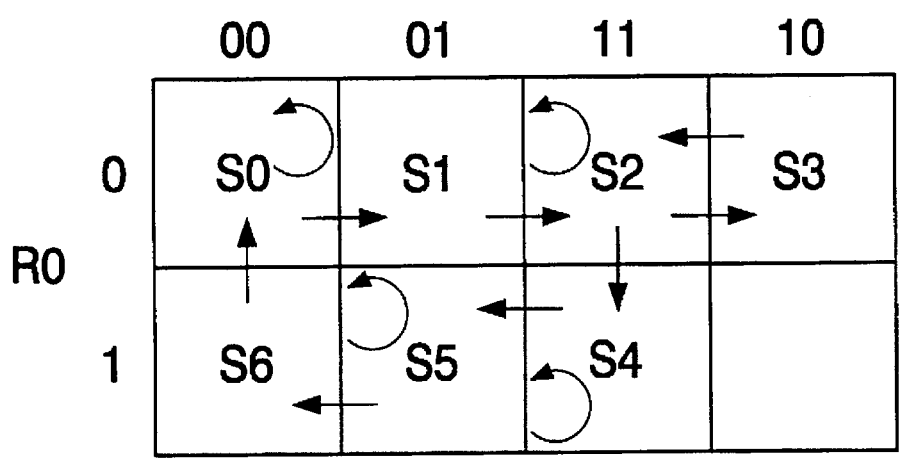
FIG. 118 is a 3-bit Karnaugh map for the state assignments and allowable state transitions of the auto-range function of the IC in accordance with the present invention.

FIG. 118 shows the state assignment on the 3-bit Karnaugh map along with the allowable state transitions.

TRANSITION TABLE STATE EQUATIONS

The logic equations for R0, R1 and R2 are given in the following sections.

STATE EQUATIONS FOR R0

| | |
|---|---|
| state S0 | No terms needed for this state. |
| state S1 | No terms needed for this state. |
| state S2 | R0d = !R0h * R1h * R2h * (TIMOUTh * ATORNGh * RANGEh + TIMOUTh * !ATORNGh) |
| state S3 | No terms needed for this state. |
| state S4 | R0d = R0h * R1h * R2h |
| state S5 | R0d = R0h * !R1h * R2h |
| state S6 | No terms needed for this state |

REDUCED STATE EQUATIONS FOR R0

Reducing the terms which only involve R0h, R1h and R2h, using Karnaugh map techniques, and combining with terms which cannot be reduced yields the following equation for R0d.

| | |
|---|---|
| R0d = | !R0h * R1h * R2h * TIMOUTh * ATORNGh * RANGEh + !R0h * R1h * R2h * TIMOUTh * !ATORNGh + R0H * R2h |

STATE EQUATIONS FOR R1

| | |
|---|---|
| state S0 | No terms needed for this state. |
| state S1 | R1d = !R0h * !R1h * R2h |
| state S2 | R1d = !R0h * R1h * !R2h |
| state S3 | R1d = !R0h * R1h * !R2h |
| state S4 | R1d = R0h * R1h * R2h * SOC3b |
| state S5 | No terms needed for this state. |
| state S6 | No terms needed for this state. |

REDUCED STATE EQUATIONS FOR R1

| | |
|---|---|
| R1d = | R0h * R1h * R2h *SOC3b + !R0h * R1h + R0h * R2 |

STATE EQUATIONS FOR R2

| | |
|---|---|
| state S0 | R2d = !R0h * !R1h * !R2h * !AZBSYh * STADCh |
| state S1 | R2d = !R0h * !R1h * R2h |
| state S2 | R2d = !R0h * R1h * R2h * (!TIMOUTh + TIMOUTh * ATORNGh * RANGEh) |
| state S3 | R2d = !R0h * R1h * !R2h |
| state S4 | R2d = R0h * R1h * R2h |
| state S5 | R2d = R0h * !R1h * R2h * !ANAEOCh |
| state S6 | No terms needed for this state. |

REDUCED STATE EQUATIONS FOR R2

Reducing the terms which only involve R0h, R1h and R2h, using Karnaugh map techniques, and combining with terms which cannot be reduced yields the following equation for R2d.

| | |
|---|---|
| R2d = | !R0h * !R1h * !R2h * !AZBSYh * STADCh + !R0h * !R1h * R2h + !R0h * R1h * !TIMOUTh !R0h * R1h * R2h * TIMOUTh * ATORNGh * RANGEh + !R0h * R1h * R2h * TIMOUTh * !ATORNGh + !R0h * R1h * !R2h + R0h * R1h * R2h + R0H * !R1h * R2h * !ANAEOCh |

OUTPUT EQUATIONS

GRESh = !R0h * !R1h * R2h * !SMCLKh
GCLKh = !R0h * R1h * !R2h * !SMCLKh
TIMREQh = !R0h * R1h * R2h
ARBSYh = !(!R0h * !R1h * !R2h)
EOCh = R0h * !R1h * !R2h
ANASOCh = R0h * R1h * R2h

APPENDIX E

Stress ratings for the IC 10 are provided in Table E1. Stresses above ratings provided in Table A1 can cause permanent damage to the device.

TABLE E1

| | |
|---|---|
| Supply Voltage Range | −0.3 V to +7.0 V |
| Temperature Under Bias | −55° C. to +125° C. |
| Storage Temperature | −65° C. to +150° C. |
| Input Diode Current | ±1-mA |
| Input Voltage (not IRQN or EXPN) | $V_{SS} - 0.3$ V to $V_{DD} + 0.3$ V |
| Input Voltage IRQN & EXPN | $V_{SS} -0.3$ V to $2 \times V_{DD} + 0.3$ V |
| Continuous Output Current | ±25 mA |
| Continuous Supply Current | 100 mA |
| Dissipation | 0.5 W |

Normal operating conditions for the IC 10 are provided in Table E2. These limits apply for normal operations of the IC 10.

TABLE E2

RECOMMENDED OPERATING CONDITIONS

| SYM | PARAMETER | MIN | TYP | MAX | UNITS |
|---|---|---|---|---|---|
| $T_A$ | Ambient Temperature | −40 | | +85 | °C. |
| VDD | Supply Voltage | 4.5 | 5.0 | 5.5 | V |
| $V_{IN}$ | Input Voltage | 0.0 | | $V_{DD}$ | V |
| $f_{OSC}$ | Oscillator | 0.0 | 7.3728 | 8.0 | MHz |

The DC characteristics of the IC 10 are provided in Table A3. The characteristics listed in Table A3 are valid over the operating range of temperature and voltage as defined in Table A1 unless otherwise specified.

TABLE E3

DC CHARACTERISTICS

| TEST | SYM | PARAMETER | MIN | MAX | UNITS |
|---|---|---|---|---|---|
| 1 | $V_{IL}$ | Input Low Voltage | 0.0 | $0.2 \times V_{DD}$ | V |
| 2 | $V_{IH}$ | Input high voltage | $0.7 \times V_{DD}$ | $V_{DD}$ | V |
| 3 | V+ | + Schmitt | 2.7 | 4.1 | V |
| 4 | V− | − Schmitt | 1.1 | 2.1 | V |
| 5 | $V_H$ | Hysteresis | 0.6 | — | V |
| 6 | $I_{IN}$ | Input Current | — | ±1 | µA |
| 7 | $I_{OZ}$ | Tri-state Leakage | — | ±10 | µA |
| 8 | $V_{COL}$ | Output Voltage 1 = −10 µA | — | 0.10 | V |
| 9 | $V_{COH}$ | Output Voltage 1 = 10 µA | VDD − 0.10 | — | V |
| 10 | $V_{OL}$ | Output Voltage 1 = 1.6 mA | — | 0.4 | V |
| 11 | $V_{OH}$ | Output Voltage | $V_{DD} - 0.8$ | — | V |

TABLE E3-continued

DC CHARACTERISTICS

| TEST | SYM | PARAMETER | MIN | MAX | UNITS |
|------|-----|-----------|-----|-----|-------|
| 12 | $C_{OUT}$ | Capacitance, output | — | 12 | pF |
| 13 | $C_{IN}$ | Capacitance, input | — | 8 | pF |
| 14 | $I_{DD}$ | Supply Current @ 4 MHz | 0 | 10 | mA |

APPENDIX F

TABLE F1

| CURRENT SUBSYSTEM AMPLIFIER SPECIFICATIONS | | |
|---|---|---|
| SYMB. | PARAMETER | VALUE |
| $V_{OS}$ | Offset Voltage | 0 to –1.0 mV max |
| $I_{IO}$ | Input offset current | 1 nA max |
| $U_{IB}$ | Input bias current | 1 nA max |
| $V_{ICM}$ | Input common mode | $V_{SS}$ to 1.5 V |
| $A_{VD}$ | Voltage Amplification | 80 dB min |
| $I_O$ | Output Current | 100 µA max |
| BW | Unity gain bandwidth | 80 kHz min |

TABLE F2

| A/D CONVERTER SUBSYSTEM SPECIFICATIONS | | |
|---|---|---|
| SYMB. | PARAMETER | VALUE |
| $V_{OS}$ | Offset Voltage | 0 to –1.0 mV max |
| $I_{IO}$ | Input offset current | 1 nA max |
| $I_{IB}$ | Input bias current | 1 nA max |
| $V_{ICR}$ | Input common mode range | $V_{SS}$ to $V_{REF}$ –0.5 V |
| $V_{IN}$ | Input range | $V_{SS}$ to $V_{REF}$ +0.5 V |
| | Resolution | 8 bits min |
| | Linearity | ±1 LSB min |
| | Differential non-linearity | ±0.5 LSB max |
| $T_{CR}$ | Conversion Time | 24 µs max |

We claim:

1. An overcurrent trip unit for an electrical interrupting device, said overcurrent trip unit comprising:
   means for sensing an electrical current in said electrical interrupting device, the electrical current having a magnitude and a time period; and
   means responsive to said sensing means for providing a trip signal in accordance with a selectable predetermined function of the magnitude and the time period of the electrical current flowing in said electrical interrupting device, said selectable predetermined function defining a long time delay portion and is selected from a plurality of programmed functions including the product of the electrical current to a first power (M) and the time ($I^M t$), and the product of the electrical current to a second power (N) and the time ($I^N t$), the second power (N) being greater than two.

2. An electrical overcurrent trip unit as recited in claim 1, wherein said selectable predetermined function also defines short time delay portion and an instantaneous portion.

3. An electrical overcurrent unit as recited in claim 1, wherein a selected one of said plurality of programmed functions is a fixed time delay.

4. An electrical overcurrent unit as recited in claim 1, wherein a selected one of said plurality of programmed functions is the product of the electrical current and the time ($I_t$).

5. An electrical overcurrent unit as recited in claim 1, wherein a selected one of said plurality of programmed functions is the product of the square of the electrical current and the time ($I^2 t$).

6. An overcurrent trip unit as recited in claim 1, wherein said a selected predetermined function is linear on a logarithmic scale having a predetermined slope.

7. An electrical overcurrent trip unit as recited in claim 6, wherein said means responsive to said sensing means includes means for varying said predetermined slope.

8. An electrical overcurrent trip unit as recited in claim 1, wherein said means responsive to said sensing means includes means for communicating with a remote communications device.

9. An electrical overcurrent trip unit for an electrical interrupting device, said overcurrent trip unit comprising:
   means for sensing an electrical current in an electrical interrupting device, the electrical current having a magnitude and a time period;
   means responsive to said sensing means for providing a trip signal as a predetermined function of the magnitude and the time period of the electrical current flowing in said electrical interrupting device, said predetermined function including a long time delay portion having a long time delay adjustment range and also including a short time delay portion having a short time delay adjustment range for a short time delay pickup and a short time delay time period;
   means for adjusting said long time delay adjustment range and said short time delay adjustment range, said adjusting means allowing for an overlap of said long time delay adjustment range and said short time delay adjustment range; and
   means for preventing said electrical interrupting device from tripping as a function of said long time delay portion prior to said short time delay time period whenever the magnitude of the electrical current is less than said short time delay pickup.

10. An electrical overcurrent trip unit as recited in claim 9, wherein said means responsive to said sensing means includes trip means for providing a trip signal in accordance with a plurality of predetermined functions for said long time delay portion.

11. An electrical overcurrent trip unit as recited in claim 10, wherein one of said plurality of predetermined functions includes one or more of the following functions: the product of the electrical current and the time ($I_t$); the product of the electrical current squared and the time ($I^2 t$); the product of the electrical current raised to the fourth power and the time ($I^4 t$); and a fixed time (FLAT).

12. An electrical overcurrent trip unit as recited in claim 10, wherein said predetermined functions are linear on a logarithmic scale having a predetermined slope.

13. An electrical overcurrent trip unit as recited in claim 12, wherein said trip means includes means for varying said predetermined slope.

14. An electrical overcurrent trip unit as recited in claim 9, wherein said sensing means includes one or more current transformers (CT).

15. An electrical overcurrent trip unit as recited in claim 14, wherein said means responsive to said sensing means includes second means for providing a trip signal when said CT's are saturated.

16. An electrical overcurrent trip unit as recited in claim 15, wherein said second means includes a microprocessor, means for adjusting the magnitude of the electrical current at which said trip signal is initiated and an analog circuit for monitoring the electrical current through said electrical interrupting device.

17. An overcurrent trip unit for an electrical interrupting device including electrical phase currents having a magnitude, said overcurrent trip unit comprising:

first means including a plurality of current transformers (CT's) each having a secondary winding for generating a secondary phase current in each of said secondary windings representative of the electrical phase currents in said electrical interrupting device;

second means responsive to said first means for providing a signal representative of the secondary phase current having a largest peak magnitude;

means for adjusting a magnitude of a first signal;

third means responsive to said second means for continuously providing a second signal as a function of the magnitude of the first signal and the largest peak magnitude of said secondary phase currents in said electrical interrupting device, said third means including means for providing said second signal even during a condition when said CT's are saturated; and means responsive to said second means and said second signal for initiating a trip signal.

18. An overcurrent trip unit as recited in claim 17, wherein said second means includes an analog circuit.

19. An overcurrent trip unit as recited in claim 18, wherein said analog circuit includes a plurality of diodes connected in an OR configuration relative to said secondary windings of said plurality of CT's.

20. An overcurrent trip unit for an electrical interrupting device adapted for connection in an electrical system with a downstream electrical interrupting device having means generating a first interlock signal having a first value when electrical current through said downstream electrical interrupting device exceeds a preset value and having a second value otherwise, said overcurrent trip unit comprising:

current sensing means for sensing an electrical current flowing through said electrical interrupting device;

trip means responsive to said current sensing means for selectively generating a trip signal as a predetermined long delay function of a first magnitude and a first time period of said electrical current sensed by said current sensing means and a predetermined short delay function of a second magnitude greater than said first magnitude and a second time period shorter than said first time period; and zone interlock means generating a trip signal in response to said second value of said first interlock signal and a current sensed by said current sensing means which is at least as great as said first magnitude for a selected time interval which is shorter than said first time period.

21. The overcurrent trip unit of claim 20 wherein said trip means includes means selectively disabling said zone interlock means.

22. The overcurrent trip unit of claim 20 wherein said first interlock signal is a binary logic signal having a first logic state as said first value and a second logic as said second value.

23. The overcurrent trip unit of claim 20 further adapted for use with a downstream electrical interrupting device having means generating a second interlock signal having a first value when ground fault current therethrough exceeds a second preset value and having a second value otherwise, and wherein said current sensing means includes ground fault current sensing means sensing ground fault currents, and wherein said trip means includes means selectively generating a ground fault trip signal as a predetermined ground fault long delay function of a first magnitude and a first time period of ground fault current, and as a predetermined short delay function of a second magnitude of ground fault current which is greater than said first magnitude of ground fault current and a second time period which is shorter than said first time period, and wherein said second interlock means generates a ground fault trip signal in response to the second value of said second interlock signal and a ground fault current sensed by said ground fault current sensing means which is at least as great as said first magnitude of ground fault current for a selected time interval which is shorter than said first time period.

24. An electrical system comprising a downstream electrical interrupting device, an upstream electrical interrupting device and an intermediate electrical interrupting device connected between said downstream electrical interrupting device and said upstream electrical interrupting device, each of said electrical interrupting devices including an overcurrent trip unit comprising current sensing means sensing current through the electrical interrupting device, and trip means selectively generating a trip signal in response to a predetermined long delay function of current through said electrical interrupting device of a first magnitude for a first time interval, and a short delay function of current through said electrical interrupting device of a second magnitude greater than said first magnitude and a second time interval shorter than said first time interval; and zone interlock means including means in said overcurrent trip unit of said downstream electrical interrupting device generating a zone-in interlock signal for said intermediate electrical interrupting device having a first value when current through said downstream electrical interrupting device is above said downstream magnitude for said first electrical interrupting device and a second value otherwise, means in said overcurrent trip unit of said intermediate electrical interrupting device generating a zone-out interlock signal having a first value when current through said intermediate electrical interrupting device exceeds the first magnitude for said intermediate electrical interrupting device and having a second value otherwise, and generating a trip signal for said intermediate electrical interrupting device when said zone-in signal has said second value and said current in said intermediate electrical interrupting device is at least as great as said first magnitude for said intermediate electrical interrupting device for a selected time interval shorter than said first time interval for said intermediate electrical interrupting device, and means in said overcurrent trip unit of said upstream electrical interrupting device generating a trip signal for said upstream electrical interrupting device when said zone-out interlock signal has said second value and said current in said upstream electrical interrupting device is at least as great as said first magnitude for said upstream electrical interrupting device for a selected time interval which is less than said first time interval for said upstream electrical interrupting device.

25. The electrical system of claim 24 wherein said current sensing means of each electrical interrupting device includes means sensing ground fault current, wherein each overcurrent trip unit includes means selectively generating a ground fault trip signal as a predetermined long delay function of ground fault current of a third magnitude and a third time interval for said electrical interrupting device, and a predetermined short delay function of ground fault current of a fourth magnitude which is more than said third magnitude and a fourth time interval which is shorter than said third time interval, wherein said zone interlock means includes means generating a zone-in ground fault interlock signal having a first value when ground fault current in said downstream electrical interrupting device exceeds said third magnitude for said downstream electrical interrupting device and having a second value otherwise, means generating a zone-out ground fault interlock signal having a first value when ground fault current in said intermediate electrical interrupting device exceeds said third magnitude for said intermediate electrical interrupting device and having a second value otherwise, and generating a ground fault trip signal in said intermediate electrical device when said zone-in ground fault interlock signal has said second value and ground fault current in said intermediate electrical interrupting device exceeds said third magnitude for said intermediate electrical interrupting device for a selected period of time which is shorter than said third time interval.

26. An overcurrent trip unit for an electrical interrupting device, said overcurrent trip unit comprising:

current sensing means for sensing an electrical current flowing through said electrical interrupting device, the electrical current having a magnitude and a time period;

trip means responsive to said current sensing means for generating a trip signal as a predetermined function of the magnitude and the time period of the electrical current flowing through said electrical interrupting device;

status means indicating an open and a closed status of said electrical interrupting device;

making current discriminator means responsive to said current sensing means for actuating said trip means to generate a trip signal in response to the electrical current flowing through said electrical interrupting device which exceeds a preset value only within a preset positive time interval after said status means indicates that said electrical interrupting device is closed.

27. The overcurrent trip unit of claim 26 wherein said preset positive time interval is a selected positive number of cycles of ac current flowing through said electrical interrupting device.

28. The overcurrent trip unit device of claim 27 wherein said selected positive number of cycles is about 10.

29. The overcurrent trip unit of claim 26 wherein said trip means includes selection means selectively enabling and disabling said making current discriminator means.

30. The overcurrent trip unit of claim 29 wherein said trip means generates a trip signal as a predetermined function of the magnitude and the time period of the electrical current flowing through said electrical interrupting device, the predetermined function being a selectable instantaneous function, and wherein said selection means selectively enables and disables said making current discriminator means when said instantaneous function is not selected.

31. An overcurrent trip unit for an electrical interrupting device, comprising:

means for sensing an electrical current in an electrical interrupting device, the electrical current having a magnitude and a time period; and means responsive to said sensing means for providing a trip signal in accordance with a selectable predetermined function of the magnitude and the time period of the electrical current flowing in said electrical interrupting device, said selectable predetermined function defines a long time delay portion and is selected from a plurality of programmed functions, and is the product of said electrical current raised to the fourth power and time.

32. An overcurrent trip unit for an electrical interrupting device, said overcurrent trip unit comprising:

means for sensing an electrical current in an electrical interrupting device, the electrical current having a magnitude and a time period;

means responsive to said sensing means for providing a trip signal in accordance with a selectable predetermined function of the magnitude and the time period of the electrical current flowing in said electrical interrupting device, said selectable predetermined function defines a long time delay portion and is selected from a plurality of programmed functions; and wherein said means responsive to said sensing means includes means for communicating with a remote communications device, said plurality of programmed selective functions being selected from said remote communications device.

33. An overcurrent trip unit for an electrical interrupting device, said overcurrent trip unit comprising:

means for sensing an electrical current in an electrical interrupting device, the electrical current having a magnitude and a time period;

means responsive to said sensing means for providing a trip signal in accordance with a selectable predetermined function of the magnitude and the time period of the electrical current flowing in said electrical interrupting device, said selectable predetermined function defines a long time delay portion an is selected from a plurality of programmed functions; and wherein said means responsive to said sensing means includes means storing setpoints and wherein said communicating means includes means for allowing said remote communications device to read said plurality of programmed functions and said setpoints.

34. An overcurrent trip unit for an electrical interrupting device including electrical phase currents having a magnitude, said overcurrent trip unit comprising:

first means including a plurality of current transformers each having a secondary winding for generating a secondary phase current in each of said secondary windings representative of the electrical phase currents in said electrical interrupting device;

second means responsive to said first means for providing a signal representative of the secondary phase current having a largest peak magnitude;

third means responsive to said second means for providing a reference signal as a function of the largest peak magnitude of said secondary phase currents in said electrical interrupting device, said third means including means for providing said reference signal even during a condition when said current transformers are saturated; said third means also including means for providing a pulse width modulated signal which pulse width is variable as a function of a selected magnitude at which said trip signal is initiated;

means for adjusting a magnitude related to said secondary phase currents in said electrical interrupting device at which said reference signal is initiated; and means responsive to said second means and said third means for initiating a trip signal.

* * * * *